US 8,806,866 B2

(12) United States Patent
McBride et al.

(10) Patent No.: US 8,806,866 B2
(45) Date of Patent: *Aug. 19, 2014

(54) SYSTEMS AND METHODS FOR EFFICIENT TWO-PHASE HEAT TRANSFER IN COMPRESSED-AIR ENERGY STORAGE SYSTEMS

(71) Applicant: SustainX, Inc., Seabrook, NH (US)

(72) Inventors: Troy O. McBride, Norwich, VT (US); Benjamin R. Bollinger, Topsfield, MA (US); Jon Bessette, Tewksbury, MA (US); Alexander Bell, Kensington, NH (US); Dax Kepshire, Amesbury, MA (US); Arne LaVen, Hampton, NH (US); Adam Rauwerdink, West Lebanon, NH (US)

(73) Assignee: SustainX, Inc., Seabrook, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/012,236

(22) Filed: Aug. 28, 2013

(65) Prior Publication Data

US 2014/0000251 A1    Jan. 2, 2014

Related U.S. Application Data

(63) Continuation of application No. 13/755,636, filed on Jan. 31, 2013, now Pat. No. 8,539,763, which is a continuation of application No. 13/644,456, filed on Oct. 4, 2012, which is a continuation of application No. 13/473,128, filed on May 16, 2012.

(60) Provisional application No. 61/486,937, filed on May 17, 2011, provisional application No. 61/489,762, filed on May 25, 2011, provisional application No. 61/512,981, filed on Jul. 29, 2011, provisional application No. 61/569,528, filed on Dec. 12, 2011, provisional application No. 61/601,641, filed on Feb. 22, 2012, provisional application No. 61/620,018, filed on Apr. 4, 2012.

(51) Int. Cl.
*F01K 3/00* (2006.01)
*F15B 21/04* (2006.01)

(52) U.S. Cl.
USPC .............. 60/509; 60/512; 60/514; 60/530; 91/4 A

(58) Field of Classification Search
USPC ....... 60/508–515, 530, 651, 671; 91/4 R, 4 A
See application file for complete search history.

(56) References Cited

U.S. PATENT DOCUMENTS

| | | | |
|---|---|---|---|
| 114,297 A | 5/1871 | Ivens et al. | |
| 224,081 A | 2/1880 | Eckart | |

(Continued)

FOREIGN PATENT DOCUMENTS

| | | |
|---|---|---|
| BE | 898225 | 3/1984 |
| BE | 1008885 | 8/1996 |

(Continued)

OTHER PUBLICATIONS

"Hydraulic Transformer Supplies Continuous High Pressure," Machine Design, Penton Media, vol. 64, No. 17, (Aug. 1992), 1 page.

(Continued)

*Primary Examiner* — Hoang Nguyen
(74) *Attorney, Agent, or Firm* — Occhiuti & Rohlicek LLP

(57) ABSTRACT

In various embodiments, foam is compressed to store energy and/or expanded to recover energy.

30 Claims, 50 Drawing Sheets

(56) References Cited

U.S. PATENT DOCUMENTS

| | | |
|---|---|---|
| 233,432 A | 10/1880 | Pitchford |
| 1,353,216 A | 9/1920 | Carlson |
| 1,635,524 A | 7/1927 | Aikman |
| 2,141,703 A | 12/1938 | Bays |
| 2,280,100 A | 4/1942 | SinQleton |
| 2,280,845 A | 4/1942 | Parker |
| 2,404,660 A | 7/1946 | Rouleau |
| 2,420,098 A | 5/1947 | Rouleau |
| 2,486,081 A | 10/1949 | Weenen |
| 2,539,862 A | 1/1951 | Rushing |
| 2,628,564 A | 2/1953 | Jacobs |
| 2,632,995 A | 3/1953 | Noe |
| 2,712,728 A | 7/1955 | Lewis et al. |
| 2,813,398 A | 11/1957 | Wilcox |
| 2,829,501 A | 4/1958 | Walls |
| 2,880,759 A | 4/1959 | Wisman |
| 3,041,842 A | 7/1962 | Heinecke |
| 3,100,965 A | 8/1963 | Blackburn |
| 3,236,512 A | 2/1966 | Caslav et al. |
| 3,269,121 A | 8/1966 | Ludwig |
| 3,538,340 A | 11/1970 | LanQ |
| 3,608,311 A | 9/1971 | Roesel, Jr. |
| 3,648,458 A | 3/1972 | McAlister |
| 3,650,636 A | 3/1972 | Eskeli |
| 3,672,160 A | 6/1972 | Kim |
| 3,677,008 A | 7/1972 | Koutz |
| 3,704,079 A | 11/1972 | Berlyn |
| 3,757,517 A | 9/1973 | RiQollot |
| 3,793,848 A | 2/1974 | Eskeli |
| 3,801,793 A | 4/1974 | Goebel |
| 3,803,847 A | 4/1974 | McAlister |
| 3,839,863 A | 10/1974 | Frazier |
| 3,847,182 A | 11/1974 | Greer |
| 3,895,493 A | 7/1975 | Rigollot |
| 3,903,696 A | 9/1975 | Carman |
| 3,935,469 A | 1/1976 | Haydock |
| 3,939,356 A | 2/1976 | Loane |
| 3,942,323 A | 3/1976 | Maillet |
| 3,945,207 A | 3/1976 | Hyatt |
| 3,948,049 A | 4/1976 | Ohms et al. |
| 3,952,516 A | 4/1976 | Lapp |
| 3,952,723 A | 4/1976 | Browning |
| 3,958,899 A | 5/1976 | Coleman, Jr. et al. |
| 3,986,354 A | 10/1976 | Erb |
| 3,988,592 A | 10/1976 | Porter |
| 3,988,897 A | 11/1976 | Strub |
| 3,990,246 A | 11/1976 | Wilmers |
| 3,991,574 A | 11/1976 | Frazier |
| 3,996,741 A | 12/1976 | Herberg |
| 3,998,049 A | 12/1976 | McKinley et al. |
| 3,999,388 A | 12/1976 | Nystrom |
| 4,008,006 A | 2/1977 | Bea |
| 4,027,993 A | 6/1977 | Wolff |
| 4,030,303 A | 6/1977 | Kraus et al. |
| 4,031,702 A | 6/1977 | Burnett et al. |
| 4,031,704 A | 6/1977 | Moore et al. |
| 4,041,708 A | 8/1977 | Wolff |
| 4,050,246 A | 9/1977 | Bourquardez |
| 4,055,950 A | 11/1977 | Grossman |
| 4,058,979 A | 11/1977 | Germain |
| 4,075,844 A | 2/1978 | Schiferli |
| 4,089,744 A | 5/1978 | Cahn |
| 4,092,830 A * | 6/1978 | Rilett .............................. 60/671 |
| 4,094,356 A | 6/1978 | Ash et al. |
| 4,095,118 A | 6/1978 | Ratbun |
| 4,100,745 A | 7/1978 | Gyarmathy et al. |
| 4,104,955 A | 8/1978 | Murphy |
| 4,108,077 A | 8/1978 | Laing |
| 4,109,465 A | 8/1978 | Plen |
| 4,110,987 A | 9/1978 | Cahn et al. |
| 4,112,311 A | 9/1978 | Theyse |
| 4,117,342 A | 9/1978 | Melley, Jr. |
| 4,117,696 A | 10/1978 | Fawcett et al. |
| 4,118,637 A | 10/1978 | Tackett |
| 4,124,182 A | 11/1978 | Loeb |
| 4,126,000 A | 11/1978 | Funk |
| 4,136,432 A | 1/1979 | Melley, Jr. |
| 4,142,368 A | 3/1979 | Mantegani |
| 4,147,204 A | 4/1979 | Pfenninger |
| 4,149,092 A | 4/1979 | Cros |
| 4,150,547 A | 4/1979 | Hobson |
| 4,154,292 A | 5/1979 | Herrick |
| 4,167,372 A | 9/1979 | Tackett |
| 4,170,878 A | 10/1979 | Jahnig |
| 4,173,431 A | 11/1979 | Smith |
| 4,189,925 A | 2/1980 | Long |
| 4,194,889 A | 3/1980 | Wanner |
| 4,195,481 A | 4/1980 | Gregory |
| 4,197,700 A | 4/1980 | Jahnig |
| 4,197,715 A | 4/1980 | Fawcett et al. |
| 4,201,514 A | 5/1980 | Huetter |
| 4,204,126 A | 5/1980 | Diggs |
| 4,206,608 A | 6/1980 | Bell |
| 4,209,982 A | 7/1980 | Pitts |
| 4,220,006 A | 9/1980 | Kindt |
| 4,224,799 A * | 9/1980 | Rilett .............................. 60/671 |
| 4,229,143 A | 10/1980 | Pucher |
| 4,229,661 A | 10/1980 | Mead et al. |
| 4,232,253 A | 11/1980 | Mortelmans |
| 4,237,692 A | 12/1980 | Ahrens et al. |
| 4,242,878 A | 1/1981 | Brinkerhoff |
| 4,246,978 A | 1/1981 | Schulz et al. |
| 4,262,735 A | 4/1981 | Courrege |
| 4,273,514 A | 6/1981 | Shore et al. |
| 4,274,010 A | 6/1981 | Lawson-tancred |
| 4,275,310 A | 6/1981 | Summers et al. |
| 4,281,256 A | 7/1981 | Ahrens |
| 4,293,323 A | 10/1981 | Cohen |
| 4,299,198 A | 11/1981 | Woodhull |
| 4,302,684 A | 11/1981 | Gogins |
| 4,304,103 A | 12/1981 | Hamrick |
| 4,311,011 A | 1/1982 | Lewis |
| 4,316,096 A | 2/1982 | Syverson |
| 4,317,439 A | 3/1982 | Emmerling |
| 4,335,867 A | 6/1982 | Bihlmaier |
| 4,340,822 A | 7/1982 | Gregg |
| 4,341,072 A | 7/1982 | Clyne |
| 4,348,863 A | 9/1982 | Taylor et al. |
| 4,353,214 A | 10/1982 | Gardner |
| 4,354,420 A | 10/1982 | Bianchetta |
| 4,355,956 A | 10/1982 | Ringrose et al. |
| 4,358,250 A | 11/1982 | Payne |
| 4,367,786 A | 1/1983 | Hafner et al. |
| 4,368,692 A | 1/1983 | Kita |
| 4,368,775 A | 1/1983 | Ward |
| 4,370,559 A | 1/1983 | Langley, Jr. |
| 4,372,114 A | 2/1983 | Burnham |
| 4,375,387 A | 3/1983 | deFilippi et al. |
| 4,380,419 A | 4/1983 | Morton |
| 4,392,062 A | 7/1983 | Bervig |
| 4,393,752 A | 7/1983 | Meier |
| 4,411,136 A | 10/1983 | Funk |
| 4,416,114 A | 11/1983 | Martini |
| 4,421,661 A | 12/1983 | Claar et al. |
| 4,428,711 A | 1/1984 | Archer |
| 4,435,131 A | 3/1984 | Ruben |
| 4,444,011 A | 4/1984 | Kolin |
| 4,446,698 A | 5/1984 | Benson |
| 4,447,738 A | 5/1984 | Allison |
| 4,449,372 A | 5/1984 | Rilett |
| 4,452,046 A | 6/1984 | Valentin |
| 4,452,047 A | 6/1984 | Hunt et al. |
| 4,454,429 A | 6/1984 | Buonome |
| 4,454,720 A | 6/1984 | Leibowitz |
| 4,455,834 A | 6/1984 | Earle |
| 4,462,213 A | 7/1984 | Lewis |
| 4,474,002 A | 10/1984 | Perry |
| 4,476,851 A | 10/1984 | Brugger et al. |
| 4,478,553 A | 10/1984 | Leibowitz et al. |
| 4,489,554 A | 12/1984 | Otters |
| 4,491,739 A | 1/1985 | Watson |
| 4,492,539 A | 1/1985 | Specht |
| 4,493,189 A | 1/1985 | Slater |
| 4,496,847 A | 1/1985 | Parkins |

(56) References Cited

U.S. PATENT DOCUMENTS

| | | |
|---|---|---|
| 4,498,848 A | 2/1985 | Petrovsky |
| 4,502,284 A | 3/1985 | Chrisoghilos |
| 4,503,673 A | 3/1985 | Schachle |
| 4,515,516 A | 5/1985 | Perrine et al. |
| 4,520,840 A | 6/1985 | Michel |
| 4,525,631 A | 6/1985 | Allison |
| 4,530,208 A | 7/1985 | Sato |
| 4,547,209 A | 10/1985 | Netzer |
| 4,574,592 A | 3/1986 | Eskeli |
| 4,585,039 A | 4/1986 | Hamilton |
| 4,589,475 A | 5/1986 | Jones |
| 4,593,202 A | 6/1986 | Dickinson |
| 4,619,225 A | 10/1986 | Lowther |
| 4,624,623 A | 11/1986 | Wagner |
| 4,648,801 A | 3/1987 | Wilson |
| 4,651,525 A | 3/1987 | Cestero |
| 4,653,986 A | 3/1987 | Ashton |
| 4,671,742 A | 6/1987 | Gyimesi |
| 4,676,068 A | 6/1987 | Funk |
| 4,679,396 A | 7/1987 | Heggie |
| 4,691,524 A | 9/1987 | Holscher |
| 4,693,080 A | 9/1987 | Van Hooff |
| 4,706,456 A | 11/1987 | Backe |
| 4,707,988 A | 11/1987 | Palmers |
| 4,710,100 A | 12/1987 | Laing et al. |
| 4,735,552 A | 4/1988 | Watson |
| 4,738,101 A | 4/1988 | Kubik |
| 4,739,620 A | 4/1988 | Pierce |
| 4,751,818 A | 6/1988 | Kubik |
| 4,760,697 A | 8/1988 | Heggie |
| 4,761,118 A | 8/1988 | Zanarini et al. |
| 4,765,142 A | 8/1988 | Nakhamkin |
| 4,765,143 A | 8/1988 | Crawford et al. |
| 4,767,938 A | 8/1988 | Bervig |
| 4,792,700 A | 12/1988 | Ammons |
| 4,849,648 A | 7/1989 | Longardner |
| 4,870,816 A | 10/1989 | Nakhamkin |
| 4,872,307 A | 10/1989 | Nakhamkin |
| 4,873,828 A | 10/1989 | Laing et al. |
| 4,873,831 A | 10/1989 | Dehne |
| 4,876,992 A | 10/1989 | Sobotowski |
| 4,877,530 A | 10/1989 | Moses |
| 4,885,912 A | 12/1989 | Nakhamkin |
| 4,886,534 A | 12/1989 | Castan |
| 4,907,495 A | 3/1990 | Sugahara |
| 4,936,109 A | 6/1990 | Longardner |
| 4,942,736 A | 7/1990 | Bronicki |
| 4,947,977 A | 8/1990 | Raymond |
| 4,955,195 A | 9/1990 | Jones et al. |
| 4,984,432 A | 1/1991 | Corey |
| 5,016,441 A | 5/1991 | Pinto |
| 5,048,292 A | 9/1991 | Kubik |
| 5,056,601 A | 10/1991 | Grimmer |
| 5,058,385 A | 10/1991 | Everett, Jr. |
| 5,062,498 A | 11/1991 | Tobias |
| 5,107,681 A | 4/1992 | Wolfbauer, III |
| 5,133,190 A | 7/1992 | Abdelmalek |
| 5,138,838 A | 8/1992 | Crosser |
| 5,140,170 A | 8/1992 | Henderson |
| 5,152,260 A | 10/1992 | Erickson et al. |
| 5,161,449 A | 11/1992 | Everett, Jr. |
| 5,169,295 A | 12/1992 | Stogner et al. |
| 5,182,086 A | 1/1993 | Henderson et al. |
| 5,203,168 A | 4/1993 | Oshina |
| 5,209,063 A | 5/1993 | Shirai et al. |
| 5,213,470 A | 5/1993 | Lundquist |
| 5,239,833 A | 8/1993 | Fineblum |
| 5,259,345 A | 11/1993 | Richeson |
| 5,271,225 A | 12/1993 | Adamides |
| 5,279,206 A | 1/1994 | Krantz |
| 5,296,799 A | 3/1994 | Davis |
| 5,309,713 A | 5/1994 | Vassallo |
| 5,321,946 A | 6/1994 | Abdelmalek |
| 5,327,987 A | 7/1994 | Abdelmalek |
| 5,339,633 A | 8/1994 | Fujii et al. |
| 5,341,644 A | 8/1994 | Nelson |
| 5,344,627 A | 9/1994 | Fujii et al. |
| 5,364,611 A | 11/1994 | Iijima et al. |
| 5,365,980 A | 11/1994 | Deberardinis |
| 5,375,417 A | 12/1994 | Barth |
| 5,379,589 A | 1/1995 | Cohn et al. |
| 5,384,489 A | 1/1995 | Bellac |
| 5,387,089 A | 2/1995 | Stogner et al. |
| 5,394,693 A | 3/1995 | Plyter |
| 5,427,194 A | 6/1995 | Miller |
| 5,436,508 A | 7/1995 | Sorensen |
| 5,448,889 A | 9/1995 | Bronicki |
| 5,454,408 A | 10/1995 | Dibella et al. |
| 5,454,426 A | 10/1995 | Moseley |
| 5,467,722 A | 11/1995 | Meratla |
| 5,473,899 A | 12/1995 | Viteri et al. |
| 5,477,677 A | 12/1995 | Krnavek |
| 5,491,969 A | 2/1996 | Cohn et al. |
| 5,491,977 A | 2/1996 | Cho |
| 5,522,212 A | 6/1996 | Kubik |
| 5,524,821 A | 6/1996 | Yie et al. |
| 5,537,822 A | 7/1996 | Shnaid et al. |
| 5,544,698 A | 8/1996 | Paulman |
| 5,557,934 A | 9/1996 | Beach |
| 5,561,978 A | 10/1996 | Buschur |
| 5,562,010 A | 10/1996 | McGuire |
| 5,579,640 A | 12/1996 | Gray, Jr. et al. |
| 5,584,664 A | 12/1996 | Elliott et al. |
| 5,592,028 A | 1/1997 | Pritchard |
| 5,595,587 A | 1/1997 | Steed |
| 5,598,736 A | 2/1997 | Erskine |
| 5,599,172 A | 2/1997 | Mccabe |
| 5,600,953 A | 2/1997 | Oshita et al. |
| 5,616,007 A | 4/1997 | Cohen |
| 5,634,340 A | 6/1997 | Grennan |
| 5,641,273 A | 6/1997 | Moseley |
| 5,674,053 A | 10/1997 | Paul et al. |
| 5,685,154 A | 11/1997 | Bronicki et al. |
| 5,685,155 A | 11/1997 | Brown |
| 5,768,893 A | 6/1998 | Hoshino et al. |
| 5,769,610 A | 6/1998 | Paul et al. |
| 5,771,693 A | 6/1998 | Coney |
| 5,775,107 A | 7/1998 | Sparkman |
| 5,778,669 A | 7/1998 | Kubik |
| 5,778,675 A | 7/1998 | Nakhamkin |
| 5,794,442 A | 8/1998 | Lisniansky |
| 5,797,980 A | 8/1998 | Fillet |
| 5,819,533 A | 10/1998 | Moonen |
| 5,819,635 A | 10/1998 | Moonen |
| 5,831,757 A | 11/1998 | DiFrancesco |
| 5,832,728 A | 11/1998 | Buck |
| 5,832,906 A | 11/1998 | Douville et al. |
| 5,839,270 A | 11/1998 | Jirnov et al. |
| 5,845,479 A | 12/1998 | Nakhamkin |
| 5,863,186 A | 1/1999 | Green et al. |
| 5,873,250 A | 2/1999 | Lewis |
| 5,901,809 A | 5/1999 | Berkun |
| 5,924,283 A | 7/1999 | Burke, Jr. |
| 5,934,063 A | 8/1999 | Nakhamkin |
| 5,934,076 A | 8/1999 | Coney |
| 5,937,652 A | 8/1999 | Abdelmalek |
| 5,971,027 A | 10/1999 | Beachley et al. |
| 6,012,279 A | 1/2000 | Hines |
| 6,023,105 A | 2/2000 | Youssef |
| 6,026,349 A | 2/2000 | Heneman |
| 6,029,445 A | 2/2000 | Lech |
| 6,073,445 A | 6/2000 | Johnson |
| 6,073,448 A | 6/2000 | Lozada |
| 6,085,520 A | 7/2000 | Kohno |
| 6,090,186 A | 7/2000 | Spencer |
| 6,119,802 A | 9/2000 | Puett, Jr. |
| 6,132,181 A | 10/2000 | Mccabe |
| 6,145,311 A | 11/2000 | Cyphelly |
| 6,148,602 A | 11/2000 | Demetri |
| 6,153,943 A | 11/2000 | Mistr, Jr. |
| 6,158,499 A | 12/2000 | Rhodes |
| 6,170,443 B1 | 1/2001 | Hofbauer |
| 6,178,735 B1 | 1/2001 | Frutschi |
| 6,179,446 B1 | 1/2001 | Sarmadi |

(56) References Cited

U.S. PATENT DOCUMENTS

| | | |
|---|---|---|
| 6,188,182 B1 | 2/2001 | Nickols et al. |
| 6,202,707 B1 | 3/2001 | Woodall et al. |
| 6,206,660 B1 | 3/2001 | Coney et al. |
| 6,210,131 B1 | 4/2001 | Whitehead |
| 6,216,462 B1 | 4/2001 | Gray, Jr. |
| 6,225,706 B1 | 5/2001 | Keller |
| 6,276,123 B1 | 8/2001 | Chen et al. |
| 6,327,858 B1 | 12/2001 | Negre et al. |
| 6,327,994 B1 | 12/2001 | Labrador |
| 6,349,543 B1 | 2/2002 | Lisniansky |
| RE37,603 E | 3/2002 | Coney |
| 6,352,576 B1 | 3/2002 | Spencer et al. |
| 6,360,535 B1 | 3/2002 | Fisher |
| 6,367,570 B1 | 4/2002 | Long, III |
| 6,372,023 B1 | 4/2002 | Kiyono et al. |
| 6,389,814 B2 | 5/2002 | Viteri et al. |
| 6,397,578 B2 | 6/2002 | Tsukamoto |
| 6,401,458 B2 | 6/2002 | Jacobson |
| 6,407,465 B1 | 6/2002 | Peltz et al. |
| 6,419,462 B1 | 7/2002 | Horie et al. |
| 6,422,016 B2 | 7/2002 | Alkhamis |
| 6,453,659 B1 | 9/2002 | Van Liere et al. |
| 6,478,289 B1 | 11/2002 | Trewin |
| 6,484,498 B1 | 11/2002 | Bonar, II |
| 6,512,966 B2 | 1/2003 | Lof |
| 6,513,326 B1 | 2/2003 | Maceda et al. |
| 6,516,615 B1 | 2/2003 | Stockhausen et al. |
| 6,516,616 B2 | 2/2003 | Carver |
| 6,554,088 B2 | 4/2003 | Severinsky et al. |
| 6,598,392 B2 | 7/2003 | Majeres |
| 6,598,402 B2 | 7/2003 | Kataoka et al. |
| 6,606,860 B2 | 8/2003 | McFarland |
| 6,612,348 B1 | 9/2003 | Wiley |
| 6,619,930 B2 | 9/2003 | Jansen et al. |
| 6,626,212 B2 | 9/2003 | Morioka et al. |
| 6,629,413 B1 | 10/2003 | Wendt et al. |
| 6,637,185 B2 | 10/2003 | hatamiya et al. |
| 6,652,241 B1 | 11/2003 | Alder |
| 6,652,243 B2 | 11/2003 | Krasnov |
| 6,666,024 B1 | 12/2003 | Moskal |
| 6,670,402 B1 | 12/2003 | Lee et al. |
| 6,672,056 B2 | 1/2004 | Roth et al. |
| 6,675,765 B2 | 1/2004 | Endoh |
| 6,688,108 B1 | 2/2004 | Van Liere |
| 6,698,472 B2 | 3/2004 | Camacho et al. |
| 6,711,984 B2 | 3/2004 | Tagge et al. |
| 6,712,166 B2 | 3/2004 | Rush et al. |
| 6,715,514 B2 | 4/2004 | Parker, III |
| 6,718,761 B2 | 4/2004 | Merswolke et al. |
| 6,739,131 B1 | 5/2004 | Kershaw |
| 6,739,419 B2 | 5/2004 | Jain et al. |
| 6,745,569 B2 | 6/2004 | Gerdes |
| 6,745,801 B1 | 6/2004 | Cohen et al. |
| 6,748,737 B2 | 6/2004 | Lafferty |
| 6,762,926 B1 | 7/2004 | Shiue et al. |
| 6,786,245 B1 | 9/2004 | Eichelberger |
| 6,789,387 B2 | 9/2004 | Brinkman |
| 6,789,576 B2 | 9/2004 | Umetsu et al. |
| 6,797,039 B2 | 9/2004 | Spencer |
| 6,815,840 B1 | 11/2004 | Aldendeshe |
| 6,817,185 B2 | 11/2004 | Coney et al. |
| 6,834,737 B2 | 12/2004 | Bloxham |
| 6,840,309 B2 | 1/2005 | Wilson et al. |
| 6,848,259 B2 | 2/2005 | Kelller-sornig et al. |
| 6,857,450 B2 | 2/2005 | Rupp |
| 6,874,453 B2 | 4/2005 | Coney et al. |
| 6,883,775 B2 | 4/2005 | Coney et al. |
| 6,886,326 B2 | 5/2005 | Holtzapple et al. |
| 6,892,802 B2 | 5/2005 | Kelly et al. |
| 6,900,556 B2 | 5/2005 | Provanzana |
| 6,922,991 B2 | 8/2005 | Polcuch |
| 6,925,821 B2 | 8/2005 | Sienel |
| 6,927,503 B2 | 8/2005 | Enish et al. |
| 6,931,848 B2 | 8/2005 | Maceda et al. |
| 6,935,096 B2 | 8/2005 | Haiun |
| 6,938,415 B2 | 9/2005 | Last |
| 6,938,654 B2 | 9/2005 | Gershtein et al. |
| 6,946,017 B2 | 9/2005 | Leppin et al. |
| 6,948,328 B2 | 9/2005 | Kidwell |
| 6,952,058 B2 | 10/2005 | Mccoin |
| 6,959,546 B2 | 11/2005 | Corcoran |
| 6,963,802 B2 | 11/2005 | Enis |
| 6,964,165 B2 | 11/2005 | Uhl et al. |
| 6,964,176 B2 | 11/2005 | Kidwell |
| 6,974,307 B2 | 12/2005 | Antoune et al. |
| 7,000,389 B2 | 2/2006 | Lewellin |
| 7,007,474 B1 | 3/2006 | Ochs et al. |
| 7,017,690 B2 | 3/2006 | Burke |
| 7,028,934 B2 | 4/2006 | Burynski, Jr. |
| 7,040,083 B2 | 5/2006 | Horii et al. |
| 7,040,108 B1 | 5/2006 | Flammang |
| 7,040,859 B2 | 5/2006 | Kane |
| 7,043,920 B2 | 5/2006 | Viteri et al. |
| 7,047,744 B1 | 5/2006 | Robertson et al. |
| 7,055,325 B2 | 6/2006 | Wolken |
| 7,067,937 B2 | 6/2006 | Enish et al. |
| 7,075,189 B2 | 7/2006 | Heronemus et al. |
| RE39,249 E | 8/2006 | Link, Jr. |
| 7,084,520 B2 | 8/2006 | Zambrano |
| 7,086,231 B2 | 8/2006 | Pinkerton |
| 7,093,450 B2 | 8/2006 | Jimenez Haertel et al. |
| 7,093,626 B2 | 8/2006 | Li et al. |
| 7,098,552 B2 | 8/2006 | Mccoin |
| 7,107,766 B2 | 9/2006 | Zacche' et al. |
| 7,107,767 B2 | 9/2006 | Frazer et al. |
| 7,116,006 B2 | 10/2006 | Mccoin |
| 7,124,576 B2 | 10/2006 | Cherney et al. |
| 7,124,586 B2 | 10/2006 | Negre et al. |
| 7,127,887 B2 | 10/2006 | Nakamura et al. |
| 7,127,895 B2 | 10/2006 | Pinkerton et al. |
| 7,128,777 B2 | 10/2006 | Spencer |
| 7,134,279 B2 | 11/2006 | White |
| 7,155,912 B2 | 1/2007 | Enis et al. |
| 7,168,928 B1 | 1/2007 | West |
| 7,168,929 B2 | 1/2007 | Siegel et al. |
| 7,169,489 B2 | 1/2007 | Redmond |
| 7,177,751 B2 | 2/2007 | Froloff |
| 7,178,337 B2 | 2/2007 | Pflanz |
| 7,191,603 B2 | 3/2007 | Taube |
| 7,197,871 B2 | 4/2007 | Yoshino |
| 7,201,095 B2 | 4/2007 | Hughey |
| 7,218,009 B2 | 5/2007 | Hendrickson et al. |
| 7,219,779 B2 | 5/2007 | Bauer et al. |
| 7,225,762 B2 | 6/2007 | Mahlanen |
| 7,228,690 B2 | 6/2007 | Barker |
| 7,230,348 B2 | 6/2007 | Poole |
| 7,231,998 B1 | 6/2007 | Schechter |
| 7,240,812 B2 | 7/2007 | Kamikozuru |
| 7,249,617 B2 | 7/2007 | Musselman et al. |
| 7,254,944 B1 | 8/2007 | Goetzinger et al. |
| 7,273,122 B2 | 9/2007 | Rose |
| 7,281,371 B1 | 10/2007 | Heidenreich et al. |
| 7,308,361 B2 | 12/2007 | Enis et al. |
| 7,317,261 B2 | 1/2008 | Rolt |
| 7,322,377 B2 | 1/2008 | Baltes |
| 7,325,401 B1 | 2/2008 | Kesseli et al. |
| 7,328,575 B2 | 2/2008 | Hedman |
| 7,329,099 B2 | 2/2008 | Hartman |
| 7,347,049 B2 | 3/2008 | Rajendran et al. |
| 7,353,786 B2 | 4/2008 | Scuderi et al. |
| 7,353,845 B2 | 4/2008 | Underwood et al. |
| 7,354,252 B2 | 4/2008 | Baatrup et al. |
| 7,364,410 B2 | 4/2008 | Link, Jr. |
| 7,392,871 B2 | 7/2008 | Severinsky et al. |
| 7,406,828 B1 | 8/2008 | Nakhamkin |
| 7,407,501 B2 | 8/2008 | Zvuloni |
| 7,415,835 B2 | 8/2008 | Cowans et al. |
| 7,415,995 B2 | 8/2008 | Plummer et al. |
| 7,417,331 B2 | 8/2008 | De La Torre et al. |
| 7,418,820 B2 | 9/2008 | Harvey et al. |
| 7,436,086 B2 | 10/2008 | Mcclintic |
| 7,441,399 B2 | 10/2008 | Utamura |
| 7,448,213 B2 | 11/2008 | Mitani |
| 7,453,164 B2 | 11/2008 | Borden et al. |

(56) References Cited

U.S. PATENT DOCUMENTS

| | | |
|---|---|---|
| 7,469,527 B2 | 12/2008 | Negre et al. |
| 7,471,010 B1 | 12/2008 | Fingersh |
| 7,481,337 B2 | 1/2009 | Luharuka et al. |
| 7,488,159 B2 | 2/2009 | Bhatt et al. |
| 7,527,482 B2 | 5/2009 | Ursan et al. |
| 7,527,483 B1 | 5/2009 | Glauber |
| 7,579,700 B1 | 8/2009 | Meller |
| 7,603,970 B2 | 10/2009 | Scuderi et al. |
| 7,607,503 B1 | 10/2009 | Schechter |
| 7,693,402 B2 | 4/2010 | Hudson et al. |
| 7,694,514 B2 | 4/2010 | Smith et al. |
| 7,802,426 B2 | 9/2010 | Bollinger |
| 7,827,787 B2 | 11/2010 | Cherney et al. |
| 7,832,207 B2 | 11/2010 | McBride et al. |
| 7,843,076 B2 | 11/2010 | Gogoana et al. |
| 7,874,155 B2 | 1/2011 | McBride et al. |
| 7,900,444 B1 | 3/2011 | McBride et al. |
| 7,958,731 B2 | 6/2011 | McBride et al. |
| 7,963,110 B2 | 6/2011 | McBride et al. |
| 8,037,678 B2 | 10/2011 | McBride et al. |
| 8,046,990 B2 | 11/2011 | Bollinger et al. |
| 8,104,274 B2 | 1/2012 | McBride et al. |
| 8,109,085 B2 | 2/2012 | McBride et al. |
| 8,117,842 B2 | 2/2012 | McBride et al. |
| 8,122,718 B2 | 2/2012 | McBride et al. |
| 8,171,728 B2 | 5/2012 | Bollinger et al. |
| 8,191,362 B2 | 6/2012 | McBride et al. |
| 8,225,606 B2 | 7/2012 | McBride et al. |
| 8,234,862 B2 | 8/2012 | McBride et al. |
| 8,234,863 B2 | 8/2012 | McBride et al. |
| 8,234,868 B2 | 8/2012 | Bollinger et al. |
| 8,240,140 B2 | 8/2012 | McBride et al. |
| 8,240,146 B1 | 8/2012 | Bollinger |
| 8,245,508 B2 | 8/2012 | Bollinger et al. |
| 8,250,863 B2 | 8/2012 | Bollinger et al. |
| 8,272,212 B2 | 9/2012 | Blieske |
| 8,359,856 B2 | 1/2013 | McBride et al. |
| 8,448,433 B2 | 5/2013 | McBride et al. |
| 8,468,815 B2 | 6/2013 | McBride et al. |
| 8,474,255 B2 | 7/2013 | McBride et al. |
| 8,479,502 B2 | 7/2013 | McBride et al. |
| 8,479,505 B2 | 7/2013 | McBride et al. |
| 8,495,872 B2 | 7/2013 | McBride et al. |
| 8,539,763 B2 * | 9/2013 | Mcbride et al. ............ 60/509 |
| 2001/0045093 A1 | 11/2001 | Jacobson |
| 2003/0131599 A1 | 7/2003 | Gerdes |
| 2003/0145589 A1 | 8/2003 | Tillyer |
| 2003/0177767 A1 | 9/2003 | Keller-sornig et al. |
| 2003/0180155 A1 | 9/2003 | Coney et al. |
| 2004/0050042 A1 | 3/2004 | Frazer |
| 2004/0050049 A1 | 3/2004 | Wendt et al. |
| 2004/0146406 A1 | 7/2004 | Last |
| 2004/0146408 A1 | 7/2004 | Anderson |
| 2004/0148934 A1 | 8/2004 | Pinkerton et al. |
| 2004/0211182 A1 | 10/2004 | Gould |
| 2004/0244580 A1 | 12/2004 | Coney et al. |
| 2004/0261415 A1 | 12/2004 | Negre et al. |
| 2005/0016165 A1 | 1/2005 | Enis et al. |
| 2005/0028529 A1 | 2/2005 | Bartlett et al. |
| 2005/0047930 A1 | 3/2005 | Schmid |
| 2005/0066655 A1 | 3/2005 | Aarestad et al. |
| 2005/0072154 A1 | 4/2005 | Frutschi |
| 2005/0115234 A1 | 6/2005 | Asano et al. |
| 2005/0155347 A1 | 7/2005 | Lewellin |
| 2005/0166592 A1 | 8/2005 | Larson et al. |
| 2005/0274334 A1 | 12/2005 | Warren |
| 2005/0275225 A1 | 12/2005 | Bertolotti |
| 2005/0279086 A1 | 12/2005 | Hoos |
| 2005/0279292 A1 | 12/2005 | Hudson et al. |
| 2005/0279296 A1 | 12/2005 | Coney et al. |
| 2006/0055175 A1 | 3/2006 | Grinblat |
| 2006/0059912 A1 | 3/2006 | Romanelli et al. |
| 2006/0059936 A1 | 3/2006 | Radke et al. |
| 2006/0059937 A1 | 3/2006 | Perkins et al. |
| 2006/0075749 A1 | 4/2006 | Cherney et al. |
| 2006/0090467 A1 | 5/2006 | Crow |
| 2006/0090477 A1 | 5/2006 | Rolff |
| 2006/0107664 A1 | 5/2006 | Hudson et al. |
| 2006/0162543 A1 | 7/2006 | Abe et al. |
| 2006/0162910 A1 | 7/2006 | Kelly et al. |
| 2006/0175337 A1 | 8/2006 | Defosset |
| 2006/0201148 A1 | 9/2006 | Zabtcioglu |
| 2006/0218924 A1 | 10/2006 | Mitani |
| 2006/0242954 A1 | 11/2006 | Welch, Jr. |
| 2006/0248886 A1 | 11/2006 | Ma |
| 2006/0248892 A1 | 11/2006 | Ingersoll |
| 2006/0254281 A1 | 11/2006 | Badeer et al. |
| 2006/0260311 A1 | 11/2006 | Ingersoll |
| 2006/0260312 A1 | 11/2006 | Ingersoll |
| 2006/0262465 A1 | 11/2006 | Wiederhold |
| 2006/0266034 A1 | 11/2006 | Ingersoll |
| 2006/0266035 A1 | 11/2006 | Ingersoll et al. |
| 2006/0266036 A1 | 11/2006 | Ingersoll |
| 2006/0266037 A1 | 11/2006 | Ingersoll |
| 2006/0280993 A1 | 12/2006 | Keefer et al. |
| 2006/0283967 A1 | 12/2006 | Cho et al. |
| 2007/0006586 A1 | 1/2007 | Hoffman et al. |
| 2007/0022754 A1 | 2/2007 | Perkins et al. |
| 2007/0022755 A1 | 2/2007 | Pinkerton et al. |
| 2007/0062194 A1 | 3/2007 | Ingersoll |
| 2007/0074533 A1 | 4/2007 | Hugenroth et al. |
| 2007/0095069 A1 | 5/2007 | Joshi et al. |
| 2007/0113803 A1 | 5/2007 | Froloff et al. |
| 2007/0116572 A1 | 5/2007 | Barbu et al. |
| 2007/0137595 A1 | 6/2007 | Greenwell |
| 2007/0151528 A1 | 7/2007 | Hedman |
| 2007/0158946 A1 | 7/2007 | Annen et al. |
| 2007/0181199 A1 | 8/2007 | Weber |
| 2007/0182160 A1 | 8/2007 | Enis et al. |
| 2007/0205298 A1 | 9/2007 | Harrison et al. |
| 2007/0234749 A1 | 10/2007 | Enis et al. |
| 2007/0243066 A1 | 10/2007 | Baron |
| 2007/0245735 A1 | 10/2007 | Ashikian |
| 2007/0258834 A1 | 11/2007 | Froloff et al. |
| 2008/0000436 A1 | 1/2008 | Goldman |
| 2008/0016868 A1 | 1/2008 | Ochs et al. |
| 2008/0047272 A1 | 2/2008 | Schoell |
| 2008/0050234 A1 | 2/2008 | Ingersoll et al. |
| 2008/0054205 A1 | 3/2008 | Lou |
| 2008/0072870 A1 | 3/2008 | Chomyszak et al. |
| 2008/0087165 A1 | 4/2008 | Wright et al. |
| 2008/0104939 A1 | 5/2008 | Hoffmann et al. |
| 2008/0112807 A1 | 5/2008 | Uphues et al. |
| 2008/0127632 A1 | 6/2008 | Finkenrath et al. |
| 2008/0138265 A1 | 6/2008 | Lackner et al. |
| 2008/0155975 A1 | 7/2008 | Brinkman |
| 2008/0155976 A1 | 7/2008 | Smith et al. |
| 2008/0157528 A1 | 7/2008 | Wang et al. |
| 2008/0157537 A1 | 7/2008 | Richard |
| 2008/0164449 A1 | 7/2008 | Gray et al. |
| 2008/0185194 A1 | 8/2008 | Leone |
| 2008/0202120 A1 | 8/2008 | Karyambas |
| 2008/0211230 A1 | 9/2008 | Gurin |
| 2008/0228323 A1 | 9/2008 | Laumer et al. |
| 2008/0233029 A1 | 9/2008 | Fan et al. |
| 2008/0238105 A1 | 10/2008 | Ortiz et al. |
| 2008/0238187 A1 | 10/2008 | Garnett et al. |
| 2008/0250788 A1 | 10/2008 | Nuel et al. |
| 2008/0251302 A1 | 10/2008 | Lynn et al. |
| 2008/0265581 A1 | 10/2008 | Welch et al. |
| 2008/0272597 A1 | 11/2008 | Althaus |
| 2008/0272598 A1 | 11/2008 | Nakhamkin |
| 2008/0272605 A1 | 11/2008 | Borden et al. |
| 2008/0308168 A1 | 12/2008 | O'Brien, II et al. |
| 2008/0308270 A1 | 12/2008 | Wilson |
| 2008/0315589 A1 | 12/2008 | Malmrup |
| 2009/0000290 A1 | 1/2009 | Brinkman |
| 2009/0007558 A1 | 1/2009 | Hall |
| 2009/0010772 A1 | 1/2009 | Siemroth |
| 2009/0021012 A1 | 1/2009 | Stull et al. |
| 2009/0056331 A1 | 3/2009 | Zhao et al. |
| 2009/0071153 A1 | 3/2009 | Boyapati et al. |
| 2009/0107784 A1 | 4/2009 | Gabriel et al. |
| 2009/0145130 A1 | 6/2009 | Kaufman |

(56) References Cited

U.S. PATENT DOCUMENTS

| | | |
|---|---|---|
| 2009/0158740 A1 | 6/2009 | Littau et al. |
| 2009/0178409 A1 | 7/2009 | Shinnar |
| 2009/0200805 A1 | 8/2009 | Kim et al. |
| 2009/0220364 A1 | 9/2009 | Rigal et al. |
| 2009/0229902 A1 | 9/2009 | Stansbury, III |
| 2009/0249826 A1 | 10/2009 | Hugelman |
| 2009/0282822 A1 | 11/2009 | McBride et al. |
| 2009/0282840 A1 | 11/2009 | Chen et al. |
| 2009/0294096 A1 | 12/2009 | Mills et al. |
| 2009/0301089 A1 | 12/2009 | Bollinger |
| 2009/0317267 A1 | 12/2009 | Gill et al. |
| 2009/0322090 A1 | 12/2009 | Wolf |
| 2010/0018196 A1 | 1/2010 | Li et al. |
| 2010/0077765 A1 | 4/2010 | Japikse |
| 2010/0089063 A1 | 4/2010 | McBride et al. |
| 2010/0133903 A1 | 6/2010 | Rufer |
| 2010/0139277 A1 | 6/2010 | McBride et al. |
| 2010/0193270 A1 | 8/2010 | Deshaies et al. |
| 2010/0196952 A1 | 8/2010 | Lemofouet et al. |
| 2010/0205960 A1 | 8/2010 | McBride et al. |
| 2010/0229544 A1 | 9/2010 | Bollinger et al. |
| 2010/0257862 A1 | 10/2010 | Howes et al. |
| 2010/0270801 A1 | 10/2010 | Liu |
| 2010/0307156 A1 | 12/2010 | Bollinger |
| 2010/0326062 A1 | 12/2010 | Fong et al. |
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0106321 A1 | 5/2011 | Cherian et al. |
| 2011/0107755 A1 | 5/2011 | McBride et al. |
| 2011/0115223 A1 | 5/2011 | Stahlkopf et al. |
| 2011/0131966 A1 | 6/2011 | McBride et al. |
| 2011/0138797 A1 | 6/2011 | Bollinger et al. |
| 2011/0167813 A1 | 7/2011 | McBride et al. |
| 2011/0204064 A1 | 8/2011 | Crane et al. |
| 2011/0219760 A1 | 9/2011 | McBride et al. |
| 2011/0219763 A1 | 9/2011 | McBride et al. |
| 2011/0232281 A1 | 9/2011 | McBride et al. |
| 2011/0233934 A1 | 9/2011 | Crane et al. |
| 2011/0252777 A1 | 10/2011 | Bollinger et al. |
| 2011/0258996 A1 | 10/2011 | Ingersoll et al. |
| 2011/0258999 A1 | 10/2011 | Ingersoll et al. |
| 2011/0259001 A1 | 10/2011 | McBride et al. |
| 2011/0259442 A1 | 10/2011 | McBride et al. |
| 2011/0266810 A1 | 11/2011 | McBride et al. |
| 2011/0283690 A1 | 11/2011 | McBride et al. |
| 2011/0296822 A1 | 12/2011 | Bollinger et al. |
| 2011/0296823 A1 | 12/2011 | McBride et al. |
| 2011/0314800 A1 | 12/2011 | Fong et al. |
| 2011/0314804 A1 | 12/2011 | Fong et al. |
| 2011/0314810 A1 | 12/2011 | McBride et al. |
| 2012/0000557 A1 | 1/2012 | McBride et al. |
| 2012/0006013 A1 | 1/2012 | McBride et al. |
| 2012/0017580 A1 | 1/2012 | Fong et al. |
| 2012/0019009 A1 | 1/2012 | Fong et al. |
| 2012/0023919 A1 | 2/2012 | Fong et al. |
| 2012/0036851 A1 | 2/2012 | McBride et al. |
| 2012/0042772 A1 | 2/2012 | Fong et al. |
| 2012/0047884 A1 | 3/2012 | McBride et al. |
| 2012/0055147 A1 | 3/2012 | Fong et al. |
| 2012/0057996 A1 | 3/2012 | Fong et al. |
| 2012/0057998 A1 | 3/2012 | Ingersoll et al. |
| 2012/0067036 A1 | 3/2012 | Fong et al. |
| 2012/0073432 A1 | 3/2012 | Ingersoll et al. |
| 2012/0085086 A1 | 4/2012 | Bollinger et al. |
| 2012/0090314 A1 | 4/2012 | Fong et al. |
| 2012/0096845 A1 | 4/2012 | Ingersoll et al. |
| 2012/0102935 A1 | 5/2012 | Ingersoll et al. |
| 2012/0102954 A1 | 5/2012 | Ingersoll et al. |
| 2012/0118137 A1 | 5/2012 | Fong et al. |
| 2012/0119513 A1 | 5/2012 | McBride et al. |
| 2012/0119514 A1 | 5/2012 | Crane et al. |
| 2012/0137668 A1 | 6/2012 | McBride et al. |
| 2012/0174569 A1 | 7/2012 | Ingersoll et al. |
| 2012/0197683 A1 | 8/2012 | Marcus |
| 2012/0210705 A1 | 8/2012 | McBride et al. |
| 2012/0222424 A1 | 9/2012 | Ingersoll et al. |
| 2012/0255292 A1 | 10/2012 | Fong et al. |
| 2012/0260645 A1 | 10/2012 | Fong et al. |
| 2012/0269651 A1 | 10/2012 | Fong et al. |
| 2012/0279209 A1 | 11/2012 | McBride et al. |
| 2012/0285154 A1 | 11/2012 | Bollinger et al. |
| 2012/0286522 A1 | 11/2012 | Stahlkopf et al. |
| 2012/0291989 A1 | 11/2012 | Fong et al. |
| 2012/0297772 A1 | 11/2012 | McBride et al. |
| 2012/0297776 A1 | 11/2012 | Bollinger et al. |
| 2012/0299310 A1 | 11/2012 | McBride et al. |
| 2013/0001958 A1 | 1/2013 | Crane et al. |
| 2013/0009408 A1 | 1/2013 | Crane et al. |
| 2013/0032743 A1 | 2/2013 | Fong et al. |
| 2013/0047597 A1 | 2/2013 | Fong et al. |
| 2013/0074485 A1 | 3/2013 | McBride et al. |
| 2013/0074488 A1 | 3/2013 | McBride et al. |
| 2013/0074940 A1 | 3/2013 | McBride et al. |
| 2013/0074941 A1 | 3/2013 | McBride et al. |
| 2013/0074949 A1 | 3/2013 | McBride et al. |
| 2013/0091834 A1 | 4/2013 | McBride et al. |
| 2013/0091835 A1 | 4/2013 | McBride et al. |
| 2013/0091836 A1 | 4/2013 | McBride et al. |
| 2013/0098027 A1 | 4/2013 | Le Roux et al. |
| 2013/0104533 A1 | 5/2013 | Fong et al. |
| 2013/0108480 A1 | 5/2013 | Fong et al. |
| 2013/0111895 A1 | 5/2013 | Fong et al. |
| 2013/0126014 A1 | 5/2013 | Fong et al. |
| 2013/0139500 A1 | 6/2013 | McBride et al. |
| 2013/0145764 A1 | 6/2013 | McBride et al. |
| 2013/0152568 A1 | 6/2013 | Modderno et al. |
| 2013/0152571 A1 | 6/2013 | Modderno et al. |
| 2013/0152572 A1 | 6/2013 | Madderno et al. |
| 2013/0160437 A1 | 6/2013 | McBride et al. |
| 2013/0168961 A1 | 7/2013 | Stahlkopf et al. |
| 2013/0186597 A1 | 7/2013 | Clark et al. |
| 2013/0192216 A1 | 8/2013 | Berlin, Jr. et al. |

FOREIGN PATENT DOCUMENTS

| | | |
|---|---|---|
| CN | 1061262 | 5/1992 |
| CN | 1171490 | 1/1998 |
| CN | 1276308 | 12/2000 |
| CN | 1277323 | 12/2000 |
| CN | 1412443 | 4/2003 |
| CN | 1743665 | 3/2006 |
| CN | 2821162 | 9/2006 |
| CN | 2828319 | 10/2006 |
| CN | 2828368 | 10/2006 |
| CN | 1884822 | 12/2006 |
| CN | 1888328 | 1/2007 |
| CN | 1967091 | 5/2007 |
| CN | 101033731 | 9/2007 |
| CN | 101042115 | 9/2007 |
| CN | 101070822 | 11/2007 |
| CN | 101149002 | 3/2008 |
| CN | 101162073 | 4/2008 |
| CN | 201103518 | 8/2008 |
| CN | 201106527 | 8/2008 |
| CN | 101289963 | 10/2008 |
| CN | 201125855 | 10/2008 |
| CN | 101377190 | 4/2009 |
| CN | 101408213 | 4/2009 |
| CN | 101435451 | 5/2009 |

(56) References Cited

FOREIGN PATENT DOCUMENTS

| | | |
|---|---|---|
| DE | 25 38 870 | 6/1977 |
| DE | 19530253 | 11/1996 |
| DE | 19903907 | 8/2000 |
| DE | 19911534 | 9/2000 |
| DE | 10042020 | 5/2001 |
| DE | 20118183 | 3/2003 |
| DE | 20120330 | 4/2003 |
| DE | 10147940 | 5/2003 |
| DE | 10205733 | 8/2003 |
| DE | 10212480 | 10/2003 |
| DE | 20312293 | 12/2003 |
| DE | 10220499 | 4/2004 |
| DE | 10334637 | 2/2005 |
| DE | 10 2005 047622 | 4/2007 |
| EP | 0204748 | 3/1981 |
| EP | 0091801 | 10/1983 |
| EP | 0097002 | 12/1983 |
| EP | 0196690 | 10/1986 |
| EP | 0212692 | 3/1987 |
| EP | 0364106 | 4/1990 |
| EP | 0507395 | 10/1992 |
| EP | 0821162 | 1/1998 |
| EP | 0 857 677 | 8/1998 |
| EP | 1 388 442 | 2/2004 |
| EP | 1405662 | 4/2004 |
| EP | 1657452 | 11/2004 |
| EP | 1726350 | 11/2006 |
| EP | 1741899 | 1/2007 |
| EP | 1 780 058 | 5/2007 |
| EP | 1988294 | 11/2008 |
| EP | 2014896 | 1/2009 |
| EP | 2078857 | 7/2009 |
| FR | 2449805 | 9/1980 |
| FR | 2816993 | 5/2002 |
| FR | 2829805 | 3/2003 |
| GB | 722524 | 11/1951 |
| GB | 772703 | 4/1957 |
| GB | 1449076 | 9/1976 |
| GB | 1479940 | 7/1977 |
| GB | 1 589 364 A | 5/1981 |
| GB | 2106992 | 4/1983 |
| GB | 2223810 | 4/1990 |
| GB | 2 300 673 | 11/1996 |
| GB | 2373546 | 9/2002 |
| GB | 2403356 | 12/2004 |
| JP | 57010778 | 1/1982 |
| JP | 57070970 | 5/1982 |
| JP | 57120058 | 7/1982 |
| JP | 58183880 | 10/1982 |
| JP | 58150079 | 9/1983 |
| JP | 58192976 | 11/1983 |
| JP | 60206985 | 10/1985 |
| JP | 62101900 | 5/1987 |
| JP | 63227973 | 9/1988 |
| JP | 2075674 | 3/1990 |
| JP | 2247469 | 10/1990 |
| JP | 3009090 | 1/1991 |
| JP | 3281984 | 12/1991 |
| JP | 4121424 | 4/1992 |
| JP | 6185450 | 7/1994 |
| JP | 8145488 | 6/1996 |
| JP | 9166079 | 6/1997 |
| JP | 10313547 | 11/1998 |
| JP | 2000-346093 | 6/1999 |
| JP | 11351125 | 12/1999 |
| JP | 2000166128 | 6/2000 |
| JP | 2000346093 | 12/2000 |
| JP | 2002127902 | 5/2002 |
| JP | 2003083230 | 3/2003 |
| JP | 2005023918 | 1/2005 |
| JP | 2005036769 | 2/2005 |
| JP | 2005068963 | 3/2005 |
| JP | 2006220252 | 8/2006 |
| JP | 2007001872 | 1/2007 |
| JP | 2007145251 | 6/2007 |
| JP | 2007211730 | 8/2007 |
| JP | 2008038658 | 2/2008 |
| KR | 840000180 | 2/1984 |
| KR | 2004004637 | 1/2004 |
| RU | 2101562 | 1/1998 |
| RU | 2169857 | 6/2001 |
| RU | 2213255 | 9/2003 |
| SU | 800438 | 1/1981 |
| UA | 69030 | 8/2004 |
| WO | WO-82/00319 | 2/1982 |
| WO | WO-8802818 | 4/1988 |
| WO | WO-99/41498 | 8/1990 |
| WO | WO-92/22741 | 12/1992 |
| WO | WO-93/06367 | 4/1993 |
| WO | WO-93/11363 | 6/1993 |
| WO | WO-93/24754 | 12/1993 |
| WO | WO 9412785 | 6/1994 |
| WO | WO-95/25381 | 9/1995 |
| WO | WO-96/01942 | 1/1996 |
| WO | WO-96/22456 | 7/1996 |
| WO | WO-96/34213 | 10/1996 |
| WO | WO-97/01029 | 1/1997 |
| WO | WO-97/17546 | 5/1997 |
| WO | WO-98/02818 | 1/1998 |
| WO | WO-98/17492 | 4/1998 |
| WO | WO-00/01945 | 1/2000 |
| WO | WO-00/37800 | 6/2000 |
| WO | WO-00/65212 | 11/2000 |
| WO | WO-00/68578 | 11/2000 |
| WO | WO-01/75308 | 10/2001 |
| WO | WO 0175290 | 10/2001 |
| WO | WO-02/25083 | 3/2002 |
| WO | WO-02/46621 | 6/2002 |
| WO | WO-02/103200 | 12/2002 |
| WO | WO-03/021107 | 3/2003 |
| WO | WO-03021702 | 3/2003 |
| WO | WO-03/078812 | 9/2003 |
| WO | WO-03081011 | 10/2003 |
| WO | WO-2004/037391 | 5/2004 |
| WO | WO-2004/059155 | 7/2004 |
| WO | WO-2004/072452 | 8/2004 |
| WO | WO-2004/074679 | 9/2004 |
| WO | WO-2004/109172 | 12/2004 |
| WO | WO-2005/044424 | 5/2005 |
| WO | WO-2005/062969 | 7/2005 |
| WO | WO-2005/067373 | 7/2005 |
| WO | WO-2005/079461 | 9/2005 |
| WO | WO-2005/088131 | 9/2005 |
| WO | WO-2005/095155 | 10/2005 |
| WO | WO-2006/029633 | 3/2006 |
| WO | WO-2006/058085 | 6/2006 |
| WO | WO-2006/124006 | 11/2006 |
| WO | WO-2007/002094 | 1/2007 |
| WO | WO-2007/003954 | 1/2007 |
| WO | WO-2007/012143 | 2/2007 |
| WO | WO-2007/035997 | 4/2007 |
| WO | WO-2007/051034 | 5/2007 |
| WO | WO-2007/066117 | 6/2007 |
| WO | WO-2007/086792 | 8/2007 |
| WO | WO-2007/089872 | 8/2007 |
| WO | WO-2007/096656 | 8/2007 |
| WO | WO-2007/111839 | 10/2007 |
| WO | WO-2007/136765 | 11/2007 |
| WO | WO-2007/140914 | 12/2007 |
| WO | WO-2008/003950 | 1/2008 |
| WO | WO-2008/014769 | 2/2008 |
| WO | WO-2008023901 | 2/2008 |
| WO | WO-2008/027259 | 3/2008 |
| WO | WO-2008/028881 | 3/2008 |
| WO | WO-2008/039725 | 4/2008 |
| WO | WO-2008/045468 | 4/2008 |
| WO | WO-2009045468 | 4/2008 |
| WO | WO-2008/051427 | 5/2008 |
| WO | WO-2008/074075 | 6/2008 |
| WO | WO-2008/084507 | 7/2008 |
| WO | WO-2008/091373 | 7/2008 |
| WO | WO 2008102292 | 8/2008 |
| WO | WO-2008/106967 | 9/2008 |
| WO | WO-2008/108870 | 9/2008 |

(56) References Cited

FOREIGN PATENT DOCUMENTS

| | | |
|---|---|---|
| WO | WO-2008/109006 | 9/2008 |
| WO | WO-2008/110018 | 9/2008 |
| WO | WO-2008/115479 | 9/2008 |
| WO | WO-2008/121378 | 10/2008 |
| WO | WO-2008139267 | 11/2008 |
| WO | WO-2008/152432 | 12/2008 |
| WO | WO-2008/153591 | 12/2008 |
| WO | WO-2008/157327 | 12/2008 |
| WO | WO-2009/034548 | 3/2009 |
| WO | WO-2009/038973 | 3/2009 |
| WO | WO-2009034421 | 3/2009 |
| WO | WO-2009/045110 | 4/2009 |
| WO | WO-2009044139 | 4/2009 |
| WO | WO-2009/114205 | 9/2009 |
| WO | WO-2009/126784 | 10/2009 |
| WO | WO-2010/006319 | 1/2010 |
| WO | WO-2010/009053 | 1/2010 |
| WO | WO-2010/040890 | 4/2010 |
| WO | WO-2010/105155 | 9/2010 |
| WO | WO-2010/135658 | 11/2010 |
| WO | WO-2011/008321 | 1/2011 |
| WO | WO-2011/008325 | 1/2011 |
| WO | WO-2011/008500 | 1/2011 |
| WO | WO-2011/079267 | 6/2011 |
| WO | WO-2011/079271 | 6/2011 |

OTHER PUBLICATIONS

Lemofouet, "Investigation and Optimisation of Hybrid Electricity Storage Systems Based on Compressed Air and Supercapacitors," (Oct. 20, 2006), 250 pages.

Cyphelly et al., "Usage of Compressed Air Storage Systems," BFE-Program "Electricity," Final Report, May 2004, 14 pages.

Lemofouet et al., "A Hybrid Energy Storage System Based on Compressed Air and Supercapacitors with Maximum Efficiency Point Tracking (MEPT), " IEEE Transactions on Industrial Electron, vol. 53, No. 4, (Aug. 2006) pp. 1105-1115.

International Search Report and Written Opinion issued Sep. 15, 2009 for International Application No. PCT/US2009/040027, 8 pages.

International Search Report and Written Opinion issued Aug. 30, 2010 for International Application No. PCT/US2010/029795, 9 pages.

International Search Report and Written Opinion issued Dec. 3, 2009 for International Application No. PCT/US2009/046725, 9 pages.

International Search Report and Written Opinion issued Jan. 4, 2011 for International Application No. PCT/US2010/055279, 13 pages.

International Search Report and Written Opinion issued May 25, 2011 for International Application No. PCT/US2010/027138, 12 pages.

Rufer et al., "Energetic Performance of a Hybrid Energy Storage System Based on Compressed Air and Super Capacitors," Power Electronics, Electrical Drives, Automation and Motion, (May 1, 2006), pp. 469-474.

Lemofouet et al. "Hybrid Energy Storage Systems based on Compressed Air and Supercapacitors with Maximum Efficiency Point Tracking," Industrial Electronics Laboratory (LEI), (2005), pp. 1-10.

Lemofouet et al., "Hybrid Energy Storage Systems based on Compressed Air and Supercapacitors with Maximum Efficiency Point Tracking," The International Power Electronics Conference, (2005), pp. 461-468.

International Preliminary Report on Patentability mailed Oct. 13, 2011 for International Application No. PCT/US2010/029795 (9 pages).

Stephenson et al., "Computer Modelling of Isothermal Compression in the Reciprocating Compressor of a Complete Isoengine," 9th International Conference on Liquid Atomization and Spray Systems (Jul. 13-17, 2003).

Coney et al., "Development of a Reciprocating Compressor Using Water Injection to Achieve Quasi-Isothermal Compression,"Purdue University International Compressor Engineering Conference (2002).

Linnemann et al., "The Isoengine—A Novel High Efficiency Engine with Optional Compressed Air Energy Storage (CAES)," International Joint Power Generation Conference (Jun. 16-19, 2003).

Linnemann et al., "The Isoengine: Realisation of a High-Efficiency Power Cycle Based on Isothermal Compression," Int. J. Energy Tech. and Policy, vol. 3, Nos. 1-2, pp. 66-84 (2005).

Winterburn et al., "Mechanisms of Ultrasound Foam Interactions," Asia-Pac. J. Chem. Eng., vol. 4, pp. 184-190 (2009).

\* cited by examiner

SYSTEMS AND METHODS FOR EFFICIENT TWO-PHASE HEAT TRANSFER IN COMPRESSED-AIR ENERGY STORAGE SYSTEMS

RELATED APPLICATIONS

This application is a continuation of U.S. patent application Ser. No. 13/755,636, filed Jan. 31, 2013, which is a continuation of U.S. patent application Ser. No. 13/644,456, filed Oct. 4, 2012, which is a continuation of U.S. patent application Ser. No. 13/473,128, filed May 16, 2012, which claims the benefit of and priority to U.S. Provisional Patent Application No. 61/486,937, filed May 17, 2011, U.S. Provisional Patent Application No. 61/489,762, filed May 25, 2012, U.S. Provisional Patent Application No. 61/512,981, filed Jul. 29, 2011, U.S. Provisional Patent Application No. 61/569,528, filed Dec. 12, 2011, U.S. Provisional Patent Application No. 61/601,641, filed Feb. 22, 2012, and U.S. Provisional Patent Application No. 61/620,018, filed Apr. 4, 2012. The entire disclosure of each of these applications is hereby incorporated herein by reference.

STATEMENT REGARDING FEDERALLY SPONSORED RESEARCH

This invention was made with government support under IIP-0923633 awarded by the NSF and DE-OE0000231 awarded by the DOE. The government has certain rights in the invention.

FIELD OF THE INVENTION

In various embodiments, the present invention relates to pneumatics, hydraulics, power generation, and energy storage, and more particularly, to systems and methods using pneumatic, pneumatic/hydraulic, and/or hydraulic cylinders for energy storage and recovery.

BACKGROUND

Storing energy in the form of compressed gas has a long history and components tend to be well tested and reliable, and have long lifetimes. The general principle of compressed-gas or compressed-air energy storage (CAES) is that generated energy (e.g., electric energy) is used to compress gas (e.g., air), thus converting the original energy to pressure potential energy; this potential energy is later recovered in a useful form (e.g., converted back to electricity) via gas expansion coupled to an appropriate mechanism. Advantages of compressed-gas energy storage include low specific-energy costs, long lifetime, low maintenance, reasonable energy density, and good reliability.

If a body of gas is at the same temperature as its environment, and expansion occurs slowly relative to the rate of heat exchange between the gas and its environment, then the gas will remain at approximately constant temperature as it expands. This process is termed "isothermal" expansion. Isothermal expansion of a quantity of high-pressure gas stored at a given temperature recovers approximately three times more work than would "adiabatic expansion," that is, expansion where no heat is exchanged between the gas and its environment—e.g., because the expansion happens rapidly or in an insulated chamber. Gas may also be compressed isothermally or adiabatically.

An ideally isothermal energy-storage cycle of compression, storage, and expansion would have 100% thermodynamic efficiency. An ideally adiabatic energy-storage cycle would also have 100% thermodynamic efficiency, but there are many practical disadvantages to the adiabatic approach. These include the production of higher temperature and pressure extremes within the system, heat loss during the storage period, and inability to exploit environmental (e.g., cogenerative) heat sources and sinks during expansion and compression, respectively. In an isothermal system, the cost of adding a heat-exchange system is traded against resolving the difficulties of the adiabatic approach. In either case, mechanical energy from expanding gas must usually be converted to electrical energy before use.

An efficient and novel design for storing energy in the form of compressed gas utilizing near isothermal gas compression and expansion has been shown and described in U.S. Pat. No. 7,832,207, filed Apr. 9, 2009 (the '207 patent) and U.S. Pat. No. 7,874,155, filed Feb. 25, 2010 (the '155 patent), the disclosures of which are hereby incorporated herein by reference in their entireties. The '207 and '155 patents disclose systems and techniques for expanding gas isothermally in staged cylinders and intensifiers over a large pressure range in order to generate electrical energy when required. Mechanical energy from the expanding gas may be used to drive a hydraulic pump/motor subsystem that produces electricity. Systems and techniques for hydraulic-pneumatic pressure intensification that may be employed in systems and methods such as those disclosed in the '207 and '155 patents are shown and described in U.S. Pat. No. 8,037,678, filed Sep. 10, 2010 (the '678 patent), the disclosure of which is hereby incorporated herein by reference in its entirety.

In the systems disclosed in the '207 and '155 patents, reciprocal mechanical motion is produced during recovery of energy from storage by expansion of gas in the cylinders. This reciprocal motion may be converted to electricity by a variety of techniques, for example as disclosed in the '678 patent as well as in U.S. Pat. No. 8,117,842, filed Feb. 14, 2011 (the '842 patent), the disclosure of which is hereby incorporated herein by reference in its entirety. The ability of such systems to either store energy (i.e., use energy to compress gas into a storage reservoir) or produce energy (i.e., expand gas from a storage reservoir to release energy) will be apparent to any person reasonably familiar with the principles of electrical and pneumatic machines.

The power density (volumetric or mass-based) of an energy-storage system that approximates isothermal expansion and compression of a gas by mingling a heat-exchange liquid with the gas may be defined as the maximum sustained power (kilowatts, kW) that the system can either convert to a stored form or extract from storage, divided by either the volume ($m^3$) or mass (kg) of the system. The power density (either volumetric or mass-based) of an energy-storage system therefore may have units of $kW/m^3$ or of kW/kg. An energy-storage system having higher power density will in general be capable of more economic storage and retrieval of energy than an otherwise comparable system with lower power density, i.e., averaged over the lifetime of the system its use will require fewer cents per kilowatt-hour stored and retrieved (¢/kWh).

Power density may be increased by a number of techniques; one such technique is to increase the rate at which thermal energy is exchanged by the heat-exchange liquid and the gas. One technique for achieving rapid heat exchange between the heat-exchange liquid and the gas is to spray the liquid through the gas as a mist or rain of droplets, which tends to increase the surface area of a given volume of liquid compared to the surface area of the same volume of liquid in a compact shape, e.g., a single cylinder or sphere. However, in many applications even more rapid heat exchange is desirable, and increasingly small heat-exchange droplet size (i.e., for increased heat-exchange surface area) may be difficult or impractical to attain. Thus, there is a need for systems and techniques for more-rapid heat exchange between a heat-exchange fluid and a gas to be or being compressed and/or expanded in compressed-gas energy storage and recovery systems.

SUMMARY

Embodiments of the present invention improve the performance of an energy storage-and-recovery system that employs heat exchange between a liquid and a gas to approximate isothermal (constant-temperature) expansion and compression of the gas in cylinders by mingling the liquid and the gas to form an aqueous foam, which increases the surface area of the liquid and facilitates rapid heat exchange with the gas and, therefore, improved power density. Thermal energy is typically exchanged more rapidly when liquid and gas are mingled as a foam than when the gas is brought into contact with liquid having a more compact shape (e.g., a single cylinder) or divided into a number of bodies having a more compact shape (e.g., spheroids, even if these are very small). Accelerated heat exchange is advantageous (e.g., supportive of higher system power density) in energy storage-and-recovery systems that approximate isothermal expansion and compression of gas, as described above. Embodiments of the invention allow for characteristics of the foam (e.g., bubble (i.e., "foam cell") size, void fraction) to be altered during operation of the system, offering advantages detailed hereinbelow. Herein, the void fraction of a foam (also termed "gas fraction") of a foam is defined as the fraction of a given volume of the foam that is occupied by gas.

An aqueous foam is a two-phase system (i.e., a system featuring both gas and liquid) in which a large volume fraction of gas is dispersed as bubbles or cells throughout a continuous liquid matrix (as discussed in J. B. Winterburn and P. J. Martin, "Mechanisms of ultrasound foam interactions," *Asia-Pac. J. Chem. Eng.* 2009: 4: 184-190, the entire disclosure of which is incorporated by reference herein). These gas bubbles are contained by liquid films typically stabilized by an admixed surfactant, i.e., a substance consisting essentially of or comprising surface-active, amphiphilic molecules that preferentially accumulate at the liquid-gas interface. These liquid films are typically interconnected at their meeting points, forming a continuous liquid phase throughout the foam structure. The structure of a particular foam varies depending on its liquid fraction; foams may be divided into two broad classes accordingly. "Wet foams" consist essentially of approximately spherical bubbles separated by thick liquid films. In the limit of perfectly spherical, close-packed gas bubbles in a wet foam, geometry determines that the void fraction in the foam is approximately 0.74 by volume. Foams with void fractions greater than approximately 0.74 are "dry foams," in which polyhedral gas cells are separated by thin liquid lamellae (i.e., walls or membranes). Embodiments of the present invention utilize wet and/or dry aqueous foam.

In embodiments of the invention, a pneumatic compressor-expander cylinder (herein termed a "cylinder") is divided into two chambers by a slidably disposed piston, at least one of which (herein termed the "air chamber") may contain gas or a gas-liquid mixture (e.g., a foam). Gas to be expanded or compressed may be introduced into the air chamber; a liquid (herein termed "heat-exchange liquid") may also be introduced into the air chamber. Force may be exerted on the piston by the fluids within the air chamber or by a rod aligned with the cylinder, passing through a suitable port in one end of the cylinder, and connected to a mechanical device (e.g., crankshaft) external to the cylinder.

In one embodiment of the invention, liquid and gas are mingled to form a foam (i.e., the liquid and gas are "foamed") in a chamber or vessel external to a cylinder in which gas is to be expanded or compressed. In particular, a liquid may be used that promotes foaming with air (or another suitable gas) when agitated, sprayed, or otherwise energetically modified. An example of such a liquid is water containing, e.g., 2% to 5% of certain additives (e.g., surfactants), some of which are described in U.S. patent application Ser. No. 13/082,808, filed on Apr. 8, 2011 (the '808 application), the entire disclosure of which is incorporated by reference herein. The foam is admitted to the air chamber of the cylinder through a suitable mechanism (e.g., a valved port). Exchange of thermal energy between the gas and the liquid occurs whenever the gas and liquid are in contact with each other, but occurs more rapidly when foaming has increased the surface area over which the gas and liquid are in contact with each other. In various states of operation, the air chamber of the cylinder may contain no foam, be partly filled with foam, or be substantially filled with foam.

In various embodiments of the invention, the chamber or vessel in which the liquid and gas are foamed is a storage reservoir for gas at high pressure (e.g., approximately 3,000 psi). Liquid tending to separate from the foam may accumulate at the bottom of the reservoir and may be recirculated into the reservoir through a spray head or other foam-generating mechanism in order to maintain or regenerate a quantity of foam within the storage reservoir.

In various embodiments of the invention, foam (or the separated liquid component of a foam) that is at a desired temperature (e.g., relatively cold or relatively hot) may be diverted into a vessel in order to store exergy therein. Herein, the exergy of a system, e.g., the fluid contents of a vessel, is the maximum amount of work that can ideally be performed by bringing the system into thermal equilibrium with the environment. Herein, a vessel in which relatively cool or hot liquid is stored for the purpose of storing exergy is termed a "thermal well."

In various embodiments of the invention, the liquid and gas are foamed in a dedicated device, herein termed a "mixing chamber," that may employ spraying, education, sparging, passage through a packed bed or solid foam, fogging, spray of suspended droplets, and/or other mechanisms to produce foam. As utilized herein, a "sparger" is a mechanism for the introduction of foam (typically a lower-liquid-content foam) and/or gas into liquid and/or a foam (typically a higher liquid-content foam) to produce foam therewith.

In various states of operation of certain embodiments, foam may be directed to a vessel or chamber (e.g., placed in a fluid path communicating between the storage reservoir and the mixing chamber, or between the air chamber of one cylinder and the air chamber of another cylinder) for the purpose of separating the liquid and gas components of the foam. Such a vessel or chamber is herein termed a "separator." Partial or substantially entire separation of foams may occur within separators, cylinders, mixing chambers, storage reservoirs, and other components (e.g., tubing). Liquid separated from foam in a separator or other component may be passed through a heat exchanger to alter its temperature, or otherwise treated or processed, and re-directed to the generation of foam in another portion of the system (e.g., a mixing chamber).

Fluid foams may be passed through one or more screens, riddles, or solid foams (all of which are herein termed "screens") to control foam quality (e.g., bubble uniformity, average bubble size). Such screens may be constructed so as to permit alteration of bubble size in various states of operation: for example, two perforated plates in substantial contact may be caused to slide with respect to each other, aligning or disaligning their perforations in a manner that allows passage of variously sized bubbles. Fluid foams may also be excited (e.g., in the mixing chamber) with acoustic vibrations (e.g., ultrasound) in order to affect the size and uniformity of the cells (bubbles) in the foam.

In various states of operation, gas or gas-liquid mixtures may be bypassed around a mixing chamber. For example, when gas is being expanded from storage, valves and piping may be configured so as to pass the gas through a mixing chamber for foaming. However, when gas is being compressed into storage, compressed gas or foam may be routed through a bypass (e.g., a pipe), and not through the mixing chamber. Routing gas through a bypass will in general dissipate less energy than routing through a mixing chamber, and therefore improve system efficiency.

In various embodiments of the invention, alternatively or additionally to foam generation outside a cylinder, foam may be generated by direct injection of liquid into the air chamber of a cylinder through, e.g., a spray head or other foam-generating device.

In various embodiments of the invention, foam may be excited with acoustic vibrations (e.g., ultrasound) in the air chamber of a cylinder to accelerate heat exchange between the gas and liquid components of the foam. Acoustic vibrations may accelerate such heat exchange between the gas and liquid components of a foam through various mechanisms (e.g., surface waves set up at the liquid-gas interfaces of bubbles or cells, or increased flow through lamellae and Plateau borders).

Various embodiments of the invention may include one or more of the following components: mixing chambers, separators, bypasses, screens, ultrasound generators, assemblies of two or more cylinders operating over different pressure ranges, and other components. As described in U.S. Pat. No. 7,802,426 (the '426 patent), the entire disclosure of which is incorporated by reference herein, compressible fluid (e.g., gas or foam) undergoing either compression or expansion may be directed, continuously or in installments, through a heat-exchange subsystem external to the cylinder. The heat-exchange subsystem either rejects heat to the environment (to cool fluid undergoing compression) or absorbs heat from the environment (to warm fluid undergoing expansion). Again, an isothermal process may be approximated via judicious selection of this heat-exchange rate.

Generally, the systems described herein may be operated in both an expansion mode and in the reverse compression mode as part of a full-cycle energy storage system with high efficiency. For example, the systems may be operated as both compressor and expander, storing electricity in the form of the potential energy of compressed gas and producing electricity from the potential energy of compressed gas. Alternatively, the systems may be operated independently as compressors or expanders.

Embodiments of the present invention are typically utilized in energy storage systems utilizing compressed gas. In a compressed-gas energy storage system, gas is stored at high pressure (e.g., approximately 3,000 psi). This gas may be expanded into a cylinder having a first compartment (or "chamber") and a second compartment separated by a piston slidably disposed within the cylinder (or by another boundary mechanism). A shaft may be coupled to the piston and extend through the first compartment and/or the second compartment of the cylinder and beyond an end cap of the cylinder, and a transmission mechanism may be coupled to the shaft for converting a reciprocal motion of the shaft into a rotary motion, as described in the '678 and '842 patents. Moreover, a motor/generator may be coupled to the transmission mechanism. Alternatively or additionally, the shaft of the cylinders may be coupled to one or more linear generators, as described in the '842 patent.

As also described in the '842 patent, the range of forces produced by expanding a given quantity of gas in a given time may be reduced through the addition of multiple, series-connected cylinder stages. That is, as gas from a high-pressure reservoir is expanded in one chamber of a first, high-pressure cylinder, gas from the other chamber of the first cylinder is directed to the expansion chamber of a second, lower-pressure cylinder. Gas from the lower-pressure chamber of this second cylinder may either be vented to the environment or directed to the expansion chamber of a third cylinder operating at still lower pressure; the third cylinder may be similarly connected to a fourth cylinder; and so on.

The principle may be extended to more than two cylinders to suit particular applications. For example, a narrower output force range for a given range of reservoir pressures is achieved by having a first, high-pressure cylinder operating between, for example, approximately 3,000 psig and approximately 300 psig and a second, larger-volume, lower-pressure cylinder operating between, for example, approximately 300 psig and approximately 30 psig. When two expansion cylinders are used, the range of pressure within either cylinder (and thus the range of force produced by either cylinder) is reduced as the square root relative to the range of pressure (or force) experienced with a single expansion cylinder, e.g., from approximately 100:1 to approximately 10:1 (as set forth in the '842 patent). Furthermore, as set forth in the '678 patent, N appropriately sized cylinders can reduce an original operating pressure range R to $R^{1/N}$. Any group of N cylinders staged in this manner, where N≥2, is herein termed a cylinder group.

Embodiments of the present invention provide for the use of positive-displacement pumps to efficiently circulate liquid at relatively high pressure, e.g., liquid for the production of liquid sprays and/or aqueous foams used to approximate isothermal expansion and compression within cylinder assemblies, with resulting gain in the efficiency of the overall energy-storage and energy-recovery processes. Such positive-displacement pumps may be piston-in-tube-type pumps, rotary positive-displacement pumps (e.g., screw pumps, progressive cavity pumps), or other types of pump. As disclosed in U.S. patent application Ser. No. 13/009,409, filed Jan. 19, 2011 (the '409 application), the entire disclosure of which is incorporated by reference herein, efficient circulation of high-pressure fluid may be achieved using a high-inlet pressure low-differential pressure pump such as a reciprocating, double-acting, positive-displacement pump having a fluid-filled chamber containing a piston or other mechanism that separates the fluid on one side of the piston from the fluid on the other side; or using a screw pump, progressive cavity pump, or other rotary positive-displacement pump.

Various embodiments of the present invention use a rotary positive-displacement pump (e.g., screw pump) to enable the energy-efficient pumping of fluid already at high pressure (e.g., from approximately 1,000 pounds per square inch gauge [psig] to approximately 3,000 psig, or higher) to a somewhat higher pressure (e.g., approximately 50 psig higher than the input pressure). Useful applications of such a pump include, but are not limited to, (1) the introduction of a foam, foaming liquid, or liquid spray into a vessel storing pressurized gas, the resulting foam or spray enabling the transfer of heat to or from the gas, (2) the energy-efficient introduction of a foam, foaming liquid, or liquid spray into a chamber containing pressurized gas, where the foam, foaming liquid, or spray enables the approximately isothermal expansion or compression of the gas within the chamber.

Herein, a screw pump is a positive-displacement pump that employs one or more screws in order to compress a fluid; a "positive displacement pump" is any device that traps a volume of fluid and then moves (displaces) that fluid, possibly compressing it in so doing; and a "screw" is a rod with a helical ridge or thread running along its length. Typically, in a screw pump, a screw meshes with a complementary surface defined by one or more ancillary components (e.g., a housing, or one or more other screws) in such a way that one or more approximately spiral-shaped volumes of fluid are trapped between the surface of the screw and the complementary surface. As the screw revolves, fluid is admitted at one end of the screw, trapped in approximately spiral-shaped volumes, moved longitudinally along the screw while possibly undergoing compression, and expelled or exhausted at the other end of the screw. In screw pumps where the pitch of the screw changes longitudinally, the volumes of fluid trapped between the screw and the complementary surface are compressed as they move longitudinally along the screw. Screw pumps that compress fluid are typically termed screw compressors. Screw pumps and compressors of various designs, including single-screw, dual-screw, and triple-screw pumps, as well as the properties and features of such pumps and compressors, will be known to persons reasonably familiar with the principles of compressors and pumps. Herein, the term "screw pump" generally refers to a screw compressor of the dual- or triple-screw type, but the use of screw pumps or rotary positive-displacement pumps of other types, including but not limited to Wendelkolben pumps, helical twisted Roots pumps, and eccentric screw pumps, is also contemplated and within the scope of the invention.

It will be apparent to persons familiar with the principles of compressors and pumps that a screw pump capable of compressing fluid may, in principle, be operated in reverse as an expander. In such reverse operation, fluid at a relatively high pressure is admitted at one end of the turning screw, trapped in an approximately spiral-shaped volume between the screw and the complementary surface, and moved longitudinally along the rotating screw as the trapped volume expands. This fluid, at lower pressure than the pressure at which it was admitted, is exhausted from the end of the screw opposite to the end at which it was admitted.

Embodiments of the present invention also provide for increasing the minimum or starting pressure within the inlet chambers of the cylinder group in compression mode by a pre-compressor. As disclosed in U.S. Pat. No. 8,104,274, filed May 18, 2011 (the '274 patent), the entire disclosure of which is incorporated by reference herein, pre-compression of air prior to the inlet chambers of the cylinder group may be used to increase power density of a compressed-gas energy storage system. Additionally, venting of gas from the cylinder group at pressures above atmospheric may increase power density. At least some of this potential energy remaining in the vented super-atmospheric pressure gas may be recovered in an expander device. In various embodiments where starting pressure is increased by a pre-compressor, the pre-compressor may include or consist essentially of a rotodynamic blower (e.g., radial centrifugal, axial) or positive-displacement type blower (e.g., lobe-type) or pump (e.g., screw pump). In various embodiments where cylinder group venting pressure is super-atmospheric, an expander may include or consist essentially of a second unidirectional device or the same device as the pre-compressor operated bidirectionally. Examples of such devices that may be used as expanders include rotodynamic expanders (e.g., radial centrifugal, axial) and positive-displacement type expanders (e.g., piston-type) and pump/motors (e.g. screw pump/motor).

When, e.g., a screw pump is operated as a pre-compressor, work is performed to compress the fluid passing through the pump. This energy is supplied by a mechanism exterior to the pump (e.g., an electric motor). When, e.g., a screw pump is operated as an expander, the gas performs work on the pump and on any mechanisms to which the pump is attached (e.g., an electric generator). Moreover, compression of gas within a screw pump operated as a compressor (or within any other pre-compressor with sufficient capacity to avoid complete destruction (i.e., separation) of the foam prior to compression) may be made to occur substantially isothermally by the introduction, at and/or before the intake of the screw pump, and/or within the screw pump itself, of a foam or foaming liquid that partially or substantially fills the trapped spiral-shaped volume of fluid within the screw pump during the compression of the gas. The foaming liquid may be combined with gas prior to undergoing compression in order to produce substantially isothermal compression of the gas. Similarly, expansion of gas within a screw pump operated as an expander (or within any other expander with sufficient capacity to avoid complete destruction of the foam prior to expansion) may be made to occur substantially isothermally by the introduction, at and/or before the intake of the screw pump, and/or within the screw pump itself, of a suitable quantity of a foam or foaming liquid that partially or substantially fills the trapped spiral-shaped volume of fluid within the screw pump during the expansion of the gas. Droplets of heat-exchange liquid (introduced through, e.g., perforations in the surface of the screw or in the complementary surface) may be combined with foam or employed instead of foam in order to effect substantially isothermal compression or expansion of gas within the screw pump. In a pump used as a pre-compressor or as a post-expander, substantially isothermal operation may increase the overall efficiency of the energy storage system.

Increasing the minimum or starting pressure within the inlet chamber of a cylinder group typically decreases the range of gauge pressures occurring within the cylinder group (and thus the range of forces exerted by the cylinder group). Gauge pressure range is reduced in direct proportion to degree of pre-compression. For example, for a system having a non-pre-compressed inlet pressure of approximately 1 psig and a maximum pressure of approximately 2,500 psig, the range of gauge pressures is approximately 2500:1; for an otherwise identical system having a pre-compressed inlet pressure of approximately 5 psig and a maximum pressure of approximately 2,500 psig, the range of gauge pressures is one-fifth as great (i.e., approximately 500:1).

Additionally, the mass of air in the inlet chamber at the initial pressure is increased in a pre-compressed system versus a non-pre-compressed system by approximately the ratio of the absolute pressures (e.g., approximately 19.7 psia/14.7 psia, depending on the polytropic coefficient of the compression or expansion). Thus, if a single compression stroke takes the same amount of time in a system with pre-compression as in a system without pre-compression, a greater mass of compressed air at the output pressure (e.g., approximately 2,500 psig), representing a proportionately greater amount of stored energy, is produced in a given time interval. In other words, for a single complete compression by a given cylinder, higher compression power is achieved by pre-compression.

It will be apparent to persons familiar with the principles of compressors and pumps that some blowers and pumps (e.g., screw pump) may be operated in reverse as an expanders.

That is, e.g., fluid at a relatively high pressure is admitted at one end of the turning screw, trapped in an approximately spiral-shaped volume between the screw and the complementary surface, and moved longitudinally along the rotating screw as the trapped volume expands. This gas, at lower pressure than the pressure at which it was admitted, is exhausted from the end of the screw opposite to the end at which it was admitted. Expansion of gas within a screw pump that is operated as an expander may be made to occur substantially isothermally by the introduction, at and/or before the intake of the screw pump, and/or within the screw pump itself, of a foam or foaming liquid that partially or substantially fills the trapped spiral-shaped volume of fluid within the screw pump during the expansion of the gas.

It will be clear to persons familiar with the principles of compressors and pumps that by similar reasoning, when the system is operated as an expander rather than as a compressor, higher expansion power is achieved by allowing the outlet pressure of the cylinder group to be significantly above atmospheric pressure. Moreover, expanding this super-atmospheric-pressure outlet gas through a device upon which the gas performs work (e.g., a screw-pump expander) allows some of the potential energy of the outlet gas to be converted into work. Recovery of this work increases the overall efficiency of the energy storage system.

Every compression or expansion of a quantity of gas, where such a compression or expansion is herein termed "a gas process," is generally one of three types: (1) adiabatic, during which the gas exchanges no heat with its environment and, consequently, rises or falls in temperature, (2) isothermal, during which the gas exchanges heat with its environment in such a way as to remain at constant temperature, and (3) polytropic, during which the gas exchanges heat with its environment but its temperature does not remain constant. Perfectly adiabatic gas processes are not practical because some heat is always exchanged between any body of gas and its environment (ideal insulators and reflectors do not exist); perfectly isothermal gas processes are not practical because for heat to flow between a quantity of gas and a portion of its environment (e.g., a body of liquid), a nonzero temperature difference must exist between the gas and its environment—e.g., the gas must be allowed to heat during compression in order that heat may be conducted to the liquid. Hence real-world gas processes are typically polytropic, though they may approximate adiabatic or isothermal processes.

The Ideal Gas Law states that for a given quantity of gas having mass m, pressure p, volume V, and temperature T, $pV=mRT$, where R is the gas constant ($R=287$ J/K·kg for air). For an isothermal process, T is a constant throughout the process, so $pV=C$, where C is some constant.

For a polytropic process, as will be clear to persons familiar with the science of thermodynamics, $pV^n=C$ throughout the process, where n, termed the polytropic index, is some constant generally between 1.0 and 1.6. For $n=1$, $pV^n=pV^1=pV=C$, i.e., the process is isothermal. In general, a process for which n is close to 1 (e.g., 1.05) may be deemed approximately isothermal.

For an adiabatic process, $pV^\gamma=C$, where $\gamma$, termed the adiabatic coefficient, is equal to the ratio of the gas's heat capacity at constant pressure $C_P$ to its heat capacity at constant volume, $C_V$, i.e., $\gamma=C_P/C_V$. In practice, $\gamma$ is dependent on pressure. For air, the adiabatic coefficient $\gamma$ is typically between 1.4 and 1.6.

Herein, we define a "substantially isothermal" gas process as one having $n \leq 1.1$. The gas processes conducted within cylinders described herein are preferably substantially isothermal with $n \leq 1.05$. Herein, wherever a gas process taking place within a cylinder assembly or storage vessel is described as "isothermal," this word is synonymous with the term "substantially isothermal."

The amount of work done in compression or expansion of a given quantity of gas varies substantially with polytropic index n. For compressions, the lowest amount of work done is for an isothermal process and the highest for an adiabatic process, and vice versa for expansions. Hence, for gas processes such as typically occur in the compressed-gas energy storage systems described herein, the end temperatures attained by adiabatic, isothermal, and substantially isothermal gas processes are sufficiently different to have practical impact on the operability and efficiency of such systems. Similarly, the thermal efficiencies of adiabatic, isothermal, and substantially isothermal gas processes are sufficiently different to have practical impact on the overall efficiency of such energy storage systems. For example, for compression of a quantity of gas from initial temperature of 20° C. and initial pressure of 0 psig (atmospheric) to a final pressure of 180 psig, the final temperature T of the gas will be exactly 20° C. for an isothermal process, approximately 295° C. for an adiabatic process, approximately 95° C. for a polytropic compression having polytropic index $n=1.1$ (10% increase in n over isothermal case of $n=1$), and approximately 60° C. for a polytropic compression having polytropic index $n=1.05$ (5% increase in n over isothermal case of $n=1$). In another example, for compression of 1.6 kg of air from an initial temperature of 20° C. and initial pressure of 0 psig (atmospheric) to a final pressure of approximately 180 psig, including compressing the gas into a storage reservoir at 180 psig, isothermal compression requires approximately 355 kilojoules of work, adiabatic compression requires approximately 520 kilojoules of work, and a polytropic compression having polytropic index $n=1.045$ requires approximately 375 kilojoules of work; that is, the polytropic compression requires approximately 5% more work than the isothermal process, and the adiabatic process requires approximately 46% more work than the isothermal process.

It is possible to estimate the polytropic index n of gas processes occurring in cylinder assemblies such as are described herein by empirically fitting n to the equation $pV^n=C$, where pressure p and volume V of gas during a compression or expansion, e.g., within a cylinder, may both be measured as functions of time from piston position, known device dimensions, and pressure-transducer measurements. Moreover, by the Ideal Gas Law, temperature within the cylinder may be estimated from p and V, as an alternative to direct measurement by a transducer (e.g., thermocouple, resistance thermal detector, thermistor) located within the cylinder and in contact with its fluid contents. In many cases, an indirect measurement of temperature via volume and pressure may be more rapid and more representative of the entire volume than a slower point measurement from a temperature transducer. Thus, temperature measurements and monitoring described herein may be performed directly via one or more transducers, or indirectly as described above, and a "temperature sensor" may be one of such one or more transducers and/or one or more sensors for the indirect measurement of temperature, e.g., volume, pressure, and/or piston-position sensors.

All of the approaches described above for converting potential energy in a compressed gas into mechanical and electrical energy may, if appropriately designed, be operated in reverse to store electrical energy as potential energy in a compressed gas. Since the accuracy of this statement will be apparent to any person reasonably familiar with the principles of electrical machines, power electronics, pneumatics, and the principles of thermodynamics, the operation of these mechanisms to both store energy and recover it from storage will not be described for each embodiment. Such operation is, however, contemplated and within the scope of the invention and may be straightforwardly realized without undue experimentation.

The systems described herein, and/or other embodiments employing foam-based heat exchange, liquid-spray heat exchange, and/or external gas heat exchange, may draw or deliver thermal energy via their heat-exchange mechanisms to external systems (not shown) for purposes of cogeneration, as described in U.S. Pat. No. 7,958,731, filed Jan. 20, 2010 (the '731 patent), the entire disclosure of which is incorporated by reference herein.

The compressed-air energy storage and recovery systems described herein are preferably "open-air" systems, i.e., systems that take in air from the ambient atmosphere for compression and vent air back to the ambient atmosphere after expansion, rather than systems that compress and expand a captured volume of gas in a sealed container (i.e., "closed-air" systems). The systems described herein generally feature one or more cylinder assemblies for the storage and recovery of energy via compression and expansion of gas. The systems also include (i) a reservoir for storage of compressed gas after compression and supply of compressed gas for expansion thereof, and (ii) a vent for exhausting expanded gas to atmosphere after expansion and supply of gas for compression. The storage reservoir may include or consist essentially of, e.g., one or more one or more pressure vessels (i.e., containers for compressed gas that may have rigid exteriors or may be inflatable, that may be formed of various suitable materials such as metal or plastic, and that may or may not fall within ASME regulations for pressure vessels), pipes (i.e., rigid containers for compressed gas that may also function as and/or be rated as fluid conduits, have lengths well in excess (e.g., >100×) of their diameters, and do not fall within ASME regulations for pressure vessels), or caverns (i.e., naturally occurring or artificially created cavities that are typically located underground). Open-air systems typically provide superior energy density relative to closed-air systems.

Furthermore, the systems described herein may be advantageously utilized to harness and recover sources of renewable energy, e.g., wind and solar energy. For example, energy stored during compression of the gas may originate from an intermittent renewable energy source of, e.g., wind or solar energy, and energy may be recovered via expansion of the gas when the intermittent renewable energy source is nonfunctional (i.e., either not producing harnessable energy or producing energy at lower-than-nominal levels). As such, the systems described herein may be connected to, e.g., solar panels or wind turbines, in order to store the renewable energy generated by such systems.

In one aspect, embodiments of the invention feature a method of recovering energy. A first foam having a first foam expansion ratio is transferred to a first cylinder assembly, and the first foam is expanded in the first cylinder assembly, thereby recovering energy therefrom. Thereafter, a second foam is transferred to a second cylinder assembly different from the first cylinder assembly. The second foam has a second foam expansion ratio larger than the first foam expansion ratio. The second foam is expanded in the second cylinder assembly, thereby recovering energy therefrom. The first and second cylinder assemblies are preferably portions of a single power unit utilized for the expansion (and possibly compression) of gas and/or foam.

Embodiments of the invention incorporate one or more of the following in any of a variety of different combinations. The expanded second foam may be exhausted from the second cylinder assembly. At least a gaseous portion of the expanded second foam may be exhausted to ambient atmosphere. After expanding the first foam, the expanded first foam may be exhausted from the first cylinder assembly. The second foam may include or consist essentially of at least a portion (e.g., a gaseous portion or a foam portion) of the expanded first foam. The expanded first foam may be exhausted into a foam vessel, and heat-transfer liquid may be introduced into the foam vessel to form the second foam. After expanding the first foam, at least a portion of the expanded first foam may be separated into gaseous and liquid components. The separation may include or consist essentially of mechanical separation (e.g., by one or more blades, one or more shears, one or more baffles, and/or one or more centrifuges) and/or application of ultrasound energy. The second foam may be formed by introducing heat-transfer liquid into the gaseous component of the expanded first foam. The liquid component of the expanded first foam may be stored (e.g., in a storage reservoir). The mass ratio of the first foam may be approximately equal to the mass ratio of the second foam. The average cell size and/or the uniformity of cell size of the first foam may be altered before expanding the first foam. The average cell size and/or the uniformity of cell size of the second foam may be altered before expanding the second foam. The foam mass ratio of the first foam and/or the second foam may be selected from the range of 1 to 4. The first foam and/or the second foam may be expanded substantially isothermally. The first foam may be formed by mingling heat-transfer liquid and compressed gas. The void fraction of the first foam may be controlled by controlling a rate of transfer of heat-transfer liquid into the compressed gas. A pressure or a temperature within the first cylinder assembly may be sensed, and the rate of transfer may be controlled in response to the sensed pressure and/or temperature. Expanding the first foam and expanding the second foam may both drive a crankshaft mechanically coupled to the first and second cylinder assemblies.

In another aspect, embodiments of the invention feature a method of storing energy. Heat-transfer liquid is dispersed into gas (e.g., air at approximately atmospheric pressure) to form a first foam having a first foam expansion ratio. The first foam is compressed within a first cylinder assembly. Thereafter, a second foam is transferred to a second cylinder assembly different from the first cylinder assembly. The second foam has a second foam expansion ratio smaller than the first foam expansion ratio. The second foam is compressed within the second cylinder assembly, and the compressed second foam is exhausted from the second cylinder assembly. At least the gaseous component of the compressed second foam is stored (e.g., in a storage reservoir).

Embodiments of the invention incorporate one or more of the following in any of a variety of different combinations. The first foam may be transferred to the first cylinder assembly prior to compressing the first foam within the first cylinder assembly. At least a portion of a liquid component may be separated from the compressed second foam prior to storing the gaseous component. The separation may include or consist essentially of mechanical separation (e.g., by one or more blades, one or more shears, one or more baffles, and/or one or more centrifuges) and/or application of ultrasound energy. Both the gaseous component and the liquid component of the compressed second foam may be stored (i.e., together in the same storage reservoir or separately in separate reservoirs).

After compressing the first foam within the first cylinder assembly, the compressed first foam may be exhausted from the first cylinder assembly. The second foam may include or consist essentially of at least a portion (e.g., a gaseous portion or a foam portion) of the compressed first foam. The compressed first foam may be exhausted into a foam vessel (e.g., a pressure vessel, a pipe, or a manifold). Heat-transfer liquid may be introduced into the foam vessel to form the second foam. After compressing the first foam, at least a portion of the compressed first foam may be separated into gaseous and liquid components. The separation may include or consist essentially of mechanical separation (e.g., by one or more blades, one or more shears, one or more baffles, and/or one or more centrifuges) and/or application of ultrasound energy. The second foam may be formed by introducing heat-transfer liquid into the gaseous component of the compressed first foam. The heat-transfer liquid introduced into the gaseous component of the compressed first foam may include or consist essentially of at least a portion of the liquid component of the separated compressed first foam. The liquid component of the compressed first foam may be stored (e.g., in a storage reservoir). The mass ratio of the first foam may be approximately equal to the mass ratio of the second foam. The average cell size and/or the uniformity of cell size of the first foam may be altered before compressing the first foam. The average cell size and/or the uniformity of cell size of the second foam may be altered before compressing the second foam. The foam mass ratio of the first foam and/or of the second foam may be selected from the range of 1 to 4. The first foam and/or the second foam may be compressed substantially isothermally. The void fraction of the first foam may be controlled by controlling a rate of dispersal of heat-transfer liquid into the gas. A pressure or a temperature within the first cylinder assembly may be sensed, and the rate of dispersal may be controlled in response to the sensed pressure and/or temperature. A crankshaft may be driven to compress the first foam and the second foam. The crankshaft may be mechanically coupled to the first and second cylinder assemblies. Forming the first foam may include or consist essentially of spraying heat-transfer liquid on a screen.

In yet another aspect, embodiments of the invention feature an energy storage and recovery system. The system includes a cylinder assembly for storing energy by compression and/or recovering energy by expansion, a storage reservoir, and a mixing chamber for (i) receiving gas and heat-transfer liquid from the storage reservoir, (ii) mixing the gas with the heat-transfer liquid to form a foam, and (iii) transferring the foam to the cylinder assembly. The mixing chamber is selectively fluidly connected to the cylinder assembly and the storage reservoir. The mixing chamber is selectively fluidly connected to the storage reservoir by a first conduit for transferring gas (and which may additionally transfer liquid, but is typically connected to a substantially gas-filled region of the storage reservoir) and a second conduit, different from the first conduit, for transferring heat-transfer liquid (and which may additionally transfer gas, but is typically connected to a substantially liquid-filled region of the storage reservoir).

Embodiments of the invention incorporate one or more of the following in any of a variety of different combinations. The mixing chamber may include a mechanism for altering at least one characteristic of the foam (e.g., foam cell size and/or foam cell size uniformity). The mechanism may include or consist essentially of a screen and/or a source of ultrasound energy. A foam-generating mechanism may be coupled to the first conduit and/or the second conduit in the mixing chamber. The foam-generating mechanism may include or consist essentially of one or more nozzles, a rotating blade, a source of ultrasound energy, and/or a sparger. The system may include a second cylinder assembly storing energy by compression or recovering energy by expansion over a pressure range different from a pressure range of the cylinder assembly. A vent for exhausting expanded gas to atmosphere may be selectively fluidly connected to the second cylinder assembly. A control system may control the cylinder assembly and/or the mixing chamber to enforce substantially isothermal compression and/or substantially isothermal expansion in the cylinder assembly. A sensor may detect pressure within the cylinder assembly and/or the mixing chamber, and the control system may be responsive to the sensor. The control system may control the flow rate of heat-transfer liquid into the mixing chamber in response to the detected pressure. A circulation apparatus (e.g., a variable-speed pump) may transfer heat-transfer liquid within the second conduit. A movable boundary mechanism may separate the cylinder assembly into two chambers. A crankshaft may be mechanically coupled to the boundary mechanism and may convert reciprocal motion of the boundary mechanism into rotary motion. A motor/generator may be coupled to the crankshaft. The storage reservoir may include or consist essentially of a pressure vessel, a pipe, and/or a cavern.

In an additional aspect, embodiments of the invention feature a method of energy storage. Foam is compressed within a cylinder to a first pressure. The compressed foam is transferred to a storage reservoir, where it at least partially separates into gaseous and liquid components at approximately the first pressure. At least a portion of the liquid component is removed from the storage reservoir and stored at a second pressure lower than the first pressure.

Embodiments of the invention incorporate one or more of the following in any of a variety of different combinations. Prior to storing the at least a portion of the liquid component at the second pressure, energy may be recovered from the at least a portion of the liquid component by reducing its pressure. A crankshaft may be driven with the recovered energy. The crankshaft may be mechanically coupled to the cylinder. Prior to compressing the foam, the foam may be formed by mingling heat-transfer liquid and gas. The foam may be formed in a foam vessel selectively fluidly connected to the cylinder. The foam vessel may include or consist essentially of a pressure vessel, a pipe, and/or a manifold. Forming the foam may include or consist essentially of spraying heat-transfer liquid on a screen. Prior to compressing the foam, the average cell size or the uniformity of cell size of the foam may be altered. The void fraction of the foam may be controlled by controlling the rate of transfer of heat-transfer liquid into the gas. A pressure and/or a temperature within the cylinder may be sensed, and the rate of transfer may be controlled in response thereto. At least a portion of the stored liquid component may be mingled with gas to form additional foam, which may then be compressed. The foam mass ratio of the foam may be selected from the range of 1 to 4. The foam may be compressed substantially isothermally. Compressing the foam may include or consist essentially of driving a crankshaft coupled to the cylinder. The compressed foam may at least partially separate due to gravity. The compressed foam may be at least partially separated via at mechanical separation (e.g., by a blade, a shear, a baffle, and/or a centrifuge) and/or application of ultrasound energy.

In another aspect, embodiments of the invention feature an energy storage and recovery system including first and second cylinder assemblies for storing energy by compression and/or recovering energy by expansion. The second cylinder assembly has a pressure range of operation different from a pressure range of operation of the first cylinder assembly. A first foam vessel for at least one of intermediate storage or formation of a first foam therein is selectively fluidly connected to the first cylinder assembly. A second foam vessel for at least one of intermediate storage or formation of a second foam therein is selectively fluidly connected to the first cylinder assembly and to the second cylinder assembly. A third foam vessel for at least one of intermediate storage or formation of a third foam therein is selectively fluidly connected to the second cylinder assembly.

Embodiments of the invention incorporate one or more of the following in any of a variety of different combinations. A vent to a surrounding atmosphere may be selectively fluidly connected to the third foam vessel. A storage reservoir for the storage of compressed gas (e.g., as a gas or as part of a foam) may be selectively fluidly connected to the first foam vessel. The system may include a recirculation mechanism for transferring foam and/or liquid from a first location in the first foam vessel to a second location in the first foam vessel different from the first location. The first foam vessel may include or consist essentially of at least one of a pressure vessel, a pipe, or a manifold. The second foam vessel may include or consist essentially of at least one of a pressure vessel, a pipe, or a manifold. The third foam vessel may include or consist essentially of at least one of a pressure vessel, a pipe, or a manifold.

In yet another aspect, embodiments of the invention feature an energy storage and recovery system including or consisting essentially of a foam-generating mechanism, a manifold, and, selectively fluidly connected to the manifold, at least one cylinder assembly expansion and/or compression of foam therewithin. The foam-generating mechanism includes or consists essentially of a spray chamber, at least one dispersal mechanism for dispersing liquid into gas flowing through the spray chamber, and fluidly coupled to the at least one dispersal mechanism, a reservoir for containing the liquid. The manifold receives foam from the spray chamber.

Embodiments of the invention incorporate one or more of the following in any of a variety of different combinations. A circulation mechanism (e.g., a fan) may at least partially form a flow of gas through the spray chamber. Another circulation mechanism (e.g., a pump such as a variable-speed pump) may circulate liquid from the reservoir to the at least one dispersal mechanism. A valve for exhausting gas from the manifold at least during formation of foam within the manifold may be connected to the manifold. A screen through which foam is formed in the manifold from the dispersed liquid in the spray chamber may be disposed between the spray chamber and the manifold. A separation chamber may be selectively fluidly connected to the manifold. The separation chamber may comprise therewithin a separation mechanism for separating foam into gaseous and liquid components. The separation chamber may be selectively fluidly connected to the reservoir. The separation mechanism may include or consist essentially of a source of ultrasound energy, a blade, a shear, a baffle, and/or a centrifuge.

In an aspect, embodiments of the invention feature an energy storage and recovery system including or consisting essentially of a plurality of cylinder pairs, a first foam-generating mechanism for generating foam at a low pressure within a first pressure range, and a second foam-generating mechanism, different from the first foam-generating mechanism, for generating foam at a high pressure within a second pressure range. Each cylinder pair includes or consists essentially of (i) a low-pressure cylinder for expansion and/or compression over the first pressure range and (ii) a high-pressure cylinder for expansion and/or compression over the second pressure range, which is different from the first pressure range and overlaps the first pressure range at least at an intermediate pressure.

Embodiments of the invention incorporate one or more of the following in any of a variety of different combinations. A manifold for intermediate storage of foam at the low pressure may be selectively fluidly connected to (i) the plurality of low-pressure cylinders and (ii) the first foam-generating mechanism. A manifold for intermediate storage of foam at the high pressure may be selectively fluidly connected to (i) the plurality of high-pressure cylinders and (ii) the second foam-generating mechanism. The first foam-generating mechanism may include or consist essentially of (i) at least one dispersal mechanism for dispersing liquid into gas and (ii) a screen through which foam is formed from the dispersed liquid. The second foam-generating mechanism may include or consist essentially of a dispersal mechanism for at least one of spraying, sparging, fogging, or agitating liquid. The system may include a third foam-generating mechanism for generating foam at the intermediate pressure. A manifold for intermediate storage of foam at the intermediate pressure may be selectively fluidly connected to (i) the plurality of low-pressure cylinders, (ii) the plurality of high-pressure cylinders, and (iii) the third foam-generating mechanism.

In another aspect, embodiments of the invention feature an energy storage and recovery system including or consisting essentially of a cylinder assembly for compression to store energy and/or expansion to recover energy, a foam-generating mechanism for introducing a foam within the cylinder assembly, a pumping cylinder for pumping heat-transfer fluid to the foam-generating mechanism, a first storage reservoir for storage of compressed gas, and a second storage reservoir for storage of heat-transfer fluid. The cylinder assembly includes a first movable boundary mechanism therein and a first rod coupled to the first movable boundary mechanism. The pumping cylinder includes a second movable boundary mechanism therein and a second rod coupled to the second movable boundary mechanism. The first storage reservoir is selectively fluidly connected to the cylinder assembly. The second storage reservoir is selectively fluidly connected to the pumping cylinder.

Embodiments of the invention incorporate one or more of the following in any of a variety of different combinations. The first storage reservoir and the second storage reservoir may be the same reservoir or may be different (i.e., discrete) reservoirs. A heat-transfer subsystem may thermally condition the heat-transfer fluid, and may include or consist essentially of a heat exchanger. The first and second rods may be mechanically coupled to a mechanism for interconverting reciprocal motion of the first and second rods with rotary motion. The mechanism may include or consist essentially of a crankshaft. The crankshaft may maintain the first and second rods in a fixed phase relationship. The foam-generating mechanism may be disposed within the cylinder assembly or disposed outside of the cylinder assembly and connected thereto via a conduit. The foam-generating mechanism may include or consist essentially of one or more nozzles, a rotating blade, a source of ultrasound energy, and/or a sparger. The first storage reservoir may store fluid at a pressure different from a pressure at which the second storage reservoir stores fluid.

In an additional aspect, embodiments of the invention feature a method of storing and recovering energy. Compressed gas is transferred from a storage reservoir to a mixing chamber selectively fluidly connected thereto. In the mixing chamber, a first foam including or consisting essentially of the compressed gas and a heat-transfer fluid is formed. The first foam is transferred from the mixing chamber to a cylinder.

The first foam is expanded in the cylinder to recover energy therefrom. The expanded first foam is removed from the cylinder. A second foam is introduced into the cylinder and compressed in the cylinder to store energy therein. At least a portion of the compressed second foam is transferred to the storage reservoir, the transfer bypassing the mixing chamber.

Embodiments of the invention incorporate one or more of the following in any of a variety of different combinations. The average cell size and/or the uniformity of cell size of the first foam may be altered before expanding the first foam. Removing the expanded first foam from the cylinder may include or consist essentially of exhausting a gaseous component of the expanded first foam to ambient atmosphere. Removing the expanded first foam from the cylinder may include or consist essentially of transferring the expanded first foam to a second cylinder, where it may be further expanded. The expanded first foam may be separated into a gaseous component and a liquid component. The expanded first foam may be separated via mechanical separation (e.g., by a blade, a shear, a baffle, and/or a centrifuge) and/or application of ultrasound energy. The liquid component of the expanded first foam may be stored. The foam mass ratio of the first foam may be selected from the range of 1 to 4. Transferring at least a portion of the compressed second foam to the storage reservoir may include or consist essentially of transferring a gaseous component of the at least a portion of the compressed second foam to the storage reservoir. Transferring at least a portion of the compressed second foam to the storage reservoir may include or consist essentially of transferring both a gaseous component and a liquid component of the at least a portion of the compressed second foam to the storage reservoir. The at least a portion of the compressed second foam may be transferred to the storage reservoir via a bypass connection between the cylinder and the storage reservoir. A valve may substantially prevent entry of the compressed second foam into the mixing chamber during transfer to the storage reservoir. A second portion of the compressed second foam may be transferred from the cylinder to the storage reservoir via the mixing chamber. The first foam and/or the second foam is expanded substantially isothermally. The cylinder may include a piston therein, and expanding the first foam in the cylinder may drive (i) a mechanism mechanically coupled to the piston and/or (ii) a hydraulic system coupled to the cylinder. Expanding the first foam may drive the mechanism, and the mechanism may include or consist essentially of a crankshaft. Forming the first foam may include or consist essentially of transferring heat-transfer liquid into the mixing chamber. The void fraction of the first foam may be controlled by controlling the rate of transfer of the heat-transfer liquid into the mixing chamber. A pressure and/or a temperature within the cylinder and/or the mixing chamber may be sensed, and the rate of transfer may be controlled in response thereto.

In yet another aspect, embodiments of the invention feature a method of recovering energy. A first foam including or consisting essentially of a compressed gas and a heat-transfer fluid is formed within a storage reservoir and transferred to a cylinder. The first foam is expanded in the cylinder to recover energy therefrom, and the expanded first foam is removed from the cylinder. A second foam is compressed in the cylinder to store energy therein, and at least a portion of the compressed second foam is stored in the storage reservoir.

Embodiments of the invention incorporate one or more of the following in any of a variety of different combinations. Forming the first foam may include or consist essentially of, within the storage reservoir, mixing heat-transfer fluid and compressed gas via a foam-generating mechanism. The foam-generating mechanism may include or consist essentially of one or more nozzles, a rotating blade, a source of ultrasound energy, and/or a sparger. Heat-transfer liquid (e.g., substantially non-foamed heat-transfer liquid) may be circulated from a region of the storage reservoir to the foam-generating mechanism. The heat-transfer liquid may be circulated outside of the storage reservoir. The average cell size and/or the uniformity of cell size of the first foam may be altered before expanding the first foam. Removing the expanded first foam from the cylinder may include or consist essentially of exhausting a gaseous component of the expanded first foam to ambient atmosphere. The expanded first foam may be separated into a gaseous component and a liquid component. The expanded first foam may be separated via mechanical separation (e.g., by a blade, a shear, a baffle, and/or a centrifuge) and/or application of ultrasound energy. The liquid component of the expanded first foam may be stored (e.g., in the storage reservoir). The foam mass ratio of the first foam may be selected from the range of 1 to 4. Storing at least a portion of the compressed second foam in the storage reservoir may include or consist essentially of storing a gaseous component of the at least a portion of the compressed second foam. Storing at least a portion of the compressed second foam in the storage reservoir may include or consist essentially of storing both a gaseous component and a liquid component of the at least a portion of the compressed second foam. Removing the expanded first foam from the cylinder may include or consist essentially of transferring the expanded first foam to a second cylinder, where it may be further expanded. The first foam and/or the second foam may be expanded substantially isothermally. The cylinder may include a piston therein. Expanding the first foam in the cylinder may drive (i) a mechanism mechanically coupled to the piston (e.g., a crankshaft) and/or (ii) a hydraulic system coupled to the cylinder.

In an additional aspect, embodiments of the invention feature a method of storing and recovering energy. Gas is transferred into a cylinder. Heat-transfer liquid is transferred into the cylinder to therein mix with the gas and form a foam including or consisting essentially of the gas and the heat-transfer liquid. Within the cylinder, the foam is compressed to store energy and/or expanded to recover energy, and the compressed or expanded foam is exhausted from the cylinder.

Embodiments of the invention incorporate one or more of the following in any of a variety of different combinations. Gas may be transferred into the cylinder from a storage reservoir, and the heat-transfer liquid may be transferred into the cylinder from the storage reservoir. The gas and the heat-transfer liquid may be transferred into the cylinder via different inlets. The foam may be compressed, and at least a portion of the compressed foam may be stored within a storage reservoir. Storing at least a portion of the compressed foam within the storage reservoir may include or consist essentially of storing a gaseous component of the compressed foam. Storing at least a portion of the compressed foam within the storage reservoir may include or consist essentially of storing both a gaseous component and a liquid component of the compressed foam. The void fraction of the foam may be controlled by controlling a rate of transfer of the heat-transfer liquid into the cylinder. A pressure and/or a temperature within the cylinder may be sensed, and the rate of transfer may be controlled in response thereto. The foam may be expanded, and exhausting the expanded foam from the cylinder may include or consist essentially of exhausting a gaseous component of the expanded foam to ambient atmosphere. The foam may be expanded, and exhausting the expanded foam from the cylinder may include or consist essentially of transferring the expanded foam to a second cylinder, where it may be further expanded. The foam may be expanded, and the expanded foam may be separated into a gaseous component and a liquid component. The expanded foam may be separated via mechanical separation (e.g., by a blade, a shear, a baffle, and/or a centrifuge) and/or application of ultrasound energy. The foam may be expanded, and the liquid component of the expanded foam may be stored. The foam mass ratio of the foam may be selected from the range of 1 to 4. The foam may be expanded or compressed substantially isothermally. The foam may be expanded and the cylinder may include a piston therein. Expanding the foam may drive (i) a mechanism mechanically coupled to the piston (e.g., a crankshaft) and/or (ii) a hydraulic system coupled to the cylinder.

In yet an additional aspect, embodiments of the invention feature a method of storing and recovering energy. A gas is compressed or expanded in a plurality of discrete stages, each stage being performed over a different pressure range. During one of the stages, heat is exchanged between the gas and discrete droplets of a first heat-transfer fluid introduced into the gas. During another one of the stages, heat is exchanged between the gas and a second heat-transfer fluid, the gas and the second heat-transfer fluid being combined to form a foam.

Embodiments of the invention incorporate one or more of the following in any of a variety of different combinations. After the compression or expansion during the another one of the stages, at least a portion of the foam may be separated into gaseous and liquid components. The at least a portion of the foam may be separated via mechanical separation (e.g., by a blade, a shear, a baffle, and/or a centrifuge) and/or application of ultrasound energy. The gas may be compressed, and, thereafter, stored in a storage reservoir. The gas may be expanded, and, thereafter, vented to ambient atmosphere. The first and second heat-transfer fluids may include the same liquid (e.g., water). The second heat-transfer fluid may include a foaming additive. The discrete droplets of the first heat-transfer fluid may be introduced into the gas by spraying. The heat exchange between the discrete droplets of the first heat-transfer fluid and the gas may render the expansion or compression during that stage substantially isothermal. The heat exchange within the foam between the gas and the second heat-transfer fluid may render the expansion or compression during that stage substantially isothermal. The expansion or compression of foam may be performed within a cylinder. The foam may be generated by mixing the gas with the second heat-transfer fluid within the cylinder. The foam may be generated by mixing the gas with the second heat-transfer fluid outside of the cylinder, and then the foam may be transferred into the cylinder. The average cell size and/or the uniformity of cell size of the foam may be altered before the foam enters the cylinder. The gas may be expanded, and the cylinder may include a piston therein. Expanding the gas in the cylinder may drive (i) a mechanism mechanically coupled to the piston (e.g., a crankshaft) and/or (ii) a hydraulic system coupled to the cylinder. The foam mass ratio of the foam may be selected from the range of 1 to 4. Forming the foam may include or consist essentially of transferring the second heat-transfer fluid into the gas. The void fraction of the foam may be controlled by controlling a rate of transfer of the second heat-transfer fluid. A pressure and/or a temperature within at least one of the stages may be sensed, and the rate of transfer may be controlled in response thereto.

In an aspect, embodiments of the invention feature a method of storing and recovering energy. Two different processes are performed within a cylinder, the processes comprising (i) compressing gas to store energy and (ii) expanding gas to recover energy. During one of the processes, heat is exchanged with the gas by introducing discrete droplets of a first heat-transfer fluid thereto. During the other one of the processes, heat is exchanged with the gas by mixing the gas with a second heat-transfer fluid to form a foam.

Embodiments of the invention incorporate one or more of the following in any of a variety of different combinations. After the other one of the processes, at least a portion of the foam may be separated into gaseous and liquid components. The separation may be performed via mechanical separation (e.g., by a blade, a shear, a baffle, and/or a centrifuge) and/or application of ultrasound energy. After gas is compressed, it may be stored in a storage reservoir. After gas is expanded, it may be vented to ambient atmosphere. The first and second heat-transfer fluids may include the same liquid (e.g., water). The second heat-transfer fluid may include a foaming additive. The discrete droplets of the first heat-transfer fluid may be introduced into the gas by spraying. The heat exchange between the discrete droplets of the first heat-transfer fluid and the gas may render that process substantially isothermal. The heat exchange within the foam between the gas and the second heat-transfer fluid may render that process substantially isothermal. The foam may be formed by mixing the gas with the second heat-transfer fluid within the cylinder. The foam may be formed by mixing the gas with the second heat-transfer fluid outside of the cylinder, and then the foam may be transferred into the cylinder. The average cell size and/or the uniformity of cell size of the foam may be altered before the foam enters the cylinder. The cylinder may include a piston therein. Expanding the gas in the cylinder may drive (i) a mechanism mechanically coupled to the piston (e.g., a crankshaft) or (ii) a hydraulic system coupled to the cylinder. The foam mass ratio of the foam may be selected from the range of 1 to 4. The void fraction of the foam may be controlled by controlling the rate of transfer of the second heat-transfer fluid into the gas. A pressure and/or a temperature of the gas may be sensed, and the rate of transfer may be controlled in response thereto.

In another aspect, embodiments of the invention feature an energy storage and recovery system including or consisting essentially of a cylinder assembly storing energy by compression and/or recovering energy by expansion, a storage reservoir, a mixing chamber, and a bypass conduit. The storage reservoir is selectively fluidly connected to the cylinder assembly. The mixing chamber is selectively fluidly connected to the cylinder assembly and the storage reservoir, and the mixing chamber (i) receives gas from the storage reservoir, (ii) mixes the gas with a heat-transfer liquid to form a foam, and (iii) transfers the foam to the cylinder assembly. The bypass conduit selectively fluidly connects the cylinder assembly directly to the storage reservoir and transfers gas and/or foam from the cylinder assembly to the storage reservoir without traversing the mixing chamber.

Embodiments of the invention incorporate one or more of the following in any of a variety of different combinations. The mixing chamber may be selectively fluidly connected to the storage reservoir by (i) a first conduit for transferring gas and (ii) a second conduit, different from the first conduit, for transferring heat-transfer liquid. A mechanism for altering at least one characteristic of the foam (e.g., foam cell size and/or foam cell size uniformity) may be disposed in the mixing chamber. The mechanism may include or consist essentially of a screen and/or a source of ultrasound energy. A foam-generating mechanism may be disposed in the mixing chamber. The foam-generating mechanism may include or consist essentially of one or more nozzles, a rotating blade, a source of ultrasound energy, and/or a sparger. The system may include a second cylinder assembly for storing energy by compression or recovering energy by expansion over a pressure range different from a pressure range of the cylinder assembly. A vent for exhausting expanded gas to atmosphere may be selectively fluidly connected to the second cylinder assembly. The system may include a control system for controlling the cylinder assembly and/or the mixing chamber to enforce substantially isothermal compression and/or substantially isothermal expansion in the cylinder assembly. The system may include a sensor for detecting a pressure within the cylinder assembly and/or the mixing chamber, and the control system may be responsive to the sensor. The control system may control the flow rate of heat-transfer liquid into the mixing chamber in response to the detected pressure. A circulation apparatus (e.g., a pump such as a variable-speed pump) may transfer heat-transfer liquid to the mixing chamber. A movable boundary mechanism may separate the cylinder assembly into two chambers. A crankshaft for converting reciprocal motion of the boundary mechanism into rotary motion may be mechanically coupled to the boundary mechanism. A motor/generator may be coupled to the crankshaft. The storage reservoir may include or consist essentially of a pressure vessel, a pipe, and/or a cavern.

In yet another aspect, embodiments of the invention feature an energy storage and recovery system including or consisting essentially of a cylinder assembly storing energy by compression and/or recovering energy by expansion, a storage reservoir selectively fluidly connected to the cylinder assembly, and a foam-generating mechanism for generating, within the storage reservoir, a foam including or consisting essentially of gas and a heat-transfer liquid.

Embodiments of the invention incorporate one or more of the following in any of a variety of different combinations. A mechanism for altering at least one characteristic of the foam (e.g., foam cell size and/or foam cell size uniformity) may be disposed between the storage reservoir and the cylinder assembly. The mechanism may include or consist essentially of a screen and/or a source of ultrasound energy. The foam-generating mechanism may include or consist essentially of one or more nozzles, a rotating blade, a source of ultrasound energy, and/or a sparger. The system may include a second cylinder assembly for storing energy by compression or recovering energy by expansion over a pressure range different from a pressure range of the cylinder assembly. A vent for exhausting expanded gas to atmosphere may be selectively fluidly connected to the second cylinder assembly. The system may include a control system for controlling the cylinder assembly to enforce substantially isothermal compression and/or substantially isothermal expansion therein. The system may include a sensor for detecting pressure or temperature within the cylinder assembly, and the control system may be responsive to the sensor. A circulation apparatus (e.g., a pump such as a variable-speed pump) may transfer heat-transfer liquid to the foam generating mechanism. A conduit may selectively fluidly connect a bottom region of the storage reservoir with the foam-generating mechanism. The conduit may extend outside of the storage reservoir. A movable boundary mechanism may separate the cylinder assembly into two chambers. A crankshaft for converting reciprocal motion of the boundary mechanism into rotary motion may be mechanically coupled to the boundary mechanism. A motor/generator may be coupled to the crankshaft. The storage reservoir may include or consist essentially of a pressure vessel, a pipe, and/or a cavern.

In an additional aspect, embodiments of the invention feature an energy storage and recovery system including or consisting essentially of a cylinder assembly for storing energy by compression and/or recovering energy by expansion, a storage reservoir, and disposed within the cylinder assembly, a foam-generating mechanism for generating a foam via introduction of a heat-transfer liquid into gas within the cylinder assembly. The cylinder assembly is selectively fluidly connected to the storage reservoir by (i) a first conduit for transferring gas and (ii) a second conduit, different from the first conduit, for transferring heat-transfer liquid to the foam-generating mechanism.

Embodiments of the invention incorporate one or more of the following in any of a variety of different combinations. The foam-generating mechanism may include or consist essentially of one or more nozzles, a rotating blade, a source of ultrasound energy, and/or a sparger. The system may include a second cylinder assembly for at least one of storing energy by compression or recovering energy by expansion over a pressure range different from a pressure range of the cylinder assembly. A vent for exhausting expanded gas to atmosphere may be selectively fluidly connected to the second cylinder assembly. The system may include a control system for controlling the cylinder assembly to enforce substantially isothermal compression and/or substantially isothermal expansion therein. The system may include a sensor for detecting a pressure or a temperature within the cylinder assembly, and the control system may be responsive to the sensor. The control system may control a flow rate of heat-transfer liquid through the foam-generating mechanism in response to the detected pressure. A circulation apparatus (e.g., a pump such as a variable-speed pump) may transfer heat-transfer liquid within the second conduit. A movable boundary mechanism may separate the cylinder assembly into two chambers. A crankshaft for converting reciprocal motion of the boundary mechanism into rotary motion may be mechanically coupled to the boundary mechanism. A motor/generator may be coupled to the crankshaft. The storage reservoir may include or consist essentially of a pressure vessel, a pipe, and/or a cavern.

In an aspect, embodiments of the invention feature an energy storage and recovery system including or consisting essentially of a cylinder assembly for storing energy by compression and/or recovering energy by expansion, a spray mechanism for introducing discrete droplets of a first heat-transfer liquid within the cylinder assembly for heat exchange between gas and the discrete droplets of the first heat-transfer liquid, and, discrete from the spray mechanism, a foam-generating mechanism for generating and/or introducing within the cylinder assembly a foam including or consisting essentially of gas and a second heat-transfer liquid.

Embodiments of the invention incorporate one or more of the following in any of a variety of different combinations. The first and second heat-transfer liquids may include the same liquid (e.g., water). The second heat-transfer liquid may include a foaming additive. The spray mechanism may include or consist essentially of a spray head and/or a spray rod. The foam-generating mechanism may include or consist essentially of one or more nozzles, a rotating blade, a source of ultrasound energy, and/or a sparger. A storage reservoir for storage of compressed gas (e.g., a pressure vessel, a pipe, and/or a cavern) may be selectively fluidly connected to the cylinder assembly. A vent for exhausting expanded gas to ambient atmosphere may be selectively fluidly connected to the cylinder assembly.

In another aspect, embodiments of the invention feature an energy storage and recovery system including or consisting essentially of (i) a plurality of cylinder assemblies for, each over a different pressure range, storing energy by compression and/or recovering energy by expansion, (ii) selectively fluidly connected to one of the cylinder assemblies, a spray mechanism for introducing therein discrete droplets of a first heat-transfer liquid, and (iii) selectively fluidly connected to a different one of the cylinder assemblies, a foam-generating mechanism for generating and/or introducing therewithin a foam including or consisting essentially of gas and a second heat-transfer liquid.

Embodiments of the invention incorporate one or more of the following in any of a variety of different combinations. The first and second heat-transfer liquids may include the same liquid (e.g., water). The second heat-transfer liquid may include a foaming additive. The spray mechanism may include or consist essentially of a spray head and/or a spray rod. The foam-generating mechanism may include or consist essentially of one or more nozzles, a rotating blade, a source of ultrasound energy, and/or a sparger. A storage reservoir for storage of compressed gas (e.g., a pressure vessel, a pipe, and/or a cavern) may be selectively fluidly connected to the cylinder assembly. A vent for exhausting expanded gas to ambient atmosphere may be selectively fluidly connected to the cylinder assembly.

In yet another aspect, embodiments of the invention feature a method of energy recovery. A piston within a pumping cylinder is driven to transfer heat-transfer liquid therefrom to a foam-generating mechanism. Compressed gas is transferred to a cylinder assembly or to the foam-generating mechanism. Via the foam-generating mechanism, (i) a foam is formed by mingling the heat-transfer liquid with the compressed gas and (ii) the foam is introduced within the cylinder assembly. The foam is expanded within the cylinder assembly, the expansion driving a piston within the cylinder assembly. At least a portion of the expanded foam is exhausted from the cylinder assembly.

Embodiments of the invention incorporate one or more of the following in any of a variety of different combinations. The compressed gas may be transferred to the cylinder assembly from a first storage reservoir. Heat-transfer liquid may be transferred to the pumping cylinder from a second storage reservoir. The first and second storage reservoirs may be the same reservoir. At least a portion of the expanded foam may be separated into gaseous and liquid components. The liquid component may be transferred to the first storage reservoir. The separation may be performed via mechanical separation (e.g., by a blade, a shear, a baffle, and/or a centrifuge) and/or application of ultrasound energy. The second storage reservoir may be separate and distinct from the first storage reservoir. The storage pressure within the first storage reservoir may be higher than the storage pressure within the second storage reservoir (which may be, e.g., approximately atmospheric pressure). At least a portion of the expanded foam may be separated into gaseous and liquid components. The liquid component may be transferred to the second storage reservoir. The separation may be performed via mechanical separation (e.g., by a blade, a shear, a baffle, and/or a centrifuge) and/or application of ultrasound energy. The heat-transfer liquid may be thermally conditioned (i.e., heated or cooled) prior to the heat-transfer liquid entering the foam-generating mechanism. The foam-generating mechanism may be disposed within the cylinder assembly. The foam-generating mechanism may be disposed outside the cylinder assembly and connected thereto by a conduit. The pistons within the pumping cylinder and the cylinder assembly may be driven simultaneously. At least a portion of the expanded foam may be separated into gaseous and liquid components. The separation may be performed via mechanical separation (e.g., by a blade, a shear, a baffle, and/or a centrifuge) and/or application of ultrasound energy. Exhausting at least a portion of the expanded foam from the cylinder assembly may include or consist essentially of exhausting a gaseous portion of the expanded foam to ambient atmosphere. Exhausting at least a portion of the expanded foam from the cylinder assembly may include or consist essentially of transferring the expanded foam or a gaseous portion thereof to a second cylinder assembly for further expansion thereof. The foam mass ratio of the foam may be selected from the range of 1 to 4. The void fraction of the foam may be controlled by controlling a rate of transfer of the heat-transfer liquid to the foam-generating mechanism. A pressure and/or a temperature within the cylinder and/or the foam-generating mechanism may be sensed, and the rate of transfer may be controlled in response thereto.

In an additional aspect, embodiments of the invention feature a method of energy storage. A piston within a pumping cylinder is driven to transfer heat-transfer liquid therefrom to a foam-generating mechanism. Gas is transferred to a cylinder assembly or to the foam-generating mechanism. Via the foam-generating mechanism, (i) a foam is formed by mingling the heat-transfer liquid with the compressed gas and (ii) the foam is introduced within the cylinder assembly. A piston within the cylinder assembly is driven to compress the foam within the cylinder assembly. At least a portion of the compressed foam is exhausted from the cylinder assembly.

Embodiments of the invention incorporate one or more of the following in any of a variety of different combinations. Exhausting the at least a portion of the compressed foam from the cylinder assembly may include or consist essentially of transferring the compressed foam to a first storage reservoir. Exhausting the at least a portion of the compressed foam from the cylinder assembly may include or consist essentially of transferring a gaseous component of the compressed foam to a first storage reservoir. Exhausting the at least a portion of the compressed foam from the cylinder assembly may include or consist essentially of transferring a liquid component of the compressed foam to a second storage reservoir. The first and second storage reservoirs may be the same reservoir. The second storage reservoir may be separate and distinct from the first storage reservoir. The storage pressure within the first storage reservoir may be higher than the storage pressure within the second storage reservoir (which may be, e.g., approximately atmospheric pressure). The heat-transfer liquid may be thermally conditioned (i.e., heated or cooled) prior to the heat-transfer liquid entering the foam-generating mechanism. The foam-generating mechanism may be disposed within the cylinder assembly. The foam-generating mechanism may be disposed outside the cylinder assembly and connected thereto by a conduit. The pistons within the pumping cylinder and the cylinder assembly may be driven simultaneously. At least a portion of the compressed foam may be separated into gaseous and liquid components. The separation may be performed via mechanical separation (e.g., by a blade, a shear, a baffle, and/or a centrifuge) and/or application of ultrasound energy. Gas may be transferred to the cylinder assembly or to the foam-generating mechanism from ambient atmosphere. Gas may be transferred to the cylinder assembly or to the foam-generating mechanism from a second cylinder assembly after compression of the gas within the second cylinder assembly. The foam mass ratio of the foam may be selected from the range of 1 to 4. The void fraction of the foam may be controlled by controlling a rate of transfer of the heat-transfer liquid to the foam-generating mechanism. A pressure and/or a temperature within the cylinder and/or the foam-generating mechanism may be sensed, and the rate of transfer may be controlled in response thereto.

In an aspect, embodiments of the invention feature an energy storage and recovery system including or consisting essentially of a first cylinder assembly for at least one of compression to store energy or expansion to recover energy and a second cylinder assembly for at least one of compression to store energy or expansion to recover energy. The first cylinder assembly includes or consists essentially of (i) a first cylinder, (ii) at least partially disposed within the first cylinder, a first pumping mechanism for circulating heat-transfer fluid from the first cylinder, and (iii) a first foam-generating mechanism for mingling heat-transfer fluid with gas to form a foam and introducing the foam within the first cylinder. The second cylinder assembly includes or consists essentially of (i) a second cylinder, (ii) at least partially disposed within the second cylinder and selectively fluidly connected to the first foam-generating mechanism, a second pumping mechanism for circulating heat-transfer fluid from the second cylinder, and (iii) a second foam-generating mechanism for mingling heat-transfer fluid with gas to form a foam and introducing the foam within the second cylinder, the second foam-generating mechanism being selectively fluidly connected to the first pumping mechanism.

Embodiments of the invention incorporate one or more of the following in any of a variety of different combinations. The first pumping mechanism may include or consist essentially of a first piston disposed within the first cylinder and separating the first cylinder into two compartments, a first piston rod comprising a first cavity and coupled to the first piston, and a first hollow tube disposed at least partially in the first cavity and extending through at least a portion of the first cylinder. Relative motion between the first hollow tube and the first piston rod may circulate heat-transfer fluid into and out of the first cavity. The second pumping mechanism may include or consist essentially of a second piston disposed within the second cylinder and separating the second cylinder into two compartments, a second piston rod comprising a first cavity and coupled to the second piston, and a second hollow tube disposed at least partially in the second cavity and extending through at least a portion of the second cylinder. Relative motion between the second hollow tube and the second piston rod may circulate heat-transfer fluid into and out of the second cavity. The first and second piston rods may be mechanically coupled to a common crankshaft. A first heat-exchange subsystem may thermally condition heat-transfer fluid circulating to the first foam-generating mechanism. The first heat-exchange subsystem may include or consist essentially of a heat exchanger. The first heat-exchange subsystem may be fluidly connected to the first foam-generating mechanism and the second pumping mechanism. A second heat-exchange subsystem may thermally condition heat-transfer fluid circulating to the second foam-generating mechanism. The second heat-exchange subsystem may include or consist essentially of a heat exchanger. The second heat-exchange subsystem may be fluidly connected to the second foam-generating mechanism and the first pumping mechanism. A first storage reservoir for storage of gas and/or heat-transfer fluid may be selectively fluidly connected to the first and second cylinder assemblies. A second storage reservoir for storage of gas and/or heat-transfer fluid may be selectively fluidly connected to the first and second cylinder assemblies. The storage pressure of the first storage reservoir may be higher than the storage pressure of the second storage reservoir (which may be approximately atmospheric pressure). The first and/or second storage reservoirs may be selectively fluidly connected to the first and/or second pumping mechanisms. The first foam-generating mechanism may be disposed within the first cylinder. The first foam-generating mechanism may be disposed outside of the first cylinder and connected thereto via a conduit. The second foam-generating mechanism may be disposed within the second cylinder. The second foam-generating mechanism may be disposed outside of the second cylinder and connected thereto via a conduit. The first foam-generating mechanism may include or consist essentially of one or more nozzles, a rotating blade, a source of ultrasound energy, and/or a sparger. The second foam-generating mechanism may include or consist essentially of one or more nozzles, a rotating blade, a source of ultrasound energy, and/or a sparger.

In another aspect, embodiments of the invention feature a method of energy recovery utilizing an energy-recovery system including or consisting essentially of (i) a first cylinder assembly comprising a first cylinder, a first pumping mechanism, and a first foam-generating mechanism and (ii) a second cylinder assembly comprising a second cylinder, a second pumping mechanism, and a second foam-generating mechanism. An expansion stroke is performed with the first cylinder assembly and an exhaust stroke is performed with the second cylinder assembly. The expansion stroke includes or consists essentially of (i) mingling heat-transfer fluid and gas at the first foam-generating mechanism to form a foam, (ii) expanding the foam within the first cylinder, and (iii) introducing heat-transfer fluid into the first pumping mechanism. The exhaust stroke includes or consists essentially of (i) exhausting foam or a gaseous component thereof from the second cylinder and (ii) pumping heat-transfer fluid with the second pumping mechanism to the first foam-generating mechanism.

Embodiments of the invention incorporate one or more of the following in any of a variety of different combinations. The exhaust stroke may include or consist essentially of thermally conditioning (e.g., heating) the heat-transfer fluid pumped with the second pumping mechanism before it enters the first foam-generating mechanism. An expansion stroke may be performed with the second cylinder assembly, and an exhaust stroke may be performed with the first cylinder assembly. The expansion stroke may include or consist essentially of (i) mingling heat-transfer fluid and gas at the second foam-generating mechanism to form a second foam, (ii) expanding the second foam within the second cylinder, and (iii) introducing heat-transfer fluid into the second pumping mechanism. The exhaust stroke may include or consist essentially of (i) exhausting foam or a gaseous component thereof from the first cylinder and (ii) pumping heat-transfer fluid with the first pumping mechanism to the second foam-generating mechanism.

In yet another aspect, embodiments of the invention feature a method of energy storage utilizing an energy-recovery system including or consisting essentially of (i) a first cylinder assembly comprising a first cylinder, a first pumping mechanism, and a first foam-generating mechanism and (ii) a second cylinder assembly comprising a second cylinder, a second pumping mechanism, and a second foam-generating mechanism. A compression stroke is performed with the first cylinder assembly. The compression stroke includes or consists essentially of (i) within the first cylinder, compressing a foam generated by the first foam-generating mechanism, and (ii) pumping heat-transfer fluid with the first pumping mechanism to the second foam-generating mechanism. A compression stroke is performed with the second cylinder assembly. The compression stroke includes or consists essentially of (i) within the second cylinder, compressing a second foam generated by the second foam-generating mechanism, and (ii) pumping heat-transfer fluid with the second pumping mechanism to the first foam-generating mechanism.

Embodiments of the invention incorporate one or more of the following in any of a variety of different combinations. An intake stroke may be performed with the first cylinder assembly. The intake stroke may include or consist essentially of (i) receiving gas within the first cylinder and (ii) introducing heat-transfer fluid into the first pumping mechanism. An intake stroke may be performed with the second cylinder assembly. The intake stroke may include or consist essentially of (i) receiving gas within the second cylinder and (ii) introducing heat-transfer fluid into the second pumping mechanism. The compression stroke of the first cylinder assembly may include thermally conditioning (e.g., cooling) the heat-transfer fluid pumped with the first pumping mechanism before it enters the second foam-generating mechanism. The compression stroke of the second cylinder assembly may include thermally conditioning (e.g., cooling) the heat-transfer fluid pumped with the second pumping mechanism before it enters the first foam-generating mechanism.

In an additional aspect, embodiments of the invention feature a system for efficient power demand response. The system includes or consists essentially of (i) a first energy-storage system for supplying power in response to demand up to a first power-demand level, (ii) connected to the first energy-storage system, a second energy-storage system for supplying power in response to demand greater than the first power-demand level, and (iii) a heat-exchange subsystem for thermally conditioning at least a portion of the first and/or second energy-storage systems, thereby increasing a collective efficiency of the first and second energy-storage systems.

Embodiments of the invention incorporate one or more of the following in any of a variety of different combinations. The first energy-storage system may include or consist essentially of a battery, a flywheel, and/or an ultracapacitor. The second energy-storage system may include or consist essentially of a compressed-gas energy-storage system that supplies power by expanding compressed gas (e.g., in the form of a foam). The first and second energy-storage systems may be connected in parallel to a power grid. The first power-demand level may be approximately 500 kW. The heat-exchange subsystem may recover thermal energy from the first energy-storage system for thermally conditioning, in the second energy-storage system, (i) heat-transfer fluid for thermally conditioning gas undergoing expansion and/or compression or for mingling with gas to form foam, (ii) gas or foam undergoing expansion and/or compression, and/or (iii) gas or foam stored in a storage reservoir prior to expansion. The heat-exchange subsystem may include or consist essentially of a first heat exchanger associated with the first energy-storage system and a second heat exchanger associated with the second energy-storage system that is (i) separate from the first heat exchanger and (ii) selectively fluidly connectable to the first heat exchanger. The first heat exchanger may be fluidly connected to a first radiator and/or a first thermal well and the second heat exchanger may be fluidly connected to a second radiator and/or a second thermal well.

In yet an additional aspect, embodiments of the invention feature a method of power delivery. A time-varying power-demand level is detected. Power is supplied from a first energy-storage system when the power-demand level is less than or equal to a threshold level. Power is supplied from a second energy-storage system when the power-demand level is greater than the threshold level. At least a portion of the first and/or second energy-storage systems is thermally conditioned (i.e., heated or cooled), thereby increasing a collective efficiency of the first and second energy-storage systems.

Embodiments of the invention incorporate one or more of the following in any of a variety of different combinations. Power may be supplied from the first energy-storage system only when the power-demand level is less than or equal to the threshold level. Power may be supplied from the second energy-storage system only when the power-demand level is greater than the threshold level. Thermally conditioning may include or consist essentially of recovering thermal energy from the first energy-storage system and thermally conditioning at least a portion of the second energy-storage system with the recovered thermal energy. Thermally conditioning the at least a portion of the second energy-storage system may include or consist essentially of thermally conditioning (i) heat-transfer fluid for thermally conditioning gas undergoing expansion and/or compression or for mingling with gas to form foam, (ii) gas or foam undergoing expansion and/or compression, and/or (iii) gas or foam stored in a compressed-gas reservoir prior to expansion. Power may be supplied from the first and second energy-storage systems over a common bus line. Supplying power from the second energy-storage system may include or consist essentially of expanding gas and/or foam to recover energy therefrom.

In an aspect, embodiments of the invention feature a method of energy storage and recovery utilizing a power unit comprising a cylinder assembly for the compression of gas to store energy and/or the expansion of gas to recover energy. Gas is compressed in the power unit. Heat-transfer liquid from a thermal well is introduced into the gas prior to and/or during compression, the heat-transfer liquid absorbing thermal energy from the gas during compression. At least a portion of the heat-transfer liquid is transferred back to the thermal well to store the thermal energy therein. Thereafter, gas is expanded in the power unit. Heat-transfer liquid from the thermal well is introduced into the gas prior to and/or during expansion, the gas absorbing thermal energy from the heat-transfer liquid during expansion.

Embodiments of the invention incorporate one or more of the following in any of a variety of different combinations. The heat-transfer liquid may be introduced into the gas by spraying the heat-transfer liquid into the gas. Introducing the heat-transfer liquid into the gas may form a foam comprising the heat-transfer liquid and the gas. At least a portion of the foam may be separated into gas and heat-transfer liquid prior to transferring the at least a portion of the heat-transfer liquid back to the thermal well. Introducing the heat-transfer liquid prior to and/or during compression may render the compression substantially isothermal. Introducing the heat-transfer liquid prior to and/or during expansion may render the expansion substantially isothermal. Waste thermal energy produced by the power unit may be stored in the thermal well. Thermal energy may be exchanged between the thermal well and the surrounding environment. Thermal energy may be exchanged between the thermal well and the surrounding environment while the power unit is neither compressing nor expanding. The temperature of the heat-transfer liquid introduced into the gas prior to and/or during compression may be below ambient temperature. The temperature of the heat-transfer liquid introduced into the gas prior to and/-or during expansion may be above ambient temperature. Compressed gas may be stored after compression, and stored compressed gas may be expanded during expansion. Storing compressed gas may include storing heat-transfer fluid at an elevated temperature. The stored heat-transfer fluid may be transferred to the thermal well, thereby storing thermal energy therein. Expanded gas may be vented to atmosphere after expansion.

In another aspect, embodiments of the invention feature an energy storage and recovery system configured for use with a thermal well for containing heat-transfer fluid therein. The system includes or consists essentially of (i) a power unit comprising a cylinder assembly for, therewithin, compression of gas to store energy and/or expansion of gas to recover energy, (ii) a mechanism for introducing heat-transfer liquid into the gas prior to and/or during the compression and/or expansion, the mechanism configured for selective fluid connection to the thermal well, (iii) a conduit for selectively transferring heat-transfer liquid introduced into the gas back into the thermal well, and (iv) thermally connected to the power unit and the thermal well, a waste-heat heat-exchange system for transferring waste thermal energy from the power unit to the thermal well.

Embodiments of the invention incorporate one or more of the following in any of a variety of different combinations. The system may include an environmental heat-exchange system configured for thermal connection to the thermal well and the surrounding environment. The system may include a control system for (i) sensing an operating state of the power unit and (ii) operating the environmental heat-exchange system only when the power unit is neither expanding nor compressing gas. A reservoir for storage of compressed gas may be selectively fluidly connected to the power unit. The reservoir may be configured for selective fluid connection to the thermal well for enabling the flow of heat-transfer liquid therebetween. A vent for venting expanded gas to atmosphere may be selectively fluidly connected to the power unit.

In yet another aspect, embodiments of the invention feature a method of energy storage and recovery utilizing a power unit comprising a cylinder assembly for the compression of gas to store energy and/or the expansion of gas to recover energy. Gas is compressed and/or expanded in the power unit. Prior to and/or during the compression and/or expansion, (i) heat-transfer liquid is withdrawn from a thermal well at a first temperature, (ii) the heat-transfer liquid is thermally conditioned, thereby bringing it to a second temperature different from the first temperature, and (iii the thermally conditioned heat-transfer liquid is introduced into the gas to exchange heat therewith.

Embodiments of the invention incorporate one or more of the following in any of a variety of different combinations. The heat exchange between the gas and the thermally conditioned heat-transfer liquid may render the compression and/or expansion substantially isothermal. Introducing the thermally conditioned heat-transfer liquid into the gas may include or consist essentially of spraying the thermally conditioned heat-transfer liquid into the gas. Introducing the thermally conditioned heat-transfer liquid into the gas may form a foam including or consisting essentially of the heat-transfer liquid and the gas. At least a portion of the foam may be separated into gas and heat-transfer liquid after the compression and/or expansion. Thermally conditioning the heat-transfer liquid may include or consist essentially of transfer of thermal energy between the heat-transfer liquid and a second thermal well discrete from and not fluidly connected to the thermal well. Waste thermal energy produced by the power unit may be stored in the second thermal well. Thermal energy may be exchanged between the second thermal well and the surrounding environment. Thermal energy may be exchanged between the second thermal well and the surrounding environment while the power unit is neither compressing nor expanding.

In an additional aspect, embodiments of the invention feature an energy storage and recovery system including or consisting essentially of (i) a power unit comprising a cylinder assembly for, therewithin, compression of gas to store energy and/or expansion of gas to recover energy, (ii) a mechanism for introducing heat-transfer liquid into the gas prior to and/or during the compression and/or expansion, (iii) selectively fluidly connected to the mechanism, a thermal well for containing heat-transfer liquid therein, (iv) a heat exchanger connected between the thermal well and the power unit for thermally conditioning heat-transfer liquid flowing from the thermal well to the power unit, and (v) associated with the heat exchanger and discrete from the thermal well, a second thermal well for storing thermal energy from and/or supplying thermal energy to the heat-transfer fluid.

Embodiments of the invention incorporate one or more of the following in any of a variety of different combinations. A conduit may transfer heat-transfer liquid introduced into the gas back into the thermal well. A waste-heat heat-exchange system for transferring waste thermal energy from the power unit to the second thermal well may be thermally connected to the power unit and the second thermal well. An environmental heat-exchange system may be thermally connected to the second thermal well and the surrounding environment. The heat exchanger may be disposed within the second thermal well.

In yet an additional aspect, embodiments of the invention feature a method of energy storage and recovery utilizing a power unit comprising a cylinder assembly for the compression of gas to store energy and/or the expansion of gas to recover energy. Gas is compressed or expanded in the power unit. Prior to and/or during the compression and/or expansion, (i) heat-transfer liquid is withdrawn from a first thermal well at a first temperature, and (ii) the heat-transfer liquid is introduced into the gas to exchange heat therewith, the heat exchange bringing the heat-transfer liquid to a second temperature different from the first temperature. Heat-transfer liquid is transferred at the second temperature to a second thermal well discrete from and not fluidly connected to the first thermal well.

Embodiments of the invention incorporate one or more of the following in any of a variety of different combinations. The heat exchange between the gas and the heat-transfer liquid may render the compression and/or expansion substantially isothermal. Introducing the heat-transfer liquid into the gas may include or consist essentially of spraying the thermally conditioned heat-transfer liquid into the gas. Introducing the heat-transfer liquid into the gas may form a foam including or consisting essentially of the heat-transfer liquid and the gas. At least a portion of the foam may be separated into gas and heat-transfer liquid prior to transferring heat-transfer liquid to the second thermal well. Waste thermal energy produced by the power unit may be stored in the second thermal well. Thermal energy may be exchanged between the surrounding environment and the first thermal well and/or the second thermal well. Thermal energy may be exchanged with the surrounding environment while the power unit is neither compressing nor expanding.

In an aspect, embodiments of the invention feature an energy storage and recovery system including (i) a power unit comprising a cylinder assembly for, therewithin, compression of gas to store energy and/or expansion of gas to recover energy, (ii) a mechanism for introducing heat-transfer liquid into the gas prior to and/or during the compression and/or expansion, (iii) selectively fluidly connected to the mechanism, (a) a first thermal well for containing heat-transfer liquid therein at a first temperature and (b) a second thermal well, discrete from the first thermal well, for containing heat-transfer liquid therein at a second temperature different from the first temperature. The system also includes a control system for (i) prior to and/or during compression, routing heat-transfer liquid (a) from the first thermal well into the gas and (b) from the power unit into the second thermal well, and (ii) prior to and/or during expansion, routing heat-transfer liquid (a) from the second thermal well into the gas and (b) from the power unit into the first thermal well.

Embodiments of the invention incorporate one or more of the following in any of a variety of different combinations. A waste-heat heat-exchange system for transferring waste thermal energy from the power unit to the second thermal well may be thermally connected to the power unit and the second thermal well. An environmental heat-exchange system may be thermally connected to the first thermal well and the surrounding environment. An environmental heat-exchange system may be thermally connected to the second thermal well and the surrounding environment.

In another aspect, embodiments of the invention feature a method of energy storage and recovery utilizing a power unit comprising a cylinder assembly for the compression of gas to store energy and/or the expansion of gas to recover energy. Gas is compressed and/or expanded in the power unit. Prior to and/or during the compression and/or expansion, (i) heat-transfer liquid is withdrawn from a reservoir at a first temperature, (ii) the heat-transfer liquid is thermally conditioned, thereby bringing it to a second temperature different from the first temperature, and (iii) the thermally conditioned heat-transfer liquid is introduced into the gas to exchange heat therewith. Thermally conditioning the heat-transfer liquid includes or consists essentially of exchanging thermal energy between the heat-transfer liquid and a heat-storage liquid flowing from a first thermal well having a third temperature to a second thermal well (i) discrete from the first thermal well and (ii) having a fourth temperature different from the third temperature.

Embodiments of the invention incorporate one or more of the following in any of a variety of different combinations. The heat-transfer liquid and the heat-storage liquid may not mix during thermal conditioning of the heat-transfer liquid. The heat exchange between the gas and the thermally conditioned heat-transfer liquid may render the compression and/or expansion substantially isothermal. Introducing the thermally conditioned heat-transfer liquid into the gas may include or consist essentially of spraying the thermally conditioned heat-transfer liquid into the gas. Introducing the thermally conditioned heat-transfer liquid into the gas may form a foam including or consisting essentially of the heat-transfer fluid and the gas. At least a portion of the foam may be separated into gas and heat-transfer liquid after the compression and/or expansion.

In yet another aspect, embodiments of the invention feature an energy storage and recovery system including or consisting essentially of (i) a power unit comprising a cylinder assembly for, therewithin, compression of gas to store energy and/or expansion of gas to recover energy, (ii) a mechanism for introducing heat-transfer liquid into the gas prior to and/or during the compression and/or expansion, (iii) selectively fluidly connected to the mechanism, a reservoir for containing heat-transfer liquid therein, (iv) a heat exchanger connected between the reservoir and the power unit for thermally conditioning heat-transfer liquid flowing from the reservoir to the power unit, and (v) associated with the heat exchanger and not fluidly connected to the reservoir, (a) a first thermal well for containing heat-storage liquid at a first temperature and (b) a second thermal well for containing heat-storage liquid at a second temperature different from the first temperature, the flow of heat-storage liquid between the first and second thermal wells thermally conditioning the heat-transfer fluid.

Embodiments of the invention incorporate one or more of the following in any of a variety of different combinations. A conduit may transfer heat-transfer liquid introduced into the gas back into the reservoir. A waste-heat heat-exchange system for transferring waste thermal energy from the power unit to the second thermal well may be thermally connected to the power unit and the second thermal well. An environmental heat-exchange system may be thermally connected to the first thermal well and the surrounding environment. An environmental heat-exchange system may be thermally connected to the second thermal well and the surrounding environment.

In an additional aspect, embodiments of the invention feature a method of energy storage and recovery utilizing a power unit comprising a cylinder assembly for the compression of gas to store energy and/or the expansion of gas to recover energy. Gas is compressed in the power unit. Prior to and/or during the compression, (i) heat-transfer liquid is withdrawn from a liquid reservoir at a first temperature, and (ii) the heat-transfer liquid is introduced into the gas to exchange heat therewith, the heat exchange bringing the heat-transfer liquid to a second temperature higher than the first temperature. Both the heat-transfer liquid at the second temperature and the compressed gas are transferred to a compressed-gas store.

Embodiments of the invention incorporate one or more of the following in any of a variety of different combinations. The heat exchange between the gas and the heat-transfer liquid may render the compression substantially isothermal. Introducing the heat-transfer liquid into the gas may include or consist essentially of spraying the thermally conditioned heat-transfer liquid into the gas. Introducing the heat-transfer liquid into the gas may form a foam including or consisting essentially of the heat-transfer liquid and the gas. Transferring both the heat-transfer liquid at the second temperature and the compressed gas to a compressed-gas store may include or consist essentially of transferring the foam to the compressed-gas store.

The method may include (i) transferring compressed gas from the compressed-gas store to the power unit, (ii) expanding the compressed gas in the power unit, (iii) prior to and/or during the expansion, (a) withdrawing heat-transfer liquid from the compressed-gas store at a third temperature and (b) introducing the heat-transfer liquid into the gas to exchange heat therewith, the heat exchange bringing the heat-transfer liquid to a fourth temperature lower than the third temperature, and (iv) transferring the heat-transfer liquid to the liquid reservoir. The heat exchange between the gas and the heat-transfer liquid may render the expansion substantially isothermal. Introducing the heat-transfer liquid into the gas prior to and/or during expansion may include or consist essentially of spraying the thermally conditioned heat-transfer liquid into the gas. Introducing the heat-transfer liquid into the gas prior to and/or during expansion may form a foam including or consisting essentially of the heat-transfer liquid and the gas. At least a portion of the foam may be separated into gas and heat-transfer liquid prior to transferring the heat-transfer liquid to the liquid reservoir. Waste thermal energy produced by the power unit may be stored in the compressed-gas store. Thermal energy may be exchanged between the surrounding environment and the compressed-gas store. Thermal energy may be exchanged with the surrounding environment while the power unit is neither compressing nor expanding.

In yet an additional aspect, embodiments of the invention feature a method of energy storage and recovery utilizing a power unit comprising a cylinder assembly for the compression of gas to store energy and/or the expansion of gas to recover energy. Gas is compressed in the power unit. Prior to and/or during the compression, (i) heat-transfer liquid is withdrawn from a first thermal well at a first temperature, and (ii) the heat-transfer liquid is introduced into the gas to exchange heat therewith, the heat exchange bringing the heat-transfer liquid to a second temperature higher than the first temperature. The compressed gas is transferred to a compressed-gas store. The heat-transfer liquid at the second temperature is transferred to the compressed-gas store and/or a second thermal well discrete from the first thermal well.

The method may include (i) transferring compressed gas from the compressed-gas store to the power unit, (ii) expanding the compressed gas in the power unit, (iii) prior to and/or during the expansion, (a) withdrawing heat-transfer liquid from at least one of the compressed-gas store or the second thermal well, and (b) introducing the heat-transfer liquid into the gas to exchange heat therewith, and (iv) transferring the heat-transfer liquid to the first thermal well.

Embodiments of the invention incorporate one or more of the following in any of a variety of different combinations. Expanding the compressed gas in the power unit may include or consist essentially of expanding the compressed gas in a first stage and a second stage each spanning a different pressure range. Heat-transfer liquid may be withdrawn from the compressed-gas store prior to and/or during expansion in the first stage. Heat-transfer liquid may be withdrawn from the second thermal well prior to and/or during expansion in the second stage. The heat exchange between the gas and the heat-transfer liquid prior to and/or during the expansion may render the expansion substantially isothermal. Introducing the heat-transfer liquid into the gas prior to and/or during expansion may include or consist essentially of spraying the thermally conditioned heat-transfer liquid into the gas. Introducing the heat-transfer liquid into the gas may form a foam including or consisting essentially of the heat-transfer liquid and the gas. At least a portion of the foam may be separated into gas and heat-transfer liquid prior to transferring the heat-transfer liquid to the first thermal well. Compressing the gas in the power unit may include or consist essentially of compressing the gas in a first stage and a second stage each spanning a different pressure range. Heat-transfer liquid may be transferred to the compressed-gas store after or during compression in the first stage. Heat-transfer liquid may be transferred to the second thermal well after or during compression in the second stage. The heat exchange between the gas and the heat-transfer liquid prior to and/or during compression may render the compression substantially isothermal. Introducing the heat-transfer liquid into the gas prior to and/or during compression may include or consist essentially of spraying the thermally conditioned heat-transfer liquid into the gas. Introducing the heat-transfer liquid into the gas prior to and/or during compression may form a foam including or consisting essentially of the heat-transfer liquid and the gas. At least a portion of the foam may be separated into gas and heat-transfer liquid before transferring the heat-transfer liquid at the second temperature to the compressed-gas store and/or a second thermal well discrete from the first thermal well. Waste thermal energy produced by the power unit may be stored in the second thermal well. Thermal energy may be exchanged between the surrounding environment and the first thermal well and/or the second thermal well. Thermal energy may be exchanged with the surrounding environment while the power unit is neither compressing nor expanding.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Note that as used herein, the terms "pipe," "piping" and the like shall refer to one or more conduits that are rated to carry gas or liquid between two points. Thus, the singular term should be taken to include a plurality of parallel conduits where appropriate. Herein, the terms "liquid" and "water" interchangeably connote any mostly or substantially incompressible liquid, the terms "gas" and "air" are used interchangeably, and the term "fluid" may refer to a liquid, a gas, or a mixture of liquid and gas (e.g., a foam) unless otherwise indicated. As used herein unless otherwise indicated, the terms "approximately" and "substantially" mean±10%, and, in some embodiments, ±5%. A "valve" is any mechanism or component for controlling fluid communication between fluid paths or reservoirs, or for selectively permitting control or venting. The term "cylinder" refers to a chamber, of uniform but not necessarily circular cross-section, which may contain a slidably disposed piston or other mechanism that separates the fluid on one side of the chamber from that on the other, preventing fluid movement from one side of the chamber to the other while allowing the transfer of force/pressure from one side of the chamber to the next or to a mechanism outside the chamber. At least one of the two ends of a chamber may be closed by end caps, also herein termed "heads." As utilized herein, an "end cap" is not necessarily a component distinct or separable from the remaining portion of the cylinder, but may refer to an end portion of the cylinder itself. Rods, valves, and other devices may pass through the end caps. A "cylinder assembly" may be a simple cylinder or include multiple cylinders, and may or may not have additional associated components (such as mechanical linkages among the cylinders). The shaft of a cylinder may be coupled hydraulically or mechanically to a mechanical load (e.g., a hydraulic motor/pump or a crankshaft) that is in turn coupled to an electrical load (e.g., rotary or linear electric motor/generator attached to power electronics and/or directly to the grid or other loads), as described in the '678 and '842 patents. As used herein, "thermal conditioning" of a heat-exchange fluid does not include any modification of the temperature of the heat-exchange fluid resulting from interaction with gas with which the heat-exchange fluid is exchanging thermal energy; rather, such thermal conditioning generally refers to the modification of the temperature of the heat-exchange fluid by other means (e.g., an external heat exchanger). The terms "heat-exchange" and "heat-transfer" are generally utilized interchangeably herein. Unless otherwise indicated, motor/pumps described herein are not required to be configured to function both as a motor and a pump if they are utilized during system operation only as a motor or a pump but not both. Gas expansions described herein may be performed in the absence of combustion (as opposed to the operation of an internal-combustion cylinder, for example).

BRIEF DESCRIPTION OF THE DRAWINGS

In the drawings, like reference characters generally refer to the same parts throughout the different views. Cylinders, rods, and other components are depicted in cross section in a manner that will be intelligible to all persons familiar with the art of pneumatic and hydraulic cylinders. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
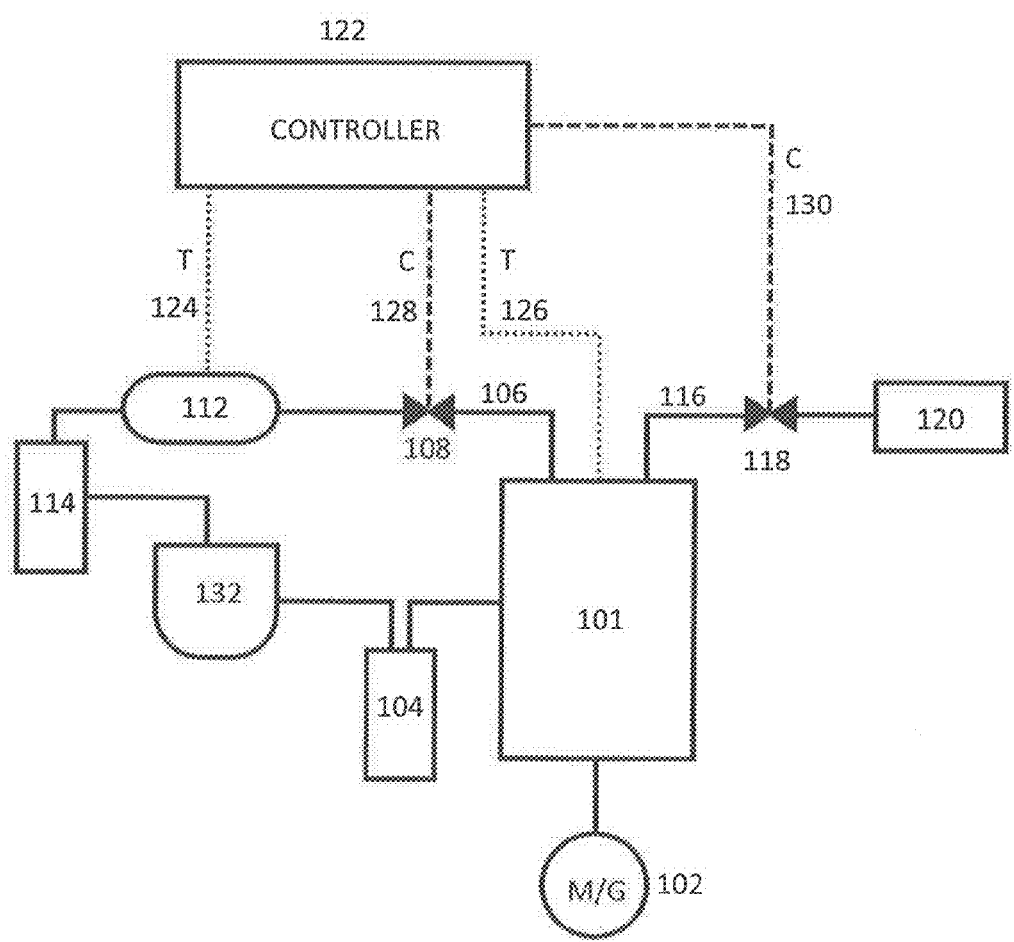
FIG. 1 is a schematic drawing of a compressed-gas energy storage system in accordance with various embodiments of the invention.

FIG. 1 depicts an illustrative system 100 that may be part of a larger system, not otherwise depicted, for the storage and release of energy. Subsequent figures will clarify the application of embodiments of the invention to such a system. The system 100 depicted in FIG. 1 features an assembly 101 for compressing and expanding gas. Expansion/compression assembly 101 may include or consist essentially of either one or more individual devices for expanding or compressing gas (e.g., turbines or cylinder assemblies that each may house a moveable boundary mechanism) or a staged series of such devices, as well as ancillary devices (e.g., valves) not depicted explicitly in FIG. 1.

An electric motor/generator 102 (e.g., a rotary or linear electric machine) is in physical communication (e.g., via hydraulic pump, piston shaft, or mechanical crankshaft) with the expansion/compression assembly 101. The motor/generator 102 may be electrically connected to a source and/or sink of electric energy not explicitly depicted in FIG. 1 (e.g., an electrical distribution grid or a source of renewable energy such as one or more wind turbines or solar cells).

The expansion/compression assembly 101 may be in fluid communication with a heat-transfer subsystem 104 that alters the temperature and/or pressure of a fluid (i.e., gas, liquid, or gas-liquid mixture such as a foam) extracted from expansion/compression assembly 101 and, after alteration of the fluid's temperature and/or pressure, returns at least a portion of it to expansion/compression assembly 101. Heat-transfer subsystem 104 may include pumps, valves, and other devices (not depicted explicitly in FIG. 1) ancillary to its heat-transfer function and to the transfer of fluid to and from expansion/compression assembly 101. Operated appropriately, the heat-transfer subsystem 104 enables substantially isothermal compression and/or expansion of gas inside expansion/compression assembly 101.

Connected to the expansion/compression assembly 101 is a pipe 106 with a control valve 108 that controls a flow of fluid (e.g., gas) between assembly 101 and a storage reservoir 112 (e.g., one or more pressure vessels, pipes, and/or caverns). The storage reservoir 112 may be in fluid communication with a heat-transfer subsystem 114 that alters the temperature and/or pressure of fluid removed from storage reservoir 112 and, after alteration of the fluid's temperature and/or pressure, returns it to storage reservoir 112. A second pipe 116 with a control valve 118 may be in fluid communication with the expansion/compression assembly 101 and with a vent 120 that communicates with a body of gas at relatively low pressure (e.g., the ambient atmosphere).

A control system 122 receives information inputs from any of expansion/compression assembly 101, storage reservoir 112, and other components of system 100 and sources external to system 100. These information inputs may include or consist essentially of pressure, temperature, and/or other telemetered measurements of properties of components of system 101. Such information inputs, here generically denoted by the letter "T," are transmitted to control system 122 either wirelessly or through wires. Such transmission is denoted in FIG. 1 by dotted lines 124, 126.

The control system 122 may selectively control valves 108 and 118 to enable substantially isothermal compression and/or expansion of a gas in assembly 101. Control signals, here generically denoted by the letter "C," are transmitted to valves 108 and 118 either wirelessly or through wires. Such transmission is denoted in FIG. 1 by dashed lines 128, 130. The control system 122 may also control the operation of the heat-transfer assemblies 104, 114 and of other components not explicitly depicted in FIG. 1. The transmission of control and telemetry signals for these purposes is not explicitly depicted in FIG. 1.

The control system 122 may be any acceptable control device with a human-machine interface. For example, the control system 122 may include a computer (for example a PC-type) that executes a stored control application in the form of a computer-readable software medium. More generally, control system 122 may be realized as software, hardware, or some combination thereof. For example, control system 122 may be implemented on one or more computers, such as a PC having a CPU board containing one or more processors such as the Pentium, Core, Atom, or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, or other storage devices.

For embodiments in which the functions of controller 122 are provided by software, the program may be written in any one of a number of high-level languages such as FORTRAN, PASCAL, JAVA, C, C++, C#, LISP, PERL, BASIC or any suitable programming language. Additionally, the software can be implemented in an assembly language and/or machine language directed to the microprocessor resident on a target device.

As described above, the control system 122 may receive telemetry from sensors monitoring various aspects of the operation of system 100, and may provide signals to control valve actuators, valves, motors, and other electromechanical/electronic devices. Control system 122 may communicate with such sensors and/or other components of system 100 (and other embodiments described herein) via wired or wireless communication. An appropriate interface may be used to convert data from sensors into a form readable by the control system 122 (such as RS-232 or network-based interconnects). Likewise, the interface converts the computer's control signals into a form usable by valves and other actuators to perform an operation. The provision of such interfaces, as well as suitable control programming, is clear to those of ordinary skill in the art and may be provided without undue experimentation.

System 100 may be operated so as to compress gas admitted through the vent 120 and store the gas thus compressed in reservoir 112. For example, in an initial state of operation, valve 108 is closed and valve 118 is open, admitting a quantity of gas into expansion/compression assembly 101. When a desired quantity of gas has been admitted into assembly 101, valve 118 may be closed. The motor/generator 102, employing energy supplied by a source not explicitly depicted in FIG. 1 (e.g., the electrical grid), then provides mechanical power to expansion/compression assembly 101, enabling the gas within assembly 101 to be compressed.

During compression of the gas within assembly 101, fluid (i.e., gas, liquid, or a gas-liquid mixture) may be circulated between assembly 101 and heat-exchange assembly 104. Heat-exchange assembly 104 may be operated in such a manner as to enable substantially isothermal compression of the gas within assembly 101. During or after compression of the gas within assembly 101, valve 108 may be opened to enable high-pressure fluid (e.g., compressed gas or a mixture of liquid and compressed gas) to flow to reservoir 112. Heat-exchange assembly 114 may be operated at any time in such a manner as alter the temperature and/or pressure of the fluid within reservoir 112.

That system 100 may also be operated so as to expand compressed gas from reservoir 112 in expansion/compression assembly 101 in such a manner as to deliver energy to the motor/generator 102 will be apparent to all persons familiar with the operation of pneumatic, hydraulic, and electric machines.

Figure 2:
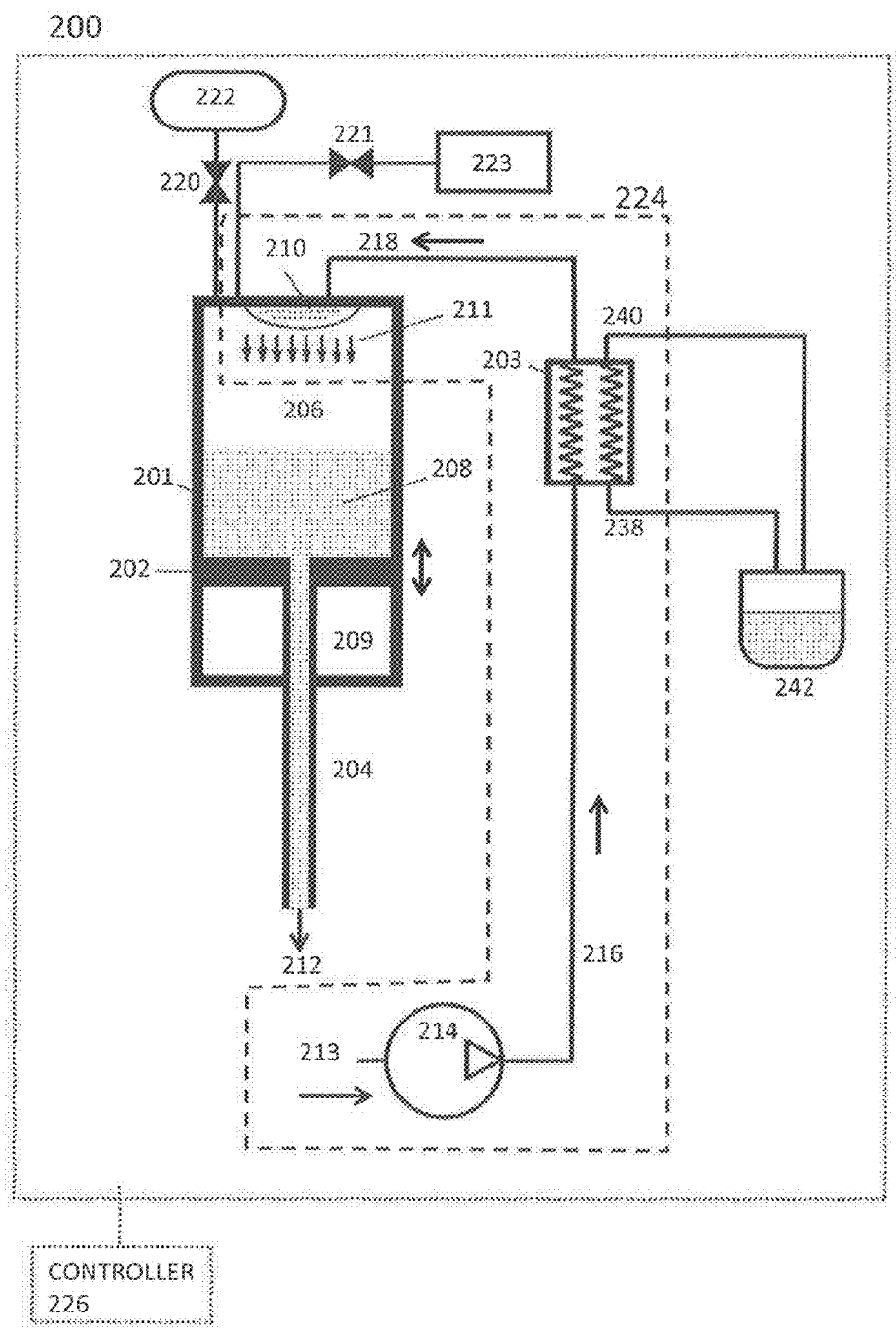
FIG. 2 is a schematic drawing of various components of a compressed-gas energy storage system in accordance with various embodiments of the invention.

FIG. 2 depicts an illustrative system 200 that features a cylinder assembly 201 (i.e., an embodiment of assembly 101 in FIG. 1) in communication with a reservoir 222 (112 in FIG. 1) and a vent to atmosphere 223 (120 in FIG. 1). In the illustrative system 200 shown in FIG. 2, the cylinder assembly 201 contains a piston 202 slidably disposed therein. In some embodiments the piston 202 is replaced by a different boundary mechanism dividing cylinder assembly 201 into multiple chambers, or piston 202 is absent entirely, and cylinder assembly 201 is a "liquid piston." The cylinder assembly 201 may be divided into, e.g., two pneumatic chambers or one pneumatic chamber and one hydraulic chamber. The piston 202 is connected to a rod 204, which may contain a center-drilled fluid passageway with fluid outlet 212 extending from the piston 202. The rod 204 is also attached to, e.g., a mechanical load (e.g., a crankshaft or a hydraulic system) that is not depicted. The cylinder assembly 201 is in liquid communication with a heat-transfer subsystem 224 that includes or consists essentially of a circulation pump 214 and a spray mechanism 210 to enable substantially isothermal compression/expansion of gas. Heat-transfer fluid circulated by pump 214 may be passed through a heat exchanger 203 (e.g., tube-in-shell- or parallel-plate-type heat exchanger). Spray mechanism 210 may include or consist essentially of one or more spray heads (e.g., disposed at one end of cylinder assembly 201) and/or spray rods (e.g., extending along at least a portion of the central axis of cylinder assembly 201). In other embodiments, the spray mechanism 210 is omitted and a foam, rather than a spray of droplets, is created to facilitate heat exchange between liquid and gas during compression and expansion of gas within the cylinder assembly 201. Foam may be generated by foaming gas with heat-exchange liquid in a mechanism (not shown, described in more detail below) external to the cylinder assembly 201 and then injecting the resulting foam into the cylinder assembly 201. Alternatively or additionally, foam may be generated inside the cylinder assembly 201 by the injection of heat-exchange liquid into cylinder assembly 201 through a foam-generating mechanism (e.g., spray head, rotating blade, one or more nozzles), partly or entirely filling the pneumatic chamber of cylinder assembly 201. In some embodiments, droplets and foams may be introduced into cylinder assembly 201 simultaneously and/or sequentially. Various embodiments may feature mechanisms (not shown in FIG. 2) for controlling the characteristics of foam (e.g., bubble size) and for breaking down, separating, and/or regenerating foam.

System 200 further includes a first control valve 220 (108 in FIG. 1) in communication with a storage reservoir 222 and cylinder assembly 201, and a second control valve 221 (118 in FIG. 1) in communication with a vent 223 and cylinder assembly 201. A control system 226 (122 in FIG. 1) may control operation of, e.g., valves 222 and 221 based on various system inputs (e.g., pressure, temperature, piston position, and/or fluid state) from cylinder assembly 201 and/or storage reservoir 222. Heat-transfer fluid (liquid or circulated by pump 214 enters through pipe 213. Pipe 213 may be (a) connected to a low-pressure fluid source (e.g., fluid reservoir (not shown) at the pressure to which vent 223 is connected or thermal well 242); (b) connected to a high-pressure source (e.g., fluid reservoir (not shown) at the pressure of reservoir 222); (c) selectively connected (using valve arrangement not shown) to low pressure during a compression process and to high pressure during an expansion process; (d) connected to changing-pressure fluid 208 in the cylinder 201 via connection 212; or (e) some combination of these options.

In an initial state, the cylinder assembly 201 may contain a gas 206 (e.g., air introduced to the cylinder assembly 201 via valve 221 and vent 223) and a heat-transfer fluid 208 (which may include or consist essentially of, e.g., water or another suitable liquid). When the gas 206 enters the cylinder assembly 201, piston 202 is operated to compress the gas 206 to an elevated pressure (e.g., approximately 3,000 psi). Heat-transfer fluid (not necessarily the identical body of heat-transfer fluid 208) flows from pipe 213 to the pump 214. The pump 214 may raise the pressure of the heat-exchange fluid to a pressure (e.g., up to approximately 3,015 psig) somewhat higher than the pressure within the cylinder assembly 201, as described in the '409 application. Alternatively or in conjunction, embodiments of the invention add heat (i.e., thermal energy) to, or remove heat from, the high-pressure gas in the cylinder assembly 201 by passing only relatively low-pressure fluids through a heat exchanger or fluid reservoir, as detailed in U.S. patent application Ser. No. 13/211,440, filed Aug. 17, 2011 (the '440 application), the entire disclosure of which is incorporated by reference herein.

Heat-transfer fluid is then sent through a pipe 216, where it may be passed through a heat exchanger 203 (where its temperature is altered) and then through a pipe 218 to the spray mechanism 210. The heat-transfer fluid thus circulated may include or consist essentially of liquid or foam. Spray mechanism 210 may be disposed within the cylinder assembly 201, as shown; located in the storage vessel 222 or vent 223; or located in piping or manifolding around the cylinder assembly, such as pipe 218 or the pipes connecting the cylinder assembly to storage vessel 222 or vent 223. The spray mechanism 210 may be operated in the vent 223 or connecting pipes during compression, and a separate spray mechanism may be operated in the storage vessel 222 or connecting pipes during expansion. Heat-transfer spray 211 from spray mechanism 210 (and/or any additional spray mechanisms), and/or foam from mechanisms internal or external to the cylinder assembly 101, enable substantially isothermal compression of gas 206 within cylinder assembly 201.

In some embodiments, the heat exchanger 203 is configured to condition heat-transfer fluid at low pressure (e.g., a pressure lower than the maximum pressure of a compression or expansion stroke in cylinder assembly 201), and heat-transfer fluid is thermally conditioned between strokes or only during portions of strokes, as detailed in the '440 application. Embodiments of the invention are configured for circulation of heat-transfer fluid without the use of hoses that flex during operation through the use of, e.g., tubes or straws configured for non-flexure and/or pumps (e.g., submersible bore pumps, axial flow pumps, or other in-line style pumps) internal to the cylinder assembly (e.g., at least partially disposed within the piston rod thereof), as described in U.S. patent application Ser. No. 13/234,239, filed Sep. 16, 2011 (the '239 application), the entire disclosure of which is incorporated by reference herein.

At or near the end of the compression stroke, control system 226 opens valve 220 to admit the compressed gas 206 to the storage reservoir 222. Operation of valves 220 and 221 may be controlled by various inputs to control system 226, such as piston position in cylinder assembly 201, pressure in storage vessel 222, pressure in cylinder assembly 201, and/or temperature in cylinder assembly 201.

As mentioned above, the control system 226 may enforce substantially isothermal operation, i.e., expansion and/or compression of gas in cylinder assembly 201, via control over, e.g., the introduction of gas into and the exhausting of gas out of cylinder assembly 201, the rates of compression and/or expansion, and/or the operation of the heat-exchange subsystem in response to sensed conditions. For example, control system 226 may be responsive to one or more sensors disposed in or on cylinder assembly 201 for measuring the temperature of the gas and/or the heat-exchange fluid within cylinder assembly 201, responding to deviations in temperature by issuing control signals that operate one or more of the system components noted above to compensate, in real time, for the sensed temperature deviations. For example, in response to a temperature increase within cylinder assembly 201, control system 226 may issue commands to increase the flow rate of spray 211 of heat-exchange fluid 208.

Figure 4:
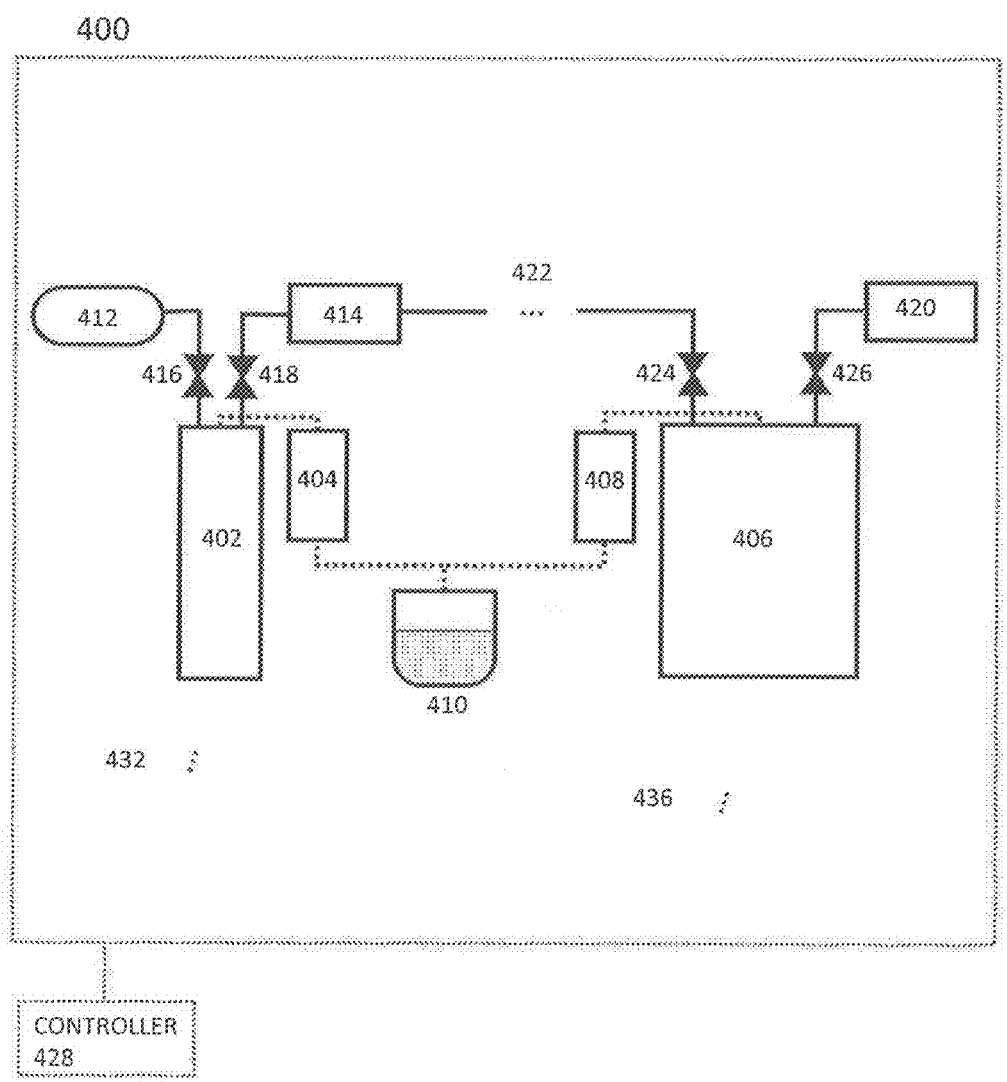
FIG. 4 is a schematic drawing of various components of a multi-cylinder compressed-gas energy storage system in accordance with various embodiments of the invention.

Furthermore, embodiments of the invention may be applied to systems in which cylinder assembly 201 (or a chamber thereof) is in fluid communication with a pneumatic chamber of a second cylinder (e.g., as shown in FIG. 4). That second cylinder, in turn, may communicate similarly with a third cylinder, and so forth. Any number of cylinders may be linked in this way. These cylinders may be connected in parallel or in a series configuration, where the compression and expansion is done in multiple stages.

The fluid circuit of heat exchanger 203 may be filled with water, a coolant mixture, an aqueous foam, or any other acceptable heat-exchange medium. In alternative embodiments, a gas, such as air or refrigerant, is used as the heat-exchange medium. In general, the fluid is routed by conduits to a large reservoir of such fluid in a closed or open loop. One example of an open loop is a well or body of water from which ambient water is drawn and the exhaust water is delivered to a different location, for example, downstream in a river. In a closed-loop embodiment, a cooling tower may cycle the water through the air for return to the heat exchanger. Likewise, water may pass through a submerged or buried coil of continuous piping where a counter heat-exchange occurs to return the fluid flow to ambient temperature before it returns to the heat exchanger for another cycle.

In various embodiments, the heat-exchange fluid is conditioned (i.e., pre-heated and/or pre-chilled) or used for heating or cooling needs by connecting the fluid inlet 238 and fluid outlet 240 of the external heat-exchange side of the heat exchanger 203 to an installation such as a heat-engine power plant, an industrial process with waste heat, a heat pump, and/or a building needing space heating or cooling, as described in the '731 patent. Alternatively, the external heat-exchange side of the heat exchanger 203 may be connected to a thermal well 242 as depicted in FIG. 2. The thermal well 242 may include or consist essentially of a large water reservoir that acts as a constant-temperature thermal fluid source for use with the system. Alternatively, the water reservoir may be thermally linked to waste heat from an industrial process or the like, as described above, via another heat exchanger contained within the installation. This allows the heat-exchange fluid to acquire or expel heat from/to the linked process, depending on configuration, for later use as a heating/cooling medium in the energy storage/conversion system. Alternatively, the thermal well 242 may include two or more bodies of energy-storage medium, e.g., a hot-water thermal well and a cold-water thermal well, that are typically maintained in contrasting energy states in order to increase the exergy of system 200 compared with a system in which thermal well 242 includes a single body of energy-storage medium. Storage media other than water may be utilized in the thermal well 242; temperature changes, phase changes, or both may be employed by storage media of thermal well 242 to store and release energy. Thermal or fluid links (not shown) to the atmosphere, ground, and/or other components of the environment may also be included in system 200, allowing mass, thermal energy, or both to be added to or removed from the thermal well 242. Moreover, as depicted in FIG. 2, the heat-transfer subsystem 224 does not interchange fluid directly with the thermal well 242, but in other embodiments, fluid is passed directly between the heat-transfer subsystem 224 and the thermal well 242 with no heat exchanger maintaining separation between fluids.

Figure 3:
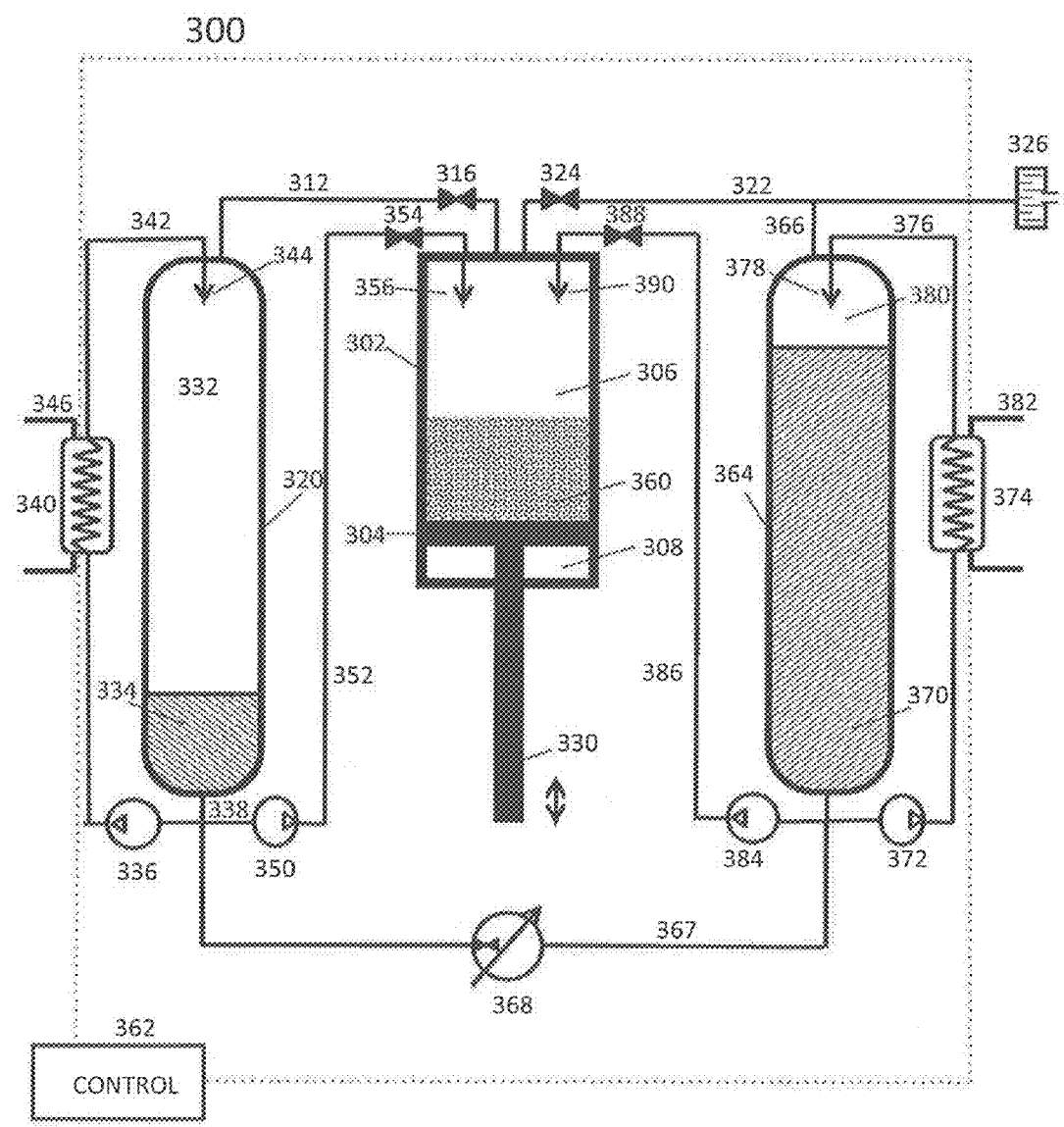
FIG. 3 is a schematic drawing of the major components of a compressed air energy storage and recovery system in accordance with various embodiments of the invention.

FIG. 3 is a schematic of the major components of an illustrative system 300 that employs a pneumatic cylinder 302 to efficiently convert (i.e., store) mechanical energy into the potential energy of compressed gas and, in another mode of operation, efficiently convert (i.e., recover) the potential energy of compressed gas into mechanical work. The pneumatic cylinder 302 may contain a slidably disposed piston 304 that divides the interior of the cylinder 302 into a distal chamber 306 and a proximal chamber 308. A port or ports (not shown) with associated pipes 312 and a bidirectional valve 316 enables gas from a high-pressure storage reservoir 320 to be admitted to chamber 306 as desired. A port or ports (not shown) with associated pipes 322 and a bidirectional valve 324 enables gas from the chamber 306 to be exhausted through a vent 326 to the ambient atmosphere as desired. In alternate embodiments, vent 326 is replaced by additional lower-pressure pneumatic cylinders (or pneumatic chambers of cylinders). A port or ports (not shown) enables the interior of the chamber 308 to communicate freely at all times with the ambient atmosphere. In alternate embodiments, cylinder 302 is double-acting and chamber 308 is, like chamber 306, equipped to admit and exhaust fluids in various states of operation. The distal end of a rod 330 is coupled to the piston 304. The rod 330 may be connected to a crankshaft, hydraulic cylinder, or other mechanisms for converting linear mechanical motion to useful work as described in the '678 and '842 patents.

In the energy recovery or expansion mode of operation, storage reservoir 320 is filled with high-pressure air (or other gas) 332 and a quantity of heat-transfer fluid 334. The heat-transfer fluid 334 may be an aqueous foam or a liquid that tends to foam when sprayed or otherwise acted upon. The liquid component of the aqueous foam, or the liquid that tends to foam, may include or consist essentially of water with 2% to 5% of certain additives; these additives may also provide functions of anti-corrosion, anti-wear (lubricity), anti-bio-growth (biocide), freezing-point modification (anti-freeze), and/or surface-tension modification. Additives may include a micro-emulsion of a lubricating fluid such as mineral oil, a solution of agents such as glycols (e.g. propylene glycol), or soluble synthetics (e.g. ethanolamines). Such additives tend to reduce liquid surface tension and lead to substantial foaming when sprayed. Commercially available fluids may be used at an approximately 5% solution in water, such as Mecagreen 127 (available from the Condat Corporation of Michigan), which consists in part of a micro-emulsion of mineral oil, and Quintolubric 807-WP (available from the Quaker Chemical Corporation of Pennsylvania), which consists in part of a soluble ethanolamine. Other additives may be used at higher concentrations (such as at a 50% solution in water), including Cryo-tek 100/Al (available from the Hercules Chemical Company of New Jersey), which consists in part of a propylene glycol. These fluids may be further modified to enhance foaming while being sprayed and to speed defoaming when in a reservoir.

The heat-transfer fluid 334 may be circulated within the storage reservoir 320 via high-inlet-pressure, low-power-consumption pump 336 (such as described in the '731 patent). In various embodiments, the fluid 334 may be removed from the bottom of the storage reservoir 320 via piping 338, circulated via pump 336 through a heat exchanger 340, and introduced (e.g., sprayed) back into the top of storage reservoir 320 via piping 342 and spray head 344 (or other suitable mechanism). Any changes in pressure within reservoir 320 due to removal or addition of gas (e.g., via pipe 312) generally tend to result in changes in temperature of the gas 332 within reservoir 320. By spraying and/or foaming the fluid 334 throughout the storage reservoir gas 332, heat may be added to or removed from the gas 332 via heat exchange with the heat-transfer fluid 334. By circulating the heat-transfer fluid 334 through heat exchanger 340, the temperature of the fluid 334 and gas 332 may be kept substantially constant (i.e., isothermal). Counterflow heat-exchange fluid 346 at near-ambient pressure may be circulated from a near-ambient-temperature thermal well (not shown) or source (e.g., waste heat source) or sink (e.g., cold water source) of thermal energy, as described in more detail below.

In various embodiments of the invention, reservoir 320 contains an aqueous foam, either unseparated or partially separated into its gaseous and liquid components. In such embodiments, pump 336 may circulate either the foam itself, or the separated liquid component of the foam, or both, and recirculation of fluid into reservoir 320 may include regeneration of foam by apparatus not shown in FIG. 3.

In the energy recovery or expansion mode of operation, a quantity of gas may be introduced via valve 316 and pipe 312 into the upper chamber 306 of cylinder 302 when piston 304 is near or at the top of its stroke (i.e., "top dead center" of cylinder 302). The piston 304 and its rod 330 will then be moving downward (the cylinder 302 may be oriented arbitrarily but is shown vertically oriented in this illustrative embodiment). Heat-exchange fluid 334 may be introduced into chamber 306 concurrently via optional pump 350 (alternatively, a pressure drop may be introduced in line 312 such that pump 350 is not needed) through pipe 352 and directional valve 354. This heat-exchange fluid 334 may be sprayed into chamber 306 via one or more spray nozzles 356 in such a manner as to generate foam 360. (In some embodiments, foam 360 is introduced directly into chamber 306 in foam form.) The foam 360 may entirely fill the entire chamber 306, but is shown in FIG. 3, for illustrative purposes only, as only partially filling chamber 306. Herein, the term "foam" denotes either (a) foam only or (b) any of a variety of mixtures of foam and heat-exchange liquid in other, non-foaming states (e.g., droplets). Moreover, some non-foamed liquid (not shown) may accumulate at the bottom of chamber 306; any such liquid is generally included in references herein to the foam 360 within chamber 306.

System 300 is instrumented with pressure, piston position, and/or temperature sensors (not shown) and controlled via control system 362. At a predetermined position of piston 304, an amount of gas 332 and heat-transfer fluid 334 have been admitted into chamber 306 and valve 316 and valve 354 are closed. (Valves 316 and 354 may close at the same time or at different times, as each has a control value based on quantity of fluid desired.) The gas in chamber 306 then undergoes free expansion, continuing to drive piston 304 downward. During this expansion, in the absence of foam 360, the gas would tend to decrease substantially in temperature. With foam 360 largely or entirely filling the chamber, the temperature of the gas in chamber 306 and the temperature of the heat-transfer fluid 360 tend to approximate to each other via heat exchange. The heat capacity of the liquid component of the foam 360 (e.g., water with one or more additives) may be much higher than that of the gas (e.g., air) such that the temperature of the gas and liquid do not change substantially (i.e., are substantially isothermal) even over a many-times gas expansion (e.g., from 250 psig to near atmospheric pressure, or in other embodiments from 3,000 psig to 250 psig).

When the piston 304 reaches the end of its stroke (bottom dead center), the gas within chamber 306 will have expanded to a predetermined lower pressure (e.g., near atmospheric). Valve 324 will then be opened, allowing gas from chamber 306 to be vented, whether to atmosphere through pipe 322 and vent 326 (as illustrated here) or, in other embodiments, to a next stage in the expansion process (e.g., chamber in a separate cylinder), via pipe 322. Valve 324 remains open as the piston undergoes an upward (i.e., return) stroke, emptying chamber 306. Part or substantially all of foam 360 is also forced out of chamber 306 via pipe 322. A separator (not shown) or other means such as gravity separation is used to recover heat-transfer fluid, preferably de-foamed (i.e., as a simple liquid with or without additives), and to direct it into a storage reservoir 364 via pipe 366.

When piston 304 reaches top of stroke again, the process repeats with gas 332 and heat-transfer fluid 334 admitted from vessel 320 via valves 316 and 354. If additional heat-transfer fluid is needed in reservoir 320, it may be pumped back into reservoir 320 from reservoir 364 via piping 367 and optional pump/motor 368. In one mode of operation, pump 368 may be used to continuously refill reservoir 320 such that the pressure in reservoir 320 is held substantially constant. That is, as gas is removed from reservoir 320, heat-transfer fluid 334 is added to maintain constant pressure in reservoir 320. In other embodiments, pump 368 is not used or is used intermittently, the pressure in reservoir 320 continues to decrease during an energy-recovery process (i.e., involving removal of gas from reservoir 320), and the control system 362 changes the timing of valves 316 and 354 accordingly so as to reach approximately the same ending pressure when the piston 304 reaches the end of its stroke. An energy-recovery process may continue until the storage reservoir 320 is nearly empty of pressurized gas 332, at which time an energy-storage process may be used to recharge the storage reservoir 320 with pressurized gas 332. In other embodiments, the energy-recovery and energy-storage processes are alternated based on operator requirements.

In either the energy-storage or energy-compression mode of operation, storage reservoir 320 is typically at least partially depleted of high-pressure gas 332, as storage reservoir 320 also typically contains a quantity of heat-transfer fluid 334. Reservoir 364 is at low pressure (e.g., atmospheric or some other low pressure that serves as the intake pressure for the compression phase of cylinder 302) and contains a quantity of heat-transfer fluid 370.

The heat-transfer fluid 370 may be circulated within the reservoir 364 via low-power-consumption pump 372. In various embodiments, the fluid 370 may be removed from the bottom of the reservoir 364 via piping 367, circulated via pump 372 through a heat exchanger 374, and introduced (e.g., sprayed) back into the top of reservoir 364 via piping 376 and spray head 378 (or other suitable mechanism). By spraying the fluid 370 throughout the reservoir gas 380, heat may be added or removed from the gas via the heat-transfer fluid 370. By circulating the heat-transfer fluid 370 through heat exchanger 374, the temperature of the fluid 370 and gas 380 may be kept near constant (i.e., isothermal). Counterflow heat-exchange fluid 382 at near-ambient pressure may be circulated from a near-ambient-temperature thermal well (not shown) or source (e.g., waste heat source) or sink (e.g., cold water source) of thermal energy. In one embodiment, counterflow heat-exchange fluid 382 is at high temperature to increase energy recovery during expansion and/or counterflow heat-exchange fluid 382 is at low temperature to decrease energy usage during compression.

In the energy-storage or compression mode of operation, a quantity of low-pressure gas is introduced via valve 324 and pipe 322 into the upper chamber 306 of cylinder 302 starting when piston 304 is near top dead center of cylinder 302. The low-pressure gas may be from the ambient atmosphere (e.g., may be admitted through vent 326 as illustrated herein) or may be from a source of pressurized gas such as a previous compression stage. During the intake stroke, the piston 304 and its rod 330 will move downward, drawing in gas. Heat-exchange fluid 370 may be introduced into chamber 306 concurrently via optional pump 384 (alternatively, a pressure drop may be introduced in line 386 such that pump 384 is not needed) through pipe 386 and directional valve 388. This heat exchange fluid 370 may be introduced (e.g., sprayed) into chamber 306 via one or more spray nozzles 390 in such a manner as to generate foam 360. This foam 360 may fill the chamber 306 partially or entirely by the end of the intake stroke; for illustrative purposes only, foam 360 is shown in FIG. 3 as only partially filling chamber 306. At the end of the intake stroke, piston 304 reaches the end-of-stroke position (bottom dead center) and chamber 306 is filled with foam 360 generated from air at a low pressure (e.g., atmospheric) and heat-exchange liquid.

At the end of the stroke, with piston 304 at the end-of-stroke position, valve 324 is closed. Valve 388 is also closed, not necessarily at the same time as valve 324, but after a predetermined amount of heat-transfer fluid 370 has been admitted, creating foam 360. The amount of heat-transfer fluid 370 may be based upon the volume of air to be compressed, the ratio of compression, and/or the heat capacity of the heat-transfer fluid. Next, piston 304 and rod 330 are driven upwards via mechanical means (e.g., hydraulic fluid, hydraulic cylinder, mechanical crankshaft) to compress the gas within chamber 306.

During this compression, in the absence of foam 360, the gas in chamber 306 would tend to increase substantially in temperature. With foam 360 at least partially filling the chamber, the temperature of the gas in chamber 306 and the temperature of the liquid component of foam 360 will tend to equilibrate via heat exchange. The heat capacity of the fluid component of foam 360 (e.g., water with one or more additives) may be much higher than that of the gas (e.g., air) such that the temperature of the gas and fluid do not change substantially and are near-isothermal even over a many-times gas compression (e.g., from near atmospheric pressure to 250 psig, or in other embodiments from 250 psig to 3,000 psig).

The gas in chamber 306 (which includes, or consists essentially of, the gaseous component of foam 360) is compressed to a suitable pressure, e.g., a pressure approximately equal to the pressure within storage reservoir 320, at which time valve 316 is opened. The foam 360, including both its gaseous and liquid components, is then transferred into storage reservoir 320 through valve 316 and pipe 312 by continued upward movement of piston 304 and rod 330.

When piston 304 reaches top of stroke again, the process repeats, with low-pressure gas and heat-transfer fluid 370 admitted from vent 326 and reservoir 364 via valves 324 and 388. If additional heat-transfer fluid is needed in reservoir 364, it may be returned to reservoir 364 from reservoir 320 via piping 367 and optional pump/motor 368. Power recovered from motor 368 may be used to help drive the mechanical mechanism for driving piston 304 and rod 330 or may be converted to electrical power via an electric motor/generator (not shown). In one mode of operation, motor 368 may be run continuously, while reservoir 320 is being filled with gas, in such a manner that the pressure in reservoir 320 is held substantially constant. That is, as gas is added to reservoir 320, heat-transfer fluid 334 is removed from reservoir 320 to maintain substantially constant pressure within reservoir 320. In other embodiments, motor 368 is not used or is used intermittently; the pressure in reservoir 320 continues to increase during an energy-storage process and the control system 362 changes the timing of valves 316 and 388 accordingly so that the desired ending pressure (e.g., atmospheric) is attained within chamber 306 when the piston 304 reaches bottom of stroke. An energy-storage process may continue until the storage reservoir 320 is full of pressurized gas 332 at the maximum storage pressure (e.g., 3,000 psig), after which time the system is ready to perform an energy-recovery process. In various embodiments, the system may commence an energy-recovery process when the storage reservoir 320 is only partly full of pressurized gas 332, whether at the maximum storage pressure or at some storage pressure intermediate between atmospheric pressure and the maximum storage pressure. In other embodiments, the energy-recovery and energy-storage processes are alternated based on operator requirements.

FIG. 4 depicts an illustrative system 400 that features at least two cylinder assemblies 402, 406 (i.e., an embodiment of assembly 101 in FIG. 1; e.g., cylinder assembly 201 in FIG. 2) and a heat-transfer subsystem 404, 408 (e.g., subsystem 224 in FIG. 2) associated with each cylinder assembly 402, 406. Additionally, the system includes a thermal well 410 (e.g., thermal well 242 in FIG. 2) which may be associated with either or both of the heat-transfer subsystems 404, 408 as indicated by the dashed lines.

Assembly 402 is in selective fluid communication with a storage reservoir 412 (e.g., 112 in FIG. 1, 222 in FIG. 2) capable of holding fluid at relatively high pressure (e.g., approximately 3,000 psig). Assembly 406 is in selective fluid communication with assembly 402 and/or with optional additional cylinder assemblies between assemblies 402 and 406 as indicated by ellipsis marks 422. Assembly 406 is in selective fluid communication with an atmospheric vent 420 (e.g., 120 in FIG. 1, 223 in FIG. 2).

System 400 may compress air at atmospheric pressure (admitted to system 400 through the vent 420) stagewise through assemblies 406 and 402 to high pressure for storage in reservoir 412. System 400 may also expand air from high pressure in reservoir 412 stagewise through assemblies 402 and 406 to a low pressure (e.g., approximately 5 psig) for venting to the atmosphere through vent 420.

As described in U.S. patent application Ser. No. 13/080,914, filed Apr. 6, 2011 (the '914 application), the entire disclosure of which is incorporated by reference herein, in a group of N cylinder assemblies used for expansion or compression of gas between a high pressure (e.g., approximately 3,000 psig) and a low pressure (e.g., approximately 5 psig), the system will contain gas at N−1 pressures intermediate between the high-pressure extreme and the low pressure. Herein each such intermediate pressure is termed a "mid-pressure." In illustrative system 400, N=2 and N−1=1, so there is one mid-pressure (e.g., approximately 250 psig during expansion) in the system 400. In various states of operation of the system, mid-pressures may occur in any of the chambers of a series-connected cylinder group (e.g., the cylinders of assemblies 402 and 406) and within any valves, piping, and other devices in fluid communication with those chambers. In illustrative system 400, the mid-pressure, herein denoted "mid-pressure P1," occurs primarily in valves, piping, and other devices intermediate between assemblies 402 and 406.

Assembly 402 is a high-pressure assembly: i.e., assembly 402 may admit gas at high pressure from reservoir 412 to expand the gas to mid-pressure P1 for transfer to assembly 402, and/or may admit gas at mid-pressure P1 from assembly 406 to compress the gas to high pressure for transfer to reservoir 412. Assembly 406 is a low-pressure assembly: i.e., assembly 406 may admit gas at mid-pressure P1 from assembly 402 to expand the gas to low pressure for transfer to the vent 420, and/or may admit gas at low pressure from vent 420 to compress the gas to mid-pressure P1 for transfer to assembly 402.

In system 400, extended cylinder assembly 402 communicates with extended cylinder assembly 406 via a mid-pressure assembly 414. Herein, a "mid-pressure assembly" includes or consists essentially of a reservoir of gas that is placed in fluid communication with the valves, piping, chambers, and other components through or into which gas passes. The gas in the reservoir is at approximately at the mid-pressure which the particular mid-pressure assembly is intended to provide. The reservoir is large enough so that a volume of mid-pressure gas approximately equal to that within the valves, piping, chambers, and other components with which the reservoir is in fluid communication may enter or leave the reservoir without substantially changing its pressure. Additionally, the mid-pressure assembly may provide pulsation damping, additional heat-transfer capability, fluid separation, and/or house one or more heat-transfer sub-systems such as part or all of sub-systems 404 and/or 408. As described in the '914 application, a mid-pressure assembly may substantially reduce the amount of dead space in various components of a system employing pneumatic cylinder assemblies, e.g., system 400 in FIG. 4. Reduction of dead space tends to increase overall system efficiency.

Alternatively or in conjunction, pipes and valves (not shown in FIG. 4) bypassing mid-pressure assembly 414 may enable fluid to pass directly between assembly 402 and assembly 406. Valves 416, 418, 424, and 426 control the passage of fluids between the assemblies 402, 406, 412, and 414.

A control system 428 (e.g., 122 in FIG. 1, 226 in FIG. 2, 362 in FIG. 3) may control operation of, e.g., all valves of system 400 based on various system inputs (e.g., pressure, temperature, piston position, and/or fluid state) from assemblies 402 and 406, mid-pressure assembly 414, storage reservoir 412, thermal well 410, heat transfer sub-systems 404, 408, and/or the environment surrounding system 420.

It will be clear to persons reasonably familiar with the art of pneumatic machines that a system similar to system 400 but differing by the incorporation of one, two or more mid-pressure extended cylinder assemblies may be devised without additional undue experimentation. It will also be clear that all remarks herein pertaining to system 400 may be applied to such an N-cylinder system without substantial revision, as indicated by elliptical marks 422. Such N-cylinder systems, though not discussed further herein, are contemplated and within the scope of the invention. As shown and described in the '678 patent, N appropriately sized cylinders, where N≥2, may reduce an original (single-cylinder) operating fluid pressure range R to $R^{1/N}$ and correspondingly reduce the range of force acting on each cylinder in the N-cylinder system as compared to the range of force acting in a single-cylinder system. This and other advantages, as set forth in the '678 patent, may be realized in N-cylinder systems. Additionally, multiple identical cylinders may be added in parallel and attached to a common or separate drive mechanism (not shown) with the cylinder assemblies 402, 406 as indicated by ellipsis marks 432, 436, enabling higher power and air-flow rates.

Figure 5:
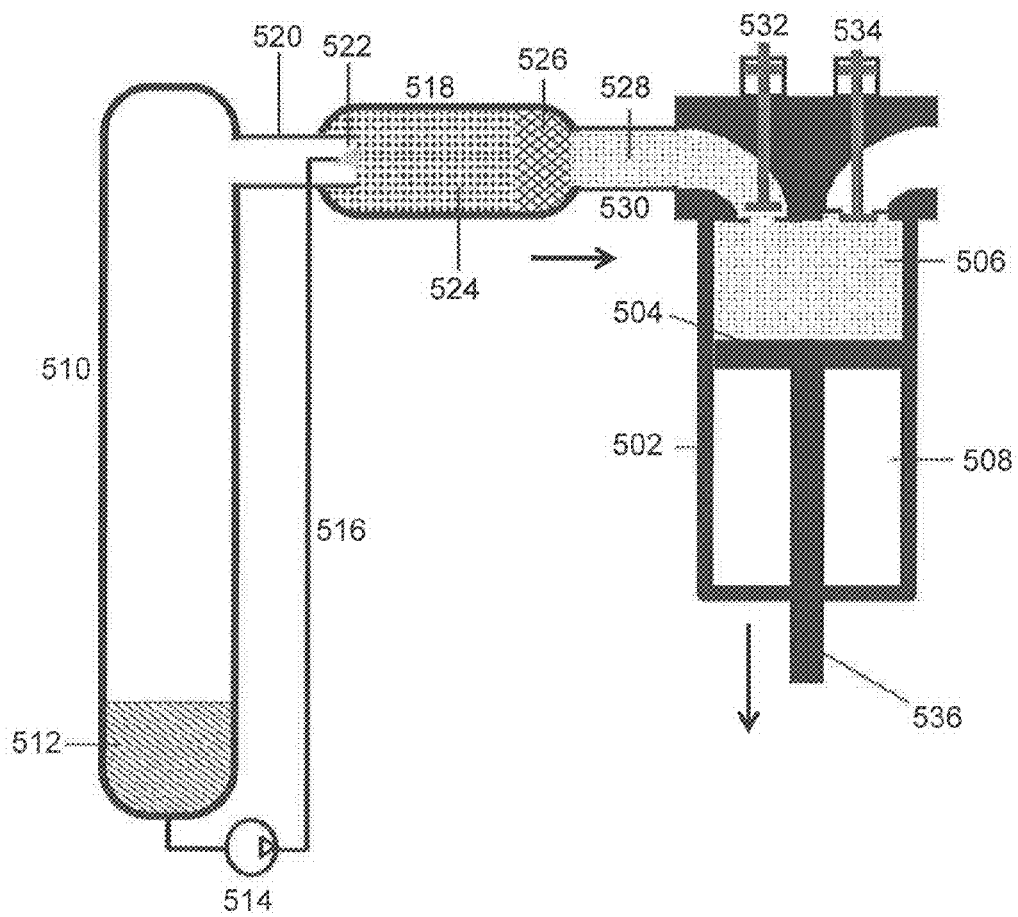
FIG. 5 is a schematic drawing of a cylinder assembly with apparatus for the generation of foam external to the cylinder in accordance with various embodiments of the invention.

FIG. 5 is a schematic diagram showing components of a system 500 for achieving approximately isothermal compression and expansion of a gas for energy storage and recovery using a pneumatic cylinder 502 (shown in partial cross-section) according to embodiments of the invention. The cylinder 502 typically contains a slideably disposed piston 504 that divides the cylinder 502 into two chambers 506, 508. A reservoir 510 contains gas at high pressure (e.g., 3,000 psi); the reservoir 510 may also contain a quantity of heat-exchange liquid 512. The heat-exchange liquid 512 may contain an additive that increases the liquid's tendency to foam (e.g., by lowering the surface tension of the liquid 512). Additives may include surfactants (e.g., sulfonates), a micro-emulsion of a lubricating fluid such as mineral oil, a solution of agents such as glycols (e.g., propylene glycol), or soluble synthetics (e.g., ethanolamines). Foaming agents such as sulfonates (e.g., linear alkyl benzene sulfonate such as Bio-Soft D-40 available from Stepan Company of Illinois) may be added, or commercially available foaming concentrates such as firefighting foam concentrates (e.g., fluorosurfactant products such as those available from ChemGuard of Texas) may be used. Such additives tend to reduce liquid surface tension of water and lead to substantial foaming when sprayed. Commercially available fluids may be used at an approximately 5% solution in water, such as Mecagreen 127 (available from the Condat Corporation of Michigan), which consists in part of a micro-emulsion of mineral oil, and Quintolubric 807-WP (available from the Quaker Chemical Corporation of Pennsylvania), which consists in part of a soluble ethanolamine. Other additives may be used at higher concentrations (such as at a 50% solution in water), including Cryo-tek 100/Al (available from the Hercules Chemical Company of New Jersey), which consists in part of a propylene glycol. These fluids may be further modified to enhance foaming while being sprayed and to speed defoaming when in a reservoir.

A pump 514 and piping 516 may convey the heat-exchange liquid to a device herein termed a "mixing chamber" (518). Gas from the reservoir 510 may also be conveyed (via piping 520) to the mixing chamber 518. Within the mixing chamber 518, a foam-generating mechanism 522 combines the gas from the reservoir 510 and the liquid conveyed by piping 516 to create foam 524 of a certain grade (i.e., bubble size variance, average bubble size, void fraction), herein termed Foam A, inside the mixing chamber 518.

The mixing chamber 518 may contain a screen 526 or other mechanism (e.g., source of ultrasound) to vary or homogenize foam structure. Screen 526 may be located, e.g., at or near the exit of mixing chamber 518. Foam that has passed through the screen 526 may have a different bubble size and other characteristics from Foam A and is herein termed Foam B (528). In other embodiments, the screen 526 is omitted, so that Foam A is transferred without deliberate alteration to chamber 506.

The exit of the mixing chamber 518 is connected by piping 530 to a port in the cylinder 502 that is gated by a valve 532 (e.g., a poppet-style valve) that permits fluid from piping 530 to enter the upper chamber (air chamber) 506 of the cylinder 502. Valves (not shown) may control the flow of gas from the reservoir 510 through piping 520 to the mixing chamber 518, and from the mixing chamber 518 through piping 528 to the upper chamber 506 of the cylinder 502. Another valve 534 (e.g., a poppet-style valve) permits the upper chamber 506 to communicate with other components of the system 500, e.g., an additional separator device (not shown), the upper chamber of another cylinder (not shown), or a vent to the ambient atmosphere (not shown).

The volume of reservoir 510 may be large (e.g., at least approximately four times larger) relative to the volume of the mixing chamber 518 and cylinder 502. Foam A and Foam B are preferably statically stable foams over a portion or all of the time-scale of typical cyclic operation of system 500: e.g., for a 120 RPM system (i.e., 0.5 seconds per revolution), the foam may remain substantially unchanged (e.g., less than 10% drainage) after 5.5 seconds or a time approximately five times greater than the revolution time.

In an initial state of operation of a procedure whereby gas stored in the reservoir 510 is expanded to release energy, the valve 532 is open, the valve 534 is closed, and the piston 504 is near top dead center of cylinder 502 (i.e., toward the top of the cylinder 502). Gas from the reservoir 510 is allowed to flow through piping 520 to the mixing chamber 518 while liquid from the reservoir 510 is pumped by pump 514 to the mixing chamber 518. The gas and liquid thus conveyed to the mixing chamber 518 are combined by the foam-generating mechanism 522 to form Foam A (524), which partly or substantially fills the main chamber of the mixing chamber 518. Exiting the mixing chamber 518, Foam A passes through the screen 526, being altered thereby to Foam B. Foam B, which is at approximately the same pressure as the gas stored in reservoir 510, passes through valve 532 into chamber 506. In chamber 506, Foam B exerts a force on the piston 504 that may be communicated to a mechanism (e.g., an electric generator, not shown) external to the cylinder 502 by a rod 536 that is connected to piston 504 and that passes slideably through the lower end cap of the cylinder 502.

The gas component of the foam in chamber 506 expands as the piston 504 and rod 536 move downward. At some point in the downward motion of piston 504, the flow of gas from reservoir 510 into the mixing chamber 518 and thence (as the gas component of Foam B) into chamber 506 may be ended by appropriate operation of valves (not shown). As the gas component of the foam in chamber 506 expands, it will tend, unless heat is transferred to it, to decrease in temperature according to the Ideal Gas Law; however, if the liquid component of the foam in chamber 506 is at a higher temperature than the gas component of the foam in chamber 506, heat will tend to be transferred from the liquid component to the gas component. Therefore, the temperature of the gas component of the foam within chamber 506 will tend to remain constant (approximately isothermal) as the gas component expands.

When the piston 504 approaches bottom dead center of cylinder 502 (i.e., has moved down to approximately its limit of motion), valve 532 may be closed and valve 534 may be opened, allowing the expanded gas in chamber 506 to pass from cylinder 502 to some other component of the system 500, e.g., a vent or a chamber of another cylinder for further expansion.

In some embodiments, pump 514 is a variable-speed pump, i.e., may be operated so as to transfer liquid 512 at a slower or faster rate from the reservoir 510 to the foam-generating mechanism 522 and may be responsive to signals from the control system (not shown). If the rate at which liquid 512 is transferred by the pump 514 to the foam-mechanism 522 is increased relative to the rate at which gas is conveyed from reservoir 510 through piping 520 to the mechanism 522, the void fraction of the foam produced by the mechanism 522 may be decreased. If the foam generated by the mechanism 522 (Foam A) has a relatively low void fraction, the foam conveyed to chamber 506 (Foam B) will generally also tend to have a relatively low void fraction. When the void fraction of a foam is lower, more of the foam consists of liquid, so more thermal energy may be exchanged between the gas component of the foam and the liquid component of the foam before the gas and liquid components come into thermal equilibrium with each other (i.e., cease to change in relative temperature). When gas at relatively high density (e.g., ambient temperature, high pressure) is being transferred from the reservoir 510 to chamber 506, it may be advantageous to generate foam having a lower void fraction, enabling the liquid fraction of the foam to exchange a correspondingly larger quantity of thermal energy with the gas fraction of the foam.

All pumps shown in subsequent figures herein may also be variable-speed pumps and may be controlled based on signals from the control system. Signals from the control system may be based on system-performance (e.g., gas temperature and/or pressure, cycle time, etc.) measurements from one or more previous cycles of compression and/or expansion.

Embodiments of the invention increase the efficiency of a system 500 for the storage and retrieval of energy using compressed gas by enabling the surface area of a given quantity of heat-exchange liquid 512 to be greatly increased (with correspondingly accelerated heat transfer between liquid 512 and gas undergoing expansion or compression within cylinder 502) with less investment of energy than would be required by alternative methods of increasing the surface of area of the liquid, e.g., the conversion of the liquid 512 to a spray.

In other embodiments, the reservoir 510 is a separator rather than a high-pressure storage reservoir as depicted in FIG. 5. In such embodiments, piping, valves, and other components not shown in FIG. 5 are supplied that allow the separator to be placed in fluid communication with a high-pressure gas storage reservoir as well as with the mixing chamber 518. An arrangement of this type will be shown in and described with reference to FIG. 9.

Figure 6:
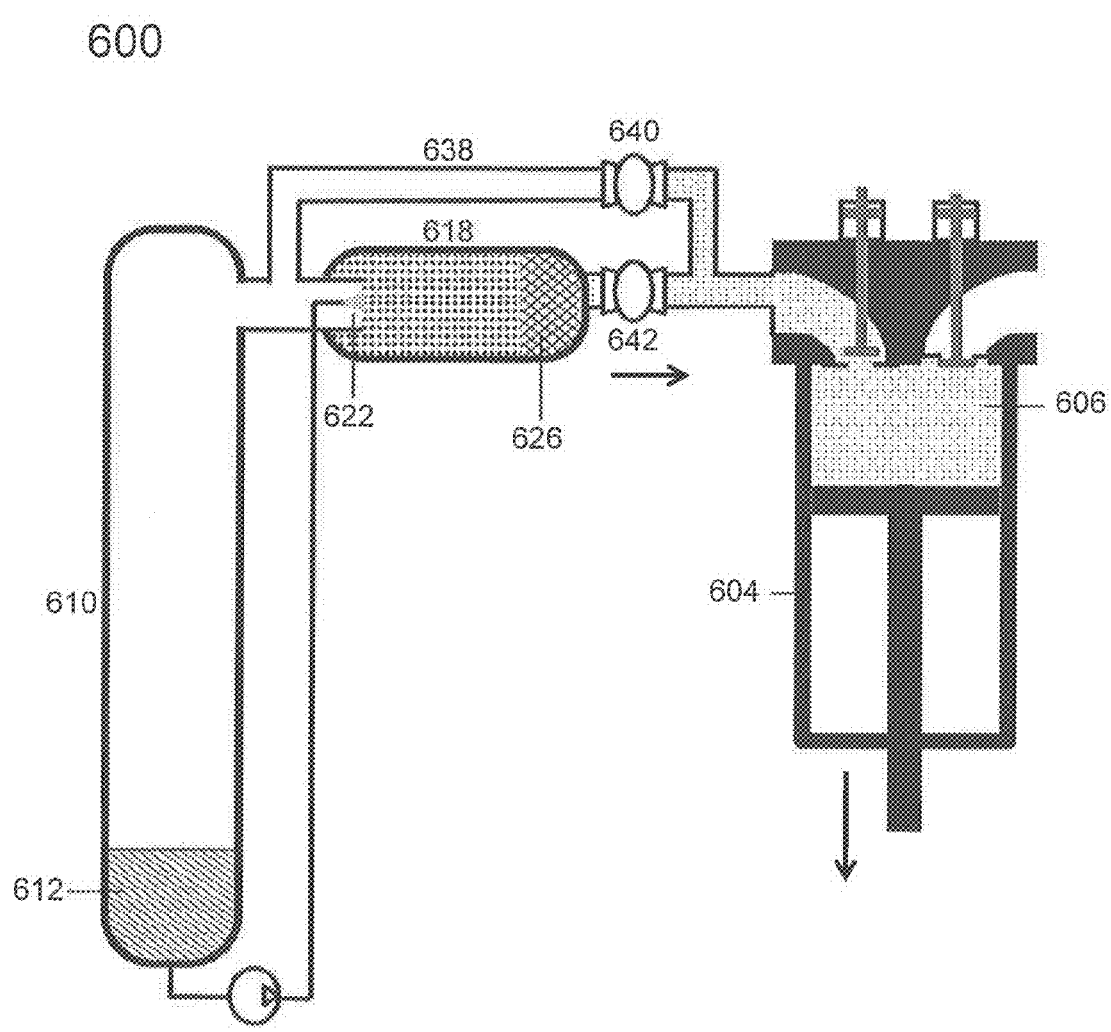
FIG. 6 is a schematic drawing of a cylinder assembly with apparatus for the generation of foam external to the cylinder and provision for bypassing the foam-generating apparatus in accordance with various embodiments of the invention.

FIG. 6 is a schematic diagram showing components of a system 600 for achieving approximately isothermal compression and expansion of a gas for energy storage and recovery using a pneumatic cylinder 604 (shown in partial cross-section) according to embodiments of the invention. System 600 is similar to system 500 in FIG. 5, except that system 600 includes a bypass pipe 638. Moreover, two valves 640, 642 are explicitly depicted in FIG. 6. Bypass pipe 638 may be employed as follows: (1) when gas is being released from the storage reservoir 610, mixed with heat-exchange liquid 612 in the mixing chamber 618, and conveyed to chamber 606 of cylinder 604 to be expanded therein, valve 640 will be closed and valve 642 open; (2) when gas has been compressed in chamber 606 of cylinder 604 and is to be conveyed to the reservoir 610 for storage, valve 640 will be open and valve 642 closed. Less friction will tend to be encountered by fluids passing through valve 640 and bypass pipe 638 than by fluids passing through valve 642 and screen 626 and around the foam-generating mechanism 622. In other embodiments, valve 642 is omitted, allowing fluid to be routed through the bypass pipe 638 by the higher resistance presented by the mixing chamber 618, and valve 640 is a check valve preventing fluid flow when gas is being released in expansion mode. The direction of fluid flow from chamber 606 to the reservoir 610 via a lower-resistance pathway (i.e., the bypass pipe 638) will tend to result in lower frictional losses during such flow and therefore higher efficiency for system 600.

In other embodiments, the reservoir 610 is a separator rather than a high-pressure storage reservoir as depicted in FIG. 6. In such embodiments, piping, valves, and other components not shown in FIG. 6 are supplied that allow the separator to be placed in fluid communication with a high-pressure gas storage reservoir as well as with the mixing chamber 618 and bypass pipe 638.

Figure 7:
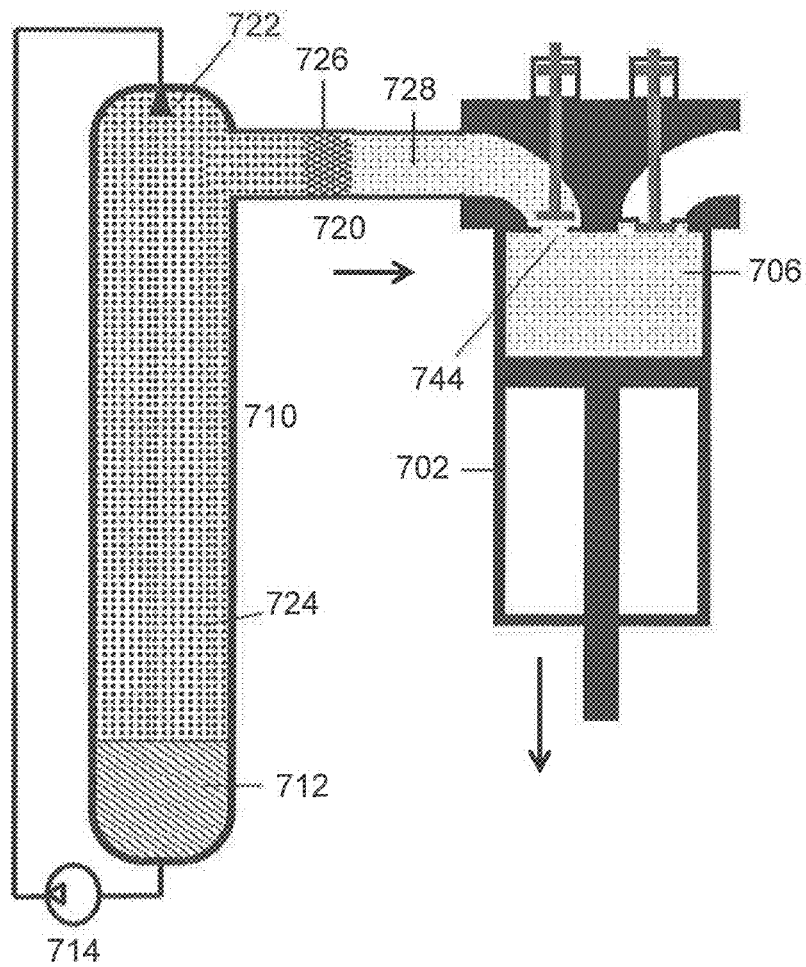
FIG. 7 is a schematic drawing of a cylinder assembly with apparatus for the generation of foam in a vessel external to the cylinder in accordance with various embodiments of the invention.

FIG. 7 is a schematic diagram showing components of a system 700 for achieving approximately isothermal compression and expansion of a gas for energy storage and recovery using a pneumatic cylinder 702 (shown in partial cross-section) according to embodiments of the invention. System 700 is similar to system 500 in FIG. 5, except that system 700 omits the mixing chamber 518 and instead generates foam inside the storage reservoir 710. In system 700, a pump 714 circulates heat-exchange liquid 712 to a foam-generating mechanism 722 (e.g., one or more spray nozzles) inside the reservoir 710. The reservoir 710 may, by means of the pump 714 and mechanism 722, be filled partly or entirely by foam of an initial or original character, Foam A (724). The reservoir 710 may be placed in fluid communication via pipe 720 with a valve-gated port 744 in cylinder 702. Valves (not shown) may govern the flow of fluid through pipe 720. An optional screen 726 (or other suitable mechanism such as an ultrasound source), shown in FIG. 7 inside pipe 720 but locatable anywhere in the path of fluid flow between reservoir 710 and chamber 706 of the cylinder 702, serves to alter Foam A (724) to Foam B (728), regulating characteristics such as bubble-size variance and average bubble size.

In other embodiments, the reservoir 710 is a separator rather than a high-pressure storage reservoir as depicted in FIG. 7. In such embodiments, piping, valves, and other components not shown in FIG. 7 will be supplied that allow the separator to be placed in fluid communication with a high-pressure gas storage reservoir as well as with the cylinder 702. In other embodiments, a bypass pipe similar to that depicted in FIG. 6 is added to system 700 in order to allow fluid to pass from cylinder 702 to reservoir 710 without passing through the screen 726.

Figure 8:
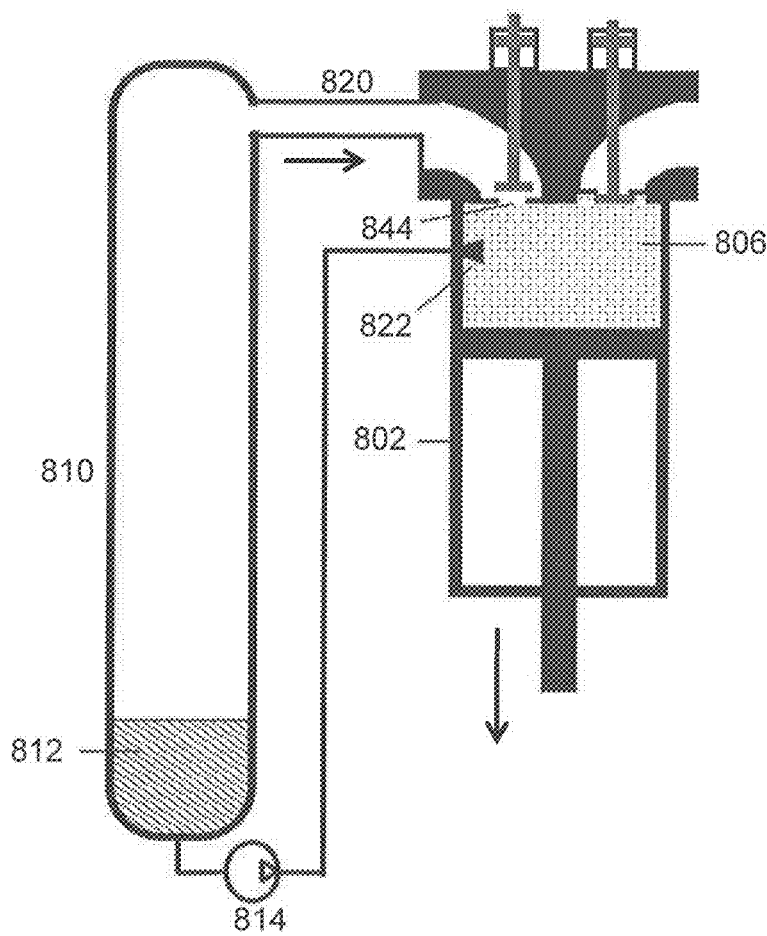
FIG. 8 is a schematic drawing of a cylinder assembly with apparatus for the generation of foam internal to the cylinder in accordance with various embodiments of the invention.

FIG. 8 is a schematic diagram showing components of a system 800 for achieving approximately isothermal compression and expansion of a gas for energy storage and recovery using a pneumatic cylinder 802 (shown in partial cross-section) according to embodiments of the invention. System 800 is similar to system 500 in FIG. 5, except that system 800 omits the mixing chamber 518 and instead generates foam inside the air chamber 806 of the cylinder 802. In system 800, a pump 814 circulates heat-exchange liquid 812 to a foam-generating mechanism 822 (e.g., one or more spray nozzles injecting into cylinder and/or onto a screen through which admitted air passes) either located within, or communicating with (e.g., through a port), chamber 806. The chamber 806 may, by means of the pump 814 and mechanism 822 (and by means of gas supplied from reservoir 810 via pipe 820 through a port 844), be filled partly or substantially entirely by foam. The reservoir 810 may be placed in fluid communication via pipe 820 with valve-gated port 844 in cylinder 802. Valves (not shown) may govern the flow of fluid through pipe 820.

Figure 9:
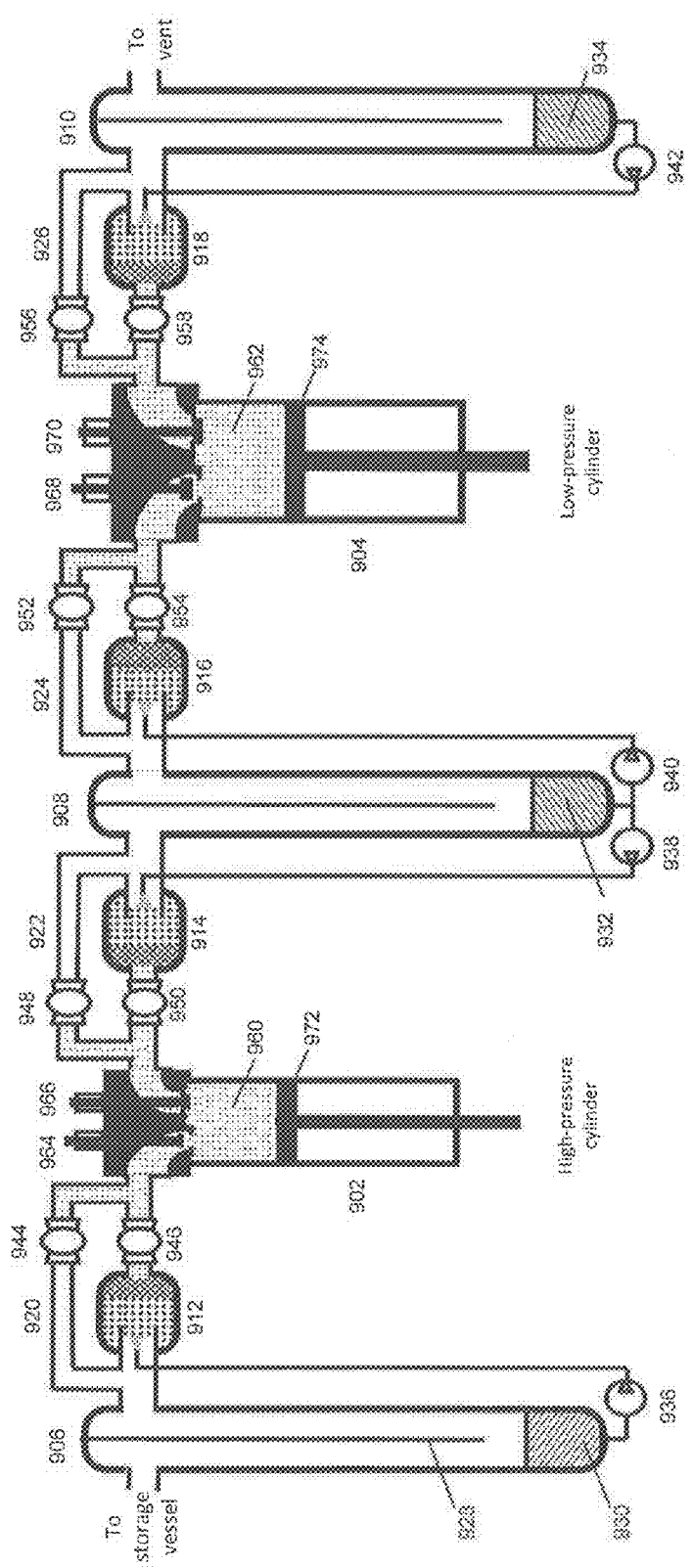
FIG. 9 is a schematic drawing of a cylinder assembly having two cylinders and apparatus for the generation and separation of foam external to the cylinders in accordance with various embodiments of the invention.

FIG. 9 is a schematic diagram showing components of a system for achieving approximately isothermal compression and expansion of a gas for energy storage and recovery using two pneumatic cylinder stages 902, 904 (shown in partial cross-section) according to embodiments of the invention. The higher-pressure cylinder 902 may be placed in fluid communication with a first separator 906 and/or a second separator 908; the lower-pressure cylinder 902 may be placed in fluid communication with the second separator 908 and/or a third separator 910. The first separator 906 may be placed in fluid communication with a high-pressure gas storage reservoir (not shown). The third separator 910 may be placed in fluid communication with a vent (not shown) that allows air to be exchanged with the environment. Fluid passing between the first separator 906 and the high-pressure cylinder 902, or between the high-pressure cylinder 902 and the second separator 908, or between the second separator 908 and the low-pressure cylinder 904, or between the low-pressure cylinder 904 and the third separator 910, may be routed through mixing chambers 912, 914, 916, 918 or bypass pipes 920, 922, 924, 926. Arrangements for controlling fluid communication between the high-pressure reservoir, the vent, the cylinders 902, 904, the mixing chambers 912, 914, 916, 918, and the bypass pipes 920, 922, 924, 926 may include valves, piping, and other components not depicted in FIG. 9. In various embodiments, the bypass pipes 920, 922, 924, 926, and/or additional bypass pipes not depicted in FIG. 9 may allow fluid to bypass the separators 906, 908, 910.

During expansion of gas from storage, gas may first be partly expanded in a high-pressure cylinder 902, allowing some of its potential elastic energy to be recovered by mechanisms (not shown) external to the cylinder 902, and then further expanded in the low-pressure cylinder 904, allowing most or substantially all of the remainder of its potential elastic energy to be recovered. During compression of gas for storage, gas may be partly compressed in the lower-pressure cylinder 904 and then further compressed in the higher-pressure cylinder 902.

The system 900 includes arrangements similar to those depicted in FIG. 5 and/or FIG. 6 for achieving approximately isothermal compression and expansion of gas using foam to facilitate heat exchange between the gas and a heat-exchange liquid.

Each of the three separators (e.g., the first separator 906) may contain baffles (e.g., baffle 928) or other internal mechanisms for encouraging the breakdown or separation of a fluid foam into its gas and liquid components. Other techniques (not shown), such as spraying into the foam or mechanical shearing the foam, may be employed to encourage foam degradation in a separator. Separated liquid 930, 932, 934 may be conveyed by pumps 936, 938, 940, 942 to the mixing chambers 912, 914, 916, 918 (which preferably have integral screens) to be used in the formation of fresh foam.

Valves 944, 946, 948, 950, 952, 954, 956, 958 may be used to direct liquid passing between the separators 906, 908, 910 and the cylinders 902, 904 either through the mixing chambers 912, 914, 916, 918 or the bypass pipes 920, 922, 924, 926. In cylinders 902, 904, valves 964, 966, 968, and 970 (e.g., poppet-type valves) control the ingress and egress of fluids. Preferably, the pumps 936, 938, 940, 942 run only when foam is to be generated in their respective mixing chambers 912, 914, 916, 918.

In general, gas that is to conveyed to an air chamber 960, 962 of a cylinder 902, 904, there to be either expanded or compressed, is routed through a mixing chamber in order to be foamed with heat-exchange liquid, enabling heat exchange to occur between the liquid and the gas during expansion or compression for the purpose of approximating an isothermal process.

In an initial state of operation of a procedure whereby gas stored in the high-pressure reservoir (not shown) is expanded in system 900 to release energy, piston 972 of the high-pressure cylinder 902 may be approximately at top dead center, piston 974 of the low-pressure cylinder 904 may be at bottom dead center (although the relative piston positions 972 and 974 may be arbitrarily phased), and the upper chamber 962 of the lower-pressure cylinder 904 is wholly or partly filled with foam at low pressure; in expansion mode, optional bypass valves 944 and 952 are closed and optional bypass valves 948 and 956 are open, allowing flow through mixing chambers 912 and 916 and optional valves 946 and 954, but bypassing flow through mixing chambers 914 and 918 by the closing of optional valves 950 and 958. Gas at high pressure is permitted to flow from the high-pressure reservoir, through the separator 906, and into the mixing chamber 912, where it is combined with heat-exchange liquid 930 to form foam. This foam, after optionally passing through a screen internal to the mixing chamber 912, flows through valve 946 and valve 964 into chamber 960 of the high-pressure cylinder 902, which it partly or substantially fills. In chamber 960, the foam exerts a force on the piston 972 that may be communicated to a mechanism external to the cylinder 902.

The gas component of the foam in chamber 960 expands as the piston 972 moves downward. At some point in the downward motion of piston 972, the flow of gas from the storage reservoir, through the separator 906, into the mixing chamber 912, and thence (as the gas component of the foam) into chamber 960 may be ended by closure of valve 964. As in the expanding foam in the cylinder of system 500 in FIG. 5, the temperature of the gas component of the foam within chamber 960 will tend to remain constant (approximately isothermal) as the gas component expands.

The piston 974 of the low-pressure cylinder 904 may be moved upward from bottom dead center concurrently with the downward motion of piston 972 described above, expelling the low-pressure foam within chamber 962 through the bypass valve 956 and pipe 926 into the separator 910. In the separator 910, the liquid component of the foam settles and accumulates as a body of liquid 934. The gas component of the foam passing from chamber 962 to the separator 910 proceeds out of the separator to the external vent (not shown) and is released to the environment. Additional mechanisms (not shown) for speeding the settling time of the foam into separate liquid and air, and for removing liquid from the venting air, may also be included. In brief, the high-pressure cylinder 902 may perform an intake stroke while the low-pressure cylinder 904 performs an exhaust stroke.

When the piston 972 of the high-pressure cylinder 902 has reached bottom dead center of cylinder 902 and the piston 974 has reached top dead center of the low-pressure cylinder 904, the chamber 960 of the high-pressure cylinder 902 contains gas at a mid-pressure (e.g., 300 psi). Subsequently valve 966 may be opened, and the piston 972 of the high-pressure cylinder 902 may begin to move upward, and valve 968 may be opened and the piston 974 of the low-pressure cylinder 904 may begin to move downward. Concurrently, the pump 940 runs, conveying heat-exchange liquid 932 to the mixing chamber 916 to be foamed. Under these conditions, gas at mid-pressure flows from the chamber 960 of the high-pressure cylinder 902, through the bypass pipe 922 and into the separator 908. While the cylinders 902 and 904 do not need to be out-of-phase, in an out-of-phase scenario, mid-pressure gas flows from the separator 908 through the mixing chamber 916, and (foamed with heat-exchange liquid) into chamber 962 of the low-pressure cylinder 904, where it performs work on the piston 974 that is moving downward. In brief, the high-pressure cylinder 902 may perform an exhaust stroke while the low-pressure cylinder 904 performs an intake stroke.

It will be clear to persons reasonably familiar with the art of pneumatic and hydraulic machines that the series of operations described above may be repeated cyclically, expanding any desired quantity of gas from storage in an approximately isothermal manner. It will also be clear that the system 900 may assume a series of states of operation that isothermally compress gas admitted through the vent and deliver the compressed gas to the high-pressure storage reservoir, and that this series of states may also be repeated cyclically, compressing any desired quantity of gas into storage. Such operations (as well as those described in connection with FIG. 9) may be performed via larger numbers of cylinders; multiple cylinders may expand or compress gas in parallel, or three or more stages (each of one or more cylinders) may be utilized to serially expand or compress gas.

In general, during both compression and expansion, system 900 may be operated so that fluids being exhausted from cylinders will be routed through the bypass tubes 920, 922, 924, 926, and fluids being taken in by cylinders will be routed through the mixing chambers 912, 914, 916, 918 in order that foams may be admitted to the air chambers 960, 962. Moreover, the screens (or other suitable foam-altering mechanisms) internal to the mixing chambers 912, 914, 916, 918 and the pumps 936, 938, 940, 942 may be operated in a manner that optimizes the efficiency of system 900 (e.g., continuous flow at a minimal pressure drop). Mixing chambers may be used for fine droplet spray as opposed to foam mixing in some or all of the mixing chambers, e.g., the low pressure chamber 918 may be used to suspend a mist of small droplets (e.g., 100 micron mean diameter or smaller) within the air in the chamber, whereas the other chambers 912, 914, 916 may be used to generate a suspension of aqueous foam. Some or all of the mixing chambers 912, 914, 916, 918 may be replaced with direct injection into the cylinder as shown in FIG. 8. Some or all of the direct-injection foam generators (e.g., 822 in FIG. 8) may be replaced with direct-injection spray generators such as an array of nozzles, e.g., a direct-injection mechanism (not shown) in the low pressure cylinder 904 may be used to suspend a mist of small droplets (e.g., 100-micron mean diameter or smaller) whereas a direct-injection mechanism (not shown) in the high pressure cylinder 902 may be used to generate an aqueous foam. Cylinders 902 and/or 904 may have two direct-injection mechanisms, one for compression and one for expansion, and one such mechanism may be for spray and one for foam generation.

Figure 10:
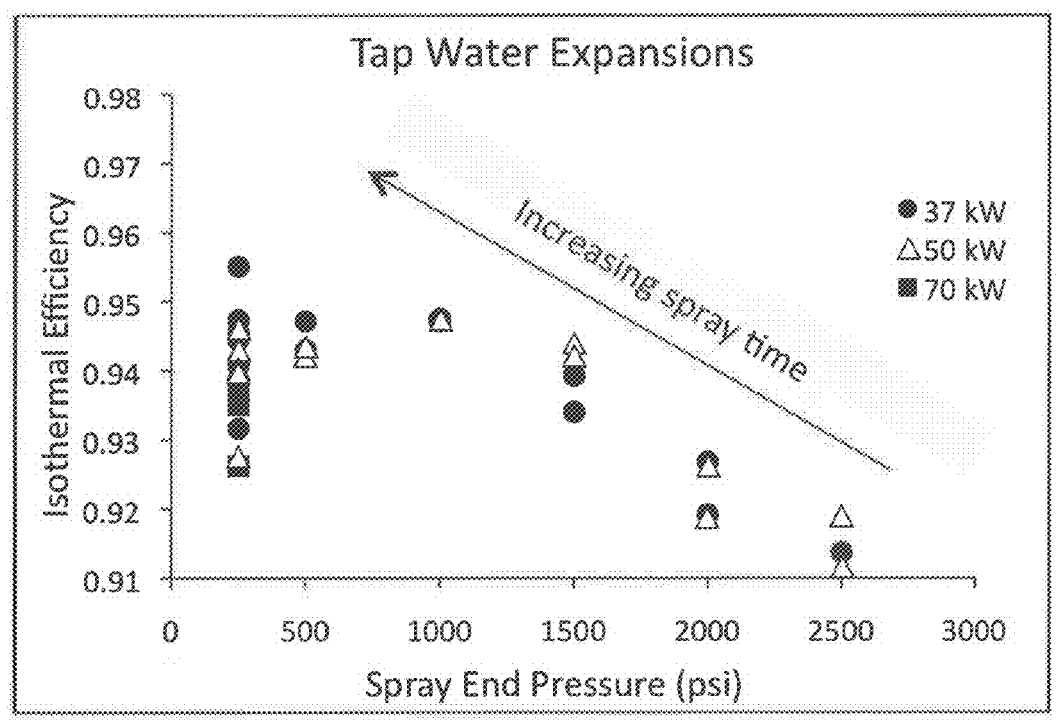
FIG. 10 is a graph of experimental data on the energetic performance of droplet sprays in isothermal gas expansions in accordance with various embodiments of the invention.

FIG. 10 is a plot of experimental data on the isothermal efficiency of a gas-expansion process using a spray of tap water without foaming additives. All expansions plotted in FIG. 10 began at 3,000 psig and ended at 250 psig and took place in a 10-gallon cylinder with an 8-inch interior diameter and a 52-inch stroke length. Each symbol (i.e., circle, triangle, or square) plots the isothermal efficiency of a single run of the energy-conversion system incorporating the cylinder. Expansions at three different rates of output power (37 kW, 50 kW, and 70 kW) are plotted in FIG. 10. The vertical axis corresponds to isothermal efficiency of expansion, i.e., the fraction of the energy that is extracted during a single actual expansion compared with the energy theoretically extractable from a given quantity of gas via isothermal expansion. Expansions that decrease in temperature generally yield less energy than an ideal isothermal expansion and thus result in less than 100% isothermal efficiency. For example, an adiabatic expansion over the same pressure range would result in approximately 50% of the energy of an ideal isothermal expansion, and thus have approximately 50% isothermal efficiency.

In the expansions for which isothermal efficiency is plotted in FIG. 10, the heat-exchange spray commences at the beginning of expansion and is stopped when the expanding gas reaches a predetermined threshold pressure or "spray end pressure." The horizontal axis of FIG. 10 corresponds to this spray end pressure. Since the beginning gas pressures are the same for all expansions in FIG. 10, lower pressures tend to be attained within the cylinder at later times; thus, for each output power level, lower spray end pressure (leftward on horizontal axis) typically corresponds to a longer period of spraying (increased spray time).

As FIG. 10 shows, and as the arrow labeled "Increasing spray time" highlights, there is a clear tendency, for this experimental setup, and using tap water without foaming additive as a heat-exchange spray liquid, for efficiency to decrease with spray end pressure (i.e., to increase with spray time). Without limiting the scope of the present invention, it is believed that this trend occurs because heat transfer between the heat-exchange liquid and the gas within the cylinder occurs at a significant rate only while the liquid and gas are in contact with each other over a large surface area. For a non-foaming spray, the liquid and gas are in contact over a large surface area only while the spray is being generated and the droplets are falling through the gas. Heat exchange slows greatly soon after the spray ceases to be generated. Spraying throughout the whole expansion or most of the expansion therefore allows closer approximation to an isothermal expansion and thus higher isothermal efficiency.

Figure 11:
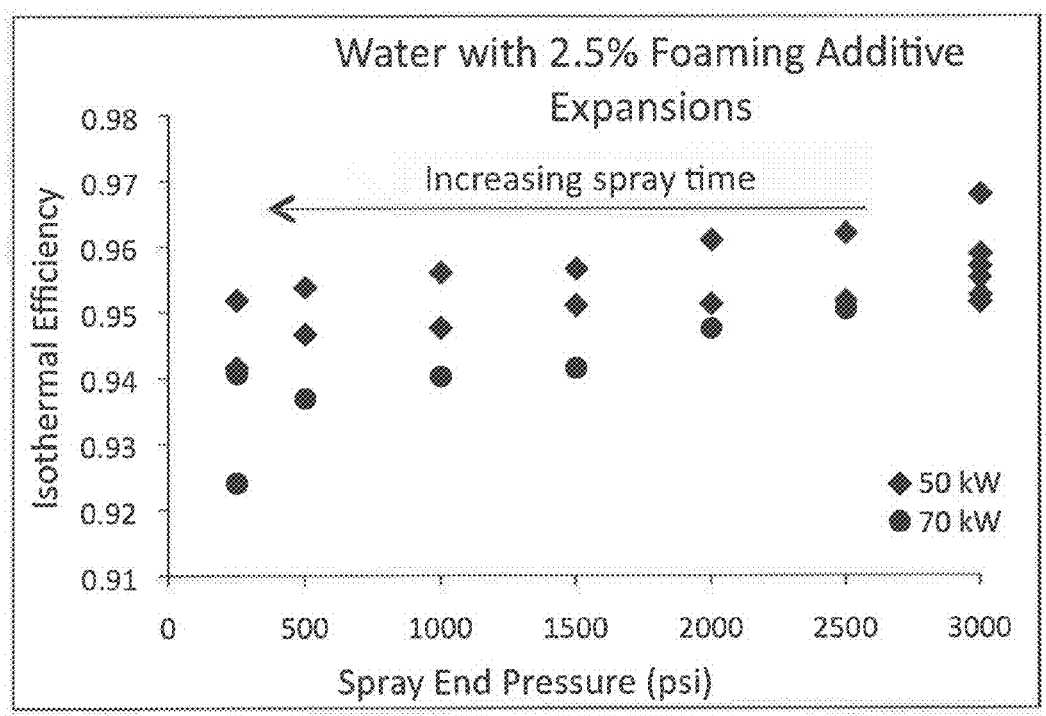
FIG. 11 is a graph of experimental data on the energetic performance of foam in isothermal gas expansions in accordance with various embodiments of the invention.

FIG. 11 is a plot of experimental data on the isothermal efficiency of a gas-expansion process using a spray of tap water with 2.5% by volume of a foaming additive (which in this exemplary experiment includes, at least in part, an ethanolamine). The axes of the plot are as described above for FIG. 10. Expansions at two different rates of output power (50 kW and 70 kW) are plotted in FIG. 11.

As FIG. 11 shows, and as the arrow labeled "Increasing spray time" highlights, there is, if any, a slight tendency, at least for this experimental setup and using tap water with 2.5% foaming additive as a heat-exchange spray liquid, for efficiency to increase with spray end pressure (i.e., to decrease with spray time). Furthermore, the isothermal efficiencies obtained utilizing foaming heat-exchange sprays tend to be higher than those obtained with non-foaming sprays (FIG. 10). Without limiting the scope of the present invention, it is believed that the physical basis of this trend is that for a foaming spray, the liquid and gas are in contact over a large surface area not only while the spray is being actively generated, but for as long as the resulting liquid-gas mixture persists substantially as a foam within the cylinder. Significant heat exchange thus may continue after the spray ceases to be generated. For the 2.5% water-plus-additive mixture used in the experiments whose results are plotted in FIG. 11, the entire volume of the expansion chamber within the cylinder is filled with foam soon (i.e., a small fraction of the duration of the expansion stroke) after the commencement of spraying. Longer spray times (lower spray end pressures) may be associated with lower isothermal efficiencies because they consume additional energy while producing relatively little additional heat transfer. Thus, under the experimental conditions pertaining to the data plotted in FIG. 11, the highest-efficiency cycle is achieved with the shortest period of spraying. Notably, the highest efficiency attained under the conditions illustrated in FIG. 11 (approximately 97%) is higher than the highest efficiency attained under the conditions illustrated in FIG. 10, i.e., with non-foaming spray (approximately 95.6%). With larger or smaller concentrations of one or more foaming additives (e.g., additives other than that utilized in this exemplary embodiment), other trends may be observed: e.g., at very low additive concentrations, foaming may be so slight as to not produce the effects observed with 2.5% concentration, in which case data more closely resembling those of FIG. 10 may be obtained.

Figure 12:
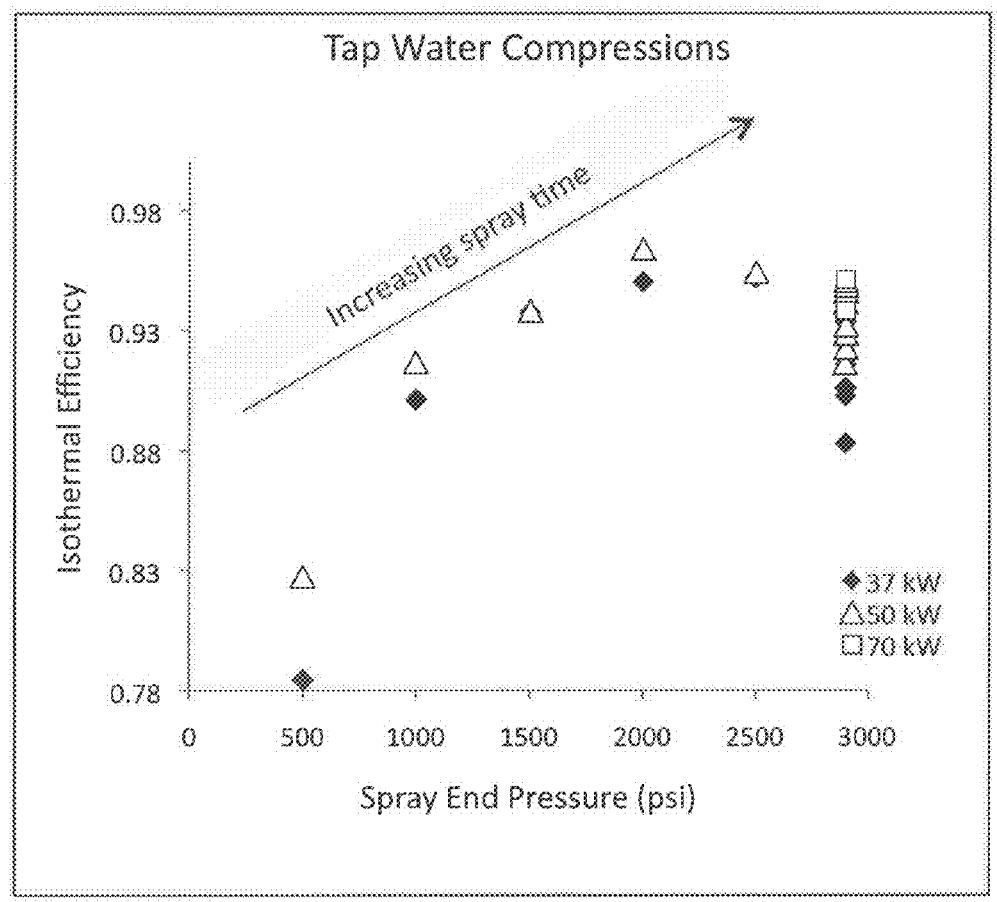
FIG. 12 is a graph of experimental data on the energetic performance of droplet sprays in isothermal gas compressions in accordance with various embodiments of the invention.

FIG. 12 is a plot of experimental data on the isothermal efficiency of a gas-compression process using a spray of tap water without foaming additives. All compressions plotted in FIG. 12 began at 250 psig and ended at 3,000 psig and took place in a 10-gallon cylinder with an 8-inch interior diameter and a 52-inch stroke length. Each symbol (i.e., diamond, square, or triangle) plots the isothermal efficiency of a single run of the energy-conversion system. Compressions at three different rates of output power (37 kW, 50 kW, and 70 kW) are plotted in FIG. 12. The vertical axis corresponds to isothermal efficiency of compression, i.e., the fraction of the energy that is required to compress a given quantity of gas to a certain volume (from a given starting pressure and volume) via isothermal compression compared with the actual measured energy to compress that same quantity of gas to the same volume. Compressions that increase in temperature generally require more energy than an ideal isothermal compression and thus result in less than 100% isothermal efficiency. For example, an adiabatic compression of 10 gallons of 250 psig gas to a volume of 2 gallons would typically require approximately 170% of the energy of an ideal isothermal compression to the same volume, and thus have approximately 60% (i.e., 100/170) isothermal efficiency.

In the compressions for which isothermal efficiency is plotted in FIG. 12, the heat-exchange spray commences at the beginning of compression and is stopped at some predetermined threshold pressure or "spray end pressure." The horizontal axis of FIG. 12 represents this spray end pressure. Since the beginning and end gas pressures are the same for all expansions in FIG. 12, lower pressures are attained within the cylinder at earlier times; thus, lower spray end pressure (leftward on horizontal axis) corresponds to a shorter period of spraying (decreased spray time).

As the data plotted in FIG. 12 show, and the arrow labeled "Increasing spray time" highlights, there is a tendency, using tap water without foaming additives as a heat-exchange spray liquid, for efficiency to increase with spray end pressure (i.e., to increase with spray time) up to a spray pressure of about 2,000 psi. Without limiting the scope of the present invention, it is believed that the physical basis of this trend is that heat transfer between the heat-exchange liquid and the gas within the cylinder occurs at a significant rate only while the liquid and gas are in contact over a large surface area. For a non-foaming spray, the liquid and gas are typically in contact over a large surface area only while the spray is being generated and its droplets are falling through the gas. Significant heat exchange ceases soon after the spray ceases to be generated. Spraying throughout the whole compression (or, for the compressions plotted in FIG. 12, most of the compression) allows closer approximation to an isothermal compression and thus higher isothermal efficiency.

Figure 13:
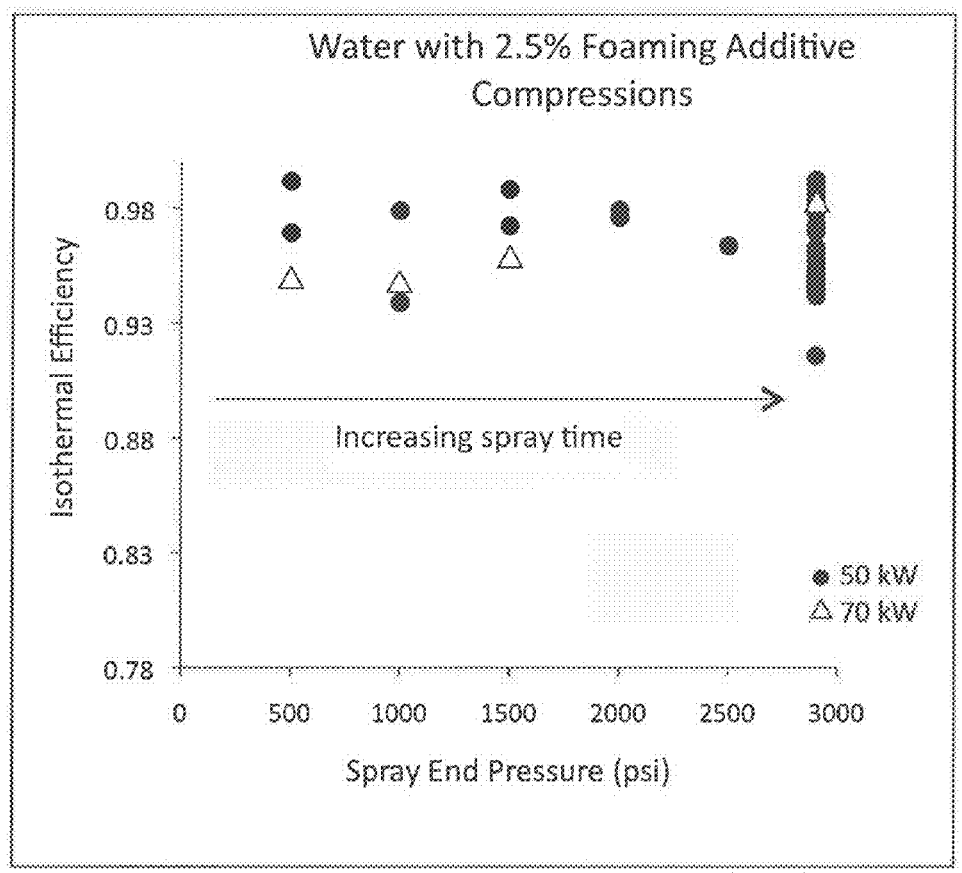
FIG. 13 is a graph of experimental data on the energetic performance of foam in isothermal gas compressions in accordance with various embodiments of the invention.

FIG. 13 is a plot of experimental data on the isothermal efficiency of a gas-compression process using a spray of tap water with 2.5% by volume of foaming additives (i.e., the same foaming additives utilized to generate the data of FIG. 11). The axes of the plot are as described above for FIGS. 10, 11, and 12. Compressions at two different rates of output (50 kW and 70 kW) are plotted in FIG. 13.

As the data plot in FIG. 13 shows, and the arrow labeled "Increasing spray time" highlights, isothermal compression efficiency is approximately independent of spray end pressure using tap water with 2.5% foaming additives as a heat-exchange spray liquid in this experimental system. Without limiting the scope of the present invention, it is believed that the physical basis of this independence is that for a foaming spray, the liquid and gas are in contact over a large surface area not only while the spray is being generated, but for as long as the liquid-gas mixture persists in the form of a foam within the cylinder. Significant heat exchange thus continues after the spray ceases to be generated. For the 2.5% mixture utilized in the experiments whose results are plotted in FIG. 13, the entire volume of the expansion chamber within the cylinder is filled with foam soon (i.e., a small fraction of the stroke) after the commencement of spraying. Under the experimental conditions illustrated in FIG. 13, the highest-efficiency cycle is achieved with the shortest period of spraying, as well as with the longest. Notably, the highest efficiency attained under the conditions illustrated in FIG. 13 (over 98%) is significantly higher than the highest efficiency attained under the conditions illustrated in FIG. 12, non-foaming spray (approximately 96%). With larger or smaller concentration of one or more foaming additives, other trends may be observed: e.g., at very low concentrations (or other concentrations of other additives), foaming may be so slight as to not produce the effects observed with 2.5% concentration, in which case data more closely resembling of FIG. 12 may be obtained.

Achieving high isothermal efficiency by using foaming spray liquid with relatively short spray time has the advantage that the parasitic energy devoted to spray generation is reduced relative to a more prolonged spraying period. During compressions, a short, initial period of spraying in general must overcome low gas pressure in the cylinder chamber being sprayed compared to the pressure in later parts of the compression, which also saves spraying energy. During expansions, when water warmer than the gas in the chamber is generally sprayed to achieve isothermal expansion, spraying when the gas is at the initial pressure requires only a small pressure increase for water at that initial pressure (e.g., water in the storage reservoir 320 in FIG. 3) and thus a low pumping power; whereas if water is sprayed from that initial pressure (e.g., the storage-reservoir pressure) into a much lower cylinder pressure, energy may be lost in the throttling of fluid during the spraying process. Additives that produce foaming may simultaneously produce one or more other benefits, such as increasing lubricity or preventing corrosion.

Other considerations in the energy-efficient generation of foam are (1) whether, to minimize energy lost in circulation of liquids across pressure differentials, foam should be generated before admission to the air chamber of a pneumatic cylinder for compression or expansion (herein termed the "pre-foam" or "port injection" approach), or directly into the air chamber of the pneumatic cylinder (herein termed the "foam-during" or "direct injection" approach), and (2) what the liquid-to-gas mass ratio of the foam should be to optimize heat exchange, pumping energy, and other efficiency considerations. The illustrative systems shown in FIG. 5, FIG. 6, and FIG. 7 are pre-foam systems; the illustrative systems shown in FIG. 8 is a foam-during system.

Figure 14:
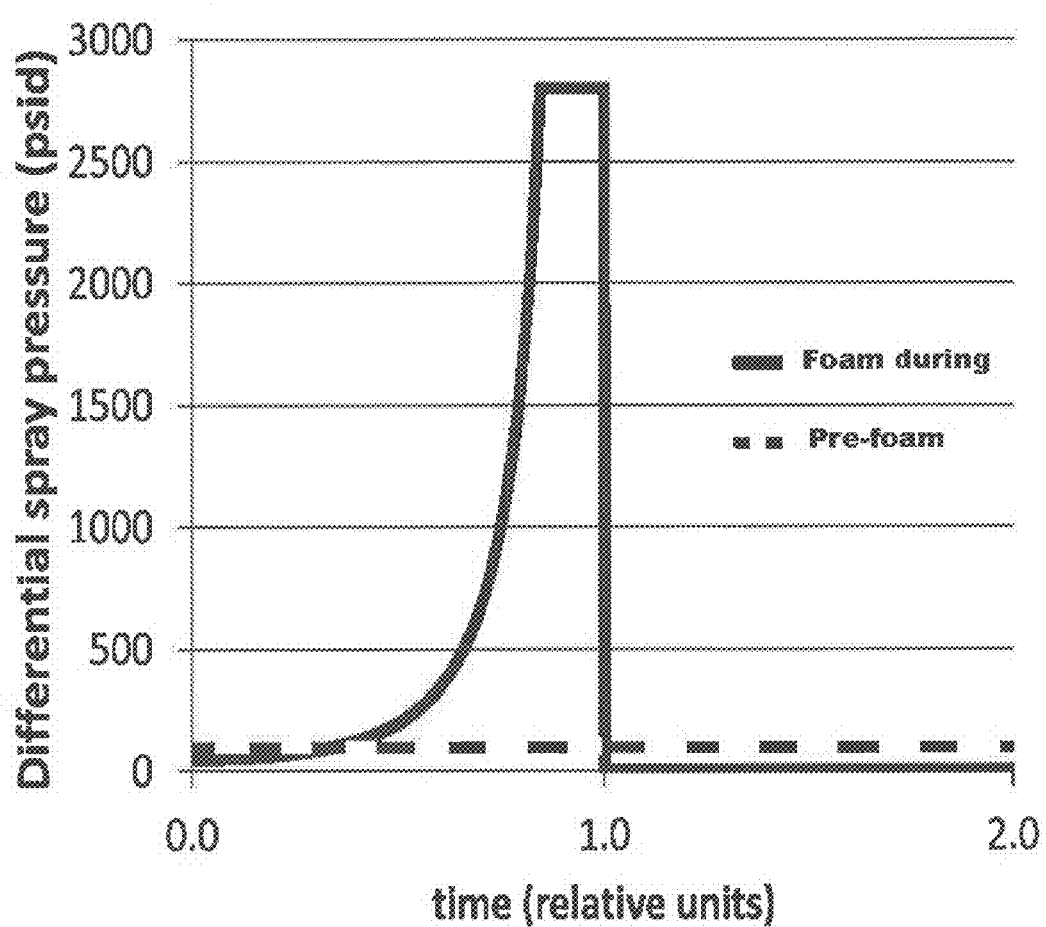
FIG. 14 is a graph of spray pressures calculated for two methods of introducing a foaming liquid into a cylinder during a compression cycle in accordance with various embodiments of the invention.

FIG. 14 is an illustrative graph of calculated energy expended in the generation and injection of foam or foaming liquid into the air chamber of a pneumatic cylinder as a function of time, comparing the pre-foam approach to the foam-during approach. By basic principles of hydraulics, the foaming energy $W_{foam}$ (i.e., where mechanical agitation is employed to induce foaming, the energy required to produce a given amount of foam by forcing foaming liquid through a device that mingles the liquid with gas to form a foam) is determined by the volume of foamed liquid $V_{liquid}$ multiplied by the change in pressure $\Delta P_{foaming}$ undergone by the foamed liquid in its passage through the foaming device: $W_{foam} = V_{liquid} \times \Delta P_{foaming}$. Where $V_{liquid}$ and $\Delta P_{foaming}$ vary with time, total foaming energy $W_{foam}$ over a given time interval is given by the integral of $V_{liquid} \times \Delta P_{foaming}$ over that interval: $W_{foam} = \int V_{liquid} \times \Delta P_{foaming}$ dt (where the limits of integration are not explicitly indicated). If $V_{liquid}$ is constant and $\Delta P_{foaming}$ varies with time, $W_{foam} = V_{liquid} \times \int \Delta P_{foaming}$ dt. For a given gas-to-liquid mass ratio for a given quantity of gas, $V_{liquid}$ is fixed; therefore, to minimize $W_{foam}$, average $\Delta P_{foaming}$ must be minimized.

In general, for the foam-during (i.e., direct-injection) approach, $\Delta P_{foaming}$ varies throughout a piston stroke within a cylinder assembly, as $\Delta P_{foaming}$ is given by the difference between the source pressure of the foaming liquid and the pressure of the gas into which the foaming liquid is injected. The pressure of the source of foaming liquid is in general approximately constant, while the pressure of a gas undergoing compression or expansion within a cylinder assembly changes substantially. Creation of a foam within a cylinder assembly during, e.g., a compression stroke, thus entails forcing foaming liquid into the air chamber of the cylinder assembly against an increasing pressure difference (increasing $\Delta P_{foaming}$).

In the graph in FIG. 14, the vertical axis, "Differential Spray Pressure," corresponds to $\Delta P_{foaming}$ and the horizontal axis corresponds to time. The area under a curve plotting $\Delta P_{foaming}$ versus time is $\int \Delta P_{foaming}$ dt. Therefore, since $W_{foam} = V_{liquid} \times \int \Delta P_{foaming}$ dt, if $V_{liquid}$ is presumed constant, foaming energy $W_{foam}$ for a given gas expansion or compression process will be proportional to the area under the $\Delta P_{foaming}$ versus time curve for that process.

The solid line in the graph in FIG. 14 shows $\Delta P_{foaming}$ for a foam-during (i.e., direct-injection) compression of a quantity of gas beginning at approximately 0 psig. As the pressure within the air chamber of the cylinder assembly increases, $\Delta P_{foaming}$ increases (rising curve in graph). If foam creation continues during a period of time after compression is complete, $\Delta P_{foaming}$ will be approximately constant for that period of time (flat portion of solid curve in graph from time equals approximately 0.8 unit to time equals 1.0 unit). The area under the solid line in the graph in FIG. 14 is $\int \Delta P_{foaming}$ dt; therefore, by $W_{foam} = V_{liquid} \times \int \Delta P_{foaming}$ dt, foaming energy $W_{foam}$ for this illustrative compression process is proportional to the area under the solid line.

Similarly, the dotted line in the graph in FIG. 14 shows $\Delta P_{foaming}$ for a pre-foam (i.e., port-injection) compression of a quantity of gas beginning at approximately 0 psig. The quantity of gas and other features of the compression process are the same as those for the compression represented by the solid line in the graph. In the pre-foam process, foam is generated at low pressure as the gas to be compressed is admitted into the air chamber of cylinder assembly. $\Delta P_{foaming}$ is low and constant throughout foam generation (horizontal dotted line in the graph) for the pre-foam process. Manifestly, the area under the dotted line in the graph (i.e., $\int \Delta P_{foaming} \, dt$, which equals the foaming energy $W_{foam}$ for this illustrative pre-foam compression process) is smaller than the area under the solid line in the graph. Therefore, foaming energy $W_{foam}$ is smaller for a pre-foam compression process than for a comparable foam-during compression process.

For a pre-foam process in which foam is created in a foam generator external to the cylinder assembly (as, e.g., in FIG. 5), the generated foam must be admitted through a valve (e.g., a poppet valve) into the air chamber of the cylinder assembly. During either expansion or compression, passage through the valve into the cylinder assembly will entail some pressure drop for the foam and therefore some energy loss. However, the pressure drop through a valve (e.g., poppet valve) governing the entrance or exit of fluid from the air chamber of the cylinder assembly will generally be lower than the pressure drop through a foam-generating device. Therefore, pre-foam processes will in general realize lower energy losses, and thus higher efficiency, than foam-during processes.

Moreover, for a spray-during process, either of compression or expansion, foam generation must occur in episodes or time intervals whose duration and timing are determined by the action of the cylinder assembly. For a pre-spray process, foam may be generated or regenerated continuously (e.g., within a large foam generator or a reservoir attached to the foam generator), not only during each compression or expansion stroke of the cylinder assembly. Performing foam generation over a longer time period is likely to further lower $\Delta P_{foaming}$ compared to more rapid foaming, allowing further efficiency gains to be realized.

Figure 15:
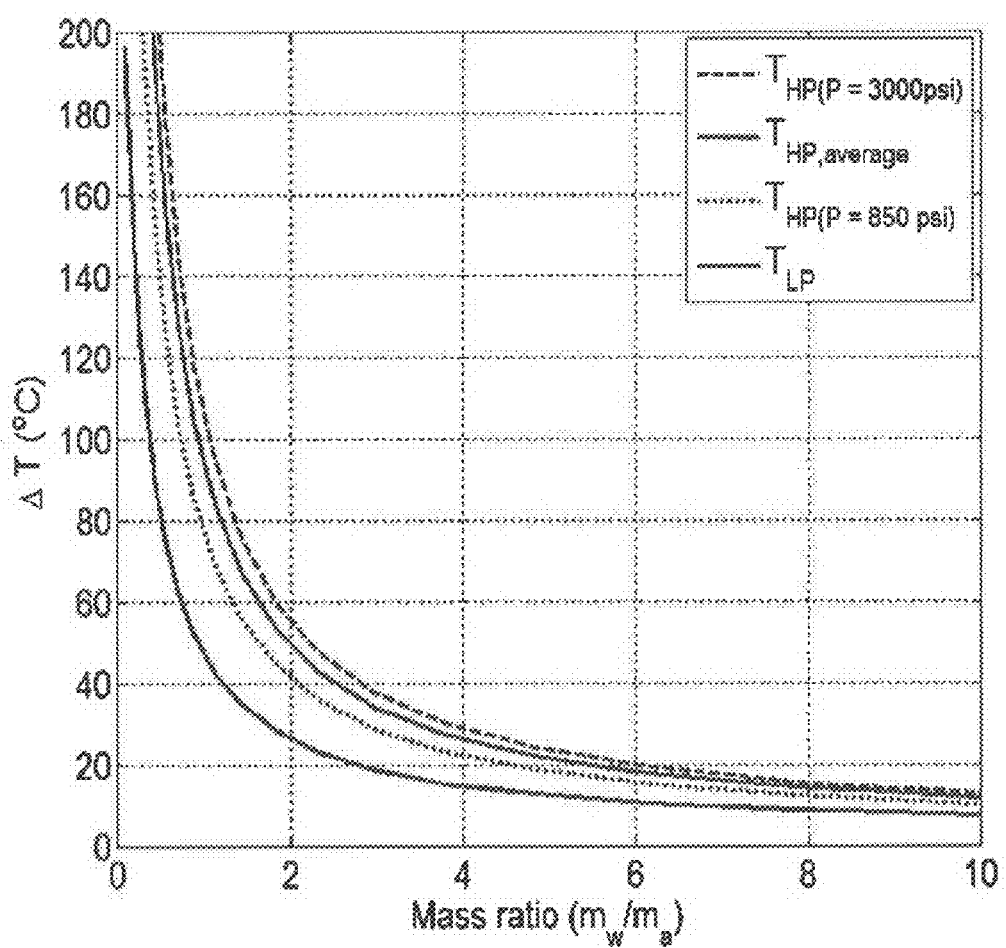
FIG. 15 is a graph of final liquid temperatures calculated for compressions over a range of heat-exchange foam mass ratios and final compression pressures in accordance with various embodiments of the invention.

The graph in FIG. 15 plots calculated temperature changes of the liquid component of a foam undergoing a set of illustrative compression processes for a range of foam mass ratios and a set of illustrative compression processes. The vertical axis of the graph in FIG. 15 corresponds to the temperature change of the liquid component of a foam undergoing compression, and the horizontal axis of the graph corresponds to the mass ratio of the foam undergoing compression, i.e., the ratio of the mass of liquid $m_w$ per unit volume of foam to the mass of gas $m_a$ per unit volume of foam. (The mass ratio $m_w/m_a$ does not vary with pressure, except as some fraction of the gas component may dissolve into or evaporate from the liquid component, altering $m_a$, or as some fraction of the liquid component may evaporate into or condense out of the gas component, altering $m_w$. The illustrative graph in FIG. 15 neglects the effects of dissolved gas and vapor-liquid phase changes of the liquid component, as these are relatively minor effects.)

When a foam including or consisting essentially of a compressible gas and an approximately incompressible liquid is compressed, the change in volume of the foam is due to the compression of the gas component. As noted earlier, gas undergoing compression tends to heat. The rising temperature of the gas component of a foam undergoing compression will cause thermal energy to be transferred to the liquid component of the foam. The larger the mass ratio $m_w/m_a$, the greater the mass of liquid available to absorb thermal energy for each mass unit of gas, and the lower the resulting change in temperature T of the liquid for a given overall change in pressure of the foam. Final T of the liquid is in general a function of initial foam temperature, the heat transfer coefficients of the gas and liquid components of the foam, the heat capacity of the gas and of the liquid, the foam mass ratio, the foam start pressure, and the foam end pressure. In the graph in FIG. 15, only mass ratio and foam end pressure vary.

The change in temperature ($\Delta T$) of the liquid component of a variety of hypothetical foams undergoing compression is represented by the series of curves in the graph in FIG. 15. Compressions are shown for a low-pressure cylinder (LP) and a second-stage high-pressure cylinder (HP). For the LP cylinder, compressions begin, for a first compression stage, at approximately 0 psig and end at approximately 180 psig (shown and labeled as $T_{LP}$). For the subsequent high-pressure second compression stage, three scenarios are shown: (1) a compression from 180 psig to a first high pressure of 850 psig ($T_{HP(P=850\,psi)}$), (2) a compression from 180 psig to a first high pressure of 3000 psig ($T_{HP(P=3000\,psi)}$), and (3) the average of (1) and (2). For simplicity, the liquid is presumed not to boil or freeze under any of the pressure-and-temperature conditions encountered in the hypothetical compressions. The first (lower) solid line of the graph represents the final temperature of an LP compression across a range of mass ratios $m_w/m_a$; the dotted line represents the final liquid temperature after foam compression to 850 psig; the dashed line represents the final liquid temperature after foam compression to 3,000 psig; and the solid line between the dashed line and the dotted line represents the average of the 850 psig and 3,000 psig final temperatures.

All four curves in the graph in FIG. 15 are of an approximately hyperbolic character, approaching adiabatic conditions as $m_w/m_a$ goes to zero and approaching zero as $m_w/m_a$ goes to infinity. It will be apparent to persons reasonably familiar with the principles of thermodynamics, liquids, and mixed-phase systems that low $m_w/m_a$ (approaching zero) is undesirable because of the temperature extremes that will be encountered. High temperatures may lead to boiling of liquid (e.g., when the liquid is separated from the foam and its pressure is reduced), to breakdown of surfactant compounds, or to other undesirable effects. Similarly, large $m_w/m_a$ (approaching infinity) requires the pumping of larger fractions of liquid in which no potential energy of pressure is stored; further, as $m_w/m_a$ increases, a point will be reached where a "foam" is no longer tenable, but rather a mass of liquid is produced in which bubbles of gas are present. Among other disadvantages of excessively high $m_w/m_a$, pistons would be capable of effecting only slight compression of such a mixture. Efficient operation of a compressed-gas energy storage system is generally not feasible where the working fluid (e.g., two-phase mixture) is not significantly compressible. Therefore, the graph in FIG. 15 supports the conclusion that foams having moderate mass ratios $m_w/m_a$, e.g., in the vicinity of $m_w/m_a=2$, are likely to be the most efficient when utilized in compressed-gas energy storage system. Such mass ratios include, for example, mass ratios of 1 to 4, and, more preferably, 1.5 to 3.

Figure 16:
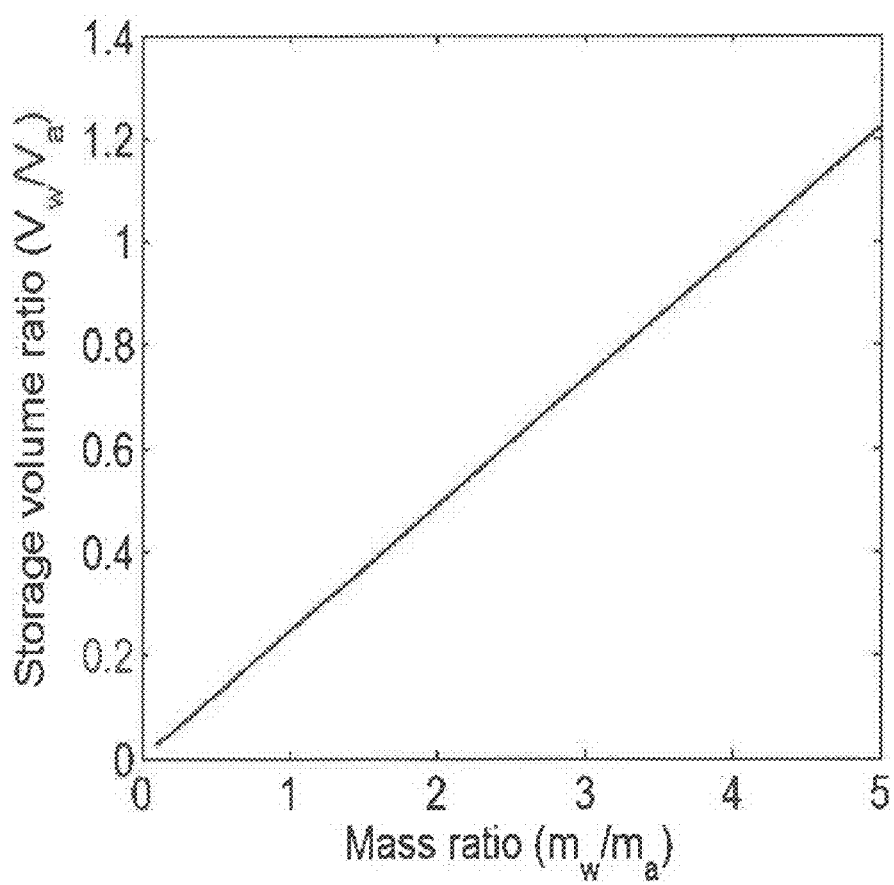
FIG. 16 is a graph of the additional storage space calculated as required for a range of heat-exchange foam mass ratios in accordance with various embodiments of the invention.

Employment of two fluid phases (e.g., liquid and gas in a foam) in a compressed-gas energy storage system may entail storage of liquid as well as of compressed gas, either commingled as foam or separated into liquid, foam, and gas fractions, although only the compressed gas stores significant pressure potential energy. Storage of liquid may constitute an additional or parasitic cost for the energy storage system; if excessive heat-exchange liquid is stored, the cost-effectiveness of the energy storage system may be reduced. For storage of large quantities of compressed gas, storage cost may even dominate total system cost, and in such a case, the cost of storing large quantities of liquid may be prohibitive. The graph in FIG. 16 shows additional liquid volume as a fraction of gas storage volume (i.e., additional storage volume for a two-phase system where the liquid is stored in the pressure storage reservoir with the gas relative to storage reservoir volume for gas-only in the storage reservoir) as a function of foam mass ratio $m_w/m_a$ for a compressed gas energy storage system with a maximum pressure of 3,000 psig. For mass ratio of zero, there is zero liquid storage. For mass ratio of 5, approximately 1.2 times more liquid volume than gas volume must be stored. For a mass ratio of approximately 2, a volume of liquid must be stored that is about half as large as the amount of gas that must be stored. FIG. 16, like FIG. 15, supports the conclusion that mass ratios in the vicinity of 2 are likely to support the operation of an efficient, cost-effective compressed-gas energy storage system.

Figure 17:
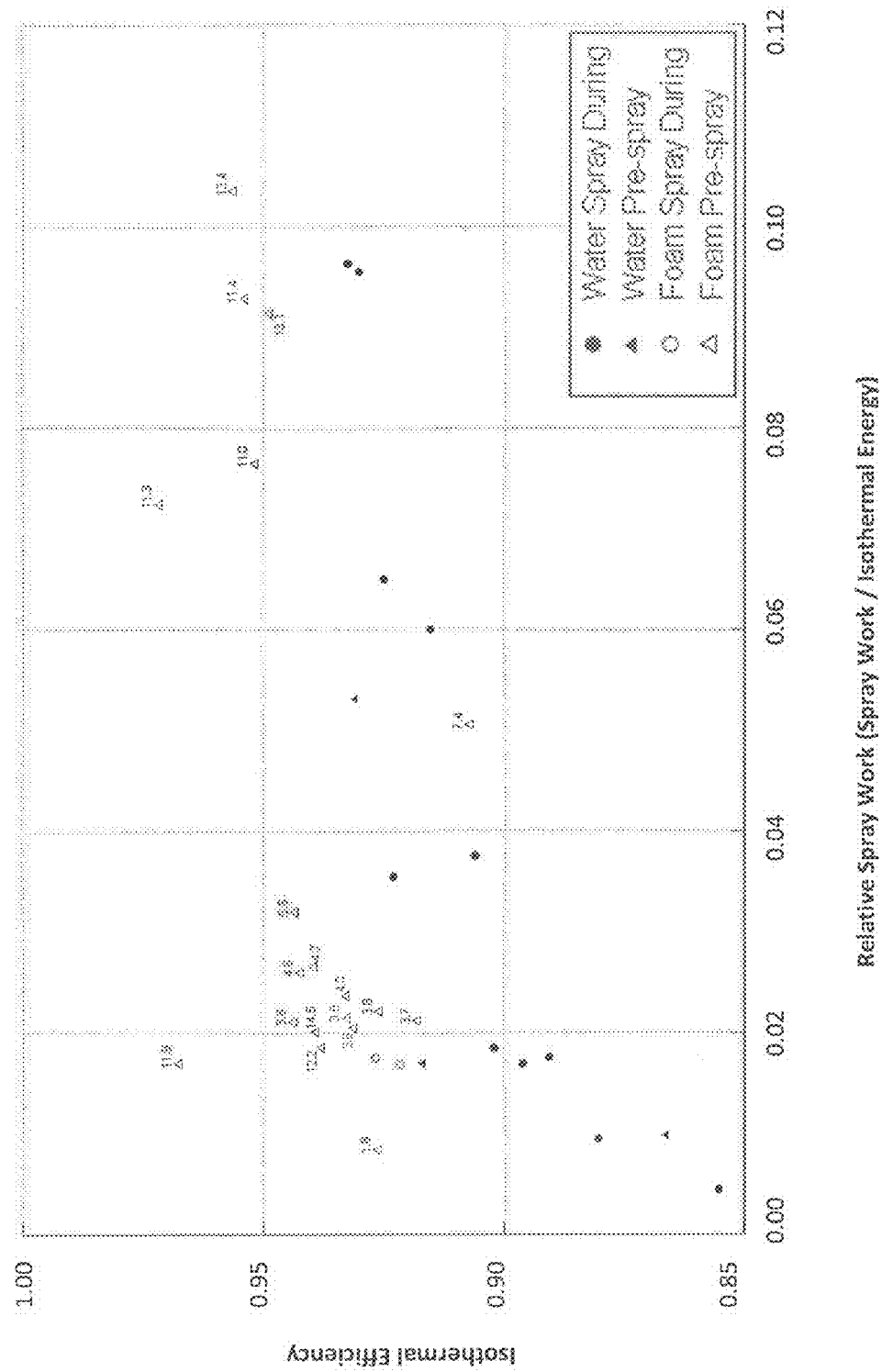
FIG. 17 is a plot of experimental data on the isothermal efficiencies of a gas-expansion compressions using a foam in accordance with various embodiments of the invention, compared to the isothermal efficiencies of similar compressions with non-foaming spray.

FIG. 17 is a graph of experimental data comparing the energetic performance of aqueous foams and droplet sprays in maintaining substantially isothermal gas cycling during rapid gas expansions between approximately 3,000 psig and approximately 250 psig. Data are shown for isothermal gas expansions occurring in a high-pressure test stand. Each symbol on the graph represents a single isothermal expansion. Heat exchange between the liquid and air is achieved by four methods in these experiments: (1) water droplet spray in the gas during compression (filled circles), (2) water droplet spray in the gas prior to expansion (filled triangles), (3) aqueous foam spray in the gas during expansion (open circles), and (4) aqueous foam spray in the gas prior to expansion (open triangles), also termed "foam pre-spray."

The vertical axis of the graph in FIG. 17 is isothermal efficiency, i.e., work performed by the expanding gas divided by the work expected by an ideal isothermal expansion. The horizontal axis of the graph in FIG. 17 is relative spray work, i.e., the work required to produce the spray of droplets or foam (e.g., by forcing liquid through a spray head) divided by the total work performed by the gas during the expansion. For example, in a given expansion experiment, if 300 kJ of work are performed by the isothermally expanding gas, and 3 kJ of work are required to produce the foam generated during that expansion, then the relative spray work for that experiment is 0.01 (3 kJ divided by 300 kJ). Lower relative spray work is desirable because it increases overall system efficiency; spray work is in general a parasitic load for an isothermal energy storage and recovery system. Spray pumping work is related to sprayed volume multiplied by pressure drop and is the work required to force the fluid through, e.g., pipes and nozzles to generate a high-quality spray or aqueous foam that promotes rapid heat transfer between the sprayed liquid and the expanding or compressing gas by maximizing surface area and proximity between the liquid and gas.

A third experimental variable in the graph in FIG. 17 is indicated for foam pre-spray experiments (open triangles) by associating numbers with plotted experimental points. The number by each pre-spray point specifies the foam mass ratio for that experiment. Herein, the foam mass ratio is defined as the ratio of liquid mass to gaseous mass in a given volume of aqueous foam. For example, if a cubic meter of a given foam contains 2 kg of liquid and 1 kg of gas, then the mass ratio of that foam is 2.0 (2 kg divided by 1 kg). Mass ratios could be indicated for all points in the graph, but for simplicity are only shown for foam pre-spray.

The graph in FIG. 17 supports several statements about the employment of foams for heat transfer in isothermal compressed-gas energy storage and generation systems. First, higher isothermal efficiencies (e.g., by approximately 2 to 5 isothermal efficiency percentage points) are achievable using foam pre-spray than for water spray techniques for a similar set of experimental conditions. (This statement is also supported by the graph in FIG. 15.) Second, the majority of foam pre-spray experiments have low relative spray work as well as high isothermal efficiency: note the cluster of foam pre-spray experimental points clustered in the vicinity of relative spray work 0.02 and isothermal efficiencies clustered between 0.92 and 0.95. Third, relatively high isothermal efficiencies (approximately 0.94) are achieved by foam pre-spray, in most cases, by relatively low mass ratios (1.8 to 5.5); again, note the cluster in the vicinity of relative spray work 0.2, isothermal efficiency 0.92 to 0.95.

A foam contains a large liquid-gas surface contact area, facilitating heat transfer between the two phases (liquid and gas). Use of foam for heat transfer during isothermal gas expansion or compression offers a number of advantages over non-foam-based techniques such as droplet sprays. These advantages include the following: (1) For a given liquid-gas surface contact area (and corresponding heat-transfer rate), a foam may typically be generated using significantly less energy than a spray. (2) Anti-corrosive and/or other agents that may be advantageous to add to a heat-exchange liquid may have intrinsic surfactant (foaming) properties. Thus, multiple advantages, including foaming for heat transfer, may be achieved using a heat-exchange liquid containing only a few additives (or merely one). (3) Droplets tend to settle (rain out) of a gas rapidly, whereas foams may be relatively persistent, depending on the properties of the surfactants or other substances responsible for foaming behavior. Therefore, unlike droplets, foams may be injected into a gas either while the gas is undergoing expansion or compression within a cylinder chamber or prior to, and/or concurrently with, the transfer of the gas into the chamber. Foam generation may thus be located externally to the cylinder, as compared to, for example, placement of spray heads within the cylinder for generating a droplet spray. Location of foam generation outside the cylinder has several advantages, including increasing cylinder interior volume and relaxing size constraints on the foam generation mechanism. Locating foam generation outside the cylinder also enables continuous or episodic foam generation, not necessarily synchronized with the operation of the cylinder, whereas foam or spray generation inside the cylinder tends to be synchronized with the operation of the cylinder. A quantity of foaming liquid may be added to a quantity of gas either during or prior to admission of the gas into a cylinder chamber, substantially filling the cylinder chamber with foam. As the gas is expanded or compressed in the cylinder chamber, the foam is expanded or compressed correspondingly, continuing to substantially fill the cylinder chamber throughout the expansion or compression. Herein, we assume that foams persistent relative to cylinder stroke time are employed, i.e., foams that do not significantly drain over the time-scale on which expansions and compressions take place in a given system. Foam persistence throughout expansion or compression facilitates isothermality by enabling heat transfer between the gas and liquid phases to occur throughout expansion or compression. (4) In the experiments whose results are depicted in FIG. 17, only foam experiments achieve simultaneously high isothermal efficiency, low relative spray work, and low mass ratio: the spray droplet experiments with highest isothermal efficiency (approximately 0.935) have mass ratio above 10 (not shown on graph) and relative spray work between approximately 0.035-0.095, whereas many foam pre-spray experiments have comparable or higher isothermal efficiencies with relative spray work less than 0.035 and mass ratios of 3.6-5.5. In general, foam pre-spray achieves higher isothermal efficiency and lower relative spray work with lower mass ratio than do other methods examined in the series of experiments graphed in FIG. 17. Lower mass ratio is advantageous because for a given isothermal efficiency and given start pressure (in expansions) or end pressure (in compressions), in a cylinder of a given volume, a lower mass ratio allows more gas to be compressed or expanded in a single cycle than does a higher mass ratio, as there is less incompressible liquid and more gas in the cylinder chamber. Processing more gas per cylinder cycle raises overall system power density. An additional advantage of lower mass ratio arises as follows: during the injection of fluid into a cylinder chamber or during the expulsion of fluid from a cylinder chamber, pressure drops occur through valves, with attendant system inefficiency. For a given flow rate through a valve, pressure drop is approximately proportional to the mass density of the fluid passing through the valve. The average mass density of a foam is lower for a foam with lower mass ratio. Thus, throttling losses during the passage of foam into and out of a cylinder are lower for a foam with lower mass ratio.

Mass ratio remains approximately constant within a closed cylinder during expansion or compression of a foam. Bubbles in a foam tend to grow during expansion and shrink during compression, but the masses of the liquid and gas components generally remain fixed, apart from effects arising from the dissolving or coming out of solution of gas and vapor-liquid phase changes of the liquid component.

Figure 18:
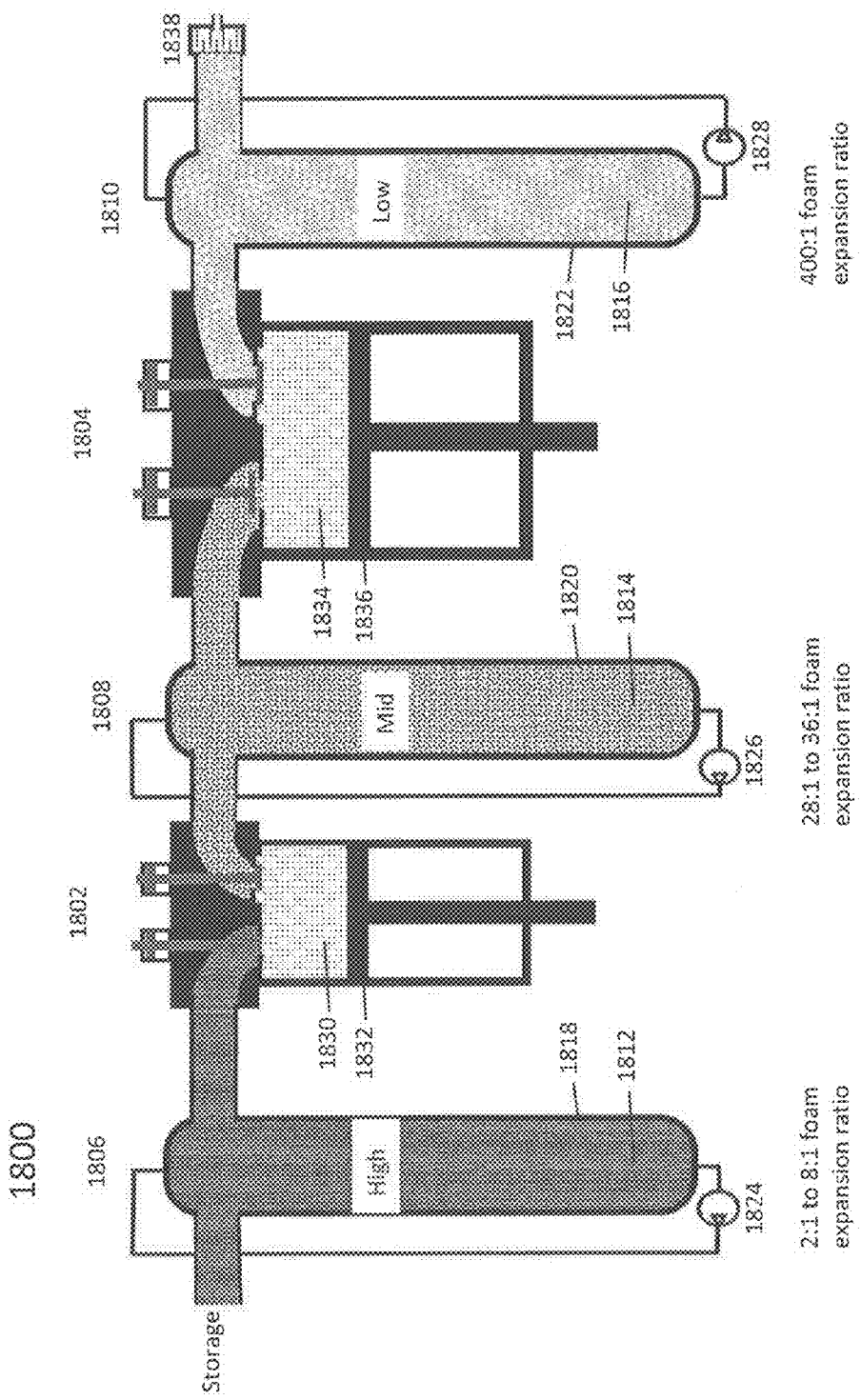
FIG. 18 is a schematic drawing of a cylinder assembly having two cylinders and apparatus for the generation and separation of foams having three different mass ratios in accordance with various embodiments of the invention.

FIG. 18 is a schematic drawing of a system 1800 that may be part of a larger system for energy storage and generation not otherwise depicted. System 1800 has two cylinders 1802 and 1804 and apparatuses 1806, 1808, 1810 for the generation and separation of foams 1812, 1814, 1816 having three different expansion ratios. Herein, the "expansion ratio" of a foam is the total volume of a given quantity of the foam divided by the volume of the liquid component of that volume of foam. For example, if 1 cubic meter of a foam contains 0.1 cubic meter of liquid, the expansion ratio of the foam is 10.0 (1 cubic meter divided by 0.1 cubic meter). Unlike mass ratio, expansion ratio does not tend to remain constant as a foam is expanded or compressed. Rather, expansion ratio tends to decrease as a foam is compressed and increase as it is expanded.

Each foam-generation apparatus 1806, 1808, 1810 features a foam vessel (1818, 1820, and 1822, respectively) and a recirculation pump (1824, 1826, and 1828, respectively). Cylinder 1802 operates in a range of relatively high pressures (e.g., between approximately 300 psig and approximately 3,000 psig), and cylinder 1804 operates in a range of relatively low pressures (e.g., between approximately 300 psig and approximately 0 psig). Each foam vessel 1818, 1820, 1822 may include or consist essentially of a separate pressure vessel (as depicted in FIG. 18), piping connected to a cylinder (or a portion thereof), and/or a manifold connected to a cylinder (or a portion thereof).

When system 1800 is operated as an expander, gas from storage (not shown) may be admitted to high-pressure foam vessel 1818 at high pressure. There the gas is combined with heat-exchange liquid to form an aqueous foam (or enhance an already present foam) having a desired mass ratio. Foam may accumulate in high-pressure foam vessel 1818 prior to transfer to cylinder 1802, be passed to high-pressure cylinder 1802 as it is generated, or both. A mechanism for combining gas with heat-exchange liquid to form an aqueous foam is not depicted in FIG. 18; illustrative mechanisms will be depicted in subsequent figures. Liquid accumulating in high-pressure foam vessel 1818 due to foam breakdown may be recirculated into vessel 1818 by the pump 1824. In other embodiments, pump 1824 may be reversed and air or less dense foam from nearer the top of vessel 1818 may be pumped into the bottom of vessel 1818 to regenerate foam (e.g., a sparging process). When system 1800 is operated as an expander, foam at high pressure from high-pressure vessel 1818 is admitted to the upper chamber 1830 of cylinder 1802. The foam expands in the chamber 1830, retaining a constant mass ratio but increasing its expansion ratio (e.g., by a factor between approximately 5 and approximately 15). After expansion of the gas in chamber 1830 to a mid-pressure (e.g., approximately 300 psig), the foam is pushed from chamber 1830 by a return stroke of the piston 1832. The foam exiting chamber 1830 passes into foam vessel 1820. In foam vessel 1820, the foam may be reconstituted by an appropriate mechanism such as one including recirculation pump 1826. The foam may accumulate in mid-pressure vessel 1820 prior to transfer to cylinder 1804, be passed to cylinder 1804 as it is generated/maintained, or both. The mid-pressure foam vessel 1820 contains and generates foam at the mid-pressure of system 1800 (e.g., approximately 300 psig).

Foam from mid-pressure foam vessel 1820 is admitted to the upper chamber 1834 of low-pressure cylinder 1804. The foam expands in the chamber 1834, retaining a constant mass ratio during expansion but increasing its expansion ratio (e.g., by a factor of approximately 10 to approximately 15). After expansion of the gas in chamber 1834 to low pressure (e.g., approximately 5 psig), the foam is pushed from chamber 1834 by a return stroke of the piston 1836. The foam exiting chamber 1830 passes into low-pressure foam vessel 1822. In low-pressure foam vessel 1822, the foam is separated into its liquid and gaseous components so that low-pressure gas may be exhausted through vent 1838 substantially without loss of heat-exchange liquid from the system 1800.

When system 1800 is operated as a compressor, gas from the environment may be admitted to low-pressure foam vessel 1822 at low pressure (e.g., atmospheric pressure). There the gas is combined with heat-exchange liquid to form an aqueous foam having a desired mass ratio. Foam may accumulate in the low-pressure foam vessel 1822 prior to transfer to cylinder 1804, be passed to low-pressure cylinder 1804 as it is generated, or both. Liquid accumulating in low-pressure foam vessel 1822 due to foam breakdown may be recirculated into vessel 1822 by the pump 1828. When system 1800 is operated as a compressor, foam at low pressure from vessel 1822 is admitted to the upper chamber 1834 of cylinder 1804. The foam is compressed in the chamber 1834, retaining a constant mass ratio but decreasing its expansion ratio. After compression of the gas in chamber 1834 to a mid-pressure (e.g., approximately 300 psig), the foam is exhausted from chamber 1834. The foam exiting chamber 1834 passes into mid-pressure foam vessel 1820. In foam vessel 1820, the foam may be reconstituted by an appropriate mechanism, e.g., one including recirculation pump 1826. The foam may accumulate in mid-pressure vessel 1820 prior to transfer to cylinder 1802, be passed to cylinder 1802 as it is generated/maintained, or both.

Foam from mid-pressure foam vessel 1820 is admitted to the upper chamber 1830 of high-pressure cylinder 1802. The foam is compressed in the chamber 1830, retaining a constant mass ratio during compression but decreasing its expansion ratio. During or after compression of the gas in chamber 1830 to high pressure (e.g., approximately 3,000 psig), the foam exits chamber 1830 and passes into high-pressure storage (not shown in FIG. 18) via high-pressure foam vessel 1818. In high-pressure foam vessel 1818, the foam may be separated into its liquid and gaseous components so that high-pressure gas may be transferred to high-pressure storage substantially without loss of heat-exchange liquid from the system 1800.

Alternatively or in conjunction, foam may be passed to high-pressure storage from vessel 1818 and there stored as an aqueous foam, separated into its liquid and gas components, or under a partial such separation.

The cylinders 1802, 1804 and the foam-generation apparatuses 1806, 1808, 1810 may circulate fluid through heat-exchange subsystems, not depicted in FIG. 18, and/or may communicate with a single or multiple thermal wells, not depicted in FIG. 18.

Figure 19:
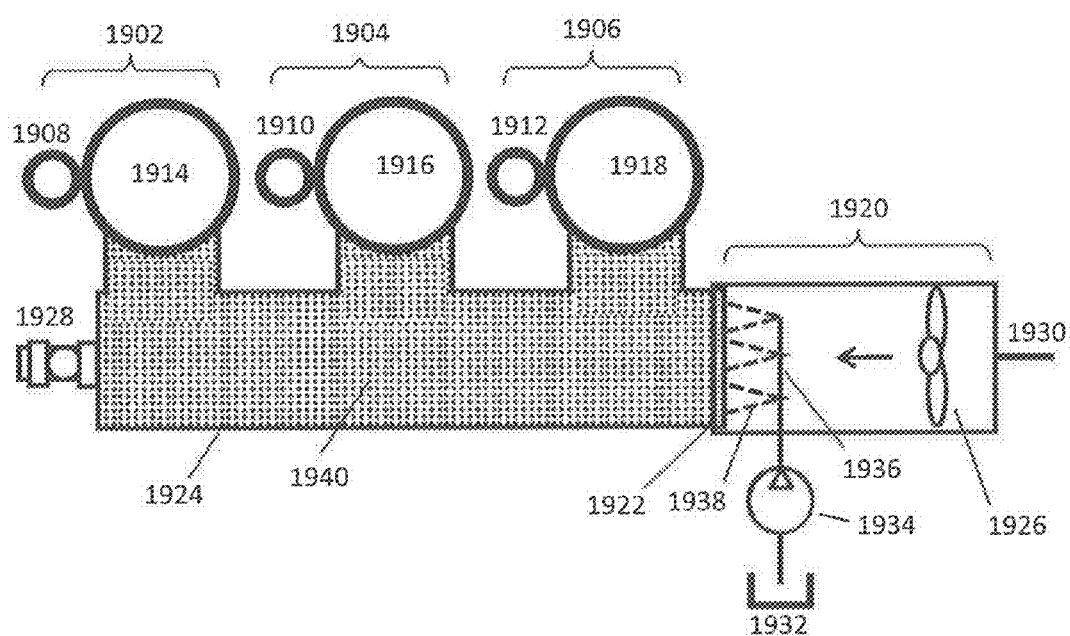
FIG. 19 is a schematic drawing of an apparatus for the generation of foam having a relatively low mass ratio in accordance with various embodiments of the invention.

FIG. 19 is a schematic drawing of an illustrative system 1900 that includes an apparatus for the generation of foam at low pressure (e.g., approximately atmospheric pressure) having a high expansion ratio (e.g., 400:1) corresponding to a moderate liquid-to-air mass ratio (e.g., 2:1). System 1900 includes three two-cylinder subsystems (1902, 1904, 1906), depicted in cross-section as viewed from above in a vertically oriented cylinder arrangement, for the isothermal expansion and compression of gas. The depiction in the illustrative system 1900 of three two-cylinder subsystems is illustrative: other numbers of subsystems, where each subsystem includes one, three, or more cylinders, are also contemplated and within the scope of the invention. Each of the two-cylinder systems 1902, 1904, and 1906 includes or consists essentially of a high-pressure cylinder (1908, 1910, and 1912, respectively) and a low-pressure cylinder (1914, 1916, and 1918, respectively). The apparatus for the generation of foam may include or consist essentially of a spray chamber 1920, a screen 1922, a manifold 1924 that conducts foam (typically represented in FIG. 19 and elsewhere herein by stippling) to the low-pressure cylinders 1914, 1916, and 1918, a fan 1926, and an optional vent and ball valve 1928 whose function shall be described below. During the generation of foam in the apparatus, air at low (e.g., approximately atmospheric) pressure is admitted to the spray chamber 1920 through an inlet 1930. The air is accelerated toward the screen 1922 by the fan 1926 (or other suitable mechanism). Fluid from a reservoir 1932, foam vessel, or other source is pumped by a pump 1934 to one or more spray heads 1936 (or other suitable dispersal mechanisms), which are placed in the flow of gas accelerated by the fan 1930. The spray 1938 from the spray heads 1936 is directed toward the screen 1922 (e.g., metal mesh, netting, solid foam material). Passing through the screen 1922, the air and spray 1938 combine to form an aqueous foam 1940. The foam 1940 may be directed via suitable valves and pipes (not depicted) into chambers of the low-pressure cylinders 1914, 1916, and 1918.

In a start-up mode of operation where the manifold 1924 initially contains no foam, gas may be directed out the valve 1928 (rather than into the low-pressure cylinders 1914, 1916, and 1918) during generation of foam until the manifold 1924 is substantially or entirely filled with foam 1940, whereupon the valve 1928 may be closed and the foam 1940 may be directed into the low-pressure cylinders 1914, 1916, and 1918. Valve 1928, in various embodiments, may be connected to a vent (not shown), have connections that allow any liquid intake to return to the fluid reservoir 1932, and/or may be connected back to the inlet 1930.

The generation capacity of the foam generation apparatus (including spray chamber 1920, screen 1922, and manifold 1924) depicted in FIG. 19 may be sized to correspond to an average foam intake flow for the cylinder or cylinders to which the apparatus supplies foam, or to a peak foam intake flow. Herein, the generation capacity of a foam generator is the volume of foam that it can produce per unit time ($m^3$/sec). Rapid foam flow from a reservoir or pre-generated body of foam may entail shear forces that break down the flowing foam, partly or wholly; generating foam at a sufficient rate may mitigate such shear forces. Other foam generators, both those depicted herein and in embodiments not depicted herein, may also be sized in order to accommodate peak flow rates and mitigate separation of foams due to shear forces.

Figure 20:
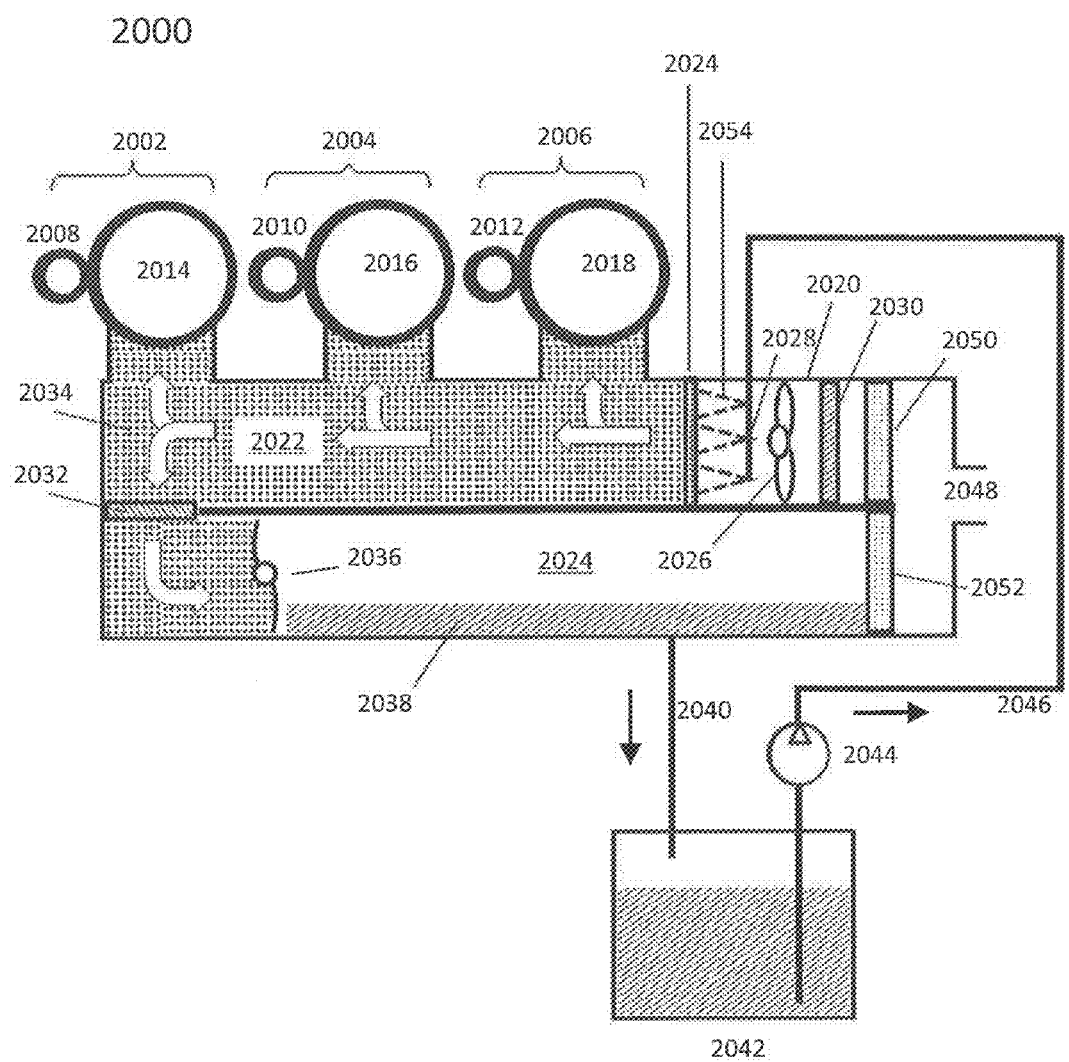
FIG. 20 is a schematic drawing of an apparatus for the generation and separation of foam having a relatively high mass ratio in accordance with various embodiments of the invention.

FIG. 20 is a schematic drawing of an illustrative system 2000 that features an apparatus for the generation and separation of aqueous foam at low pressure (e.g., approximately atmospheric pressure) having a high expansion ratio (e.g., 400:1) corresponding to a moderate liquid-to-air mass ratio (e.g., 2:1). System 2000 includes three two-cylinder subsystems (2002, 2004, 2006), depicted in cross-section as viewed from above in a vertically oriented cylinder arrangement, for the isothermal expansion and compression of gas. The depiction in the illustrative system 2000 of three two-cylinder subsystems is illustrative: other numbers of subsystems, where each subsystem includes one, three, or more cylinders, are also contemplated and within the scope of the invention.

Each of the two-cylinder systems 2002, 2004, and 2006 includes a high-pressure cylinder (2008, 2010, and 2012, respectively) and a low-pressure cylinder (2014, 2016, and 2018, respectively). The apparatus for the generation of foam includes three chambers: a spray chamber 2020; a manifold 2022 that conducts foam to the low-pressure cylinders 2014, 2016, and 2018; and a separation chamber 2024. The spray chamber 2020 is divided from the manifold 2022 by a screen 2024 and may contain a fan 2026, one or more spray heads 2028, and a louver or flap 2030 capable of either blocking or allowing the passage of gas into the spray chamber 2020. Louvre 2030 may act as an air check valve, preventing backflow in the opposite direction of the arrows shown on manifold 2022. The manifold 2022 is separated from the separation chamber 2024 by a louver or flap 2032 capable of either blocking or allowing the passage of gas and/or foam 2034 from the manifold 2022 into the separation chamber 2024. The separation chamber 2024 contains a foam breakup mechanism 2036 that separates foam 2034 into a gas component and a liquid component 2038. In FIG. 20, the foam breakup mechanism 2036 is a rotating whisk; other methods and mechanisms for the breakup of foam (e.g., other forms of mechanical agitation, screens, filters, ultrasound) are contemplated and within the scope of the invention. The liquid 2038 within the separation chamber 2024 is conveyed by piping 2040 to a reservoir 2042, from whence it may be pumped by a pump 2044 through piping 2046 to the spray heads 2028 for recycling into fresh foam 2034. An atmospheric vent or opening 2048 permits ingress of low-pressure gas into the spray chamber 2020 during generation of foam 2034 and egress of low-pressure gas from the separation chamber 2024 during the breakup of foam 2034. During ingress of gas into the spray chamber 2020, an optional cleaning filter 2050 prevents the admission into the spray chamber 2020 of particulates and/or other contaminants in the atmospheric air. During egress of gas from the separation chamber 2024, an optional coalescing filter 2052 removes remaining liquid from foam, water droplets, and vapor, assuring that nearly no liquid will be passed to the vent 2048. In various other embodiments, separate vents may be provided for ingress of gas into and egress of gas out of the system 2000. Also in various other embodiments, the filters 2050, 2052 may be located outside the apparatus depicted in FIG. 20 (e.g., in pipes leading to the separate vents provided in various other embodiments).

During operation of system 2000 as a compressor (e.g., to store energy as the pressure potential energy of compressed air), air is admitted through vent 2048, passes through a filter 2050, and is accelerated by fan 2026 toward the spray heads 2028 and the screen 2024. Liquid is pumped through the spray heads 2028. (Optionally, fan 2026 may be omitted and air flow may be generated via cylinder piston motion.) Spray 2054 mingled with air strikes the screen 2024. A foam 2034 having a relatively high expansion ratio is generated by the passage of mingled air and liquid through the screen 2024. The manifold 2022 conducts the foam 2034 to the low-pressure cylinders 2014, 2016, and 2018, into which the foam 2034 is admitted by appropriate valves (not depicted in FIG. 20). The foam 2034 inside the low-pressure cylinders 2014, 2016, and 2018 is then compressed to a mid-pressure (e.g., approximately 300 psig), after which the foam is transferred to the high-pressure cylinders 2008, 2010, and 2012 and possibly to, or through, other apparatus not depicted in FIG. 20. Additionally, the amount of foam flow generated by fan 2026, spray 2054, and screen 2024 may exceed the required flow rate of the cylinders 2014, 2016, and 2018 (e.g., by sizing the flow rate to the peak required intake flow of the cylinders) such that excess foam may be generated. This excess foam may be recycled by running through louver 2032, foam breakdown mechanism 2036, and separation chamber 2024.

During operation of system 2000 as an expander (e.g., to generate energy from the pressure potential energy of compressed air), louver 2030 will typically be closed to prevent backflow through the foam generation equipment 2024, 2028, 2026. After expansion of air in the cylinder pairs 2002, 2004, and 2006, foam 2034 at low pressure (e.g., approximately 5 psig for an instant and then approximately atmospheric thereafter) exits the low-pressure cylinders 2014, 2016, and 2018, passes through the manifold 2022, and enters the separation chamber 2024. In the separation chamber 2024, the low-pressure foam 2034 encounters the foam breakdown mechanism 2036 and is separated into its gas and liquid 2038 components. This separation may not be complete, but at minimum the foam expansion ratio will be drastically reduced (e.g., from a 400:1 expansion ratio foam to a 2:1 expansion ratio foam and air). The liquid 2038 (or low expansion-ratio foam) is conveyed to the reservoir 2042 and the gas component passes through coalescing filter 2052 and is vented through vent 2048.

Figure 21:
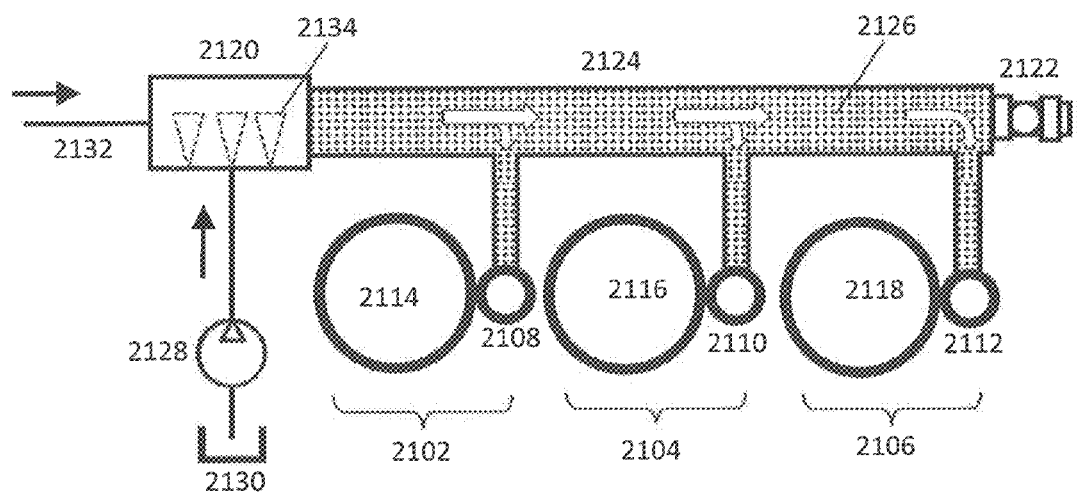
FIG. 21 is a schematic drawing of an apparatus for the generation of foam having a relatively low mass ratio in accordance with various embodiments of the invention.

FIG. 21 is a schematic drawing of an illustrative system 2100 featuring an apparatus for the generation of foam at high pressure (e.g., 750 to 3,000 psig) having a low expansion ratio (e.g., 8:1 to 2:1) corresponding to a moderate liquid-to-air mass ratio (e.g., 2:1). System 2100 includes three two-cylinder subsystems (2102, 2104, 2106), depicted in cross-section as viewed from above in a vertically oriented cylinder arrangement, for the isothermal expansion and compression of gas. The depiction in the illustrative system 2100 of three two-cylinder subsystems is illustrative: other numbers of subsystems, where each subsystem includes one, three, or more cylinders, are also contemplated and within the scope of the invention. Each of the two-cylinder systems 2102, 2104, and 2106 includes a high-pressure cylinder (2108, 2110, and 2112, respectively) and a low-pressure cylinder (2114, 2116, and 2118, respectively). The apparatus for the generation of foam includes or consists essentially of a spray chamber 2120, an optional vent and ball valve 2122, and a manifold 2124 that conducts aqueous foam 2126 to the high-pressure cylinders 2108, 2110, and 2112. A pump 2128 pumps liquid (or optionally air or liquid and air) from a reservoir or other source 2130 to one or more spray heads or other suitable dispersal mechanisms (not depicted) in the spray chamber 2120. Air at high pressure is conducted to the spray chamber 2120 by piping 2132. The passage of high-pressure air through the spray chamber mingles the air with the spray 2134, forming foam 2126. Foam generation at high pressure and low expansion ratio is robust and the foam may be generated with or without (i) the use of a screen (such as screen 1224 shown in FIG. 12) and/or (ii) the forced flow of air (e.g., foam may be generated in the absence of cylinder 2108, 2110, 2112 piston movement and/or a fan). Spray 2134 may be all liquid, all air, or a mixture of liquid and air and may be sprayed horizontally, vertically upward, vertically downward, or according to other arrangements within the spray chamber 2120. In other embodiments, the high-pressure and low expansion-ratio foam may be generated by mechanical agitation of the liquid and air, such as through the use of a rotating impeller embedded in spray chamber 2120. The foam 2126 may be directed via suitable valves and pipes (not depicted) into chambers of the high-pressure cylinders 2108, 2110, and 2112. Reservoir 2130 may be the same apparatus as the source for high-pressure air (at piping 2132), perhaps separated only by location of the piping (e.g., 2132 is connected to the top of a storage reservoir and 2130 is at the bottom of the reservoir such that mostly high-pressure air is directed through 2132 and mostly high-pressure liquid is directed through pump 2128). The fluid flowing through 2132 may be mostly foam and chamber 2120 may act only to refresh, homogenize, change the expansion ratio of, or otherwise refine the aqueous foam.

In a start-up mode of operation where the manifold 2124 initially contains no foam, gas may be directed out the valve 2122 (rather than into the high-pressure cylinders 2108, 2110, and 2112) during generation of foam until the manifold 2124 is substantially or entirely filled with foam 2126, whereupon the valve 2122 may be closed and the foam 2126 may be directed into the high-pressure cylinders 2108, 2110, and 2112. The high-pressure gas or foam directed out of the valve 2122 may be recirculated back into storage reservoir 2130, into pipe 2132, spray chamber 2120, or otherwise recycled. A pump (not shown) may be used to draw fluid from pipe 2132 through valve 2122 and then return the fluid to reservoir 2130, pipe 2132, or spray chamber 2120 in a recycling loop.

Figure 22:
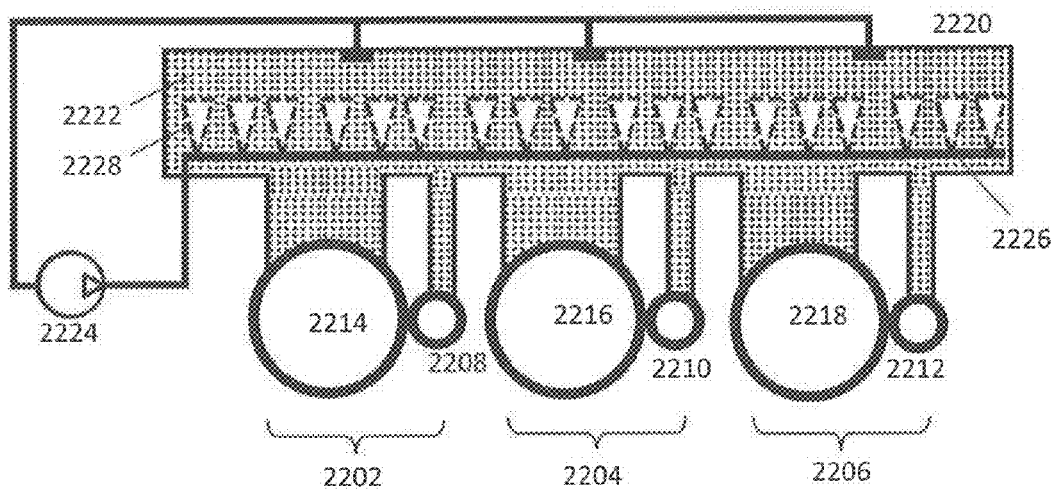
FIG. 22 is a schematic drawing of an apparatus for the generation of foam having an intermediate mass ratio in accordance with various embodiments of the invention.

FIG. 22 is a schematic drawing of an illustrative system 2200 featuring an apparatus for the generation of foam at mid pressure (e.g., 200 to 300 psig) having a medium expansion ratio (e.g., 36:1 to 28:1) corresponding to a moderate liquid-to-air mass ratio (e.g., 2:1). System 2200 includes three two-cylinder subsystems (2202, 2204, 2206), depicted in cross-section as viewed from above in a vertically oriented cylinder arrangement, for the isothermal expansion and compression of gas. The depiction in the illustrative system 2200 of three two-cylinder subsystems is illustrative: other numbers of subsystems, where each subsystem includes one, three, or more cylinders, are also contemplated and within the scope of the invention. Each of the two-cylinder systems 2202, 2204, and 2206 includes a high-pressure cylinder (2208, 2210, and 2212, respectively) and a low-pressure cylinder (2214, 2216, and 2218, respectively). The apparatus for the generation of foam includes or consists essentially of a combined spray chamber and manifold 2220 in which foam 2222 is generated or regenerated and which conducts foam 2222 from the high-pressure cylinders 2208, 2210, and 2212 to the low-pressure cylinders 2214, 2216, 2218 (during expansion) or from the low-pressure cylinders 2214, 2216, 2218 to the high-pressure cylinders 2208, 2210, and 2212 (during compression).

During expansion or compression, foam having an intermediate expansion ratio at intermediate pressure enters the chamber/manifold 2220. A pump 2224 draws fluid (e.g., air, foam, or liquid separated from foam in chamber/manifold 2220) and injects the fluid back into chamber/manifold 2220 through nozzles or heads 2226 (or other suitable dispersal mechanisms). The injected fluid 2228 takes up residence in the chamber/manifold 2220 in the form of a sufficiently stable aqueous foam 2222 that may be directed via suitable valves and pipes (not depicted) into chambers of either the high-pressure cylinders 2208, 2210, and 2212 or the low-pressure cylinders 2214, 2216, 2218. Additional components, not shown, may be used to aid in the generation of foam, such as screens, meshes, or solid foams.

Figure 23:
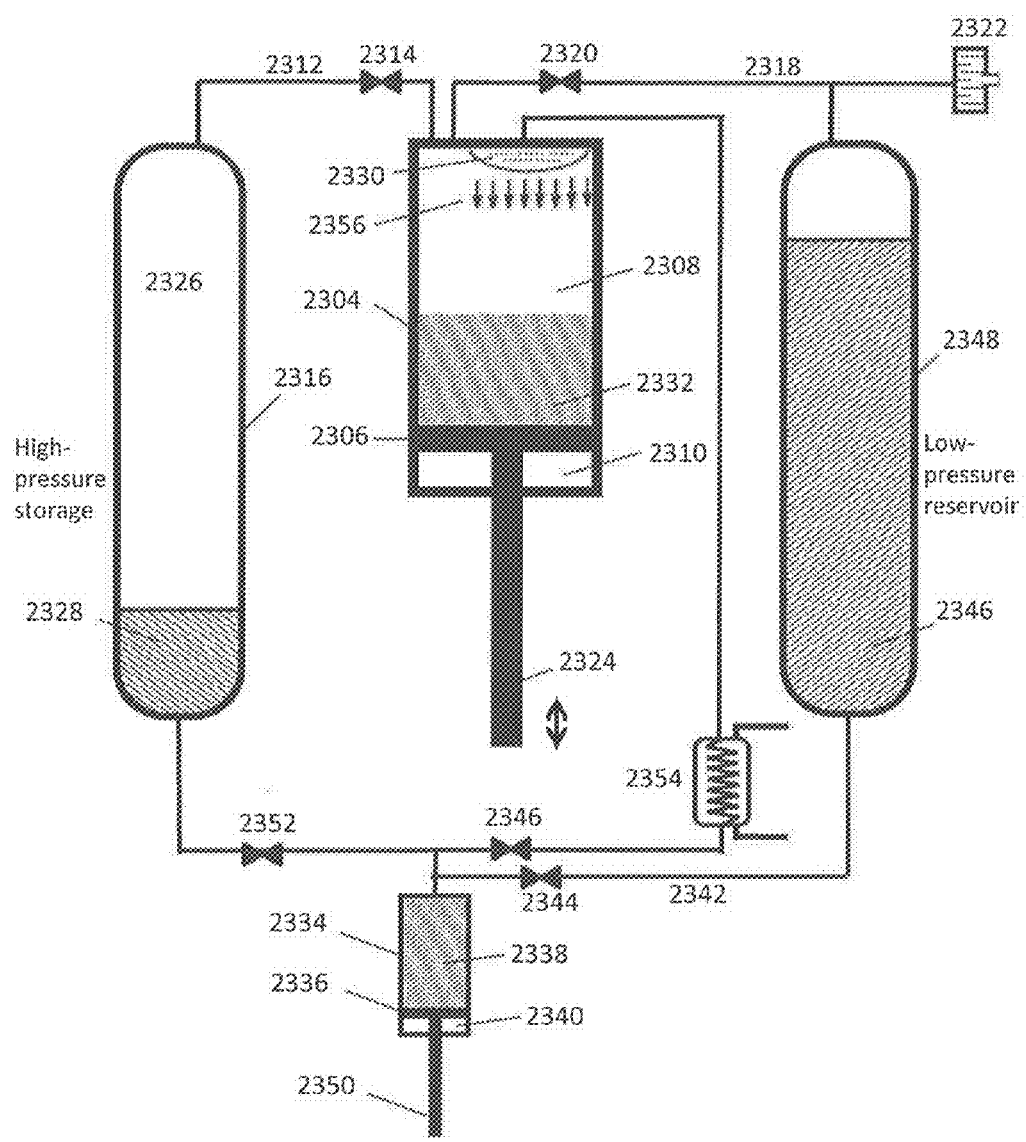
FIG. 23 is a schematic drawing of various components of a compressed-gas energy storage system in accordance with various embodiments of the invention.

Various embodiments employ efficient pumping schemes for the circulation of foam or of heat-exchange liquid that may be foamed. FIG. 23 depicts an illustrative system 2300 that compresses or expands gas. The system 2300 employs a pneumatic cylinder 2304 that contains a slidably disposed piston 2306 that divides the interior of the cylinder 2304 into a distal chamber 2308 and a proximal chamber 2310. A port or ports (not shown) with associated pipes 2312 and a bidirectional valve 2314 enables gas from a high-pressure storage reservoir 2316 to be exchanged with chamber 2308 as desired. The high-pressure storage reservoir may act as a separator, in which the liquid component of a foam may be separated from the gas component of the foam. In an alternative embodiment, a distinct separator (not shown) component may be employed to separate liquid and gas, and may contain elements to facilitate separation and foam breakdown including baffles, mechanical shear elements, meshes, ultrasonic shear elements, and/or other such elements. A port or ports (not shown) in the end-cap of the air chamber of the cylinder 2304, with associated pipe 2318 and a bidirectional valve 2320, enables fluid from the chamber 2308 to be admitted from or exhausted to the ambient atmosphere as desired through a vent 2322. In alternate embodiments, not shown, vent 2322 is replaced by one or more additional pneumatic cylinders. A port or ports, not shown, enables the interior of the lower chamber 2310 of the pneumatic cylinder 2304 to communicate freely at all times with the ambient atmosphere. In alternate embodiments, cylinder 2304 is double-acting and chamber 2310 is, like chamber 2308, equipped to exchange, in various states of operation, fluids with either high- or low-pressure reservoirs and/or additional cylinders.

The distal end (i.e., upper end, for the illustrative vertical orientation of cylinder 2304 in FIG. 23) of a rod 2324 is coupled to the piston 2306. The proximal (lower) end of rod 2324 may be connected to some mechanism, such as one or more hydraulic cylinders or a crankshaft (not shown), for interconverting linear mechanical power and rotary mechanical power.

In an energy-recovery or expansion mode of operation, storage reservoir 2316 is filled with high-pressure fluid 2326 and a quantity of heat-transfer fluid 2328. The fluid 2326 may consist essentially or primarily either of gas or of foam. The heat-exchange fluid 2328 may be a liquid that tends to foam when sprayed or acted upon in some other manner. The accumulation of heat-exchange fluid 2328 depicted at the bottom of vessel 2316 may consist essentially or primarily either of liquid or of foam. A quantity of gas may begin to be introduced via valve 2314 and pipe 2312 into the upper chamber 2308 of cylinder 2304 when piston 2306 is near or at the top of its stroke (i.e., "top dead center" of cylinder 2304). The piston 2306 and its rod 2324 will then be moving downward (the cylinder 2304 may be oriented arbitrarily but is shown vertically oriented in this illustrative embodiment). Heat-exchange fluid 2328 may be injected into chamber 2308 via one or more spray heads 2330. The spray-head 2330 depicted in FIG. 23 is illustrative only; other devices (e.g., one or more nozzles or a rotating blade) may be used to introduce heat-exchange fluid into the air chamber 2308. In the illustrative embodiment of FIG. 23, foam can be generated or regenerated within cylinder 2304 by injection of fluid through a mechanism (e.g., the spray head 2330); in various other embodiments, foam is generated externally to cylinder 2304 (by a mechanism not depicted in FIG. 23). Heat-exchange fluid (liquid or foam) may partially or entirely fill the chamber 2308. An accumulation of fluid 2332 (liquid or foam) may occur on the upper surface of the piston 2306.

The system 2300 is instrumented with pressure, piston position, and/or temperature sensors (not shown) and controlled via a control system (not shown). The system 2300 also features a pump cylinder 2334 for supply of pressurized heat-exchange fluid to the spray head 2330. The pump cylinder 2334 contains a slidably disposed piston 2336 that divides the interior of the cylinder 2334 into an upper chamber 2338 and a lower chamber 2340. Heat-exchange fluid may partially or entirely fill the upper chamber 2338 of the pump cylinder 2334. A port or ports (not shown), with associated pipe 2342 and a bidirectional valve 2344, enables fluid 2346 from a low-pressure reservoir 2348 to be exchanged with chamber 2338 as desired. The reservoir may act as a foam reservoir and/or as separator that divides the liquid component of a foam from the gas component of the foam. A port or ports, not shown, enables the interior of the lower chamber 2340 of the pump cylinder 2334 to communicate freely at all times with the ambient atmosphere. The piston 2336 is coupled to a rod 2350. The rod 2324 of the pneumatic cylinder 2304 and the rod 2350 of the pump cylinder 2334 may be joined to a single mechanical device (not shown), e.g. a crankshaft, which maintains them in a fixed phase relationship (e.g., rod 2350 may reach its maximum upward displacement whenever rod 2324 reaches its maximum downward displacement). The pump cylinder 2334 may be oriented arbitrarily but is shown vertically oriented in this illustrative embodiment.

Heat-exchange fluid 2346 in the low-pressure reservoir 2348 is mixable and/or exchangeable with heat-exchange fluid 2328 in the high-pressure store 2316, the accumulation of fluid 2332 in the pneumatic cylinder 2304, and the fluid within the upper chamber 2338 of the pump cylinder 2334. That is, all these bodies of fluid are labeled separately for clarity in FIG. 23, but in the course of operation of the system 2300 may be mingled and exchanged with each other as well as with any heat-exchange fluid present in pipes, valves, and other components of the system 2300. Preferably, the accumulations 2328, 2346 of heat-exchange fluid in the two reservoirs 2316, 2348 in FIG. 23 include or consist essentially of un-foamed (but foamable) heat-exchange liquid.

Two methods of operation of the system 2300, namely the "open-loop method" and the "closed-loop method," are described hereinbelow. The two methods described herein are illustrative, not exhaustive, of the methods according to which system 2300 may be operated. Also, the relative timing or phasing of various steps in these two methods of operation as described herein are illustrative: other patterns of relative timing or phasing are contemplated and within the scope of the invention.

Each of these two methods of operation of system 2300 described herein (i.e., closed-loop method and open-loop method) has a compression mode, in which gas is compressed in order to store energy, and an expansion mode, in which gas is expanded to release energy.

Open-loop Method of Operation: Compression Mode

In an initial state of one mode of operation of the system 2300, herein termed the "open-loop compression" method of operation, piston 2306 is at top dead center of pneumatic cylinder 2304 and piston 2336 is top dead center of pump cylinder 2334. Valves 2314, 2346, and 2352 are closed and valves 2320 and 2344 are open. Piston 2306 and piston 2336 move downward, admitting a quantity of low-pressure gas into chamber 2308 of the pneumatic cylinder 2304 and a quantity of heat-exchange fluid 2346 (preferably liquid) from low-pressure reservoir 2348 into chamber 2338 of the pump cylinder 2334. Downward motion of the piston 2306 to its nethermost limit of motion (i.e., "bottom dead center" position), with filling of chamber 2308 with gas, constitutes an "intake stroke" of cylinder 2304. Downward motion of the piston 2336 to its nethermost limit of motion (i.e., "bottom dead center" position), with filling of chamber 2338 with heat-exchange fluid, constitutes an "intake stroke" of the pump cylinder 2334.

Valves 2320 and 2344 may then be closed and valve 2346 opened, and the pistons 2306 and 2336 may begin upward strokes in their respective cylinders. The upward motion of piston 2306 tends to compress the fluid within chamber 2308 of the pneumatic cylinder 2304, and the upward motion of piston 2336 tends to expel fluid from chamber 2338 of the pump cylinder 2334. Fluid expelled from chamber 2338 of the pump cylinder 2334 passes through valve 2346 and an optional heat exchanger 2354 that may alter the temperature of the fluid. The fluid then passes into chamber 2308 of cylinder 2304 through the spray head 2330, forming a spray 2356. The fluid 2356 either enters the chamber 2308 as a foam or forms a foam by mingling with the gas within chamber 2308. The fluid 2356 may partially or entirely fill chamber 2308 and may form an accumulation of fluid 2332 atop piston 2306. The accumulation of fluid 2332 may include or consist essentially of foam or of liquid separated from foam within chamber 2308.

At a predetermined point in the upward (compression) stroke of piston 2306, valve 2314 may be opened, allowing pressurized fluid, possibly including heat-exchange fluid 2332 (e.g., as the liquid component of a foam), to flow through piping 2312 into the high-pressure store 2316. Heat-exchange fluid 2332 expelled from chamber 2308 by piston 2306 may form or add to the accumulation of fluid 2328 within the high-pressure store 2316. The accumulation of fluid 2328 may include or consist essentially of heat-exchange liquid separated from foam in reservoir 2316.

Upward motion of the piston 2306 to its limit of motion (top dead center), with expulsion of pressurized gas and fluid into store 2316, constitutes a "compression stroke" of pneumatic cylinder 2304. A complete compression stroke in the open-loop method of operation of system 2300 entails one-way or "open-loop" passage of heat-exchange fluid (preferably liquid) 2346 out of the low-pressure reservoir 2348, through chamber 2338 of the pump cylinder 2334, through the optional heat exchanger 2354, into chamber 2308 of the pneumatic cylinder 2304, and into the high-pressure store 2316, successively. During one or more successive cycles of system 2300 in open-loop compression mode as described hereinabove, heat-exchange liquid 2328 may accumulate in the high-pressure store 2316.

The sequence of operations described above for the compression mode of the closed-loop method of operation is illustrative, and may be varied in this and other embodiments. Sequences of operations described for other modes and methods of operation below are also illustrative and might be varied in other embodiments.

Open-loop Method of Operation: Expansion Mode

In an initial state of another mode of operation of the system 2300, herein termed the "open-loop expansion" mode of operation, piston 2306 is at top dead center of pneumatic cylinder 2304 and piston 2336 is at bottom dead center of pump cylinder 2334. Chamber 2338 of pump cylinder 2334 is filled with heat-exchange fluid (preferably liquid). Valves 2320, 2344, and 2352 are closed and valves 2314 and 2346 are open. Piston 2306 moves downward, admitting a quantity of high-pressure gas into chamber 2308 of the pneumatic cylinder 2304. Simultaneously, piston 2336 of the pump cylinder 2334 moves upward. Heat-exchange fluid from chamber 2338 passes through valve 2346, optional heat exchanger 2354, and spray head 2330 to enter chamber 2308 of the pneumatic cylinder. At some subsequent, predetermined point, valve 2314 may be closed while piston 2306 continues its downward motion and piston 2336 continues its upward motion.

The motion of piston 2306 from top dead center to bottom dead center of pneumatic cylinder 2304 during and after the introduction into chamber 2308 of high-pressure gas (or foam) from store 2316 is herein termed an "expansion stroke" of pneumatic cylinder 2304. The motion of piston 2336 from bottom dead center to top dead center of pump cylinder 2334 is herein termed a "pumping stroke" of pump cylinder 2334. The expansion stroke of pneumatic cylinder 2304 and the pumping stroke of pump cylinder 2334, as well as other cylinder strokes of this and other embodiments described herein, may be of equal duration and may begin and end simultaneously, or they may be of different durations and may not begin or end simultaneously.

Subsequent to the completion of the expansion stroke and pumping stroke, valves 2314 and 2346 may be closed and valves 2320 and 2352 opened. Piston 2306 of the pneumatic cylinder then moves from bottom dead center to top dead center while the fluid within chamber 2308 is expelled. Preferably, the expelled fluid includes or consists essentially of foam and enters vessel 2348, where it is separated into its gas and liquid components so that its gas component may be exhausted through vent 2322 and its liquid component 2332 may accumulate as liquid 2346 in the low-pressure reservoir 2348. Upward motion of the piston 2306 from bottom dead center to top dead center with expulsion of low-pressure gas and liquid from chamber 2308 constitutes an "exhaust stroke" of cylinder 2304. Concurrently, cylinder 2334 performs an intake stroke, i.e., piston 2336 moves from top dead center to bottom dead center and chamber 2336 fills with heat-exchange fluid (preferably liquid) 2328 from the high-pressure store 2316.

An expansion stroke of cylinder 2304 in the open-loop method of operation of system 2300 entails one-way or "open-loop" passage of heat-exchange fluid 2328 out of the high-pressure store 2316, through chamber 2338 of the pump cylinder 2334, through the optional heat exchanger 2354, into chamber 2308 of the pneumatic cylinder 2304, and into the low-pressure reservoir 2348, successively. During one or more successive cycles of system 2300 in open-loop expansion mode, heat-exchange fluid 2328 is removed from the high-pressure store 2316 and accumulates as liquid 2346 in the low-pressure reservoir 2348. A period of operation of system 2300 in open-loop compression mode will tend to cause an accumulation 2328 of heat-exchange liquid in the high-pressure store 2316; a subsequent period of operation of system 2300 in open-loop expansion mode will tend to remove the accumulation 2328 of heat-exchange liquid from the high-pressure store 2316 and return it to the low-pressure reservoir 2348.

Closed-loop Method of Operation: Compression Mode

In an initial state of another mode of operation of the system 2300, herein termed the "closed-loop compression" method of operation, piston 2306 is at top dead center of pneumatic cylinder 2304 and piston 2336 is top dead center of pump cylinder 2334. Valves 2314, 2344, and 2346 are closed, and valves 2320 and 2352 are open. Piston 2306 and piston 2336 move downward, admitting a quantity of low-pressure fluid (gas or foam) into chamber 2308 of the pneumatic cylinder 2304 and a quantity of heat-exchange fluid (preferably liquid) 2328 from high-pressure store 2316 into chamber 2338 of the pump cylinder 2334. Pneumatic cylinder 2304 performs an intake stroke and pump cylinder 2334 performs an intake stroke.

Valves 2320 and 2352 may then be closed and valve 2346 opened, and the pistons 2306 and 2336 may begin upward strokes in their respective cylinders. The upward motion of piston 2306 tends to compress the fluid within chamber 2308 of the pneumatic cylinder 2304, and the upward motion of piston 2336 tends to expel fluid from chamber 2338 of the pump cylinder 2334. Fluid expelled from chamber 2338 of the pump cylinder 2334 passes through valve 2346 and an optional heat exchanger 2354 that may alter the temperature of the fluid. The fluid then passes into chamber 2308 of cylinder 2304 through spray head 2330. The fluid may partially or entirely fill chamber 2308 with foam. An accumulation 2332 of fluid may form on top of piston 2306. At a predetermined point in the upward (compression) stroke of piston 2306, valve 2314 may be opened, allowing pressurized gas and/or foam to flow through piping 2312 into the high-pressure store 2316. Heat-exchange fluid 2332 expelled from chamber 2308 by piston 2306 may form an accumulation of fluid 2328 within the high-pressure store 2316. The accumulation of fluid 2328 may include or consist essentially of foam or of liquid separated from foam within reservoir 2316.

Upward motion of the piston 2306 to its limit of motion (top dead center), with expulsion of pressurized fluid into store 2316, constitutes a "compression stroke" of pneumatic cylinder 2304. A compression stroke in the closed-loop method of operation of system 2300 entails cyclic or closed-loop passage of heat-exchange fluid (preferably liquid) 2328 out of chamber 2308 of the pneumatic cylinder 2304, into the high-pressure store 2316, into chamber 2338 of the pump cylinder 2334, through the optional heat exchanger 2354, and into chamber 2308 of the pneumatic cylinder 2304 successively.

Closed-loop Method of Operation: Expansion Mode

In an initial state of another mode of operation of the system 2300, herein termed the "closed-loop expansion" mode of operation, piston 2306 is at top dead center of pneumatic cylinder 2304 and piston 2336 is at bottom dead center of pump cylinder 2334. Chamber 2338 of pump cylinder 2334 is filled with heat-exchange fluid. Valves 2320, 2344, and 2352 are closed and valves 2314 and 2346 are open. Piston 2306 moves downward, admitting a quantity of high-pressure gas (or foam) into chamber 2308 of the pneumatic cylinder. Simultaneously, piston 2336 moves upward. Heat-exchange fluid (preferably liquid) from chamber 2338 passes through valve 2346, optional heat exchanger 2354, and spray head 2330 to enter chamber 2308 of the pneumatic cylinder. At some subsequent, predetermined point, valve 2314 may be closed while piston 2306 continues its downward motion and piston 2336 continues its upward motion. Pneumatic cylinder 2304 performs an expansion stroke and pump cylinder 2334 performs a pumping stroke.

Subsequent to the completion of the expansion stroke of cylinder 2304 and the pumping stroke of pump cylinder 2334, valves 2314 and 2346 may be closed and valves 2320 and 2352 opened. Piston 2306 of the pneumatic cylinder 2304 then moves from bottom dead center to top dead center while the low-pressure fluid within chamber 2308 is expelled through pipe 2318. Preferably, the expelled fluid includes or consists essentially of foam and enters vessel 2348, where it is separated into its gas and liquid components so that its gas component may be exhausted through vent 2322 and its liquid component 2332 may accumulate as liquid 2346 in the low-pressure reservoir 2348. Pneumatic cylinder 2304 performs an exhaust stroke. Simultaneously, the pump cylinder 2334 performs an intake stroke.

An expansion stroke in the closed-loop method of operation of system 2300 entails cyclic or "closed-loop" passage of heat-exchange fluid 2332 out of chamber 2308 of the pneumatic cylinder 2304, into the low-pressure reservoir 2348, through chamber 2338 of the pump cylinder 2334, through the optional heat exchanger 2354, and into chamber 2308 of the pneumatic cylinder 2304 successively.

Figure 24A:
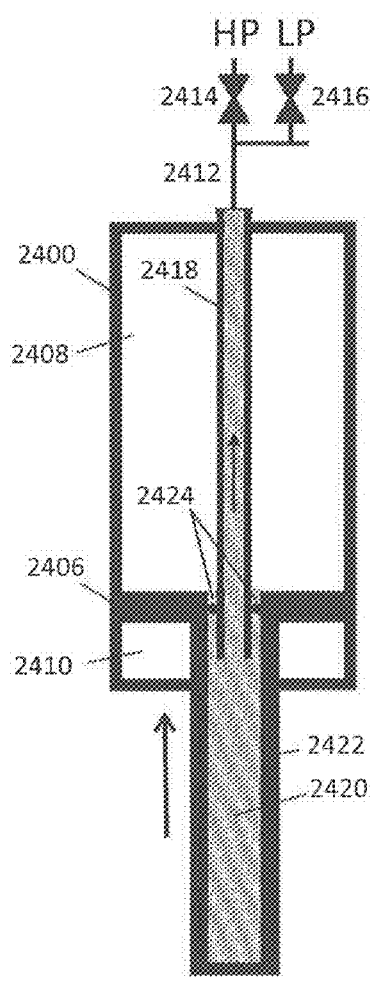
FIGS. 24A and 24B are schematic drawings of various components of a pneumatic cylinder additionally functional as a liquid pump in accordance with various embodiments of the invention.
Figure 24B:
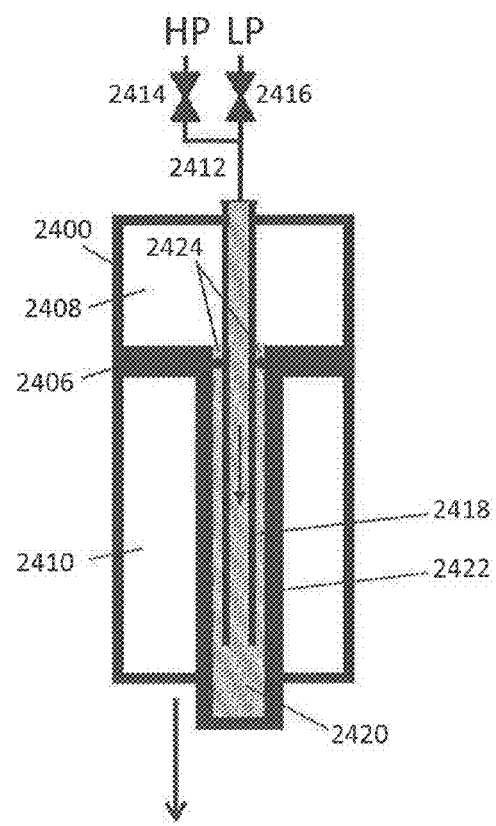

Various other embodiments employ a pneumatic cylinder that also acts as a pump in order to efficiently circulate heat-exchange fluid (e.g., foam or a foaming liquid) in an energy storage system. FIGS. 24A and 24B depict a pneumatic cylinder 2400 that compresses or expands gas and simultaneously acts as a liquid pump. FIG. 24A depicts one state of operation of cylinder 2400; FIG. 24B depicts another state of operation of cylinder 2400.

The cylinder 2400 contains a slidably disposed piston 2406 that divides the interior of the cylinder 2400 into a distal (upper) chamber 2408 and a proximal (lower) chamber 2410. A port or ports (not shown) with associated piping 2412 and bidirectional valves 2414, 2416 enables the upper chamber 2408 to be placed in fluid communication with either (a) a high-pressure fluid storage reservoir (not shown, but indicated by the letters "HP") or (b) a low-pressure fluid reservoir (not shown, but indicated by the letters "LP"). The LP reservoir may contain liquid at low pressure and its gaseous portion may communicate freely with the ambient atmosphere through a vent (not shown). A port or ports (not shown) places the lower chamber 2410 of the first cylinder in continuous fluid communication with gas at low pressure (e.g., the ambient atmosphere). Cylinder 2400 incorporates a tube 2418 that may be cylindrical in cross-section and is connected at its upper end to the upper end-cap of the cylinder 2400. The tube 2418 is hollow and may be filled with heat-exchange liquid. The piston 2406 is connected to a rod 2422 that contains a center-drilled hollow or cavity 2420, herein termed the rod cavity 2420, that may be filled with heat-exchange liquid. The tube 2418 is open at its proximal (lower) end, and is long enough so that the cavity within the tube 2418 is in constant fluid communication with the rod cavity 2420 (e.g., even when piston 2406 is at bottom dead center). Gasketing 2424 allows the tube 2418 to telescope within the rod 2422 as the rod 2422 and piston 2406 move and prevents fluid communication between the upper chamber 2408 and the communicating cavities of the tube 2418 and rod 2422. When piston 2406 and rod 2422 move upward, as depicted in FIG. 24A, the total volume of the communicating cavities within the tube 2418 and the rod 2422 decreases, tending to pressurize the fluid within the communicating cavities and to expel it from the communicating cavities through the tube 2418. When piston 2406 and rod 2422 move downward, as depicted in FIG. 24B, the total volume of the communicating cavities within the tube 2418 and the rod 2422 will increase, tending to lower the pressure of the fluid within the communicating cavities and/or to admit fluid into the communicating cavities through the tube 2418. By integrating the pump into a rod of a cylinder, higher efficiency may be achieved by eliminating separate or additional crankshaft throws or other mechanical drive connections.

Figure 25:
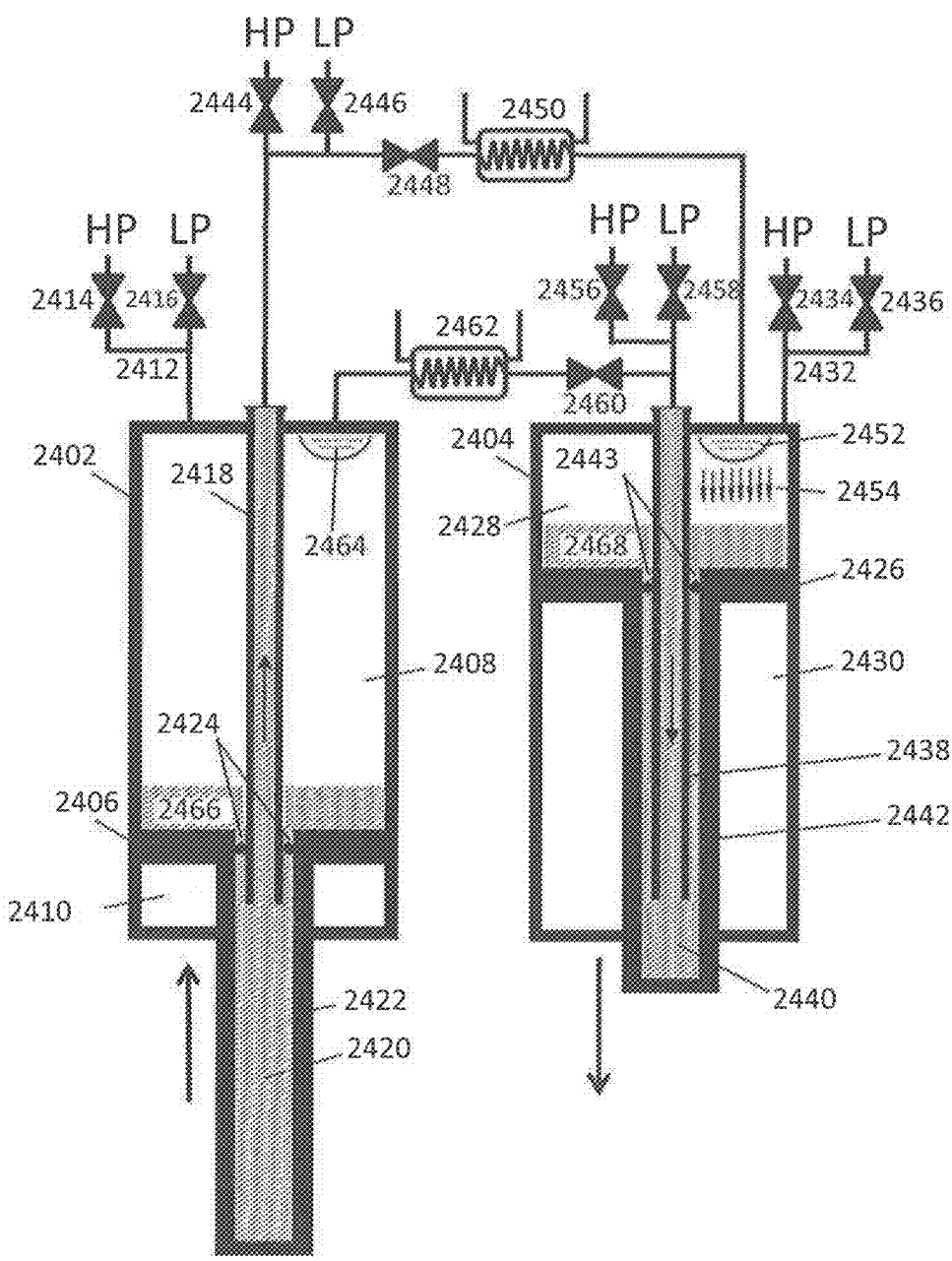
FIG. 25 is a schematic drawing of various components of a compressed-gas energy storage system employing two pneumatic cylinders additionally functional as liquid pumps in accordance with various embodiments of the invention.

FIG. 25 depicts a system 2500 that employs two cylinders of the type depicted in FIGS. 24A and 24B to compress and/or expand gas. Unlike system 2300 in FIG. 23, system 2500 does not employ a discrete or separate water pump (e.g., pump cylinder 2334 in FIG. 23) in order to efficiently circulate heat-exchange liquid.

The system 2500 employs two cylinders 2402, 2404 (hereinafter termed the first cylinder and the second cylinder), both cylinders 2402, 2404 being similar to the cylinder 2400 depicted in FIGS. 24A and 24B. The second cylinder 2404 contains a slidably disposed piston 2426 that divides the interior of the second cylinder 2404 into a distal (upper) chamber 2428 and a proximal (lower) chamber 2430. A port or ports (not shown) with associated pipe 2432 and bidirectional valves 2434, 2436 enables the upper chamber 2428 to be placed in fluid communication with either (a) a high-pressure fluid storage reservoir (not shown, but indicated by the letters "HP"), preferably the same as that to which the first cylinder 2402 may be connected through valve 2414, or (b) a low-pressure fluid reservoir (not shown, but indicated by the letters "LP"), preferably the same as that to which the first cylinder 2402 may be connected through valve 2416. The LP reservoir may contain liquid at low pressure and its gaseous portion may communicate freely with the ambient atmosphere through a vent (not shown). A port or ports (not shown) places the lower chamber 2430 in continuous fluid communication with gas at low pressure (e.g., the ambient atmosphere).

Cylinder 2404 also, like cylinder 2402, incorporates a hollow tube 2438 that may be cylindrical in cross-section and is connected at its upper end to the distal end-cap of the cylinder 2404. The interior of the tube 2438 may be filled with heat-exchange liquid. The piston 2426 is connected to a rod 2442 that contains a center-drilled rod cavity 2440 that may be filled with heat-exchange liquid. The tube 2438 is open at its lower end and the cavity within the tube 2438 is in fluid communication with the rod cavity 2440. Gasketing 2443 allows the tube 2438 to telescope within the rod 2442 as the rod 2442 and piston 2426 move and prevents fluid communication between the upper chamber 2428 and the communicating cavities of the tube 2438 and rod 2442. When piston 2426 and rod 2442 move upward, the total volume of the communicating cavities within the tube 2438 and the rod 2442 will decrease, tending to pressurize the fluid therein.

The upper end of tube 2418 in the first cylinder 2402 is connected to bidirectional valves 2444, 2446, 2448. Valve 2444 may place the interior of tube 2418 in fluid communication with a high-pressure storage reservoir (HP); valve 2446 may place the interior of tube 2418 in fluid communication with a low-pressure reservoir (LP); and valve 2448 may permit fluid to flow from the interior of the tube 2418, through optional heat exchanger 2450, and thence to a spray head 2452 within chamber 2428 of the second cylinder 2404. Foaming liquid 2454 passing through spray head 2452 enters chamber 2428. The spray heads 2452, 2464 depicted in FIG. 25 are illustrative only: other devices (e.g., rotating blades) may be used to introduce heat-exchange fluid into the air chambers 2408, 2428. In the illustrative embodiment of FIG. 25, foam may be generated or regenerated within cylinders 2402, 2404 by injection of fluid through an appropriate mechanism (e.g., the spray heads 2452, 2464); in various other embodiments, foam is generated externally to the cylinders 2402, 2404 (as described elsewhere herein) by mechanisms not depicted in FIG. 25.

Similarly, the upper end of tube 2438 in cylinder 2404 is connected to bidirectional valves 2456, 2458, 2460. Valve 2456 may place the interior of tube 2438 in fluid communication with a high-pressure storage reservoir (HP), preferably the same as that with which tube 2418 communicates via valve 2444; valve 2458 may place the interior of tube 2438 in fluid communication with a low-pressure reservoir (LP), preferably the same as that with which tube 2418 communicates via 2446; and valve 2460 may permit fluid to flow from the interior of the tube 2438, through optional heat exchanger 2462, and thence to spray head 2464 within chamber 2408 of cylinder 2402. Liquid passing through spray head 2464 enters chamber 2408, preferably forming a foam within the chamber 2408.

The valves 2444, 2456 permit fluid communication with that portion of the HP store to which heat-exchange liquid may settle (e.g., separate from a foam) under the influence of gravity, and therefore tend to control the passage of liquid rather than of gas or foam.

The system 2500 is instrumented with pressure, piston position, and/or temperature sensors (not shown) and controlled via a control system (not shown). The proximal (lower) ends of the rods 2422, 2442 may be connected to a mechanism, such as one or more hydraulic cylinders or a common crankshaft (not shown), for interconverting linear mechanical power and rotary mechanical power, as described in the '678 and '842 patents.

System 2500 may be operated in such a way that the cavity 2420 within rod 2422 of the first cylinder 2402 acts as a pump driving heat-exchange fluid into chamber 2428 of second cylinder 2404 during expansion or compression of gas in chamber 2428, and the cavity 2440 within rod 2442 of second cylinder 2404 acts as a pump driving heat-exchange liquid into chamber 2408 of first cylinder 2402 during expansion or compression of gas in chamber 2408. A discrete or separate pump for circulating heat-exchange liquid is rendered unnecessary by this method.

Like system 2300 in FIG. 23, system 2500 may be operated according to at least two methods of operation, namely the "open-loop method" and the "closed-loop method." These two methods of operation are exemplary, not exhaustive, of the methods according to which system 2500 may be operated. Each of these two methods of operation of system 2500 (i.e., closed-loop method and open-loop method) has a compression mode, in which gas is compressed in order to store energy, and an expansion mode, in which gas is expanded to release energy.

Open-loop Method of Operation: Expansion Mode

In one mode of operation of the system 2500, herein termed the "open-loop expansion" method of operation, the second cylinder 2404 performs an expansion stroke while the first cylinder 2402 performs an exhaust stroke and sprays foaming heat-exchange liquid into the second cylinder 2404: the two cylinders may then reverse roles, and may alternate intake and expansion strokes for as long as expansion of gas by system 2500 is desired.

In an initial state of operation of the open-loop expansion method of operation, piston 2406 of the first cylinder 2402 is at bottom dead center and piston 2426 of the second cylinder 2404 is at top dead center. Valves 2416, 2448, 2458, and 2434 are open and all other valves are closed. Valve 2416 allows low-pressure air to exit chamber 2408 of the first cylinder 2402 while piston 2406 performs an upward (exhaust) stroke; valve 2448 allows heat-exchange liquid to flow from the rod cavity 2420 of the first cylinder 2402, through optional heat exchanger 2450, and through the spray head 2452 of the second cylinder 2404, preferably forming a foam 2454 therein; valve 2458 allows heat-exchange fluid from the low-pressure (LP) reservoir to enter the rod cavity 2440 of the second cylinder 2404; and valve 2434 allows gas from the high-pressure store to enter the upper chamber 2428 of the second cylinder 2404. In this initial state of operation, a liquid accumulation 2466 may be present atop piston 2406 and a liquid accumulation 2468 atop piston 2426 is slight or absent.

Subsequent to this initial state of operation, the foam 2454 may enable isothermal expansion of the gas within chamber 2428 and may form a fluid accumulation 2468 atop the piston 2426. At a predetermined point during the expansion stroke of the second cylinder 2404, valve 2434 may be closed, preventing the admission of more high-pressure gas to the upper chamber 2428. Gas already admitted to the chamber 2428 will continue to expand, and piston 2426 and its associated rod 2442 move downward until they reach bottom dead center. Concurrently, piston 2406 and its associated rod 2422 move to top dead center, performing an exhaust stroke. Any liquid accumulation 2466 atop piston 2406 of the first cylinder 2402 will be expelled into the LP reservoir during the latter portion of the exhaust stroke.

By opening valves 2414, 2460, 2436, and 2446 and closing all other valves, system 2500 may then be placed in a state of operation similar to the initial state of operation of the open-loop expansion method of operation described above, except that the roles of the two cylinders are reversed: i.e., first cylinder 2402 is prepared to execute an expansion stroke and the second cylinder 2404 is prepared to execute an exhaust stroke. Expansion cycles in which the first cylinder 2402 expands gas may alternate indefinitely (limited by the capacity of the HP store) with expansion cycles in which the second cylinder 2404 expands gas.

While the second cylinder 2404 performs an expansion stroke, heat-exchange fluid at low pressure fills the rod cavity 2440 of the second cylinder 2404 through valve 2458. Concurrently, heat-exchange fluid in the rod cavity 2420 of the first cylinder 2402 is pressurized and expelled through valve 2448. Thus, the first cylinder 2402, during its exhaust stroke, acts as a pump supplying heat-exchange liquid to the second cylinder 2402 as the latter performs an expansion stroke. Similarly, when the second cylinder 2404 performs an exhaust stroke while the first cylinder 2402 performs a concurrent expansion stroke, the second cylinder 2404 acts as a pump supplying heat-exchange liquid to the first cylinder 2402.

Open-loop Method of Operation: Compression Mode

In another mode of operation of the system 2500, herein termed the "open-loop compression" method of operation, the two cylinders 2402, 2404 perform concurrent compression strokes while injecting heat-exchange fluid into each other's upper chambers 2408, 2428. The two cylinders then perform concurrent gas intake strokes while refilling their rod chambers 2420, 2440 with heat-exchange liquid.

In an initial state of operation in open-loop compression mode, pistons 2406, 2426 are both at bottom dead center of their respective cylinders 2402, 2404, and any liquid accumulations 2466, 2468 atop the pistons 2406, 2426 are slight or absent. Valves 2448 and 2460 are open and all other valves are closed. The upper chambers 2408, 2428 of the cylinder contain gas at low pressure. Pistons 2406, 2426 and their associated rods 2422, 2442 begin to move upward, tending to pressurize the fluid in the upper chambers 2408, 2428 of the cylinders 2402, 2404. Heat-exchange liquid expelled from the rod cavities 2420, 2440 passes through the tubes 2418, 2438, valves 2448, 2460, optional heat exchangers 2450, 2462, and spray heads 2464, 2452, injecting fluid (preferably as foam, e.g., foam 2454) into the chambers 2408, 2428. This foam may enable isothermal expansion of the gas within chambers 2408, 2428 and may form fluid (foam and/or liquid) accumulations 2466, 2468 atop the pistons 2406, 2426. At a predetermined point in the concurrent compression strokes of the pistons 2406, 2426, valves 2414, 2434 may be opened, allowing pressurized fluid (gas or foam) to flow into the high-pressure (HP) store (not shown). Heat-exchange fluid 2466, 2468 expelled from chambers 2408, 2428 by pistons 2406, 2426 may cause an accumulation of fluid (e.g., separated liquid) to form within the HP store.

Pistons 2406, 2426 move upward during the concurrent compression strokes executed by the two cylinders 2402, 2404 until the pistons 2406, 2426 are at top dead center of their respective cylinders 2402, 2404. In a subsequent state of operation, valves 2416, 2446, 2458, and 2436 are opened and all other valves are closed, and the pistons 2406, 2426 and their associated rods 2422, 2442 move downward until they reach bottom dead center of their respective cylinders 2402, 2404, filling the upper chambers 2408, 2428 with low-pressure gas and the rod cavities 2420, 2440 with low-pressure heat-exchange liquid from the low-pressure (LP) reservoir, thus preparing the system for another concurrent compression stroke.

A compression stroke in the open-loop method of operation of system 2500 entails one-way or "open-loop" passage of heat-exchange fluid out of the LP reservoir, into the rod cavities 2420, 2440 of the cylinders 2402, 2404, through the spray heads 2464, 2452 into the upper chambers 2408, 2428 of the cylinders 2402, 2404, and thence into the HP store, successively. During one or more successive cycles of system 2500 in open-loop compression mode, heat-exchange liquid is thus removed from the LP reservoir and accumulates in the HP store. A period of operation of system 2500 in open-loop compression mode (e.g., a number of such cycles) will tend to cause an accumulation of heat-exchange liquid in the HP store; a subsequent period of operation of system 2500 in open-loop expansion mode will tend to remove the accumulation of heat-exchange liquid from the HP store and return it to the LP reservoir.

It will be apparent to any person reasonably well acquainted with the art of hydraulic machinery that system 2500 may also be operated according to a closed-loop method having both expansion and compression modes. Such a method of operation will (i) shift accumulated heat-exchange liquid 2466, 2468 into the HP store during each compression and refill the rod cavities 2420, 2440 of the cylinders 2402, 2404 from the HP store rather than from the LP reservoir, and/or (ii) shift accumulated heat-exchange liquid 2466, 2468 into the LP reservoir during each expansion and refill the rod cavities 2420, 2440 of the cylinders 2402, 2404 from the LP reservoir rather than from the HP store.

The use of cylinders 2402, 2404 for both gas expansion/compression and heat-exchange fluid pumping may increase system efficiency and reliability as compared to a system employing a discrete or separate pump for the circulation of heat-exchange fluid, due to the reduction in the number of mechanisms within the energy storage and recovery system.

When a fluid (e.g., foam) is to either enter or exit the air chamber of a pneumatic cylinder through a valve, it is desirable, as discussed earlier, that pressure drop through the valve be minimal, in order that energy losses entailed by passing through may be minimized. Furthermore, if the fluid to be passed through the valve is a foam, it may be advantageous to minimize shear forces acting on the foam, in order to prevent the foam from being separated into its liquid and gas components, or in order to prevent the sizes of bubbles within the foam from being inadvertently altered. Moreover, where a liquid phase is present in the air chamber of a pneumatic cylinder as well as a gas phase (e.g., in cylinders employing foams for heat exchange between liquid and gas), it is desirable that valve check passively open to prevent damage to components from overpressure in the cylinder, i.e., hydrolock events. Valve designs that enable high-efficiency, low-shear flow of foam with hydrolock protection are described in U.S. patent application Ser. No. 13/307,163, filed Nov. 30, 2011 (the '163 application), the entire disclosure of which is incorporated by reference herein, and may be utilized in embodiments of the present invention.

Figure 26:
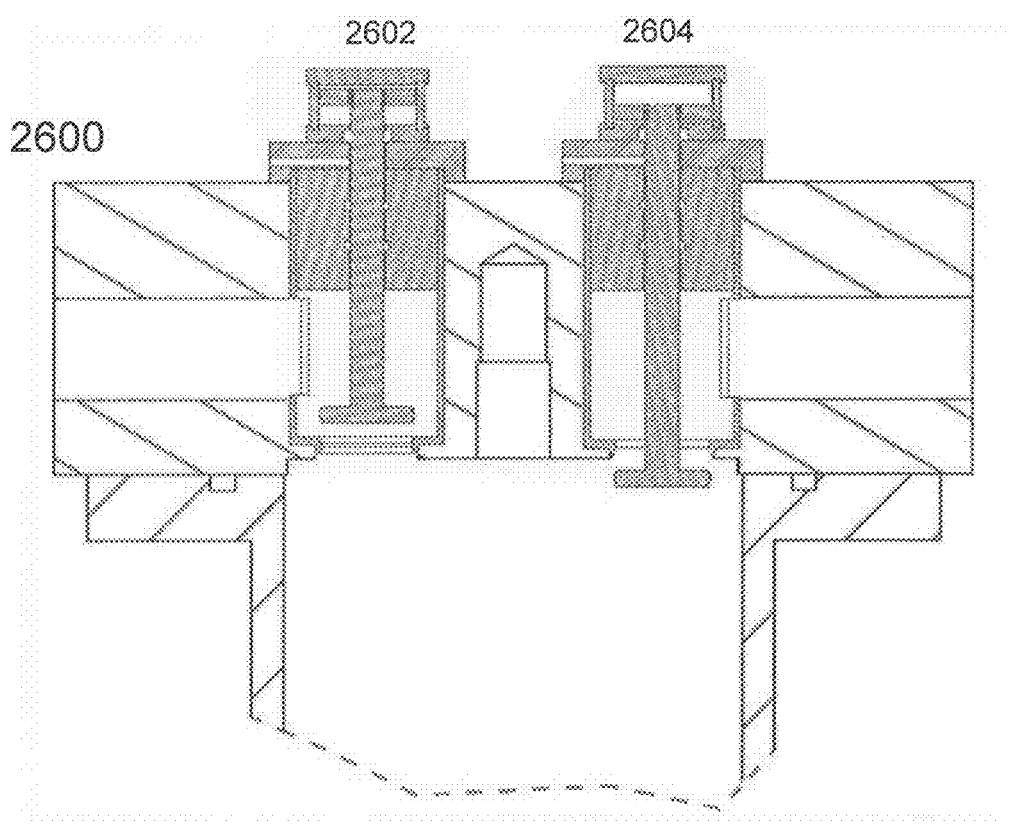
FIG. 26 is a schematic drawing of two poppet valves in a cylinder head in accordance with various embodiments of the invention.

FIG. 26 is a schematic representation of a pneumatic cylinder head 2600 featuring two valves 2602, 2604 of types described in the '163 application, a high-side valve 2602 and a low-side valve 2604. The high-side valve 2602 is a pull-to-open valve that passively checks open to mitigate overpressure within the cylinder air chamber (i.e., hydrolock). The low-side valve 2604 is a push-to-open valve that passively checks open when pressure is lower inside the cylinder than outside (e.g., during an intake stroke). Valves 2602 and 2604 may be designed for rapid action and with high lift (i.e., with a large area permitting flow between the valve member and valve seat in the open position) in order to minimize pressure drop through the valve (and thus energy losses). High lift also reduces shear forces on foam flowing into or out of the air chamber of the cylinder, preserving foam integrity.

Figure 27:
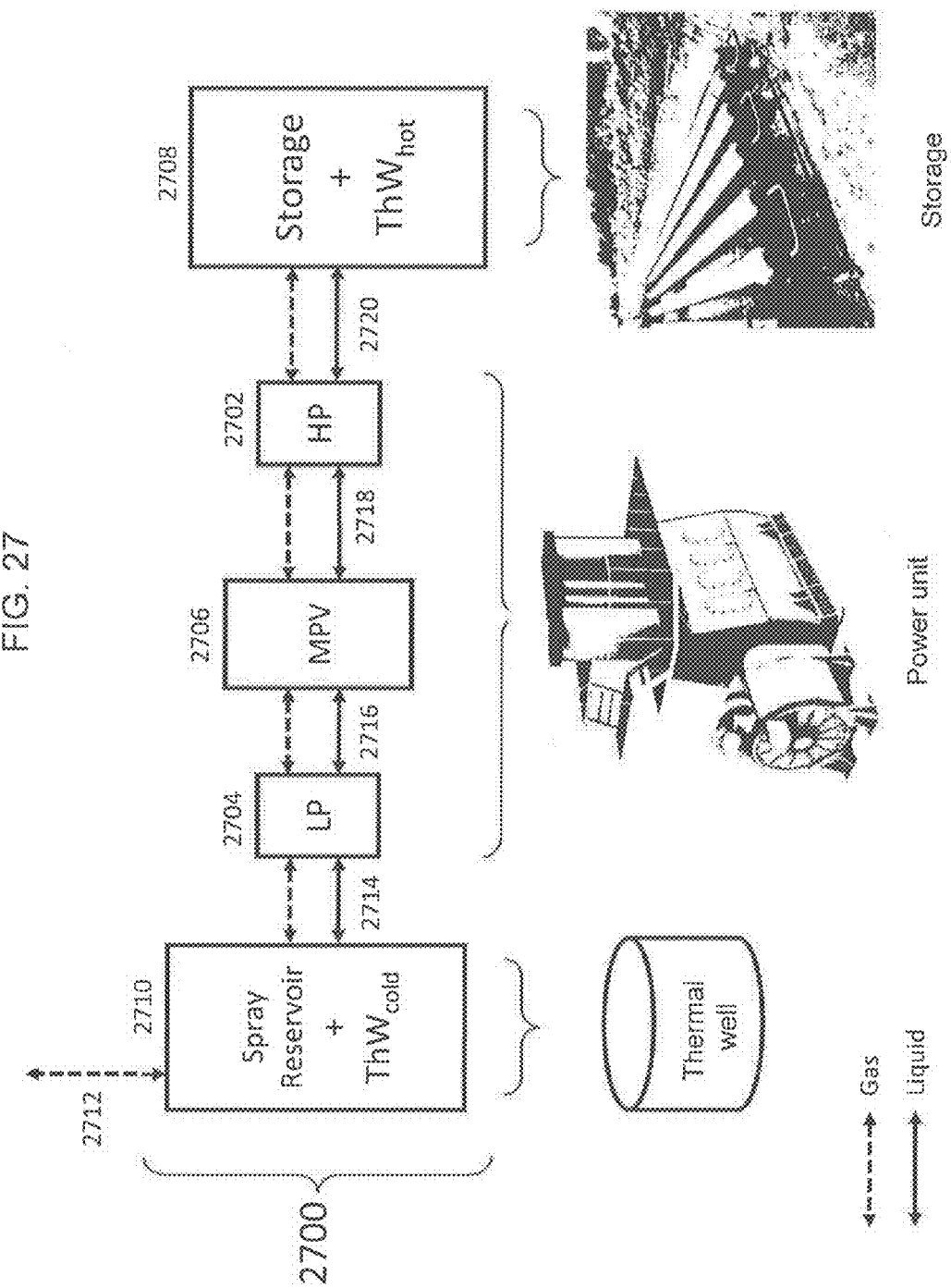
FIG. 27 is a schematic drawing of various components of a compressed-gas energy storage system in accordance with various embodiments of the invention.

FIG. 27 is a schematic diagram of portions of an illustrative compressed-air energy-storage system 2700 that incorporates various embodiments of the invention. The system 2700 includes a high-pressure pneumatic cylinder assembly 2702 (labeled HP in FIG. 27) that expands and compresses gas between some mid pressure (e.g., approximately 200 psig) and some high pressure (e.g., approximately 3,000 psig); a low-pressure pneumatic cylinder assembly 2704 that expands and compresses gas between some low pressure (e.g., approximately 0 psig) and some mid pressure (e.g., approximately 200 psig); a mid-pressure vessel 2706 (labeled MPV in FIG. 27) that typically contains fluid (e.g., gas, heat-exchange liquid, foam, or separated gas and liquid) at the mid pressure of the system; a storage reservoir 2708 or intercommunicating set of storage reservoirs (e.g., sealed lengths of piping rated for storage or transport of high-pressure gas) and capable of storing fluid at high pressure and mildly elevated temperature (e.g., 50° C.), and thus of acting as both a store of pressure potential energy and thermal energy; a storage vessel/spray reservoir 2710 (e.g., a tank) capable of holding an appropriate quantity of heat-exchange liquid at a relatively low temperature (e.g., 20° C.). The spray reservoir 2710 preferably includes mechanisms for separating a low-pressure foam into liquid and gas components and venting the gas component to the atmosphere (indicated by dashed arrow 2712). In FIG. 27, dashed arrows represent the bidirectional movement of gas through appropriate piping and solid arrows represent the bidirectional movement of liquid through appropriate piping; pairs of dashed and solid arrows (2714, 2716, 2718, 2720) indicate movement of gas and liquid between various components of system 2700. The spray reservoir 2710 may exchange both liquid and gas (e.g., as separate flows of liquid and gas or as a single flow of aqueous foam) with the low-pressure cylinder 2704, the low-pressure cylinder 2704 may exchange liquid and gas with the mid-pressure vessel 2706, the mid-pressure vessel 2706 may exchange liquid and gas with the high-pressure cylinder 2702, and the high-pressure cylinder 2702 may exchange liquid and gas with the high-pressure store 2708.

In FIG. 27, the high-pressure cylinder 2702, the mid-pressure vessel 2706, and the low-pressure vessel 2704 are portions of a "power unit," i.e., that subsystem of energy storage system 2700 which interconverts thermal and pressure potential energy with mechanical work and electrical energy. In a mode of operation where thermal and pressure potential energy from warm, high-pressure fluid in the high-pressure store 2708 are converted to electrical energy, a quantity of fluid is transferred from the high-pressure store 2708 to the high-pressure cylinder 2702. The fluid typically includes or consists essentially of both gas and liquid that are at approximately identical temperature and pressure. The gas and liquid may be combined into a foam prior to admission to the high-pressure cylinder 2702 or may be foamed within the cylinder 2702. The cylinder 2702 expands its contents (e.g., foam substantially or entirely filling the air chamber of cylinder 2702) from the original high pressure (e.g., approximately 3,000 psig) to a mid-pressure (e.g., 200 psig). As the gas component of the foam with the cylinder 2702 expands, performing work upon a moving piston within cylinder 2702, it tends to cool; however, as a temperature difference appears between the gas and liquid components of the foam, thermal energy flows from the liquid to the gas component. The larger the temperature difference, the faster the flow of thermal energy from liquid to gas will tend to be. Thus, the mingling of liquid and gas in an aqueous foam structure within cylinder 2702 will tend to allow substantially isothermal expansion of the gas component of the foam, effectively transforming a portion of the thermal energy in the liquid admitted to cylinder 2702 into mechanical work.

When the contents of the cylinder 2702 have reached the mid-pressure of the system 2700, liquid and gas (e.g., as foam) at the mid-pressure are transferred (arrows 2718) to the mid-pressure vessel 2706. The mid-pressure vessel stores the liquid and gas and may include provisions for regenerating foam or for separating foam into its gas and liquid components. Whenever the mid-pressure vessel 2706 contains a sufficient quantity of gas at the mid-pressure, a quantity of gas is transferred from the mid-pressure vessel 2706 to the low-pressure cylinder 2704. The gas is mingled with heat-exchange liquid from the mid-pressure vessel 2706 to form a foam that substantially or entirely fills the air chamber of the low-pressure cylinder 2704. As in the high-pressure cylinder 2702, only across a different pressure range, the gas within the low-pressure cylinder 2704 is expanded, performing work upon a moving piston with the cylinder 2704, as the liquid component of the foam tends to make the expansion of the gas approximately isothermal. After expansion of the gas in the low-pressure cylinder 2704, the liquid and gas within the cylinder 2704 are at relatively low temperature and approximately atmospheric pressure, and are then transferred (arrows 2714) to the spray reservoir and foam separator 2710. The low-pressure gas component of the foam is vented to the atmosphere (arrow 2712) and the low-pressure liquid component of the foam is retained. If the retained liquid is cooler than the ambient (environmental) temperature of the system 2700 at a time when the system 2700 is to be operated in an energy-generating mode, then the liquid in the spray reservoir 2710 constitutes a store of exergy (potential work), as does the store of hot liquid in the high-pressure store 2708. The storage reservoirs 2708 and 2710 may be insulated in order to slow the loss of exergy that occurs as their contents warm or cool toward the temperature of the ambient environment. The number of compression and/or expansion stages, i.e., 2 stages, depicted in FIG. 27 is illustrative. Additional expansion and compression stages and mid-pressure vessels may be added to further divide the pressure ranges (e.g., 3 compression/expansion stages –0 to 80 psig, 80 psig to 500 psig, and 500 to 3000 psig, with mid-pressure vessels at approximately 80 psig and 500 psig).

Figure 28:
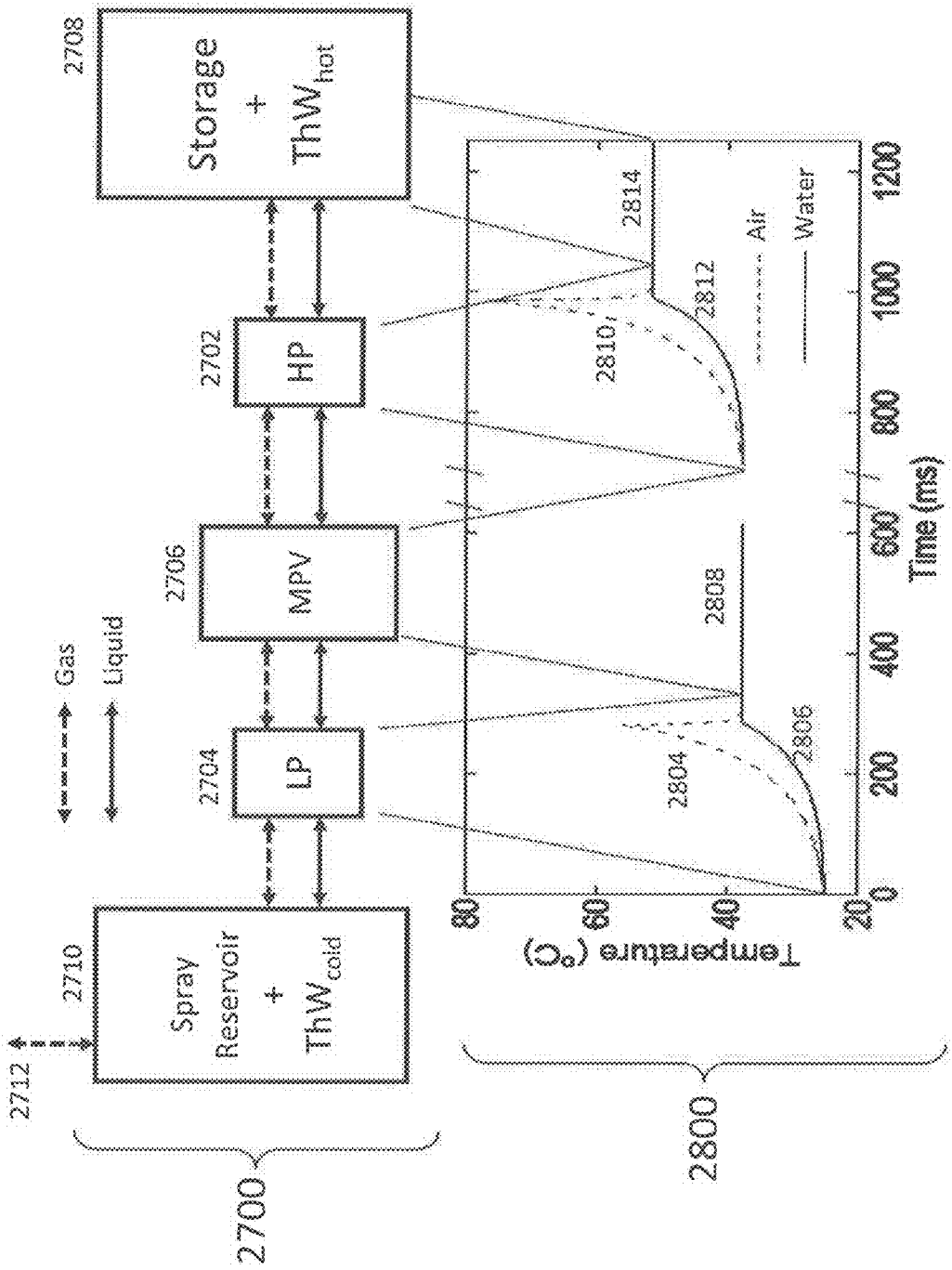
FIG. 28 is a schematic drawing of various components of a compressed-gas energy storage system, accompanied by a graph showing selected time and temperature relationships within the system, in accordance with various embodiments of the invention.

Similarly, system 2700 may store energy by admitting atmospheric air (arrow 2712) and compressing it sequentially in cylinders 2704 and 2702. FIG. 28 shows a schematic representation of portions of the system 2700 already depicted in FIG. 27, and attaches a time-versus-temperature graph 2800 to partially describe the stages of a hypothetical two-stage compression. Pairs of thin lines converging from portions of graph 2800 to portions of the schematic representation of system 2700 indicate which portions of graph 2800 represent changes in temperature occurring in which portions of system 2700. In graph 2800, dashed lines represent the temperature of gas, and solid lines represent the temperature of heat-exchange liquid.

The graph 2800 begins at time T=0, the beginning of a compression stroke in the low-pressure cylinder 2704. The cylinder contains a foam of which the gas and liquid components are both at the same low pressure (approximately atmospheric) and the same relatively low temperature (approximately 25° C.). From T=0 milliseconds (ms) to approximately T=290 ms, the foam is compressed in the cylinder 2704. The rising temperature of the gas is represented by the dashed curve 2804. As the temperature of the gas rises, heat is transferred to the liquid component of the foam, whose temperature is represented by the solid curve 2806. The curve 2804 clearly shows that the temperature of the gas is not constant, that is, that the compression of the gas is not purely isothermal; however, it is substantially or approximately isothermal in comparison to the temperature change that would occur if the gas underwent the compression adiabatically. In the adiabatic case, the temperature of the gas would rise not to approximately 55° C., but to approximately 295° C. Thus, the compression process undergone by the gas in cylinder 2704 may reasonably be termed "substantially isothermal," with polytropic coefficient less than n=1.05, and realizes significant efficiency gains over the adiabatic case. These gains are not as large as they would be for a perfectly isothermal compression (which would take infinite time).

The difference between the solid line 2806 and dashed line 2805 (liquid and gas temperatures, respectively) represents lost exergy that cannot be recovered during a subsequent expansion. The minimization of this lost exergy is achieved when the process time constant (in this case, a compression occurs in about 290 ms) is considerably less than the heat-transfer time constant. The heat-transfer time constant depends in part on the surface area and proximity between the compressing or expanding gas and the liquid. Small droplets or a foam matrix maximize this surface area. In general, spheroidal droplets will have a lower surface area than a matrix of foam cells; thus a foam matrix may result in a lower heat transfer time constant, less lost exergy, and a more efficient energy storage system.

Graph 2800 in FIG. 28 shows that compression ceases at approximately T=290 ms, as the gas and liquid mixture is transferred to the mid-pressure vessel. The gas quickly approximates the temperature of the liquid, as shown by the precipitous drop of dashed curve 2804 from approximately T=290 ms to approximately T=300 ms. The foam (and any separated liquid) in cylinder 2704 are then contained in the mid-pressure vessel 2706. The foam may be regenerated within the mid-pressure vessel at approximately constant pressure and temperature (depending on the size of the mid-pressure vessel, presumably sized sufficiently large to prevent large fluctuations in pressure during a single intake or exhaust from a LP or HP cylinder) and transferred to the HP cylinder 2702. By approximately T=700 ms, the air chamber of the HP cylinder 2702 is filled substantially or entirely with foam and a compression stroke begins. Similarly to the compression in the LP cylinder 2704, the temperature of the gas component of the foam rises as shown by dashed curve 2810 (such temperature rise being significantly mitigated compared to the case of adiabatic compression), the temperature of the liquid component of the foam rises as shown by solid curve 2812, and the temperatures of the gas and liquid components of the foam quickly equilibrate after compression ceases, as shown by the precipitous drop in the dashed curve 2810 from approximately T=950 ms to approximately T=1000 ms. The difference between the solid line 2812 and dashed line 2810 (liquid and gas temperatures, respectively) represents lost exergy that cannot be recovered during a subsequent expansion. Thereafter, the liquid and gas contents of the HP cylinder 2702 are stored within the high-pressure storage and thermal well 2708, remaining at approximately constant temperature and pressure as shown by solid curve 2814.

The system 2700 thus uses heat-exchange liquid, foamed with gas during expansion and compression of the gas, both as an exergy storage medium and to enable rapid, approximately isothermal expansion and compression of gas. Moreover, heat from a variety of external sources (e.g., solar heat, waste heat from fuel-burning power plants) may be transferred to the fluid in reservoir 2708. Thermal energy thus added to fluid in reservoir 2708 may be partly realized as useful work in the cylinders 2702 and 2704, and thus as electrical power output from the system 2700. In another embodiment, additional thermal energy may be transferred to the fluid in storage 2708 in the form of low-grade heat from sources such as power plants that would otherwise be wasted to the environment as a form of cogeneration, further increasing or maintaining energy available during a subsequent expansion. Additionally, thermal energy from such sources of low-grade heat (not shown) may be transferred to the mid-pressure vessel 2706 during expansion via heat exchanger (not shown) to increase recoverable energy.

Figure 29:
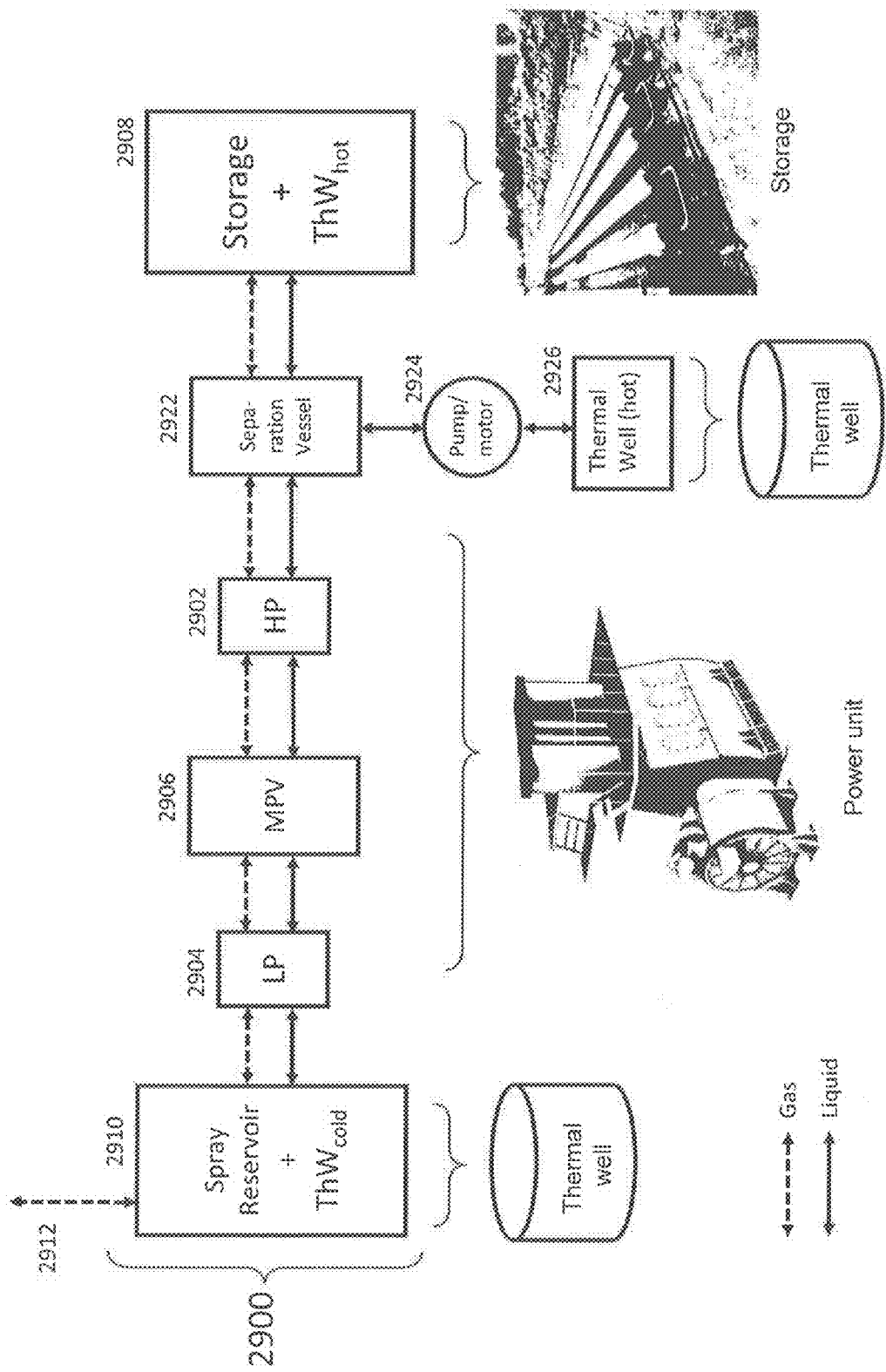
FIG. 29 is a schematic drawing of various components of a compressed-gas energy storage system in accordance with various embodiments of the invention.

FIG. 29 is a schematic diagram of portions of an illustrative compressed-air energy-storage system 2900, similar in some respects to system 2700 in FIG. 27 and FIG. 28, that incorporates embodiments of the invention. The system 2900 includes a high-pressure pneumatic cylinder assembly 2902 (labeled HP in FIG. 29) that expands and compresses gas between some mid pressure (e.g., approximately 200 psig) and some high pressure (e.g., approximately 3,000 psig); a low-pressure pneumatic cylinder assembly 2904 that expands and compresses gas between some low pressure (e.g., approximately 0 psig) and some mid pressure (e.g., approximately 200 psig); a mid-pressure vessel 2906 (labeled MPV in FIG. 29) that typically contains fluid (e.g., gas, heat-exchange liquid, foam, or separated gas and liquid) at the mid pressure of the system; a storage reservoir 2908 or intercommunicating set of storage vessels (e.g., sealed lengths of piping rated for the storage or transport of high-pressure gas) capable of storing fluid at high pressure and elevated temperature (e.g., 50° C.), and thus of acting as both a store of pressure potential energy and thermal energy; a storage vessel/spray reservoir 2910 (e.g., a tank) capable of holding an appropriate quantity of heat-exchange liquid at a relatively low temperature (e.g., 20° C.). The spray reservoir 2910 preferably includes mechanisms for separating a low-pressure foam into liquid and gas components and venting the gas to the atmosphere (indicated by dashed arrow 2912). In FIG. 29, dashed arrows represent the bidirectional movement of gas through appropriate piping and solid arrows represent the bidirectional movement of liquid through appropriate piping.

System 2900 also includes a high-pressure separation vessel 2922, which features one or more mechanisms for separating a foam (e.g., a high-pressure foam) into liquid and gas components. The storage reservoirs 2908, 2910, and 2926 may be insulated in order to slow the loss of exergy that occurs as their contents warm or cool toward the temperature of the ambient environment. The spray reservoir 2910 may exchange both liquid and gas (e.g., as separate flows of liquid and gas or as a single flow of aqueous foam) with the low-pressure cylinder 2904, the low-pressure cylinder 2904 may exchange liquid and gas with the mid-pressure vessel 2906, the mid-pressure vessel 2906 may exchange liquid and gas with the high-pressure cylinder 2902, the high-pressure cylinder 2702 may exchange gas with the high-pressure store 2908 and (via pump/motor 2924) liquid with the low-pressure thermal well 2926 (e.g., insulated atmospheric pressure tank).

Like system 2700, system 2900 may be operated in either compression (energy-storage) or expansion (energy-generating) modes. During a compression mode of operation of system 2900, gas is compressed stagewise through the low-pressure cylinder 2904, the mid-pressure vessel 2906, and the high-pressure vessel 2902 as described above for system 2700. After compression in the HP cylinder 2902, liquid and gas (partly or substantially in the form of a foam) from the high-pressure cylinder 2902 are directed to the separation vessel 2922, where the liquid and gas components of the foam are separated by an appropriate mechanism (e.g., baffles, gravity, rotating blades, ultrasound, centrifuging, and/or other such mechanism). The separated gas component of the foam is directed from the separation vessel 2922 to the storage vessel 2908; the separated heat-exchange liquid component, at relatively high pressure (e.g., 3,000 psig) and high temperature (e.g., 50° C.) is directed from the separation vessel 2922 through a pump/motor 2924 to a low-pressure storage vessel 2926 (e.g., a tank) capable of holding an appropriate quantity of heat-exchange liquid at elevated temperature and low pressure. The pressure of the heat-exchange liquid is decreased during passage from the separation vessel 2922 through the pump/motor 2924 to the storage vessel 2926, driving the pump/motor as a motor and thus generating useful energy (recovering this portion of the energy used during the compression of the liquid to elevated pressure). In an alternative embodiment, the high-pressure storage reservoir 2908 may be used both as gas storage and as the liquid/gas separator, where liquid is removed from the low point of the gas storage reservoir after gravity drainage of the liquid portion of the aqueous foam. In this embodiment, separation vessel 2922 is not a separate element from reservoir 2908. In one embodiment, the storage reservoir 2908 is a horizontal pipe field with large horizontal surface area which facilitates relatively rapid gravity drainage of an aqueous foam.

During an energy-generating (expansion) mode of operation of system 2900, heat-exchange liquid at low pressure and possibly at elevated temperature from vessel 2926 is directed through pump/motor 2924. Pump/motor 2924, operated in pump mode, raises the pressure of the liquid to a level sufficient to permit the liquid's combination with gas at high pressure (e.g., approximately 3,000 psig) from the storage reservoir 2908 as a foam. The foam may be formed in the reservoir 2908, vessel 2922, in a mechanism distinct from the vessel 2922 and external to the high-pressure cylinder 2902, or inside the high-pressure cylinder 2902. Staged expansion of the gas in the HP cylinder 2902, mid-pressure vessel 2906, and low-pressure vessel 2904 then proceeds as described above for system 2700.

The system 2900 thus uses heat-exchange liquid, foamed with gas during expansion and compression of the gas, both as an exergy storage medium and to enable rapid, substantially isothermal expansion and compression of gas. Unlike system 2700, system 2900 does not use a single vessel (or interconnected set of vessels) to store both high-pressure gas and heat-exchange liquid. This has the advantage that a smaller volume of high-pressure storage is required; the total volume of storage required on the hot side of the system 2900 (i.e., the storage of both hot liquid in vessel 2926 and hot, high-pressure gas in vessel 2908) is approximately the same as for system 2700, but since vessel 2926 is low-pressure it is likely to be lower-cost per unit volume than high-pressure vessel 2908.

Moreover, heat from a variety of external sources (e.g., solar heat, waste heat from fuel-burning power plants) may be transferred to the liquid in thermal well 2926 with relative ease (compared to transferring heat to the contents of high-pressure stores 2700 or 2908), since heat-exchange mechanisms tolerating high pressures will not be needed for such heat harvesting. Thermal energy thus added to thermal well 2926 may be partly realized as useful work in the cylinders 2902 and 2904, and thus as cogenerated electrical power output from the system 2900. Lower total storage cost and/or cogeneration may more than compensate for the energy loss entailed by transferring high-pressure liquid from the separation vessel 2922 to a low pressure in thermal well 2926 in compression modes and by pumping low-pressure liquid from thermal well 2926 to a high pressure for foaming with gas in the HP cylinder 2902 during expansion modes.

During a generation mode of a compressed-gas energy storage system employing storage reservoirs of fixed volume for storage of high-pressure gas, gas is progressively exhausted, continuously or in batches, from a high-pressure storage reservoir in order that its potential energy may be partly realized as mechanical and electrical energy. During such progressive exhaustion of the high-pressure store, the pressure and temperature of the gas within the store will tend to decrease in an approximately adiabatic manner. As will be apparent to persons familiar with the principles of thermodynamics, this approximately adiabatic pressure and temperature decrease will entail a loss of recoverable energy due to lower available pressures and/or an exergy loss due to temperature mixing. Similarly, during a storage mode of the compressed-gas energy storage system, gas is progressively delivered, continuously or in batches, to the high-pressure storage reservoir in order that its potential energy may be stored. During such progressive delivery of gas to the high-pressure store, the pressure and temperature of the gas within the store will tend to increase in an approximately adiabatic manner, with corresponding increased work to compress to higher pressure and/or mixing exergy loss due to mismatched temperatures.

To prevent exergy losses during either exhaustion of gas from or delivery of gas to the high-pressure store, it may be desirable to maintain heat exchange between gas undergoing either compression or expansion within the high-pressure store and a heat-exchange liquid. Heat exchange between gas and liquid in the high-pressure store may be achieved by partly or substantially filling the high-pressure store with foam, where the liquid component of the foam is a heat-exchange liquid. The liquid component of the foam will tend to either give up thermal energy to the gas component of the foam, or to absorb thermal energy from the gas component, enabling approximately isothermal increase or decrease of pressure within the high-pressure store during either a storage or generation mode of operation of the system. The temperature of the liquid component of the foam, or of the foam mixture may be further altered by a heat-exchange mechanism (heat exchanger) external to the high-pressure store, shedding heat from the environment or harvesting heat from the environment or some source of cogenerative heat. Either foam or separated liquid may be circulated through a heat exchanger external to the high-pressure store. In other embodiments, heat-exchange mechanisms (e.g., finned tubes) may be provided internally to the high-pressure store, so that an external heat-exchange fluid (e.g., environmental air) may be circulated into the high-pressure store without mingling with its contents, rather than contents of the high-pressure being circulated to an external heat exchanger. Techniques for heat exchange with a compressed gas stored in a gas-only high-pressure store are described in U.S. patent application Ser. No. 13/094,960, filed Apr. 27, 2011 (the '960 application), the entire disclosure of which is incorporated by reference herein. The minimization of this lost exergy is achieved when the process time constant is considerably less than the heat-transfer time constant. In general, a compression or expansion within the storage reservoir occurs at a much slower time constant than within the cylinders and power unit. For example, compression of gas from 750 psig to 3,000 psig in a storage reservoir may take approximately one hour. The heat-transfer time constant depends in part on the surface area and proximity between the compressing or expanding gas and the liquid. Small droplets or a foam matrix maximize this surface area. In general, spheroidal droplets will have a lower surface area than a matrix of foam cells; thus, a foam matrix may result in a lower heat-transfer time constant, less lost exergy, and a more efficient energy storage system. For the storage reservoir heat exchange, a lower quality foam or low quality or intermittent spray or circulation may be sufficient to achieve the desired heat transfer time constant (e.g., substantially lower time constant than 1 hour).

Figure 30:
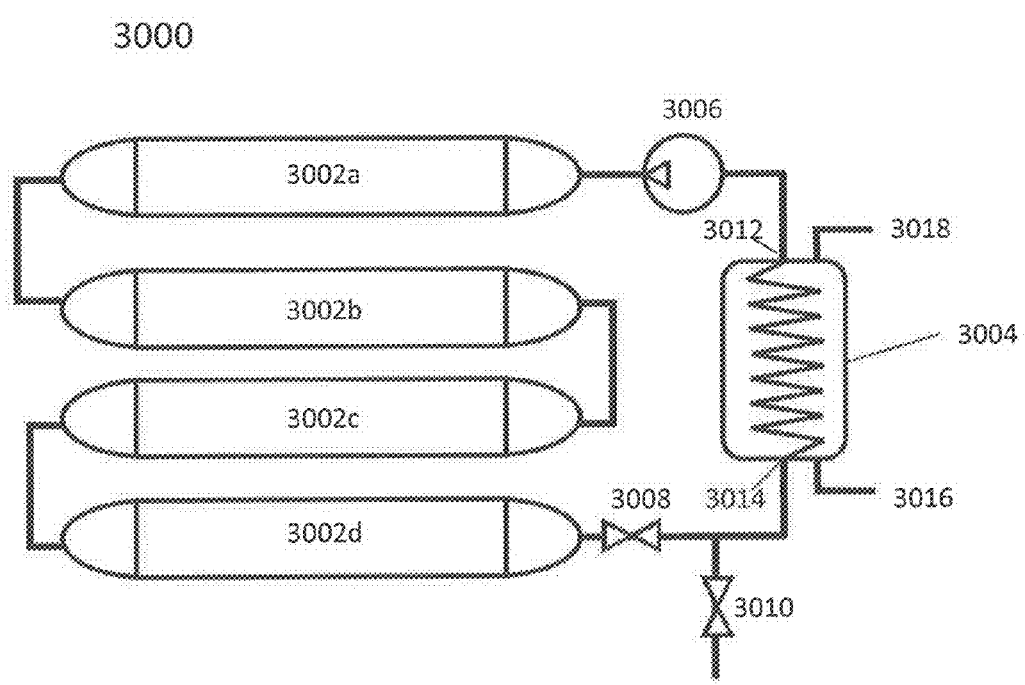
FIG. 30 is a schematic drawing of compressed-gas storage vessels with an external heat exchanger in accordance with various embodiments of the invention.

FIG. 30 is a schematic representation of an illustrative mechanism for circulating fluid from a high-pressure store in order to achieve approximately isothermal changes in pressure in the store during the exhaustion of gas from or delivery of gas to the store, or to add energy to the gas within the store from a cogenerative or other source through the use of a heat exchanger. Fluid from the reservoir (3002a-3002d) is circulated through a heat exchanger 3004 using a pump 3006 operating as a circulator. The circulated fluid may be gas, or heat-exchange liquid, or a foam including both gas and liquid. The pump 3006 operates with a small pressure change sufficient for circulation, but within a housing that is able to withstand high pressures, as detailed in the '409 application. The pump 3006 circulates the high-pressure fluid through the heat exchanger 3004 without substantially increasing its pressure (e.g., a 50 psi increase for 3,000 psi air). The fluid is then re-injected into the reservoir 3002a-3002d, possibly through a mechanism that regenerates a foam or other two-phase mixture (e.g., spray of droplets) within the reservoir 3002a-3002d. In this way, the temperature of the stored compressed gas may be controlled (e.g., raised, lower, held approximately constant, or held approximately equal to the internal liquid temperature) by opening valve 3008 with valve 3010 closed and heated during expansion (release of gas form the reservoir 3002a-3002d) or cooled during compression (delivery of gas to the reservoir 3002a-3002d) by closing valve 3008 and opening valve 3010. Valve 3010, when open, places the subsystem 3000 in fluid communication with an energy-storage system such as system 2700 in FIG. 27. The heat exchanger 3004 may be any sort of standard heat-exchanger design; illustrated in FIG. 30 is a tube-in-shell type heat exchanger with high-pressure air inlet and outlet ports 3012 and 3014 and low-pressure shell ports 3016 and 3018 (which may be connected to an external heating or cooling source).

In other embodiments, foam is circulated from reservoir 3002a-3002d through heat exchanger 3004. The fluid circulated through the external loop of heat exchanger 3004 may, in various embodiments, be a gas, liquid, or foam. The reservoir 3002a-3002d is depicted in FIG. 30 in a horizontal position but other orientations are contemplated and within the scope of the invention.

Figure 31:
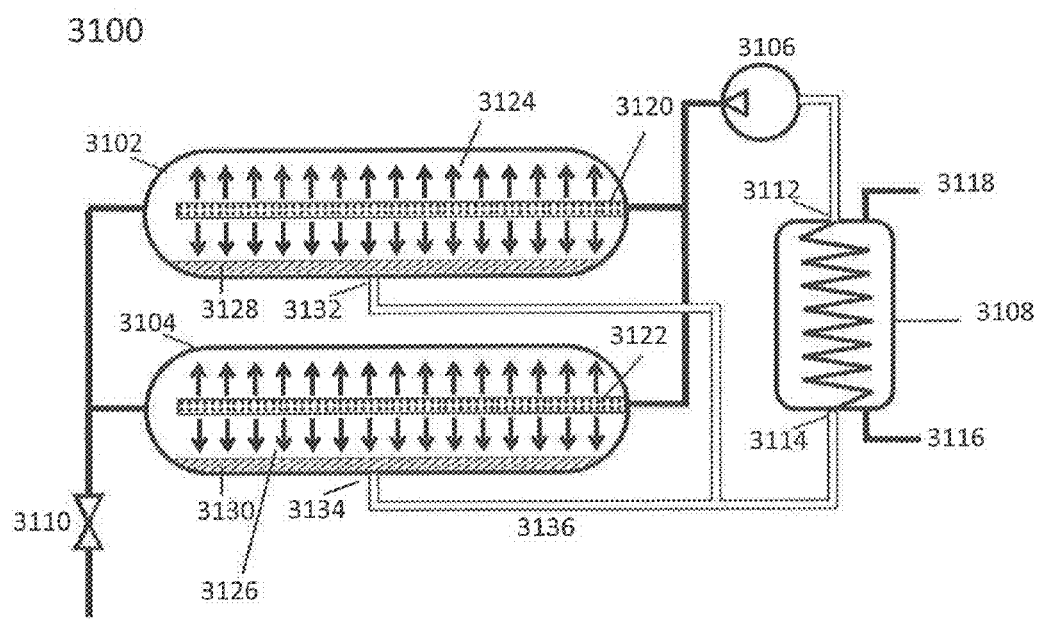
FIG. 31 is a schematic drawing of compressed-gas storage vessels with internal heat exchange in accordance with various embodiments of the invention.

FIG. 31 is a schematic of an illustrative alternative compressed-air storage reservoir subsystem 3100 for heating and cooling of compressed gas in energy storage systems in order to expedite transfer of thermal energy to and from the compressed gas prior to and/or during expansion or compression. As depicted, thermal energy transfer to and from stored fluid in storage reservoirs 3102, 3104 is expedited via liquid circulation using a pump 3106. The liquid pump 3106 operates with a small pressure change sufficient for circulation and spray (and/or foam generation), but within a housing that is able to withstand high pressures; that is, it circulates high-pressure water (or other suitable heat-transfer fluid) through heat exchanger 3108 and introduces the liquid into storage reservoirs 3102 and 3104 without substantially increasing its pressure (e.g., a 50 psi increase for circulating and spraying within 3,000 psig stored compressed gas). The heat exchanger may be omitted or bypassed in other embodiments. The heat exchanger 3108 may be any sort of standard heat exchanger design; illustrated here is a tube-in-shell heat exchanger with high-pressure liquid inlet and outlet ports 3112 and 3114 and low-pressure shell liquid ports 3116 and 3118. The shell ports 3116 and 3118 may permit communication with a second heat exchanger, a thermal well, or some other body of fluid.

Heat exchange within the storage reservoirs 3102, 3104 is expedited by active spraying or foaming of liquid (e.g., water) into the vessels 3102, 3104. Herein, "spraying" refers to any passage of liquid through a mechanism (e.g., small orifice, engineered nozzle, mechanism directing a spray against an impingement pin or plate) that acts upon the liquid mechanically in such a manner as to divide the liquid into droplets. "Foaming" refers to any passage of liquid through a mechanism that mingles it with gas to form a foam; such mechanisms include schemes where the liquid is directed against a surface producing or acted upon by ultrasound, which surface vibrates the liquid in such a way as to produce breakup or foaming. All such mechanisms are contemplated and within the scope of the invention. The illustrative system of FIG. 31 shows multiply perforated rods (spray rods) as the spray/foaming mechanism. As illustrated in FIG. 31, perforated rods 3120 and 3122 may be installed inside storage reservoirs 3102 and 3104. The perforated rods 3120, 3122 may be located along or at the top of the storage reservoirs 3102, 3104, along the middle portion of the storage reservoirs (as illustrated in FIG. 31), and/or along the bottom of the storage reservoirs (e.g., a sparging type arrangement). The rods 3120, 3122 may extend through part or all of the length of the storage reservoirs 3102, 3104. The pump 3106 increases the liquid pressure above the reservoir pressure such that liquid is actively circulated and sprayed/foamed out of rods 3120, 3122, as shown by arrows 3124 and 3126. With spraying and/or foaming into storage reservoirs 3102 and 3104, droplets or foam matrices of the liquid within the gas inside storage reservoirs 3102, 3104 occurs, enabling efficient heat transfer between the liquid and the gas. Foam may partially or substantially fill the storage reservoirs 3102, 3104. Over time, the foam will tend to separate, producing accumulations of liquid 3128, 3130 at the bottom of the storage reservoirs 3102, 3104. Liquid thus accumulated may be removed through ports 3132, 3134 and associated piping 3136. The piping 3136 returns the liquid to the heat exchanger 3108, through which the liquid 3128, 3130 is circulated as part of the closed-loop water circulation and spray/foaming system. Valve 3110, when open, places the subsystem 3100 in fluid communication with an energy-storage system such as system 2700 in FIG. 27.

In various other embodiments, foam or gas is circulated from storage reservoirs 3102, 3104 through heat exchanger 3108. The fluid circulated through the external loop of heat exchanger 3108 may, in various embodiments, be a gas, liquid, or foam. The ports 3132, 3134 may be located on the top or sides of storage reservoirs 3102, 3104 such as to pull gas (e.g., in a sparging arrangement) or foam instead of preferentially pulling separated liquid. The storage reservoirs 3102, 3104 and their internal spray mechanisms 3120, 3122 are depicted in FIG. 31 in a horizontal position but other orientations are contemplated and within the scope of the invention. Two storage reservoirs 3102, 3104 are depicted in FIG. 31 but other numbers of storage reservoirs, such as, e.g., pipelines and natural or artificial caverns are contemplated and within the scope of the invention.

Figure 32:
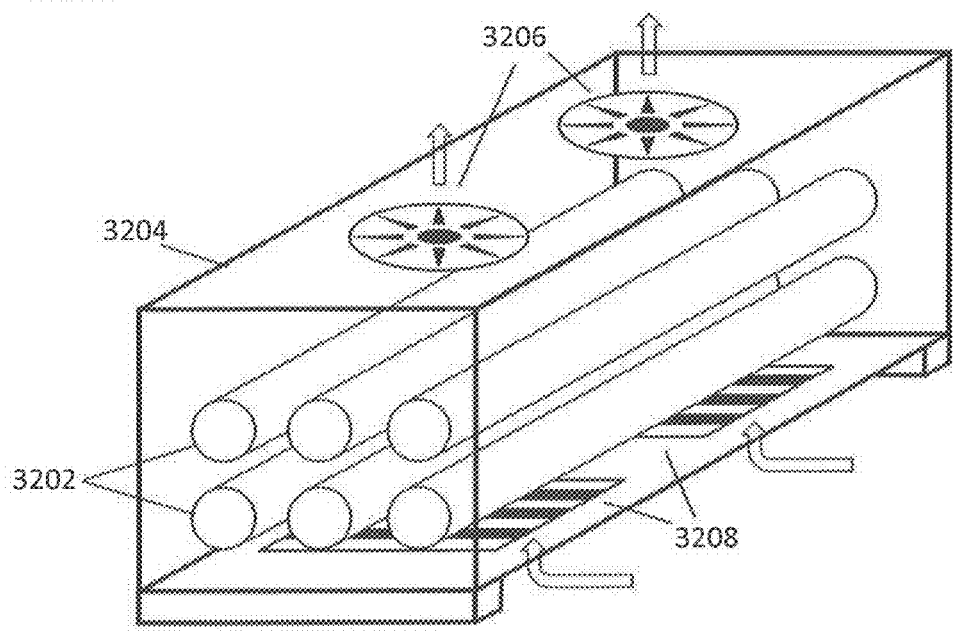
FIG. 32 is a schematic drawing of compressed-gas storage vessels warmed or cooled by a fluid circulating around them in accordance with various embodiments of the invention.

FIG. 32 is a schematic of an alternative compressed-air storage reservoir subsystem 3200 for heating and cooling of compressed gas in energy storage systems, to expedite transfer of thermal energy to and from the compressed gas prior to and/or during expansion or compression. Thermal energy transfer to and/or from stored compressed gas in storage reservoirs 3202 is expedited via fluid circulation using an enclosure 3204 and air circulation fans 3206. The storage reservoirs 3202 may also include heat-exchange liquid, which may be separated or mingled with the gas in the storage reservoirs 3202 to form a foam that partially or entirely fills the storage reservoirs 3202. Separated liquid, foam, and gas not incorporated in a foam may coexist in the storage reservoirs 3202 and in all other high-pressure storage reservoirs depicted herein. In the subsystem 3200, fluid (e.g., air) enters the enclosure 3204 through intake openings (e.g., vents) 3208. The fluid may be at a temperature different from the compressed gas within the storage reservoirs 3202. The storage reservoirs 3202 are in an arrangement that permits substantial circulation of fluid around and between them. Fluid circulating around and between the storage reservoirs 3202 gains thermal energy from the storage reservoirs 3202 if the fluid entering through the vents 3208 is at a lower temperature than the fluid within the storage reservoirs 3202; similarly, the storage reservoirs 3202 gain thermal energy from the fluid entering through the vents 3208 if the circulating fluid is at a higher temperature than the fluid within the storage reservoirs 3202. Fluid that has circulated around and between the storage reservoirs 3202 is typically pulled from the enclosure 3204 by exhaust devices (e.g., pumps, fans) 3206, represented illustratively in FIG. 32 as fans. The gas exhausted by devices 3206 may be confined by one or more ducts (not shown), circulated through a heat-exchange system to change its temperature, and returned to the vents 3208 through the ducts. The exterior of the enclosure 3204 may be insulated. The fluid entering the intake openings 3208 may be heated or cooled and thus change the temperature of storage reservoirs 3202 and their interior contents. The source of such heating may be waste heat from a source such as a thermal power plant or industrial process, and may be a direct source such as solar heating or fuel fired heating elements.

Valves and piping (not shown) may place the contents of the storage reservoirs 3202 in fluid communication with an energy-storage system such as system 2700 in FIG. 27. The storage reservoirs 3202 are depicted in FIG. 32 in a horizontal position but other orientations are contemplated and within the scope of the invention. Six storage reservoirs 3202 are depicted in FIG. 32 but other numbers of storage reservoirs, as well as other types of gas storage, are contemplated and within the scope of the invention.

Figure 33:
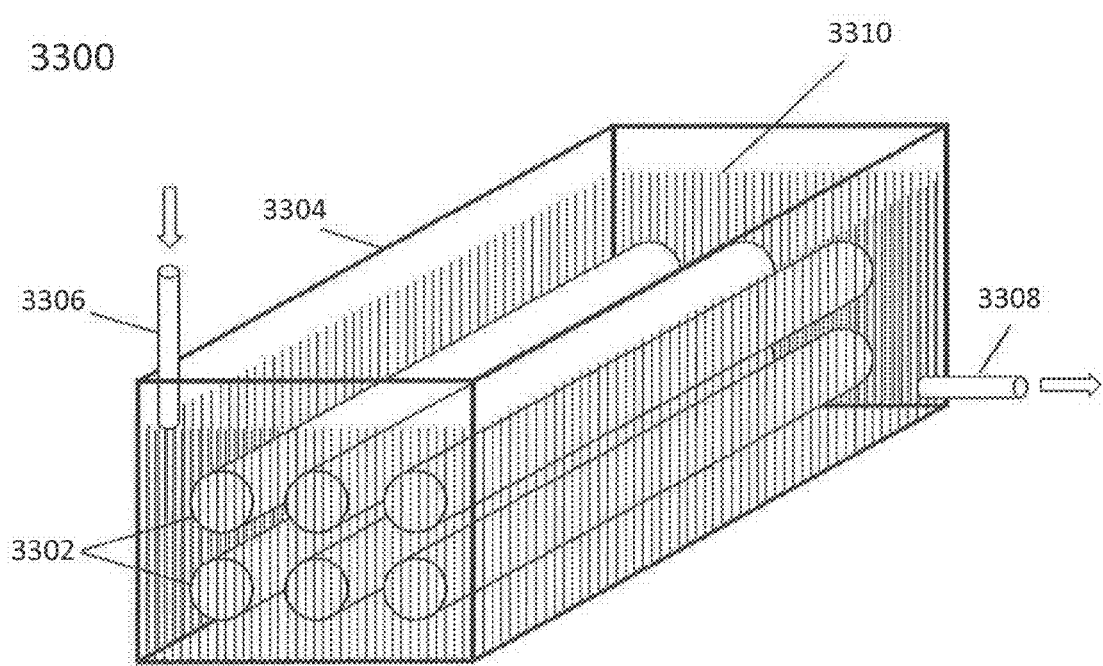
FIG. 33 is a schematic drawing of compressed-gas storage vessels warmed or cooled by a liquid circulating around them in accordance with various embodiments of the invention.

FIG. 33 is a schematic of yet another compressed-air storage reservoir subsystem 3300 for use with heating and cooling of compressed gas in energy storage systems, to expedite transfer of thermal energy to and from the compressed gas prior to and/or during expansion or compression. Thermal energy transfer to and from stored compressed gas in storage reservoirs 3302 is expedited via circulation of one or more fluids (e.g., water, aqueous foam) in an enclosure 3304 and using piping 3306, 3308 to respectively admit fluid to and remove fluid from the enclosure 3304. The storage reservoirs 3302 may also contain heat-exchange liquid, which may be separated or mingled with the gas in storage reservoirs 3302 to form a foam that partially or entirely fills the storage reservoirs 3302. In the exemplary subsystem 3300 depicted in FIG. 33, the fluid level 3310 in enclosure 3304 is indicated by closely-spaced vertical lines. Fluid enters the enclosure 3304 through pipe 3306. The fluid may be at a temperature different from that of the fluid within the storage reservoirs 3302. The storage reservoirs 3302 are preferably in an arrangement that permits substantial circulation of water (or other fluid) around and between them. Fluid circulating around and between the storage reservoirs 3302 gains thermal energy from the storage reservoirs 3302 if the fluid entering through pipe 3306 is at a lower temperature than the fluid within the storage reservoirs 3302; similarly, the storage reservoirs 3302 gain thermal energy from the fluid if the fluid entering through the pipe 3306 is at a higher temperature than the fluid within the storage reservoirs 3302. Fluid that has circulated around and between the storage reservoirs 3302 is removed from the enclosure through pipe 3308. The fluid removed through pipe 3308 may be circulated through a heat-exchange system (not shown in FIG. 33) to change its temperature and returned to the enclosure 3304 through pipe 3306.

Valves and piping (not shown) may place the contents of the storage reservoirs 3302 in fluid communication with an energy-storage system such as system 2700 in FIG. 27. The storage reservoirs 3302 are depicted in FIG. 33 in a horizontal position but other orientations are contemplated and within the scope of the invention. Six storage reservoirs 3302 are depicted in FIG. 33 but other numbers of storage reservoirs are contemplated and within the scope of the invention.

Figure 34:
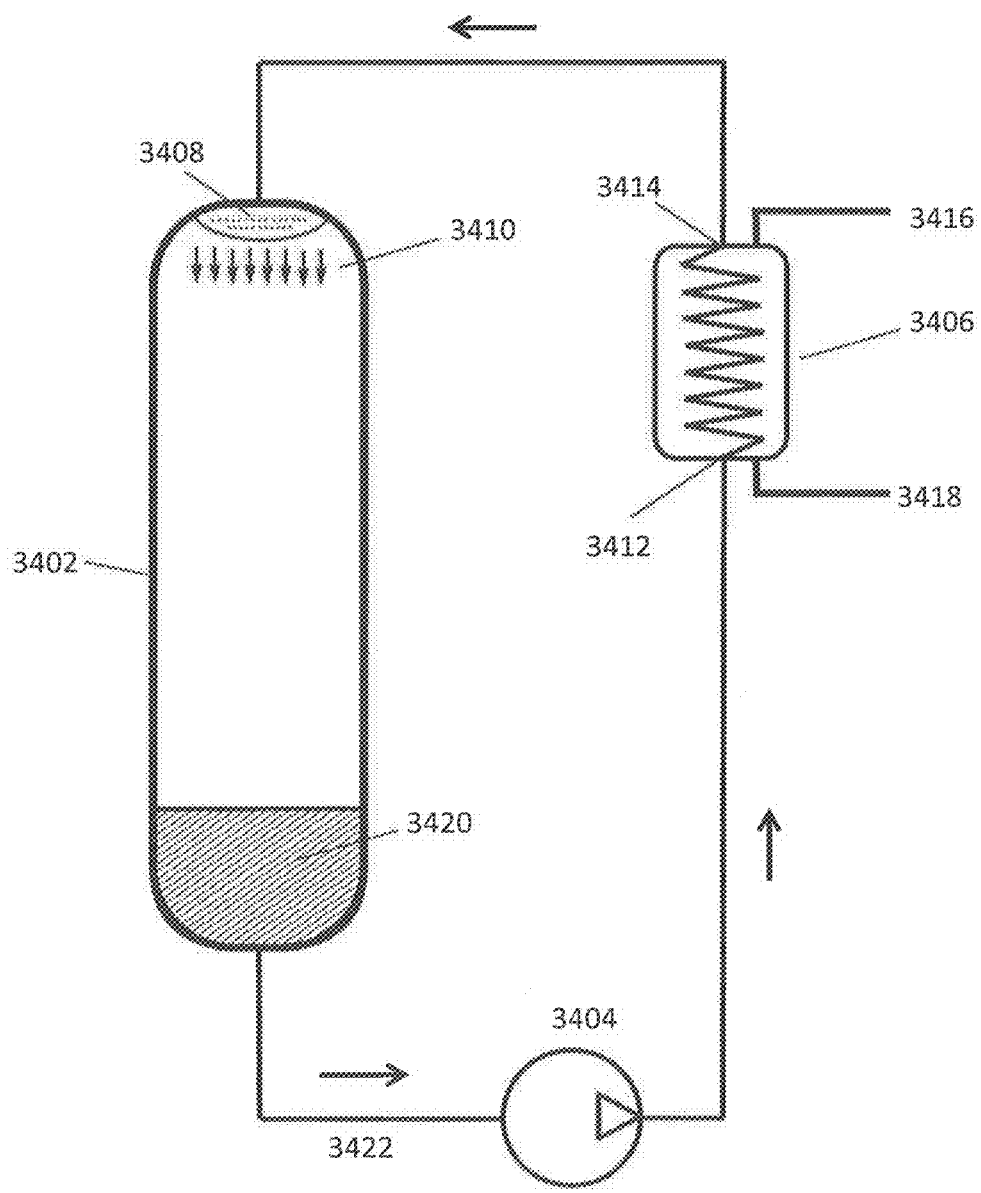
FIG. 34 is a schematic drawing of a cavern storing compressed gas and heat-exchange liquid, with external heat exchange in accordance with various embodiments of the invention.

FIG. 34 illustrates another compressed-air storage reservoir subsystem 3400 for heating and cooling of compressed gas in energy-storage systems, to expedite transfer of thermal energy to and from the compressed gas prior to and/or during expansion or compression. Thermal energy transfer to and from stored compressed gas in a pressurized reservoir such as a cavern 3402 (e.g., a naturally occurring or artificially created cavern, which may be located underground) is expedited via liquid circulation using a liquid pump 3404 and heat exchanger 3406. The cavern 3402 may also contain heat-exchange liquid, which may be separated or mingled with the gas in the cavern 3402 to form a foam that partially or entirely fills the cavern 3402. Liquid or foam 3420 may pool at the bottom of the cavern 3402. The pump 3404 operates with a small pressure change sufficient for circulation and spray/foam generation, but within a housing that is able to withstand high pressures; pump 3404 circulates high-pressure fluid through heat exchanger 3406 and then to a spray/foam-generation mechanism 3408, creating a foaming spray 3410 inside the cavern 3402 without substantially increasing the pressure of the fluid (e.g., a 50 psi increase for circulating and spraying within 3,000 psi stored compressed air). In this way, the stored compressed gas may be pre-heated (or pre-cooled) using a fluid circulation and spraying/foaming method, which also may allow for active liquid monitoring of the storage cavern 3402. The two-phase heat exchange may occur as pre-heating prior to expansion and/or pre-cooling prior to compression. The circulation may be done without heat exchanger 3406 and serve to maintain the heat exchange liquid and gas at substantially the same temperature during an expansion or compression. The pump 3404 may be submerged in the liquid or foam 3420 or be external to the liquid or foam 3420. The heat exchanger 3406 may be of any standard heat-exchanger design; illustrated here is a tube-in-shell heat exchanger with high-pressure liquid inlet and outlet ports 3412 and 3414 and low-pressure shell liquid ports 3416 and 3418. The shell ports 3416 and 3418 may permit communication with a second heat exchanger or a thermal well or some other body of fluid.

Heat exchange within the storage cavern 3402 is expedited by active spraying and foam generation 3410 of liquid (e.g., water with one or more foaming additives) into the cavern 3402. Illustrated in FIG. 34 is a scheme where one or more perforated spray heads 3408 are installed within the storage cavern 3402. Pump 3404 increases the fluid pressure above the cavern pressure such that fluid is actively circulated and sprayed out of spray head 3408. Foam may partially or entirely fill the volume of cavern 3402. Due to foam separation, liquid and/or foam 3420 may accumulate at the bottom of the cavern 3402 and be removed through piping 3422. The piping 3422 returns the liquid and/or foam 3420 to the pump 3404 and heat exchanger 3406, through which the liquid and/or foam is circulated as part of the closed-loop fluid circulation and foam-generation and/or foam-regeneration system. A valve or valves and piping (not shown) may place cavern 3402 in fluid communication with an energy-storage system such as system 2700 in FIG. 27.

If the cavern 3402 is of sufficient size, a substantial mass of liquid and/or foam 3420 may be allowed to accumulate at the bottom of the cavern 3402. In this case, this mass of liquid and/or foam 3420 may exchange heat relatively slowly with the air also contained in cavern 3402, and may be used as a thermal reservoir.

A vertical cavern shape and spray-head-type internal foam-generation mechanism 3408 are depicted in FIG. 34 but other orientations and spray or foam-generation mechanisms (e.g., spray rod, multiple nozzles) are contemplated and within the scope of the invention. The spray head 3408 may be located at the bottom of the cavern to allow sparging of air into the accumulating liquid and/or foam 3420 to form or regenerate a foam within the cavern 3402. A single cavern 3402 is depicted in FIG. 34 but other numbers of caverns and storage reservoirs featuring both caverns and other forms of gas storage (e.g., pressure vessels and/or pipes) are contemplated and within the scope of the invention.

Figure 35:
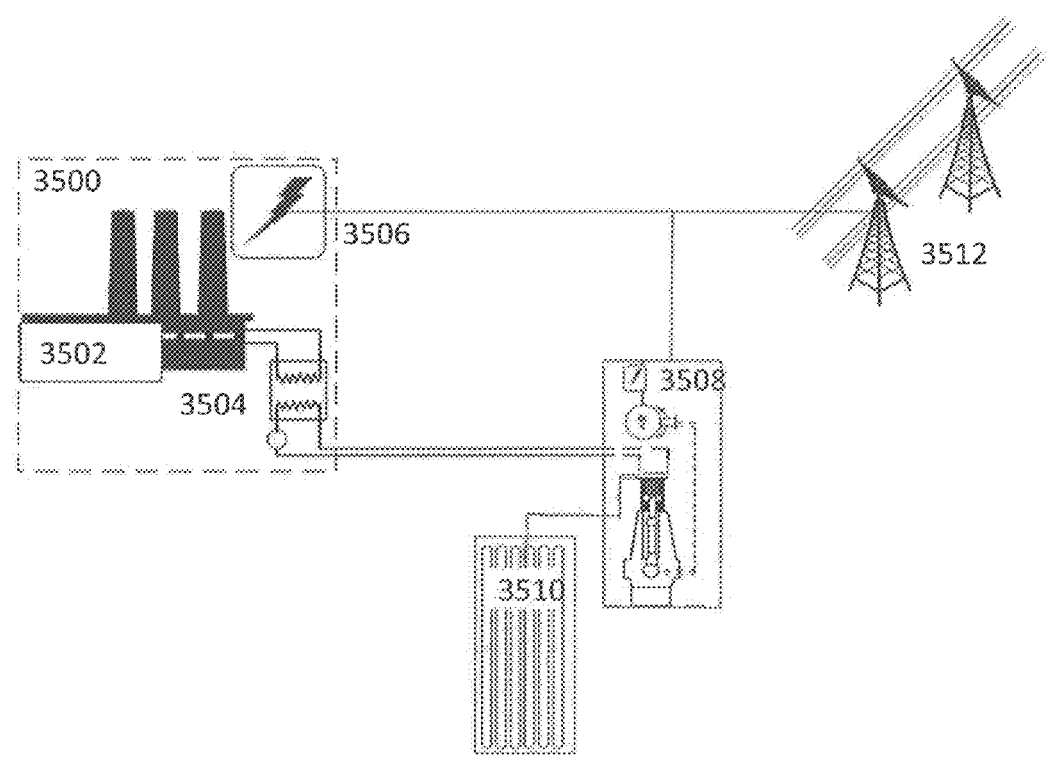
FIG. 35 is a schematic of various components of an energy storage and recovery system in accordance with various embodiments of the invention, illustrating an application where waste heat from a power plant is used to heat stored compressed gas prior to and/or during expansion in the system.

FIG. 35 is a diagram of various components of an energy storage and recovery system in accordance with various embodiments of the invention. The illustrated system includes or consists essentially of an installation 3500 where thermal energy is available for recovery, extracted from the surroundings, needed for usage, and/or may be removed for cooling. Example installations 3500 include fossil-fuel based power plants (e.g., coal, natural gas); other heat-engine based power plants such as nuclear, solar thermal, and geothermal; industrial processes with waste heat; heat pumps, heat sources, and heat sinks; buildings needing space heating or cooling; and sources of environmentally chilled water. In FIG. 35, for illustrative purposes, a power plant 3502 is shown whose excess thermal energy is recoverable through a standard heat-exchange unit 3504. Generated power 3506 from the power plant 3502 may be used to drive the compressed-gas energy storage system 3508 as determined by the operator (e.g., when market demand for power is low), storing energy in the form of compressed gas in storage reservoir 3510.

Energy may be additionally stored as the thermal energy or exergy of liquids cooled below the environmental temperature or warmed above it, and these liquids may be located in the same vessels that contain the compressed gas (e.g., mingled with it as a foam) or separated from the gas and stored in separate vessels. Upon demand for increased power, this stored energy undergoes expansion (e.g., staged expansion) in the compressed-gas energy storage system 3508 to generate power for usage (e.g., power grid delivery 3512). The recovered thermal energy from the power plant 3502 may be used in the heat-exchange subsystem of the compressed-gas storage reservoir 3510 (or other pressurized storage) to preheat the stored compressed gas and/or to heat the heat-exchange fluid and gas before or during expansion and/or between expansion/compression stages in mid-pressure vessels, increasing the work done by a given volume of pressurized gas and improving system efficiency and/or performance. Likewise, but not illustrated herein, water cooled by heat exchange with cold environments, ground loops, water loops, or other low-temperature reservoirs may be used in the heat-exchange subsystem to pre-cool and/or continually cool the compressed gas prior to and during further compression, improving system efficiency and/or performance. In all these instances, performance and/or value of the system may be markedly improved.

Figure 36:
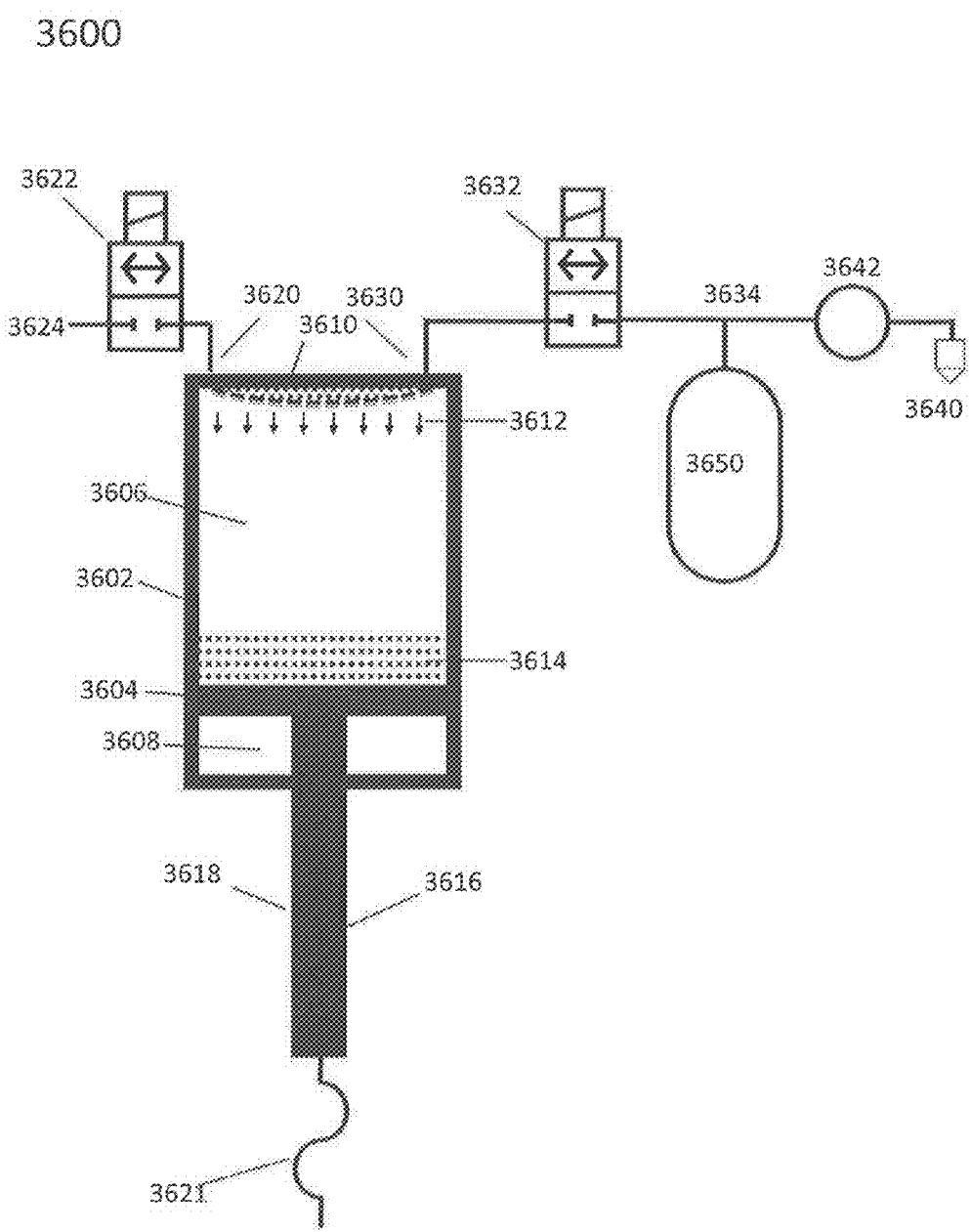
FIGS. 36 and 37 are schematic drawings of energy storage and recovery systems incorporating a cylinder assembly and one or more expanders, compressors, or expander/compressors in accordance with various embodiments of the invention.

FIG. 36 depicts an illustrative system 3600 that substantially isothermally compresses or expands gas over a predetermined pressure range in accordance with various embodiments of the present invention. System 3600 includes a cylinder 3602 containing a mobile piston 3604 (or other suitable boundary mechanism) that divides the interior of the cylinder 3602 into a gas-filled chamber (also termed air chamber or pneumatic chamber) 3606 (and a liquid-filled, i.e., hydraulic) chamber 3608. Alternatively, chamber 3608 may be gas-filled, and/or the air chamber 3606 may contain one or more of gas, liquid, and foam. An integrated heat-exchange mechanism is typically present in chambers 3606 and/or 3608, as described in the '155 patent and/or as shown in FIG. 2. In the illustrative embodiment shown in FIG. 36, a spray head 3610 injects a spray 3612 of fluid into the upper chamber 3606 of the cylinder 3602. This spray 3612 may include or consist essentially of an aqueous foam comprising both gas and a heat-exchange liquid, or of a liquid that mixes with gas in the air chamber 3606 to form an aqueous foam. Foam 3614 partially or entirely fills the air chamber 2606; partial separation of the foam 3614 may also occur, allowing liquid to accumulate on top of piston 3604. Ports 3620 and 3630 with valves 3622 and 3632 allow gas to be admitted to or exhausted from chamber 3606 as desired. A port or ports (not shown) with associated pipes and valves (not shown) allow fluid to be admitted to or withdrawn from chamber 3608 as desired.

During air expansion, the gas in chamber 3606 expands, performing work on piston 3604. As the gas in chamber 3606 expands, its temperature tends to fall, and thermal energy is transferred from to the gas from the heat-transfer liquid within chamber 3606 (e.g., the liquid component of a foam partly or wholly filling chamber 3606). The transfer of thermal energy to the gas from the liquid in chamber 3606 increases the amount of work performed by the expanding gas on the piston 3604. As the gas in chamber 3606 expands, its temperature tends to fall, and thermal energy is transferred from to the gas from the heat-transfer liquid within chamber 3606 (e.g., the liquid component of a foam partly or wholly filling chamber 3606). The transfer of thermal energy to the gas from the liquid in chamber 3606 increases the amount of work performed by the expanding gas on the piston 3604.

During air compression, piston 3604 moves upward and thus compresses the gas in chamber 3606. As the gas in chamber 3606 is compressed, its temperature tends to rise, and thermal energy is transferred from the gas to the heat-transfer liquid within chamber 3606 (e.g., the liquid component of a foam partly or wholly filling chamber 3606). The transfer of thermal energy from the gas to the liquid in chamber 3606 decreases the amount of work that the piston 3604 must perform on the expanding gas.

The transfer of thermal energy to the liquid from the gas in chamber 3606 reduces the amount of work that the piston 3604 performs on the gas in chamber 3606 in order to compress the gas.

To prepare the cylinder 3602 for compression, low-pressure gas is admitted from point 3634 through valve 3632 and port 3630 into upper chamber 3606 during a downward stroke starting with piston 3604 near or at the top of cylinder 3602. The gas may be mingled with liquid to form a foam, either before, during, or after admission to chamber 3606. In various embodiments of the invention, the inlet pressure at point 3634 is raised above atmospheric pressure by a blower (e.g., lobe type) or pump/compressor (e.g., screw pump) 3642 that draws in atmospheric-pressure or near-atmospheric-pressure gas through inlet/vent 3640. The compression by pump/compressor 3642 may be predominantly adiabatic; alternatively, pump/compressor 3642 may include, e.g., a screw pump that permits the introduction of a heat-exchange foam and/or droplets into air undergoing compression and/or expansion within screw pump 3642, enabling the substantially isothermal compression and/or expansion of air within screw pump 3642. The foam may be subsequently pumped by the screw pump 3642 to chamber 3606. Moreover, as shown in FIG. 36, the screw pump 3642 may be a bidirectional expander/compressor; hence, references herein to "compressor 3642" and "expander 3642" below may refer to a single bidirectional screw-pump unit. The outlet of the compressor 3642 may be attached to a low-pressure vessel 3650 near or at the predetermined minimum system pressure at point 3634 (i.e., the super-atmospheric pressure enabled by the compressor 3642 and that serves as the inlet pressure to cylinder 3602) in order that low-pressure vessel 3650 may provide a buffer such that the compressor 3642 may operate continuously at near-constant power. The low-pressure vessel 3650 may contain integrated heat exchange as described above and in the '155 patent. At or near the bottom of a downward (intake) stroke preparatory to compression, where piston 3604 is at or near the bottom of cylinder 3602 and chamber 3606 is filled with gas (and/or foam) at a predetermined pressure by the action of compressor 3642 and valve 3632, valve 3632 is closed. An upward compression stroke follows. At a predetermined high pressure, which may be equal to the pressure at point 3624 (e.g., the pressure in a high-pressure storage reservoir like reservoir 222 or higher-pressure cylinder in a multi-stage system), valve 3622 is opened, connecting chamber 3606 through port 3620 to point 3624. The pressurized gas and/or foam is then forced through valve 3622 to point 3624, until piston 3604 is near or at the top of cylinder 3606, whereupon valve 3622 closes and the process repeats with another intake stroke.

In comparison to a system otherwise identical to system 3600 but lacking a compressor 3642, the presence of the compressor 3642 in system 3600 enables a greater amount (mass) of gas to be compressed in a single upstroke of piston 3604 within cylinder 3602. The work of compression done in a single stroke with compressor 3642 is higher than without compressor 3642 and more gas is compressed to point 3624.

The efficiency of the total compression for predominantly adiabatic compression by compressor 3642 and substantially isothermal compression in the cylinder 3602 is typically less than a substantially isothermal compression completely within the cylinder 3602 over the entire pressure range, as previously mentioned. The efficiency of the total compression for substantially isothermal compression by compressor 3642 and substantially isothermal compression in the cylinder 3602 is also typically less than a substantially isothermal compression completely within the cylinder 3602 over the entire pressure range. The addition of the compressor 3642 thus generally increases the power of system 3600 (i.e., the rate at which system 3600 transforms work to potential energy of compressed gas) at the expense of efficiency. The degree of tradeoff between power and efficiency that is optimal typically varies depending on the application in which system 3600 is used. Additionally, for a given outlet pressure at port 3620, the higher starting pressure within chamber 3606 of the cylinder 3602 reduces the pressure range (ratio of outlet pressure to inlet pressure) over which the cylinder 3602 acts during the course of a stroke; as reviewed above, this also narrows the range of forces that act on rod 3618 that is attached to the piston 3604 and whose nether end extends out of cylinder 3602. This narrowing of the range of forces in turn enables more efficient conversion of electrical energy by a motor/generator (not shown) to work in the system 3600, as previously discussed.

During an expansion, a predetermined amount of compressed gas and/or foam at high pressure is admitted from point 3624 (e.g., from a storage vessel such as reservoir 222 in FIG. 2 or higher-pressure cylinder in a multi-stage system such as system 2700 in FIG. 27) through valve 3622 and port 3620 into chamber 3606. The amount of gas and/or foam admitted may be set by a control system (e.g., controls system 122 in FIG. 1) such that after fully expanding on a downward stroke (i.e., when piston 3604 reaches the bottom of cylinder 3602), the gas and/or foam reaches a predetermined minimum system pressure that is typically super-atmospheric (e.g., approximately 5 psig). For example, the control system may be responsive to one or more sensors measuring gas flow rate and/or pressure within cylinder 3602 to meter the gas introduction. On the upward return stroke of the cylinder 3602, that gas is exhausted through valve 3632 to point 3634.

In various embodiments of the invention, the piping at point 3634 is attached to an expander 3642 that converts the pressurized gas flow into rotational motion; in such embodiments, gas flow through the expander 3642 generates power additional to the amount generated by the expansion within the cylinders. The expansion through the expander 3642 may be predominantly adiabatic; alternatively, expander 3642 may permit the introduction of a heat-exchange foam and/or droplets into air undergoing expansion within expander 3642, enabling the substantially isothermal expansion of air within expander 3642. After expansion through the expander 3642, the gas (or gaseous component of foam) may be exhausted to the atmosphere through vent 3640. In addition, as shown in FIG. 36, a low-pressure vessel 3650 near or at the predetermined minimum system pressure (i.e., the super-atmospheric pressure input to the expander 3642 and that serves as the outlet pressure of cylinder 3602) may also be connected at point 3634 in order to provide a buffer such that the expander 3642 may operate continuously at near-constant power. As mentioned above, the low-pressure vessel 3650 may contain an integrated heat-exchange mechanism.

By ending the expansion stroke within cylinder 3602 at a pressure above atmospheric pressure, a greater amount (mass) of gas may be expanded in a single downstroke of piston 3604 within cylinder 3602. The work of expansion done in that single stroke (higher forces acting over a distance) will be higher than the amount of work performed by an otherwise identical stroke during which a smaller amount of gas is expanded (lower forces acting over the same distance). Moreover, if an expander 3642 is employed, additional power may be generated that would be lost if the super-atmospheric-pressure gas in chamber 3606 at the end of an expansion stroke were vented directly to the atmosphere. The total efficiency of a predominantly adiabatic expansion in expander 3642 combined with a predominantly isothermal expansion in cylinder 3602 is typically less than the efficiency of a near-isothermal expansion completely within the cylinder 3602 over the entire pressure range. The efficiency of the total expansion for substantially isothermal expansion by expander 3642 and substantially isothermal expansion in the cylinder 3602 is also typically less than a substantially isothermal expansion completely within the cylinder 3602 over the entire pressure range. The employment of super-atmospheric venting pressure combined with an expander 3642 thus generally adds power at the expense of efficiency. The degree of tradeoff between power and efficiency that is optimal typically varies depending on the application in which system 3600 is used. Additionally, the higher vent pressure of the cylinder 3602 reduces the pressure range over which the cylinder 3602 acts for a given outlet pressure (i.e., where range is outlet/inlet pressure), such that some benefit of efficiency of power transmission may be achieved by operating the cylinder 3602 over a narrower pressure (and thus force) range.

A control system (e.g., control system 122 in FIG. 1) may control the compressor/expander 3642 and cylinder 3602 in order to enforce substantially isothermal expansion and/or compression of gas in cylinder 3602 over a particular range of super-atmospheric pressures and substantially adiabatic compression and/or expansion in expander/expander 3642 between approximately atmospheric pressure and the minimum super-atmospheric pressure of operation of cylinder 3602. For example, the control system may direct the introduction of gas and/or foam into and the exhausting of gas and/or foam out of cylinder 3602 and expander/expander 3642 via, e.g., control over the various ports and/or valves associated with these components. The control system may be responsive to one or more sensors disposed in or on cylinder 3602 and/or expander/expander 3642 for measuring the pressure of the gas within these components, and direct movement of the gas within system 3600 accordingly. As described above, control of substantially isothermal compression and/or expansion within cylinder 3602 may also entail control over an associated heat-transfer subsystem that may foam heat-exchange liquid with the gas. Such heat-transfer subsystems may be turned off or rendered idle during substantially adiabatic or substantially isothermal compression and/or expansion in expander/expander 3642.

Figure 37:
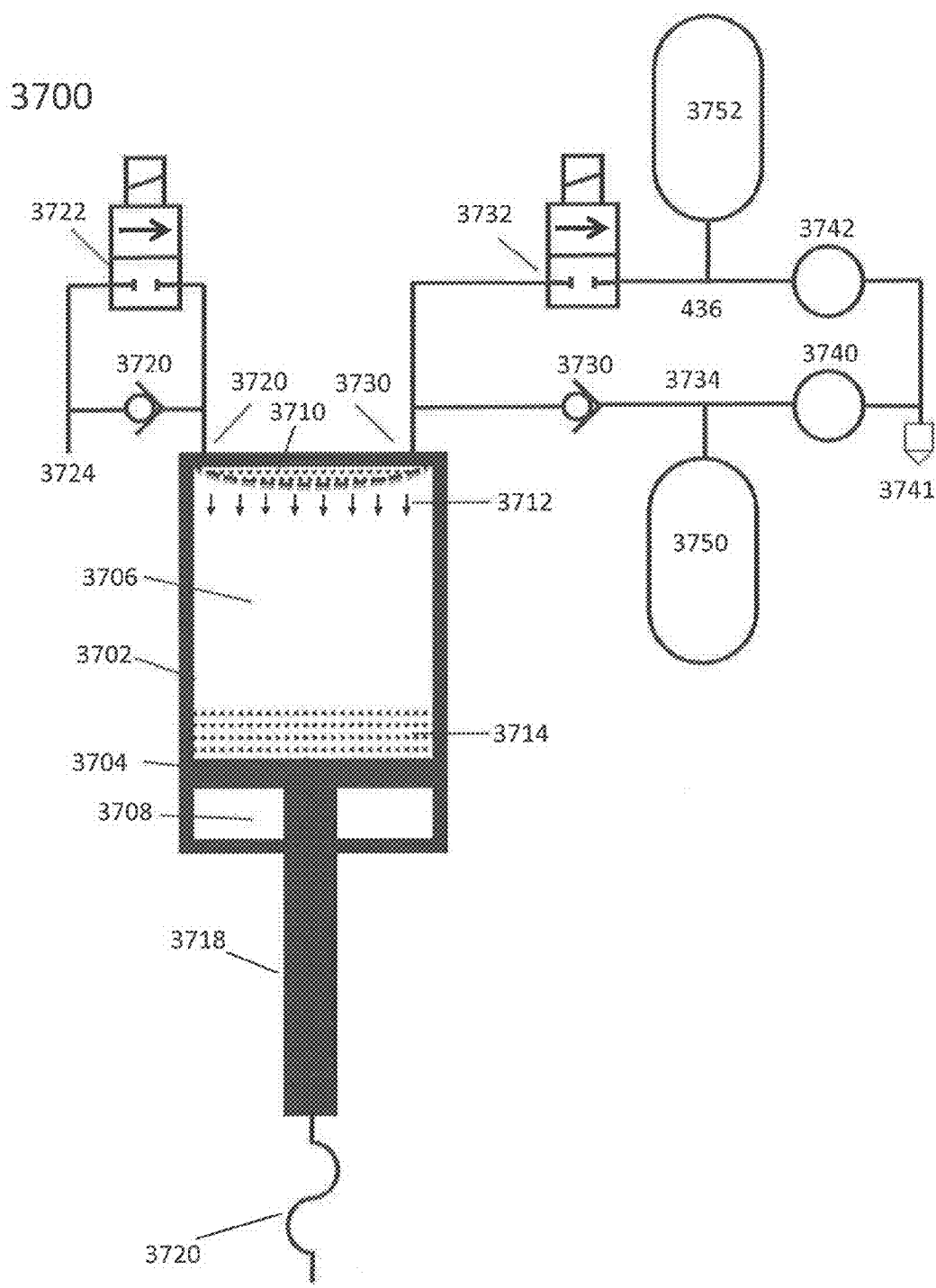

FIG. 37 depicts an illustrative system 3700 that substantially isothermally compresses or expands gas over a predetermined pressure range in accordance with various embodiments of the present invention. System 3700 employs the same substantially isothermal cylinder stage shown in system 3600 of FIG. 36, but features a separate and parallel set of control valves and other components for expansion and compression. System 3700 includes a cylinder 3702 containing a mobile piston 3704 that divides the interior of the cylinder 3702 into a gas-filled (pneumatic) chamber 3706 and a liquid-filled (hydraulic) chamber 3708. Alternatively, both chambers 3706 and 3708 may be gas-filled. An integrated heat-exchange mechanism may be present in chambers 3706 and/or 3708, as described in the '155 patent and/or as shown in FIG. 36. In the illustrative embodiment, a spray head 3710 forms a spray 3712 of heat-exchange liquid, thereby forming a foam with the gas in the upper chamber 3706 of the cylinder 3702. In other embodiments, the spray head 3710 may be located outside the cylinder 3702. This spray 3712 may produce an accumulation of liquid 3714 on top of piston 3704. Ports 3720 and 3730 with valves 3722 and 3732 allow gas to be admitted to or exhausted from chamber 3706 as desired. A port or ports (not shown) with associated pipes and valves (not shown) allows fluid to be admitted to or withdrawn from chamber 3708 as desired.

During air expansion, gas and/or foam in chamber 3706 expands, performing work on piston 3704. As the gas in chamber 3706 expands, its temperature tends to fall. If during expansion the spray 3712 enters chamber 3706 at a suitable temperature (e.g., the temperature of the gas in chamber 3706 before compression begins), then the liquid component of the foam is at a higher temperature during expansion than the gas in chamber 3706, and the liquid component of the foam transfers thermal energy to the gas in chamber 3706. The transfer of thermal energy from the liquid component of the foam to the gas in chamber 3706 increases the amount of work performed by the expanding gas on the piston 3704. In effect, this transfer of thermal energy from the liquid component of the foam to the gas in chamber 3706 enables the conversion of some of the thermal energy in the spray 3712 into work.

During air compression, piston 3704 moves upward and thus compresses the gas in chamber 3706. While the gas in chamber 3706 is being compressed by the piston 3704, its temperature tends to rise. If during compression the liquid spray 3712 enters chamber 3706 at a suitable temperature (e.g., the temperature of the gas in chamber 3706 before compression begins), then the gas in chamber 3706 is at a higher temperature during compression than the liquid component of the foam, and the gas in chamber 3706 transfers thermal energy to the liquid component of the foam. The transfer of thermal energy to the liquid component of the foam from the gas in chamber 3706 reduces the amount of work that the piston 3704 must perform on the gas in chamber 3706 in order to compress the gas.

During a downward stroke (preparatory to a compression stroke) starting with piston 3704 near or at the top of cylinder 3702, low-pressure gas is admitted from point 3734 through valve 3730 (shown here as a check valve) and through port 3730 into upper chamber 3706. In various embodiments of the invention, the inlet pressure at point 3734 is raised above atmospheric pressure by a compressor 3740 (e.g., a screw pump 3740) drawing in atmospheric or near-atmospheric pressure gas through inlet/vent 3741. The compression by compressor 3740 may be predominantly adiabatic; alternatively, compressor 3740 may permit the introduction of a heat-exchange foam and/or droplets into air undergoing compression within compressor 3740, enabling the substantially isothermal compression of air within compressor 3740. As shown in the illustrative example of FIG. 37, the compressor 3740 need not be a bidirectional expander/compressor, but may be implemented as a unidirectional device that may be turned off or rendered idle during expansion mode. The outlet of the compressor 3740 may include an after-cooler or other heat-exchange system (not shown) and may be attached to a low-pressure vessel 3750 near or at the predetermined minimum system pressure at point 3734 in order to provide a buffer such that the compressor 3740 may operate continuously at substantially constant power during compression mode. The low-pressure vessel 3750 may contain integrated heat exchange as described above. At or near the bottom of a downward stroke, where piston 3704 is at or near the bottom of cylinder 3702, chamber 3706 is filled with fluid (e.g., foam) at the predetermined pressure by the action of compressor 3740 and valve 3730, valve 3730 is closed, and an upward compression stroke is performed. Alternatively, as shown, valve 3730 operates as a check valve and closes as soon as the upward compression stroke pressurizes chamber 206 above the pressure at point 3734. At a predetermined high pressure, preferably equal to the pressure at point 3724 (e.g., from a storage reservoir such as reservoir 222 or a higher-pressure cylinder in a multi-stage system), valve 3720 (shown here as a check valve) is opened, connecting chamber 3706 through port 3720 to point 3724. The pressurized fluid is then forced through valve 3720 to point 3724, until piston 3704 is near or at the top of cylinder 3706, when valve 3720 closes and the process repeats with another intake stroke. Alternatively, as shown in FIG. 37, valve 3720 operates as a check valve and opens as soon as the upward compression stroke pressurizes chamber 3706 above the pressure at point 3724 and closes as soon as the downward intake stroke begins, reducing pressure in chamber 3706 below the pressure at point 3724.

Using the compressor 3740, a greater amount (mass) of gas may be compressed in a single upstroke of piston 3704 within cylinder 3702 than may be compressed without using compressor 3740. The work of compression done in that single stroke will be higher than without compressor 3740 and more gas will be compressed to point 3724. The efficiency of the total compression for a predominantly adiabatic compression in compressor 3740 and a predominantly isothermal compression in cylinder 3702 tends to be less than for a substantially isothermal compression completely within the cylinder 3702 over the entire pressure range. The efficiency of the total compression for substantially isothermal compression by compressor 3740 and substantially isothermal compression in the cylinder 3702 is also typically less than a substantially isothermal compression completely within the cylinder 3702 over the entire pressure range. The addition of the compressor 3740 thus typically adds power at the expense of efficiency. Additionally, the higher super-atmospheric starting pressure within the cylinder 3702 reduces the pressure range over which the cylinder 3702 acts for a given outlet pressure (i.e. where range is outlet/inlet pressure), such that some benefit of efficiency of power transmission may be achieved by operating the cylinder 3702 over a narrower pressure (and thus force) range.

During expansion, a predetermined amount of compressed gas at high pressure is admitted from point 3724 (e.g. from a storage reservoir such as reservoir 222 or a higher-pressure cylinder in a multi-stage system) through valve 3722 and port 3720 into chamber 3706. As illustrated in FIG. 37, valve 3722 may be a unidirectional valve, i.e., optimized for flow in only one direction. The amount of gas admitted may be set by the control system 122 such that after fully expanding on a downward stroke (i.e., piston 3704 reaches the bottom of cylinder 3702) the gas reaches the predetermined minimum system pressure for cylinder compression and/or expansion (e.g. approximately 5 psig). On the upward return stroke of the cylinder 3702, that gas is exhausted through valve 3732 to point 3736. In various embodiments of the invention, point 3736 may be attached to an expander 3742 that converts the pressurized gas flow to rotational motion, performing work and generating additional power above the amount generated by the expansion within the cylinder(s). As shown in the illustrative example, the expander 3742 need not be a bidirectional expander/compressor, but may be implemented as a unidirectional expander that may be turned off or rendered idle during compression mode. The expansion through the expander 3742 may be predominantly adiabatic, such as that achieved by a centrifugal or axial-turbine-type expander; alternatively, expander 3742 may permit the introduction of a heat-exchange foam and/or droplets into air undergoing expansion within expander 3742, enabling the substantially isothermal expansion of air within expander 3742. After expansion through the expander 3742, the gas may be exhausted to atmosphere through vent 3741. In addition, as shown in this illustrative embodiment, a low-pressure vessel 3752 near or at the predetermined minimum system pressure may also be connected at point 3736 in order to provide a buffer such that the expander 3742 may operate continuously at substantially constant power. The low-pressure vessel 3752 may contain integrated heat exchange as described above.

By ending the expansion stroke within cylinder 3702 at a pressure above atmospheric pressure, a greater amount (mass) of gas may be expanded in a single downstroke of piston 3704 within cylinder 3702. The work of expansion done in that single stroke is typically higher than that done with less gas. Additionally, with an expander 3742, additional power may be generated that would be lost if the super-atmospheric-pressure gas were vented directly to atmosphere. The efficiency of the total expansion for a predominantly adiabatic expansion in expander 3750 and a predominantly isothermal expansion in cylinder 3702 may be less than a substantially isothermal expansion completely within the cylinder 3702 over the entire pressure range. The efficiency of the total expansion for substantially isothermal expansion by expander 3742 and substantially isothermal compression in the cylinder 3702 is also typically less than a substantially isothermal compression completely within the cylinder 3702 over the entire pressure range. The addition of the higher vent pressure thus typically adds power at the expense of efficiency. The degree of tradeoff between power and efficiency that is optimal typically varies depending on the application in which system 3700 is used. (For example, at certain low pressures, the cost of an expander may not be worth the recovered power; in such a case, vessel 3752 and expander 3742 may be profitably omitted.) Additionally, the higher vent pressure of the cylinder 3702 typically reduces the pressure range over which the cylinder 3702 acts for a given outlet pressure; as a result, the benefit of efficiency of power transmission may be achieved by operating the cylinder 3702 over a narrower pressure (and thus force) range.

Additionally, the higher vent pressure at port 3730 reduces the pressure range (ratio of outlet pressure to inlet pressure) over which the cylinder 3702 acts during the course of a stroke; this also narrows the range of forces that act on rod 3718. This narrowing of the range of forces in turn enables more efficient conversion of work performed by system 3700 to electrical energy by a motor/generator (not shown).

Figure 38:
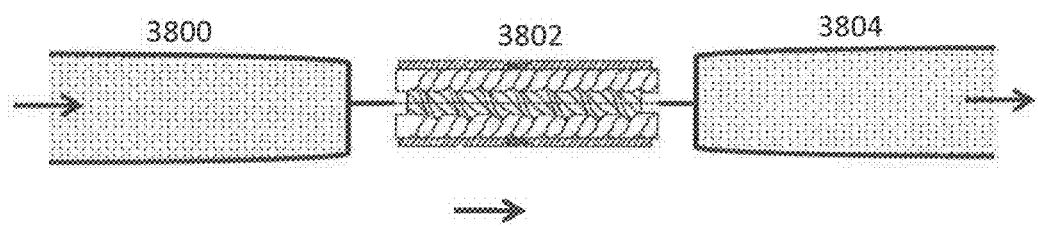
FIG. 38 is a schematic drawing of a booster pump equipped for the formation of foam therewithin in accordance with various embodiments of the invention.

Reference is now made to FIG. 38, which depicts another illustrative embodiment of the invention. A volume 3800 (e.g., pipeline, fluid reservoir, gas reservoir, pneumatic chamber filled with gas or foam) contains fluid at a pressure $P_s$. Due to frictional losses and work performed in creating fluid motion, this pressure $P_s$ may be lower than the pressure $P_i$ at which the fluid was injected into the volume 3800. Alternatively or additionally, pressure $P_i$ may simply be some pressure, higher than $P_s$, to which it is desired to raise fluid extracted from volume 3800. In order to continuously pump the fluid back into the volume 3800, or into another volume 3804 at any pressure (e.g., P) higher than $P_s$, a screw pump 3802 may be installed as a booster pump, symbolized in FIG. 38 by a cartoon of a screw pump. The screw pump 3802 efficiently takes inlet fluid from the volume 3800 at pressure $P_s$ and outputs fluid at pressure $P_t$ for injection back into volume 3800 or into a second volume 3804 (as depicted in FIG. 38).

A screw pump may be employed as a booster or circulation pump in any of the illustrative mechanisms depicted herein that employs a booster or circulation pump. In such applications, the screw pump may feature apparatus that permits the introduction of a heat-exchange foam and/or droplets into air undergoing compression and/or expansion within screw pump, enabling the substantially isothermal compression and/or expansion of air within screw pump. The foam thus generated may be transported by piping from the screw pump to a pneumatic cylinder, separator, storage reservoir, or other component of the energy storage system.

Figure 39:
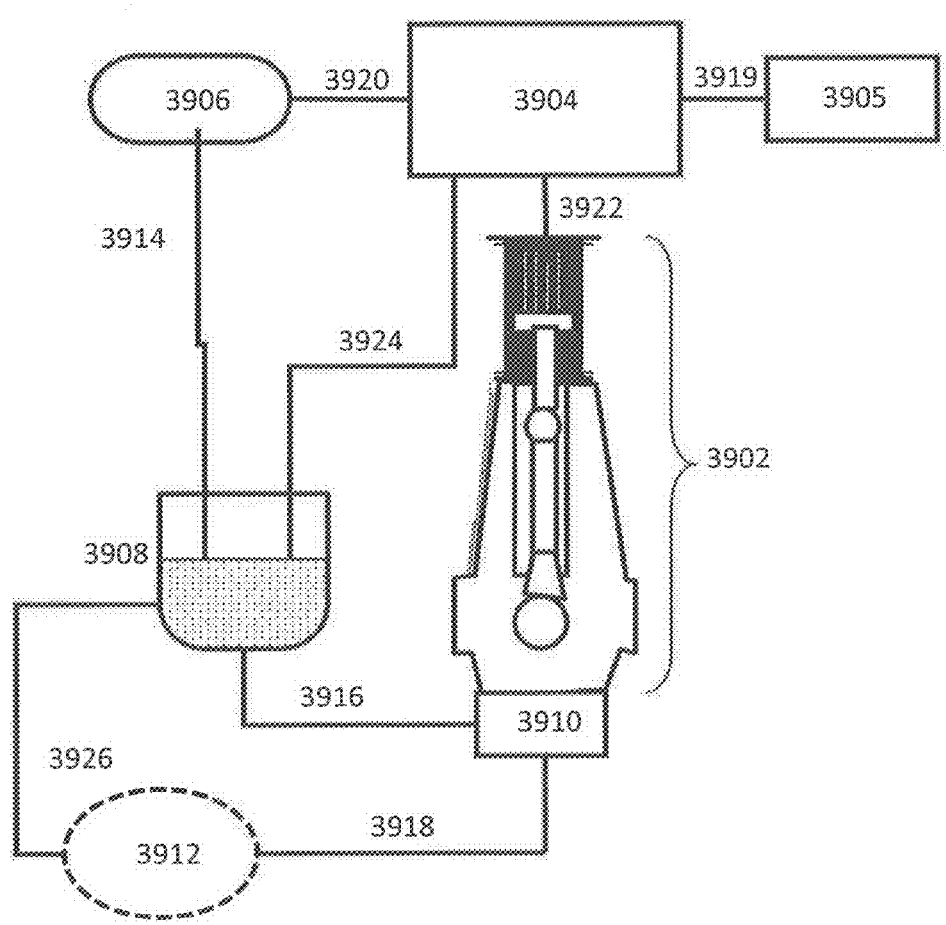
FIGS. 39-44 are schematic drawings of various systems featuring cylinder assemblies for expansion and/or compression of gas, as well as one or more thermal wells, in accordance with various embodiments of the invention.

FIG. 39 depicts an illustrative system 3900 that features a power unit 3902 (including a cylinder assembly unit for compression and expansion of gas), a cylinder heat-exchange system 3904, a vent 3905 to draw air from and exhaust air to the environment, a storage reservoir 3906 capable of holding fluid (e.g., air and/or water) at high pressure (e.g., 3,000 psi), a thermal well 3908 for storage and retrieval of thermal energy (e.g., a body of water), a waste-heat heat-exchange system 3910 coupled to waste heat generated by mechanical and/or electronic components of the power unit 3902, and an environmental heat-exchange system 3912 for exchanging thermal energy with the environment (e.g., the air, the ground). Lines 3914, 3916, 3918, 3919, 3920, 3922, 3924, and 3926 denote piping, valves, and other arrangements for exchange of gas, liquid, and/or thermal energy between the components the lines connect. The cylinder heat-exchange system 3904 features components for generating or otherwise processing foams and/or sprays, for changing the pressure of fluids, and for routing fluid transfers between the various components with which the cylinder heat-exchange system 3904 is in fluid communication (e.g., store 3906, power unit 3902, thermal well 3908); the cylinder heat-exchange systems depicted in subsequent figures may include components performing similar functions. In FIG. 39 and subsequent figures, the power unit 3902 is depicted as including a single spray- or foam-cooled pneumatic cylinder (at top) connected to a crankshaft, seen in cross-section; however, this depiction is illustrative and conceptual only, and is not intended to restrict the mechanisms that might be employed in system 3900 (or in other illustrative systems depicted herein) for the interconversion of thermal, gas elastic potential, mechanical, and electrical energy. In other embodiments, not depicted herein, the power unit 3902 includes multiple cylinders, and interconversion of mechanical and electrical energy may occur via hydraulic systems, linear generators, and other alternatives to the cylinder-crankshaft combination depicted in FIG. 39 and some other figures herein. Moreover, in various embodiments, the water employed as a heat-exchange and thermal-energy-storage material in system 3900 includes one or more additives, or is replaced by a different fluid (e.g., an oil). Also, materials other than water, including non-fluid or multiphase materials (e.g., aqueous foams), may be employed as the energy-storage medium of the thermal well 3908. The depictions of power units, heat-exchange liquids, and thermal wells in all figures herein are illustrative and nonrestrictive. Moreover, in all illustrative systems described herein, environmental heat-exchange units and waste-heat heat-exchange units are optional wherever depicted.

Possible modes of operation of system 3900 include an expansion mode and a compression mode. In the compression mode, a quantity of gas (e.g., air) at relatively low (e.g., atmospheric) pressure is admitted at an ambient or moderate temperature to the cylinder assembly in power unit 3902. The compression of the gas in the cylinder assembly is maintained substantially isothermal by introduction into the gas of a spray of foaming liquid drawn from the thermal well 3908 via the heat-exchange system 3904, thereby forming a foam in the power unit 3902. The water in the thermal well 3908 is here presumed to be at a relatively low (e.g., ambient) temperature at the beginning of the compression-mode cycle, and may include one or more foaming additives (alternatively, the additive(s) may be added by the heat-exchange system 3904). The liquid component of the foam undergoing compression may be returned via the cylinder heat-exchange system 3904 to the thermal well 3908 at a higher temperature than the water was drawn from the thermal well 3908, having gained thermal energy during compression. At or near the end of each compression stroke of the cylinder assembly, gas at high pressure and approximately ambient temperature is conveyed through piping to the high-pressure reservoir 3906.

Throughout a single cylinder compression cycle, or throughout a series of cylinder compression cycles, return of heated water to the thermal well 3908 will generally tend to raise the temperature of the water in the thermal well 3908. If thermal well 3908 is a single body of water, then the temperature of that body will tend to rise; if the thermal well 3908 includes one or more hot-water reservoirs and one or more cold-water reservoirs, the temperature of the water in the one or more hot-water reservoirs (and thus the average temperature of the contents of thermal well 3908) will tend to rise. In effect, some energy that originated as mechanical work performed on gas undergoing compression in the power unit 3902 will be stored as thermal energy in the thermal well 3908.

In the expansion mode of system 3900 (e.g., an expansion cycle subsequent to the compression cycle described hereinabove), gas at high pressure may be transferred from the reservoir 3906 to the cylinder of the power unit 3902, where it expands, performing work on a piston. As or before the gas expands within the cylinder, foamable liquid may be transferred from the thermal well 3908 to the power unit 3902 via the cylinder heat-exchange system 3904. This liquid (e.g., water with one or more additives) may be at a relatively high temperature due to the transfer of thermal energy to the thermal well 3908 during prior compression cycles or by other processes. Water from the thermal well 3908 forms a foam with the gas undergoing expansion, transferring heat to the gas as the gas cools and thus tending to keep the expansion substantially isothermal and causing the gas to perform more work on the piston. In effect, thermal energy stored in the thermal well 3908 may be converted to work in the power unit 3902 during an expansion cycle of system 3908. Thermal energy stored in the thermal well 3908 may come from compression cycles of the power unit 3902, or from other sources; in particular, the waste-heat heat-exchange unit 3910 may be employed to transfer heat from the mechanical and electrical components of power unit 3902 to the thermal well 3908. Heat from other sources, not shown in FIG. 39, may also be transferred to the thermal well 3908.

The temperature of the thermal well 3908 may be decreased or held constant despite the addition of heat thereto (e.g., via the cylinder heat exchange system 3904) by shedding heat from the thermal well 3908 to the environment (e.g., atmosphere or ground) via an environmental heat-exchange unit 3912. Waste heat from the power unit 3902 may also be shed via the environmental heat-exchange unit 3912. For example, if at the end of a series of expansion cycles the temperature of the water within the thermal well 3908 is not sufficiently low for use in a subsequent series of compression cycles, heat may be shed from the thermal well 3908 to the environment via environmental heat-exchange unit 3912 during an inactive interval, i.e., a period when reservoir 3906 contains stored pressurized gas but system 3900 is not being employed as a generator. An environmental heat-exchange unit 3912 that is designed to allow system 3900 to shed unwanted heat slowly during an inactive interval will tend to be smaller and less costly than one designed to shed heat quickly (in real time) during active operation of system 3900, reducing the cost of system 3900. The use of a thermal well 3908 enables the time-shifting of waste thermal energy to the environment, which may have the advantage of both making the environmental heat-exchange unit smaller due to lengthening the time over which a certain amount of thermal energy is dissipated and also allowing the heat exchange to potentially take place at times different from the operation times of the power unit, which may allow usage at more optimal environmental temperatures (e.g., colder night temperatures for dissipating heat). Moreover, unwanted heat from the reservoir 3906, gas undergoing compression in the power unit 3902, and heat from mechanical and electronic inefficiencies of the power unit 3902 may all be shed to the environment by the single environmental heat-exchange unit 3912, realizing further cost and simplicity advantages over comparable systems that utilize multiple heat-exchange units to control the temperature of various subsystems.

During gas-expansion cycles of system 3900, the temperature of the thermal well 3908 may be increased or held constant despite the removal or loss of heat from the thermal well 3908 by adding heat to the thermal well 3908 harvested from the environment via the environmental heat-exchange unit 3912. During gas-compression cycles, the temperature of the thermal well 3908 may be decreased or held constant despite the addition of heat to the thermal well 3908 by shedding heat from the thermal well 3908 to the environment via the environmental heat-exchange unit 3912. Such temperature management of the thermal well 3908 may be desirable for efficiency reasons or, for example, to keep the water in the thermal well 3908 from either freezing or boiling.

Transferring energy to the thermal well 3908 from foam undergoing compression in a series of compression cycles will generally tend to produce a body of high-temperature water for use in a subsequent series of expansion cycles; transferring energy out of the thermal well 3908 to foam undergoing expansion in a series of expansion cycles will generally tend to produce a body of low-temperature water for use in a subsequent series of compression cycles. By maintaining a generally hotter-than-ambient reservoir of liquid in the thermal well 3908 for spraying during or before expansions, and a generally cooler-than-ambient reservoir of liquid in the thermal well 3908 for spraying during or before compressions, the efficiency of the energy storage and generation system 3900 may be increased over that of an otherwise comparable system whose foaming liquid is always ambient in temperature. Moreover, obtaining higher and lower temperature extremes in the thermal well 3908 by storing thermal energy obtained from gas undergoing compression and expansion, rather than by using heaters, refrigeration, or heat-pump devices to obtain the desired temperature extremes, may reduce parasitic energy expenditures and consequently increase the overall efficiency of the system 3900.

Capture of heat from mechanical and electronic inefficiencies in the power unit 3902 via the waste-heat heat-exchange unit 3910, and the transfer of such heat to thermal well 3908 for partial conversion to work in subsequent expansion cycles, will typically also tend to increase the overall efficiency of the system 3900.

In some embodiments, the thermal well 3908 includes a vessel (not shown) for the storage of liquid at high pressure and high temperature; additionally or alternatively, liquid at high pressure and temperature may be stored in the vessel 3906 along with gas at high pressure and high temperature. These and other bodies of high-temperature liquid may be employed during expansion cycles of system 3900 to achieve substantially isothermal gas compression.

Figure 40:
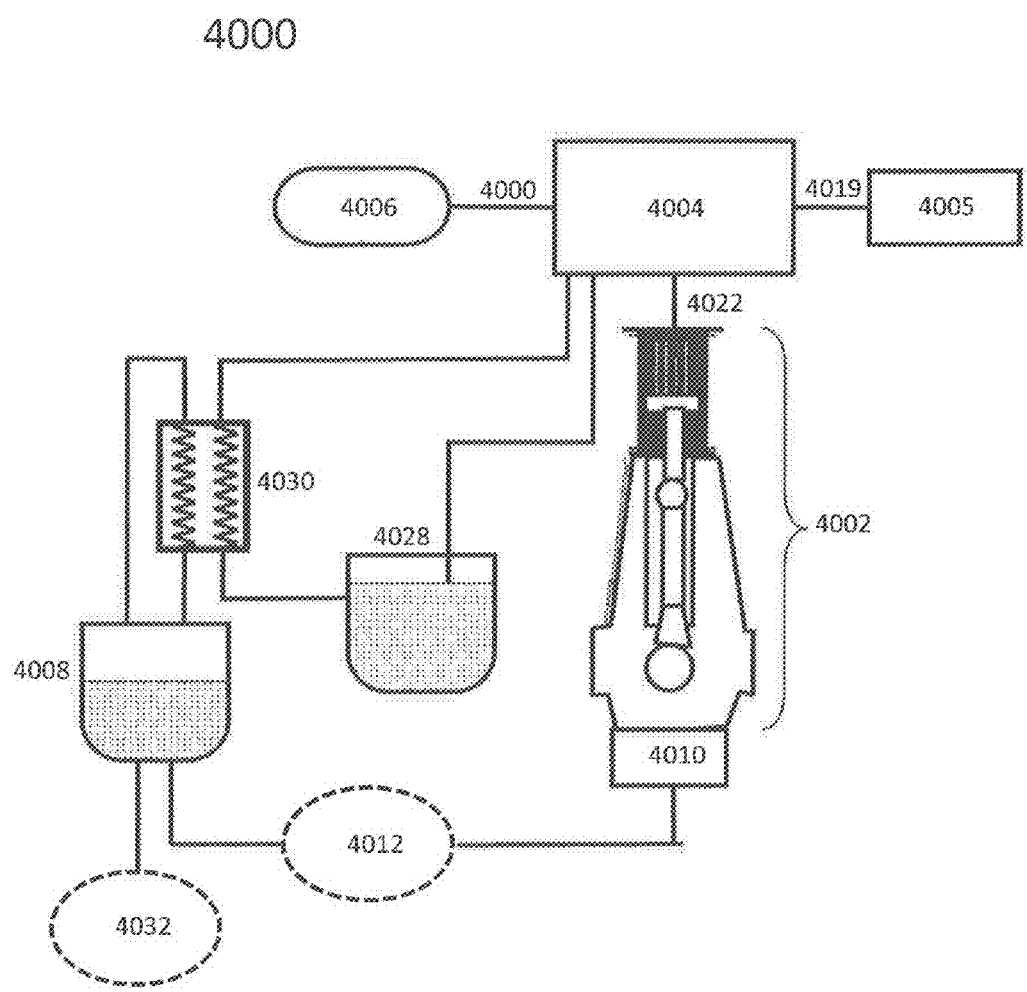

FIG. 40 depicts an illustrative system 4000 that features a power unit 4002, a cylinder heat-exchange system 4004, a vent 4005 to draw and exhaust air from and to the environment, a storage reservoir 4006 capable of holding fluid (e.g., air and water) at high pressure (e.g., 3,000 psi), a thermal well 4008 for storage and retrieval of thermal energy (e.g., a body of water), a waste-heat heat-exchange system 4010 coupled to waste heat generated by mechanical and electronic components of the power unit 4002, an environmental heat-exchange system 4012 capable of exchanging thermal energy with the environment (e.g., the air, the ground), a spray-liquid (for foam generation) reservoir 4028, and a spray-to-well heat-exchange unit 4030 fluidly coupled on one side to the thermal well 3908 and on the other to the spray reservoir 4028. System 4000 may also include an optional secondary environmental heat exchange unit 4032.

Possible modes of operation of system 4000 include an expansion mode and a compression mode. In the compression mode, a quantity of gas (e.g., air) at relatively low (e.g., atmospheric) pressure is admitted at an ambient or moderate temperature to the cylinder assembly of power unit 4002 from vent 4005 via piping 4019. The compression in the cylinder assembly is kept substantially isothermal by introduction into the gas of a spray of foaming liquid (e.g., water with one or more additives) drawn from the spray reservoir 4028 via the spray-to-well heat-exchange unit 4030 and the cylinder heat-exchange system 4004, thereby forming a foam in the cylinder assembly. The water in the spray reservoir 4028 is here presumed to be at a relatively low (e.g., ambient) temperature. The water sprayed through the gas undergoing (and/or prior to) compression may be returned via the cylinder heat-exchange system 4004 to the spray reservoir 4028 at a higher temperature than the water was drawn from spray reservoir 4028, having gained thermal energy from the gas undergoing compression. The temperature of the water in spray reservoir 4028 will typically thus tend to be increased by compression cycles of the power unit 4002. However, as water from spray reservoir 4028 passes through the spray-to-well heat exchanger 4030, heat may be transferred from the spray fluid to the thermal well 4008, reducing the temperature of the spray fluid. Heat added to the spray reservoir 4028 by compression cycles of the power unit 4002 may thus be transferred during subsequent compression cycles to the thermal well 4008, allowing the temperature of the spray liquid in reservoir 4028 to be kept approximately constant.

System 4000 may realize advantages already described hereinabove for system 3900 in FIG. 39, including temperature management of the contents of thermal well 4008 and partial conversion to work of waste heat from power unit 4002. Additionally, in system 4000, the thermal-storage liquid in the thermal well 4008 does not mix with the spray liquid, and the quantity of liquid in the thermal well 4008 may be significantly larger than the quantity of spray liquid. Separation of thermal-storage liquid and spray liquid in system 4000 may be advantageous because any liquid sprayed inside the power unit 4002 is preferably maintained in a state of relatively high purity (notwithstanding the presence of one or more foaming additives) so that spray contaminants do not degrade the performance of components of the power unit

4002. The thermal-storage liquid in system 4000 is not sprayed inside the power unit 4002 and therefore need not be maintained in as high a state of purity as the spray liquid. Maintenance of a relatively small volume of spray liquid in a state of high purity is generally less costly than maintaining the relatively large volume of the thermal well 4008 in a state of high purity, as would be preferable if the contents of the thermal well 4008 were to be used as spray liquid (as the contents of thermal well 3908 are in system 3900). Moreover, the spray liquid may contain additives that may be omitted from the thermal-storage liquid, another opportunity for economic gain in the operation of system 4000 as compared to operation of system 3900. Additionally, heat exchanger 4030 may be embedded in the thermal well 4008 and the contents of the thermal well 4008 may be solid (e.g., gravel), a phase-change material (e.g., paraffin wax), or some other thermal-storage material (e.g., oil, ceramics).

Figure 41:
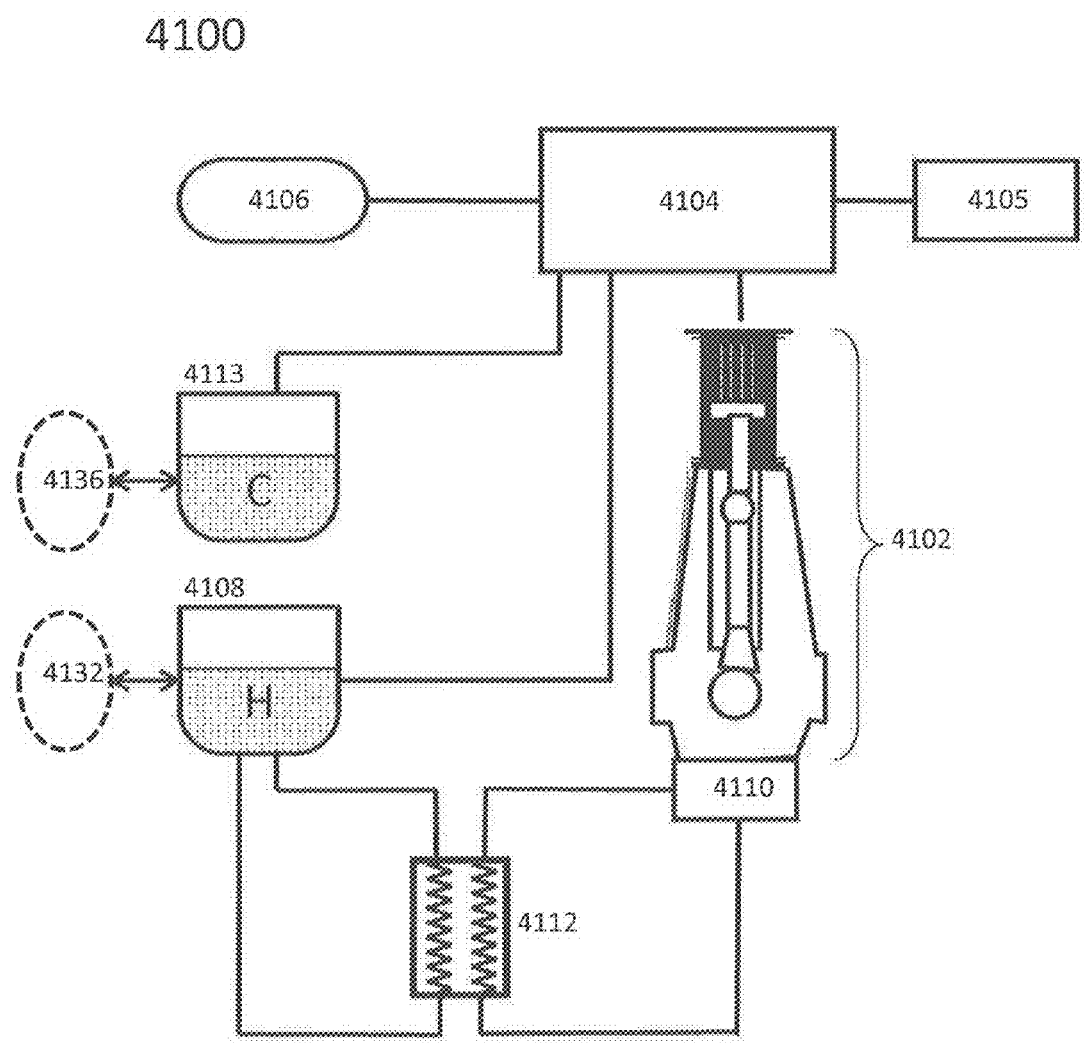

FIG. 41 depicts an illustrative system 4100 that features a power unit 4102 (including a cylinder assembly unit for compression and expansion of gas), cylinder heat-exchange system 4104, a vent 4105 to draw and exhaust air from and to the environment, a storage reservoir 4106 capable of holding fluid (e.g., air and water) at high pressure (e.g., 3,000 psi), a hot thermal well 4108 (e.g., thermally insulated body of water), a cold thermal well 4113 (e.g., a second thermally insulated body of water), a waste-heat heat-exchange system 4110 coupled to waste heat generated by mechanical and electronic components of the power unit 4102, a waste-to-well heat-exchange system 4112 coupled on one side to the hot thermal well 4108 and on the other side to the waste-heat heat-exchange system 4110, a first environmental heat-exchange system 4132 capable of exchanging thermal energy with the environment (e.g., the air, the ground), and a second environmental heat-exchange system 4136 also capable of exchanging thermal energy with the environment.

Possible modes of operation of system 4100 include an expansion mode and a compression mode. In the compression mode, a quantity of gas (e.g., air) at relatively low (e.g., atmospheric) pressure is admitted from vent 4105 at an ambient or moderate temperature to the cylinder assembly of power unit 4102. The compression is maintained substantially isothermal by introduction into the gas of a spray of water drawn from the cold thermal well 4113 via the cylinder heat exchange system 4104, thereby forming a foam within the cylinder assembly. The water thus sprayed through the gas undergoing or prior to compression may be returned via the cylinder heat-exchange system 4104 to the hot thermal well 4108 at a higher temperature than the water was drawn from cold thermal well 4113, having gained thermal energy from the gas undergoing compression. Water will therefore tend to be transferred from the cold thermal well 4113 to the hot thermal well 4108 during compression cycles of the power unit 4102.

Similarly, in the expansion mode of system 4100, a quantity of gas (e.g., air) at relatively high pressure (e.g., 3,000 psi) is admitted at an ambient or moderate temperature to the cylinder assembly of power unit 4102. The expansion is maintained substantially isothermal by introduction into the gas of a spray of water drawn from the hot thermal well 4108 via the cylinder heat exchange system 4104, thereby forming a foam within the cylinder assembly. The water thus sprayed into the gas during expansion may be returned via the cylinder heat exchange system 4104 to the cold thermal well 4113 at a lower temperature than the water was drawn from hot thermal well 4108, the sprayed water having imparted thermal energy to the gas undergoing expansion. Water will therefore tend to be transferred from the hot thermal well 4108 to the cold thermal well 44113 during expansion cycles of the power unit 4102.

The environmental heat exchangers 4132 and 4136 enable the temperatures of the thermal wells 4108, 4113 to be managed in both expansion and compression modes as already described hereinabove for the thermal wells of systems 3900 and 4000. Heat from the waste-heat heat-exchange unit 4110 may be transferred to the hot thermal well 4108 by means of the waste-to-well heat-exchange system 4112 or to the environment by means of an additional environmental heat exchange system (not shown).

System 4100 may realize advantages already described hereinabove for systems 3900 and 4000, including temperature management of the contents of thermal wells 4108, 4113 and partial conversion to work of waste heat from power unit 4102. Further, it will be apparent to persons reasonably familiar with the principles of thermodynamics that the maintenance of two thermal wells 4108, 4113 at (preferably) distinct temperatures decreases the entropy (due to mixing of hot and cold streams) and increases the exergy (extractable work) of system 4100, making the operation of system 4100 potentially more efficient than the operation of a system (e.g., system 4000) having only a single thermal well. Moreover, heat may be added to the hot thermal well 4108 from any source without altering the temperature of the cold thermal well 4113, and heat may be transferred out of the cold thermal well 4113 (e.g., by environmental heat exchanger 4136) without altering the temperature of the hot thermal well 4108.

Figure 42:
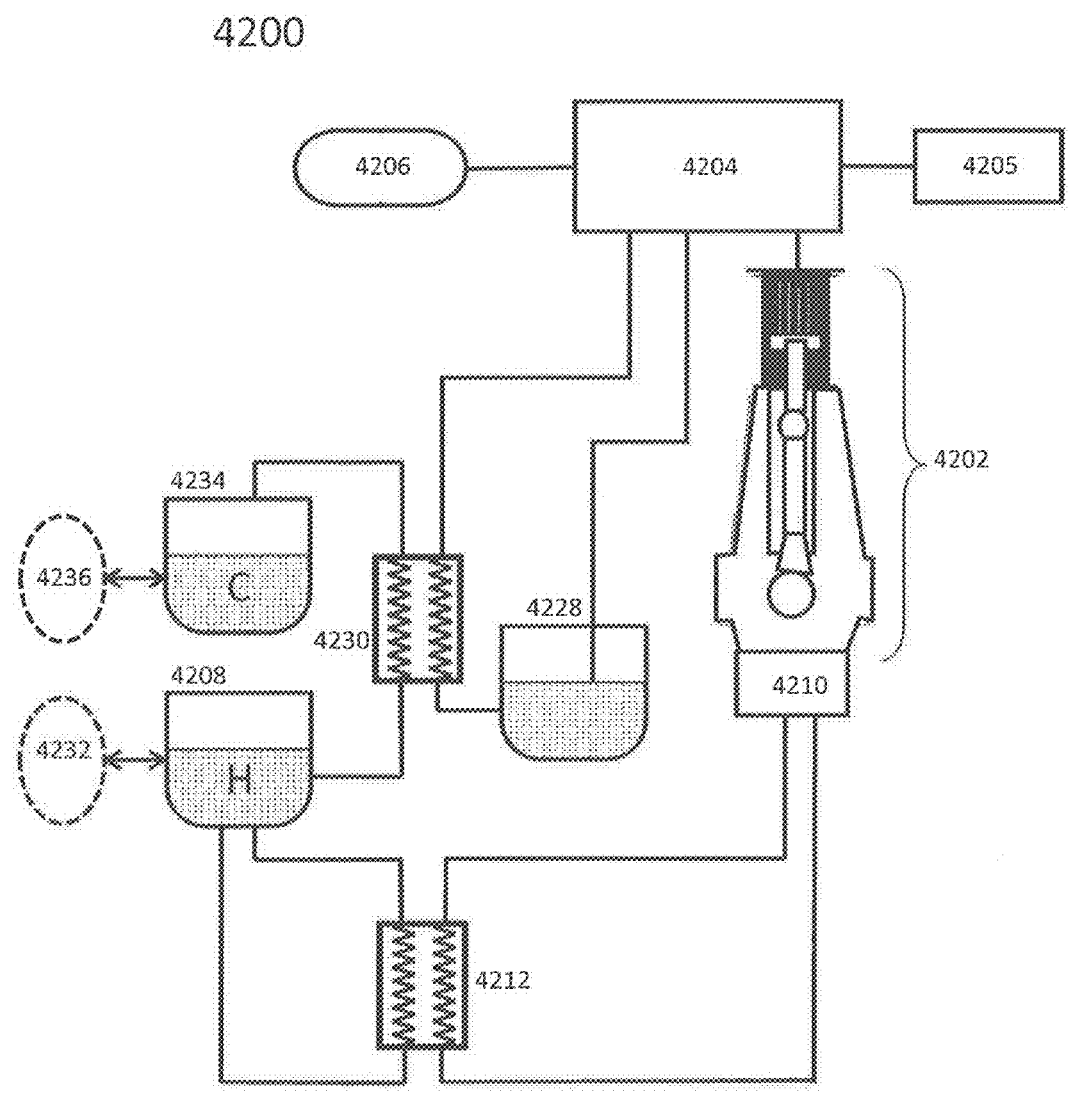

FIG. 42 depicts an illustrative system 4200 that features a power unit 4202 (including a cylinder assembly unit for compression and expansion of gas), a cylinder heat-exchange system 4204, a vent 4205 to draw and exhaust air from and to the environment, a storage reservoir 4206 capable of holding fluid (e.g., air and water) at high pressure (e.g., 3,000 psi), a hot thermal well 4208 (e.g., thermally insulated body of water), a cold thermal well 4234 (e.g., a second thermally insulated body of water), a waste-heat heat-exchange system 4210 that extracts waste heat generated by mechanical and electronic components of the power unit 4202, a waste-to-well heat-exchange system 4212 coupled on one side to the hot thermal well 4208 and on the other to the waste-heat heat-exchange system 4210, a spray reservoir 4228, a spray-to-well heat-exchange unit 4230 fluidly coupled on one side to the hot thermal well 4208 and cold thermal well 4234 and on the other side to the spray reservoir 4228, a first environmental heat-exchange system 4232 capable of exchanging thermal energy with the environment (e.g., the air, the ground), and a second environmental heat-exchange system 4236 also capable of exchanging thermal energy with the environment.

Possible modes of operation of system 4200 include an expansion mode and a compression mode. In the compression mode, a quantity of gas (e.g., air) at relatively low (e.g., atmospheric) pressure is admitted from vent 4205 at an ambient or moderate temperature to the cylinder assembly of power unit 4202. The compression is maintained substantially isothermal by introduction into the gas of a spray of water drawn from the spray reservoir 4228 via the spray-to-well heat exchanger 4230 and the cylinder heat exchange system 4204, thereby forming a foam within the cylinder assembly. The water in the spray reservoir 4228 is here presumed to be at a relatively low (e.g., ambient) temperature at the beginning of the compression-mode cycle. The water thus sprayed through the gas undergoing or prior to compression may be returned via spray heat-exchange unit 4204 to the spray reservoir 4228 at a higher temperature than the water was drawn from spray reservoir 4228, having gained thermal energy from the gas undergoing compression. The temperature of the water in spray reservoir 4228 will thus tend to be increased by compression cycles of the power unit 4202. However, as spray liquid from spray reservoir 4228 passes through one side of the spray-to-well heat exchanger 4230 on its way to the spray heat-exchange unit 4204, heat may be transferred from the spray liquid to thermal-well liquid passing from the cold thermal well 4234 to the hot thermal well 4208 through the other side of the spray heat-exchange unit 4230, reducing the temperature of the spray liquid and tending to increase the temperature of the liquid in the hot thermal well 4208. Thermal energy added to the spray reservoir 4228 by compression cycles of the power unit 4202 may thus be transferred during subsequent compression cycles to the hot thermal well 4208, and the temperature of the spray liquid in reservoir 4228 may thus be kept substantially constant.

Similarly, in an expansion mode of system 4200, a quantity of gas (e.g., air) at relatively high pressure (e.g., 3,000 psi) is admitted at an ambient or moderate temperature to the cylinder assembly of power unit 4202. The expansion is maintained as substantially isothermal by introduction into the gas of a spray of water drawn from the spray reservoir 4228 via the spray-to-well heat-exchange unit 4230 and the cylinder heat exchange system 4204, thereby forming a foam within the cylinder assembly. The water in the spray reservoir 4228 is here presumed to be at a relatively high (e.g., approximately 60° C., or even higher) temperature at the beginning of the compression-mode cycle. The water thus sprayed through the gas undergoing or prior to compression may be returned via spray heat-exchange unit 4204 to the spray reservoir 4228 at a lower temperature than the water was drawn from spray reservoir 4228, having imparted thermal energy to the gas undergoing expansion. The temperature of the water in spray reservoir 4228 will thus tend to be decreased by compression cycles of the power unit 4202. However, as spray liquid from spray reservoir 4228 passes through one side of the spray-to-well heat exchanger 4230, heat may be transferred to the spray liquid from fluid passing from the hot thermal well 4208 to the cold thermal well 4234 through the other side of the spray-to-well heat exchanger 4230, increasing the temperature of the spray liquid and decreasing the temperature of the liquid being moved from the hot thermal well 4208 to the cold thermal well 4234. Heat removed from the spray reservoir 4228 by expansion cycles of the power unit 4202 may thus be restored during each subsequent compression cycle by extracting heat from the hot thermal well 4208, and the temperature of the spray liquid in reservoir 4228 may be kept approximately constant.

The environmental heat exchangers 4232 and 4236 enable the temperatures of the thermal wells 4208, 4234 to be managed in both expansion and compression modes as already described hereinabove for the thermal wells of systems 3900 and 4000. The directions of flow through heat exchanger 4230 may be reversed when switching between compression and expansion mode via additional valving and piping (not shown) to maintain counterflow. Also, heat from the waste-heat heat-exchange unit 4210 may be transferred from the power unit 4202 to the hot thermal well 4208 by means of the waste-to-well heat-exchange system 4212.

System 4200 may realize advantages already described hereinabove for systems 3900, 4000, and 4100, including temperature management of the contents of thermal wells 4208, 4234 and partial conversion to work of waste heat from power unit 4202. Further, it will be apparent to persons reasonably familiar with the principles of thermodynamics that the maintenance of two thermal wells 4208, 4234 at (preferably) distinct temperatures decreases the entropy and increases the exergy (extractable work) of system 4200, making the operation of system 4200 potentially more efficient than the operation of a system (e.g., system 4000) having only a single thermal well. As in system 4100, heat may be added to the hot thermal well 4208 from any source without altering the temperature of the cold thermal well 4234 or of the spray reservoir 4228, and heat may be transferred out of the cold thermal well 4234 (e.g., by environmental heat exchanger 4236) without altering the temperature of the hot thermal well 4208 or of the spray reservoir 4228. Additionally, in system 4200, the thermal-storage liquid in the thermal wells 4208, 4234 does not mix with the spray liquid, and the quantity of liquid in the thermal wells 4208, 4234 may be significantly larger than the quantity of spray liquid. Separation of thermal-storage liquid and spray liquid in system 4200 may be advantageous because any liquid sprayed inside the power unit 4202 is preferably maintained in a state of relatively high purity so that spray contaminants do not degrade the performance of components of the power unit 4202. The thermal-storage liquid in system 4200 is not sprayed inside the power unit 4202 and therefore need not be maintained in as high a state of purity as the spray liquid. Maintenance of a relatively small volume of spray liquid in a state of high purity is generally less costly than maintaining the relatively large volume of the thermal wells 4208, 4234 in a state of high purity. Moreover, the spray liquid may contain additives that may be omitted from the thermal-storage liquid, another opportunity for economic gain in the operation of system 4200 (as compared to, e.g., operation of system 4100). Additionally, heat exchanger 4230 may be embedded in the thermal well 4208 and/or 4234 and the contents of the thermal well 4208 and/or 4234 may be solid (e.g., gravel), a phase-change material (e.g., paraffin wax), or some other thermal-storage material (e.g., oil, ceramics).

Figure 43:
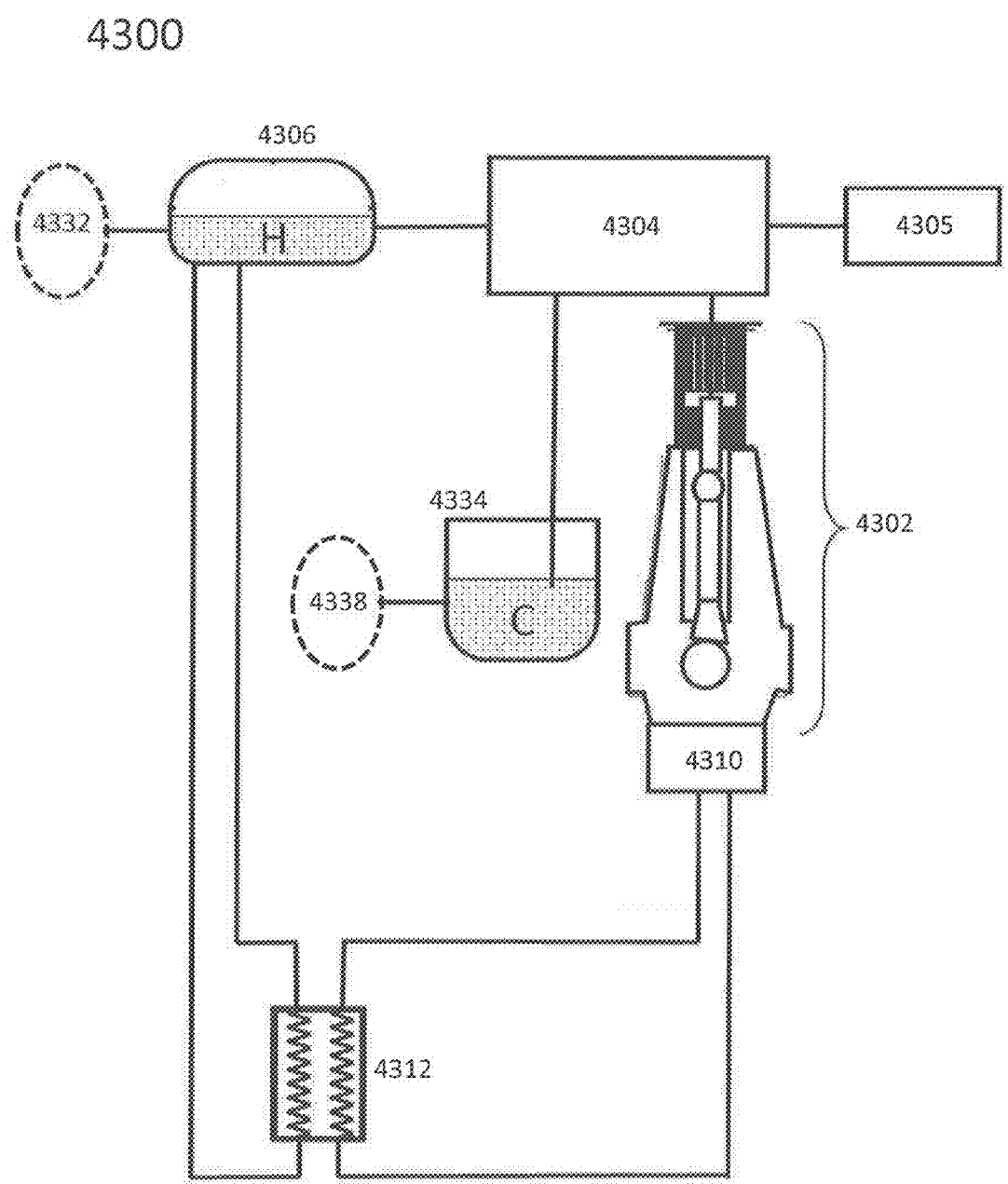

FIG. 43 depicts an illustrative system 4300 that features a power unit 4302 (including a cylinder assembly unit for compression and expansion of gas), a cylinder heat-exchange system 4304, a storage reservoir 4306 capable of holding both gas and liquid at high pressure (e.g., 3,000 psi) and relatively high temperature, a waste-heat heat-exchange system 4310 coupled to waste heat generated by mechanical and electronic components of the power unit 4302, a waste-to-well heat-exchange system 4312 coupled on one side to the high-pressure fluid reservoir 4306 and on the other side to the waste-heat heat-exchange system 4310, a cold thermal well 4334 including or consisting essentially of, e.g., a body of water, a first environmental heat-exchange system 4332 capable of exchanging thermal energy with the environment (e.g., the ground), and a second environmental heat-exchange system 4338 also capable of exchanging thermal energy with the environment. The high-temperature, high-pressure reservoir 4306 combines functions of a high-pressure gas store with functions of a hot thermal well and may be a single unit (e.g., insulated pressure tanks, insulated pipelines, underground geologic formation such as salt domes).

Possible modes of operation of system 4300 include an expansion mode and a compression mode. In the compression mode, a quantity of gas (e.g., air) at relatively low (e.g., atmospheric) pressure is admitted from vent 4305 at an ambient or moderate temperature to the cylinder assembly of power unit 4302. The compression of the gas is maintained substantially isothermal by introduction into the gas of a spray of water drawn from the cold thermal well 4334 via the cylinder heat exchange system 4304, thereby forming a foam within the cylinder assembly. The water thus sprayed into the gas undergoing or prior to compression may be directed, along with the compressed gas, via the cylinder heat-exchange system 4304 to the high-temperature, high-pressure reservoir 4306 at a higher pressure and temperature than the water was drawn from cold thermal well 4334, having gained thermal energy from the gas undergoing compression. Water will therefore tend to be transferred from the cold thermal well 4334 to the high-temperature, high-pressure reservoir 4306 during compression cycles of the power unit 4302.

Similarly, in the expansion mode of system 4300, a quantity of gas (e.g., air) at relatively high pressure (e.g., 3,000 psi) and relatively high temperature is transferred from the high-temperature, high-pressure reservoir 4306 to the cylinder assembly of power unit 4302. As the cylinder assembly expands the gas, the temperature of the gas tends to decrease; the degree of this decrease is limited by the foam formation with the gas, and the expansion is preferably maintained substantially isothermal. In the expansion mode of system 4300, the spray liquid includes or consists essentially of water (e.g., with one or more foaming additives) drawn from the high-temperature, high-pressure reservoir 4306 via the cylinder heat-exchange system 4304. At the end of an expansion cycle, this liquid will tend to be at a lower temperature and pressure than when sprayed into the gas undergoing or prior to expansion, the liquid having imparted thermal energy to the gas undergoing expansion, and may be directed via the cylinder heat-exchange system 4304 to the cold thermal well 4334. Expanded gas at relatively low temperature and pressure may be vented via vent 4305 to the environment from power unit 4302. Liquid will thus tend to be transferred from the high-temperature, high-pressure reservoir 4306 to the cold thermal well 4334 during expansion cycles of the power unit 4302.

The environmental heat exchangers 4332 and 4338 enable the temperatures of the cold thermal well 4334 and the high-temperature, high-pressure reservoir 4306 to be managed in both expansion and compression modes as already described hereinabove for thermal wells communicating with environmental heat exchangers. Heat from the waste-heat heat-exchange unit 4310 may be transferred to the high-temperature, high-pressure reservoir 4306 via the waste-to-well heat-exchanger 4312. In other embodiments, some or all of these heat exchangers are eliminated.

System 4300 may realize advantages already described hereinabove for systems 3900, 4000, 4100, and 4200, including temperature management of the contents of the thermal well 4334 and of the high-temperature, high-pressure reservoir 4306, and partial conversion to work of waste heat from power unit 4302. As with systems 4100 and 4200, it will be apparent to persons reasonably familiar with the principles of thermodynamics that the maintenance of two bodies of liquid (i.e., in the cold thermal well 4334 and in the high-temperature, high-pressure reservoir 4306) at (preferably) distinct temperatures decreases the entropy and increases the exergy (extractable work) of system 4300, making the operation of system 4300 potentially more efficient than the operation of a system (e.g., system 4000) having only a single thermal well. Moreover, due to the elevation of the boiling point of water with increasing pressure, system 4300 offers the additional advantage that the upper (non-vaporizing) temperature limit of water stored in the high-temperature, high-pressure reservoir 4306 is higher than the upper temperature limit of water stored in a non-pressurized hot thermal well such as hot thermal well 4208 of system 4200. It will be apparent to persons reasonably familiar with the principles of thermodynamics that the exergy of a system increases when the temperature difference between two bodies of liquid in the system is increased; thus, for example, the exergy of the bodies of hot and cold liquid of system 4300 may be higher than the exergy of similar quantities of hot and cold liquid in system 4200, because the temperature difference between the bodies of hot and cold liquid in system 4300 may be, in some operating conditions of system 4300, larger than the temperature difference between the bodies of hot and cold liquid of system 4200.

Figure 44:
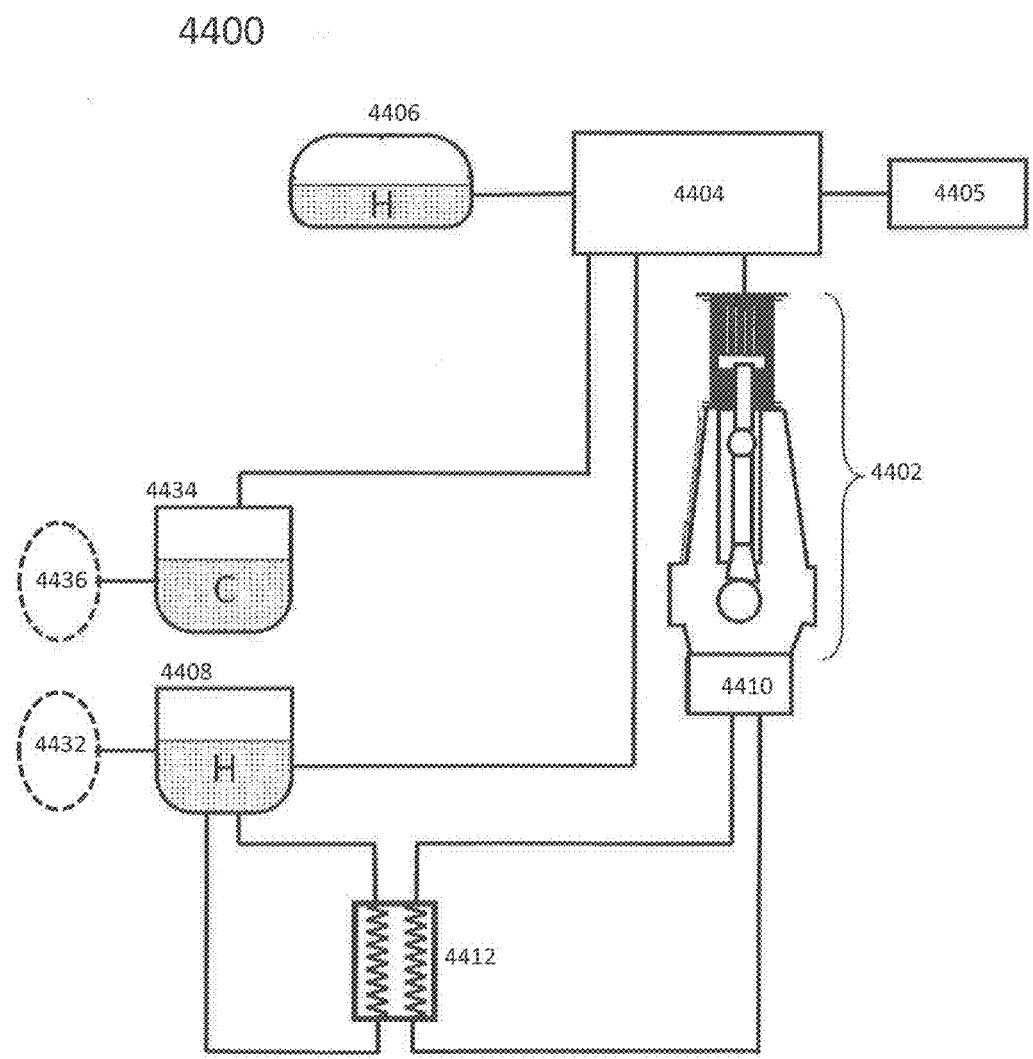

FIG. 44 depicts an illustrative system 4400 that features a power unit 4402 (including a cylinder assembly unit for compression and expansion of gas) that may include two or more different cylinder assemblies (that may have different diameters), each compressing or expanding gas over a different range of pressures (i.e., a two or more stage compressor and expander power unit); a cylinder heat-exchange system 4404; a storage reservoir 4406 capable of holding both gas and liquid at high pressure (e.g., 3,000 psi) and relatively high temperature; a hot thermal well 4408 including or consisting essentially of an insulated body of water at low pressure (e.g., atmospheric pressure); a cold thermal well 4434 also including or consisting essentially of a body of water; a waste-heat heat-exchange system 4410 coupled to waste heat generated by mechanical and electronic components of the power unit 4402; a waste-to-well heat-exchange system 4412 coupled on one side to the hot thermal well 4408 and on the other side to the waste-heat heat-exchange system 4410; a first environmental heat-exchange system 4432 capable of exchanging thermal energy with the environment (e.g., the air, the ground); and a second environmental heat-exchange system 4436 also capable of exchanging thermal energy with the environment (e.g., the air, the ground). The high-temperature, high-pressure reservoir 4406 combines functions of a high-pressure gas store with functions of a hot thermal well.

Possible modes of operation of system 4400 include an expansion mode and a compression mode. In the compression mode, a quantity of gas (e.g., air) at relatively low (e.g., atmospheric) pressure is admitted via vent 4405 at an ambient or moderate temperature to the cylinder assembly of power unit 4402. As the cylinder assembly of power unit 4402 compresses the gas, the compression is maintained substantially isothermal by introduction into the gas of a spray of water drawn from the cold thermal well 4434 via the cylinder heat-exchange system 4404, thereby forming a foam within the cylinder assembly. The water thus sprayed into the gas undergoing or prior to compression may be directed, along with the compressed gas, via the cylinder heat-exchange system 4404 to the high-temperature, high-pressure reservoir 4406 at a higher pressure and temperature than the water was drawn from cold thermal well 4434, having gained thermal energy from the gas undergoing compression. Some or all spray water may also be directed to the low-pressure hot thermal well 4408 via the cylinder heat-exchange system 4404. Water will therefore tend to be transferred from the cold thermal well 4434 to the high-temperature, high-pressure reservoir 4406 and/or low pressure hot thermal well 4408 during compression cycles of the power unit 4402.

Similarly, in the expansion mode of system 4400, a quantity of gas (e.g., air) at relatively high pressure (e.g., 3,000 psi) and relatively high temperature is transferred from the high-temperature, high-pressure reservoir 4406 to the cylinder assembly of power unit 4402. As the cylinder assembly expands the gas, the expansion is maintained substantially isothermal by introduction into the gas of a spray of water drawn from the high-temperature, high-pressure reservoir 4406 via the cylinder heat-exchange system 4404, thereby forming a foam within the cylinder assembly. As the gas is expanded to lower pressures, the spray may be partially or even fully formed from water drawn from the low-pressure hot thermal well 4408. The water sprayed through the gas undergoing or prior to expansion may be directed via the cylinder heat-exchange system 4404 to the cold thermal well 4434 at a relatively low pressure and temperature, having imparted thermal energy to the gas undergoing expansion. Expanded gas may be vented to the environment via vent 4405 from power unit 4402. Water will thus tend to be transferred from the high-temperature, high-pressure reservoir 4406 and/or low-pressure hot thermal well 4408 to the cold thermal well 4434 during expansion cycles of the power unit 4402.

The environmental heat exchangers 4436 and 4432 enable the temperatures of the cold thermal well 4434 and low-pressure hot thermal well 4408 to be managed in both expansion and compression modes, as already described hereinabove for the thermal wells of systems 3900, 4000, 4100, 4200, and 4300. Heat from the waste-heat heat-exchange unit 4410 may be transferred to the low-pressure hot thermal well 4408 via the waste-to-well heat-exchange system 4412.

System 4400 may realize advantages already described hereinabove for systems 3900, 4000, 4100, 4200, and 4300, including temperature management of the contents of the thermal wells 4408, 4434 and partial conversion to work of waste heat from power unit 4402. As with systems 4100, 4200, and 4300, it will be apparent to persons reasonably familiar with the principles of thermodynamics that the maintenance of two or more bodies of liquid (i.e., in the cold thermal well 4434, in the hot thermal well 4408, and in the high-temperature, high-pressure reservoir 4406) at (preferably) distinct temperatures decreases the entropy and increases the exergy (extractable work) of system 4400, making the operation of system 4400 potentially more efficient than the operation of a system (e.g., system 400) having only a single thermal well. Due to the elevation of the boiling point of water with increasing pressure, system 4400 offers (as does system 4300 in FIG. 43) the advantage that the upper (non-vaporizing) temperature limit of water stored in the high-temperature, high-pressure reservoir 4406 is higher than the upper temperature limit of water stored in a non-pressurized hot thermal well such as hot thermal well 4408. Moreover, system 4400 offers the additional advantage that waste heat may be transferred from the power unit 4402 to the low-pressure hot thermal well 4408 using a low-pressure waste-to-well heat exchanger 4412, rather than a high-pressure waste-to-well heat exchanger 4312 as in system 4300. A low-pressure waste-to-well heat exchanger 4412 will tend to be less costly than a high-pressure waste-to-well heat exchanger.

Where power unit 4402 includes two different diameter cylinders (not depicted), one (C1) compressing gas over a first, lower pressure range, and the second (C2) compressing gas over a second, higher pressure range, advantages (e.g., increased overall efficiency of system 4400) may be realized in a compression mode of operation of system 4400 by maintaining the low-pressure hot thermal well 4408 at a temperature (and optionally also at the mid-pressure) achieved at the end of the substantially isothermal compression in C1. That is, low-pressure hot thermal well 4408 may be maintained at a lower temperature than the contents of the high-pressure, high-temperature store 4406. This allows the quantity of spray introduced during or prior to compressions to be independently adjusted in C1 and C2 as the pressure in the store 4406 increases over sequential compression cycles. Further, if low-grade waste heat (e.g., from a thermal power plant; not depicted) is available, it may be transferred via a heat exchanger to the low-pressure, lower-temperature hot thermal well, increasing effective overall system efficiency. The temperature of the low-pressure hot thermal well 4408 operating at a midpoint of a multi-stage compression/expansion process may be optimal for usage of waste heat at available temperatures (e.g., approximately 40° C., 60° C., or similar), whereas the high-pressure high temperature reservoir 4406 may be maintained at substantially higher temperature (e.g., approximately 80° C., 120° C. or similar) that may not allow usage of typical waste heat temperatures. By operating the multi-stage compression/expansion process at higher temperatures, reduced water spray volume may be used, increasing storage volume and system efficiency (e.g., reducing valve losses for passing two-phase flow). It will be apparent to persons reasonably familiar with thermodynamics that similar advantages may be realized in an expansion mode of system 4400.

Figure 45:
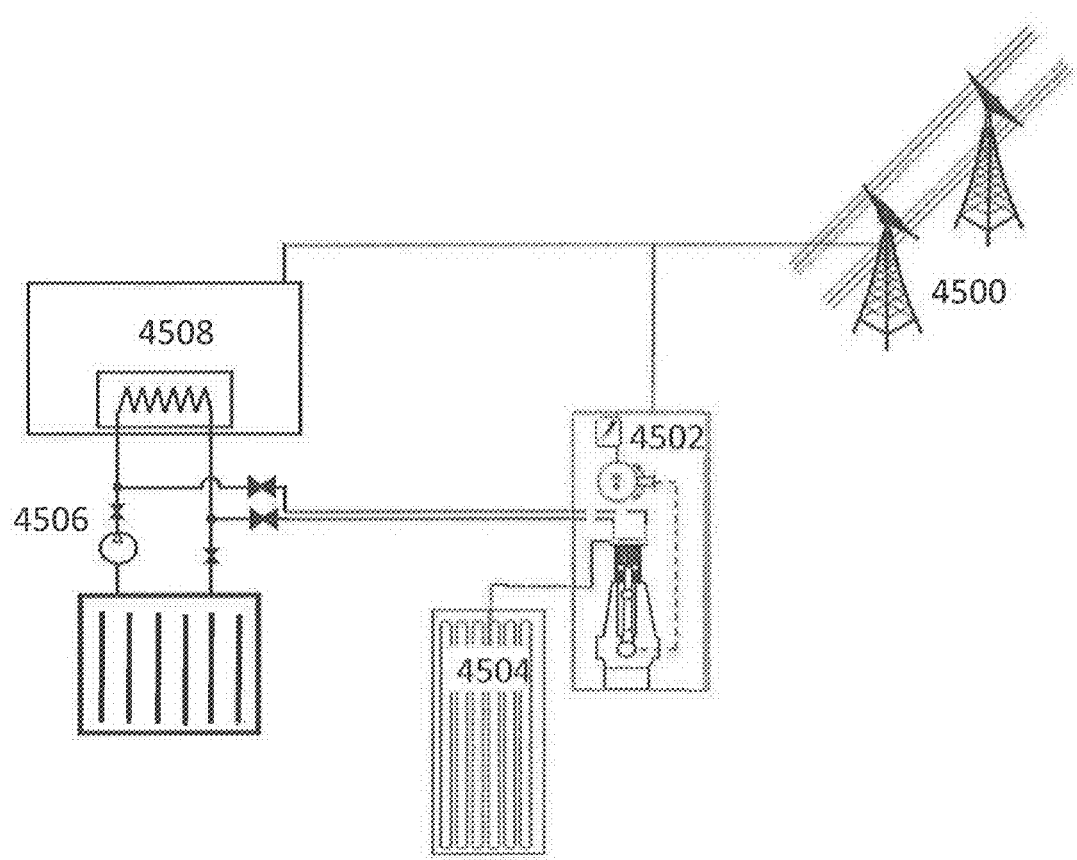
FIGS. 45 and 46 are schematics of various components of energy storage and recovery systems in which high-power, short-duration energy storage devices are connected in parallel with a compressed-gas energy storage system, in accordance with various embodiments of the invention.

FIG. 45 depicts an illustrative embodiment of the invention in which one or more batteries 4508 and/or other high-power, short-duration energy storage devices (e.g., an energy storage device with less than 1 hour of storage, e.g., 15 minutes) are connected in parallel with a compressed-gas energy storage system 4502 to generate power for usage (e.g., power grid delivery 4500). The energy storage system 4502 may resemble illustrative storage systems depicted elsewhere herein. The battery 4508 is configured to provide stored energy during periods of low power demand (e.g., less than 500 kW), while the compressed-gas energy storage system 4502 is configured to provide stored energy during periods of increased power-demand fluctuations (e.g., above 500 kW). In one example, the operator of a power generation facility that includes a solar power generation and the energy storage system depicted in FIG. 45 receives payment to maintain a constant power level of 2,000 kW. At an instant, solar power generation drops from 2,000 kW to 1,900 kW as a cloud shadows part of the array. Measured power output may be maintained at the required constant power level by requiring that the battery 4508 discharge at a rate of 0 to 100 kW as the cloud shadows the array. At another instant, a storm passes the area and the solar power generation drops to 1000 kW to 500 kW for an extended period of time. Measured power output may be maintained at the constant power level by requiring that the compressed-gas energy storage system 4502 discharges at a rate of 1000 to 1500 kW as the cloud shadows the array. Upon demand for increased power (e.g., above 500 kW), stored energy in the form of compressed gas in storage reservoir 4504 undergoes expansion in the compressed-gas energy storage system 4502 to generate power for usage (e.g., power grid delivery 4500). Any excess thermal energy from the battery 4508 may be recoverable through a heat-exchange unit 4506. The recovered thermal energy from the battery 4508 may be used in the heat-exchange subsystem of the compressed-gas storage reservoir 4504 (or other pressurized storage) to preheat the stored compressed gas and/or to heat the heat-exchange fluid and gas during expansion, increasing the work done by a given volume of pressurized gas, and so improving system efficiency and/or performance. For example, the recovered thermal energy may be utilized to thermally condition stored compressed gas and/or gas undergoing expansion and/or compression as described in the '960 application.

The response time of the high-power, short-duration energy storage device 4508 may be optimized to respond within microseconds to changing power levels and demand. The rate of the power response may be limited to approximately one millisecond based on the data acquisition rate of the control system, but can readily be configured to respond in less than one second.

Figure 46:
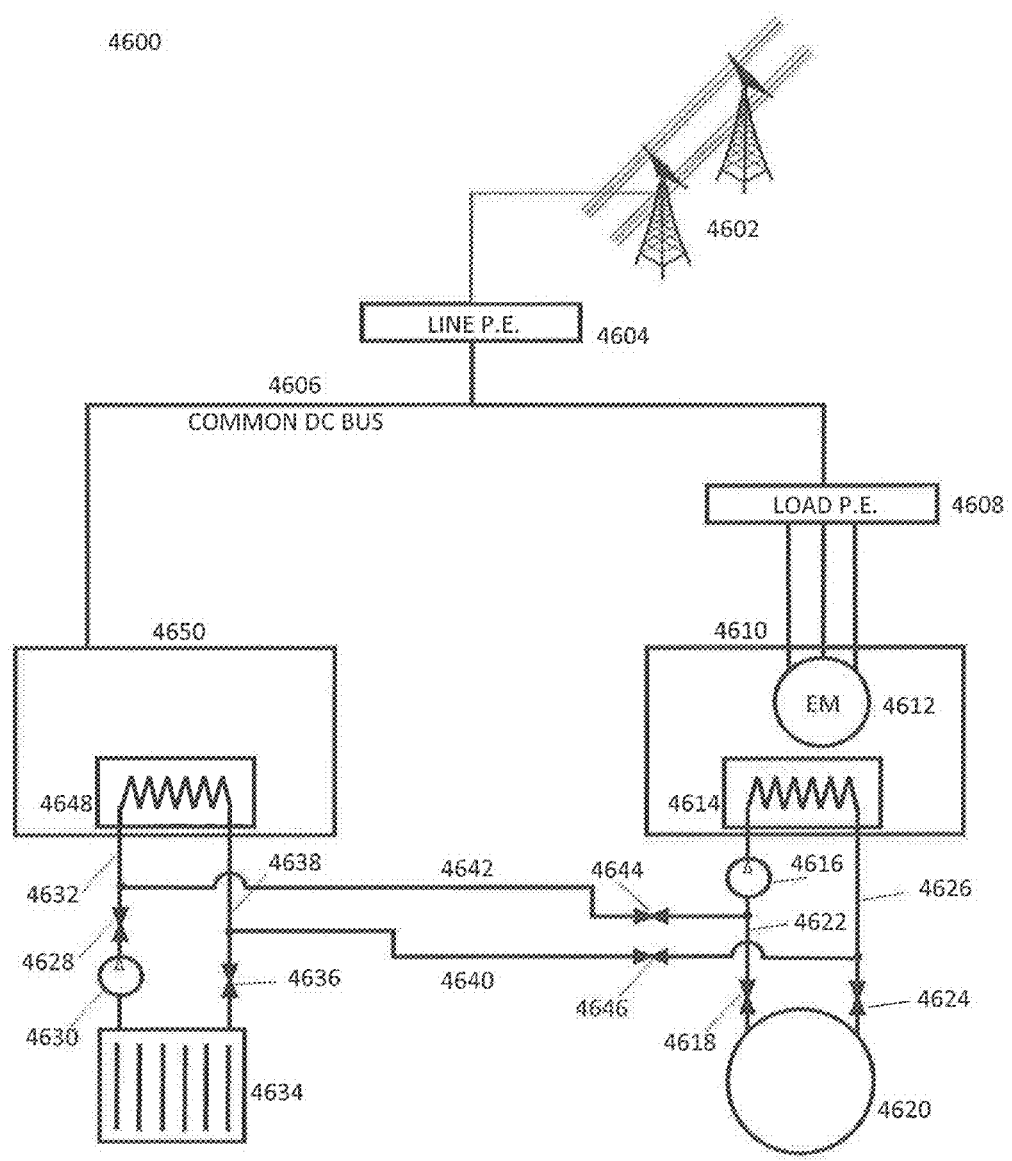

FIG. 46 depicts an integrated system 4600 in which a compressed-gas energy storage system 4610 including one or more storage reservoirs with stored compressed gas (not depicted) is connected to an electric motor 4612. During periods of higher power demand fluctuations (e.g., above 500 kW) the compressed-gas energy storage system 4610 is discharged to provide motor 4612 with stored energy. The motor 4612 converts the stored energy into electric power. In some embodiments, for a synchronous electric machine running at synchronous speeds (e.g., 1800 RPM), no power electronics are required. In other embodiments, for a variable-speed electric machine, as illustrated in FIG. 46, electric power is sent to load-side power electronics 4608 that convert the electric current from AC to DC before sending the power through a common DC bus line 4606. Electric power may then be sent to line-side power electronics 4604 (DC to AC) for usage (e.g., by power grid 4602). During periods of low power-demand fluctuations (e.g., less than 500 kW) one or more batteries 4650, and/or other high-power, short-duration energy storage devices (e.g., flywheels and/or ultracapacitors), are discharged to provide power for usage. For a DC device such as a battery, the electrical output may be connected to the same line-side power electronics. For example, electric power may be discharged from the battery 4650 through the common DC bus line 4606 to line-side power electronics 4604 before being sent for usage (e.g., power grid 4602).

In various embodiments, the battery 4650 is connected to a cooling system featuring a heat exchanger 4648, a radiator 4634, a battery inlet pipe 4632 with a pump 4630, a fluid control valve 4628, and a battery return pipe 4638 with a fluid control valve 4636. Similarly, the compressed-gas energy storage system 4610 is connected to a heat-exchange subsystem featuring a heat exchanger 4614, a radiator 4620, an inlet pipe 4622 with a pump 4616, a fluid control valve 4618, and a return pipe 4626 with a fluid control valve 4624. Radiator 4620 may alternatively or additionally include or consist essentially of a thermal well. The battery inlet pipe 4632 may be connected to the inlet pipe 4622 via pipe 4642. Likewise, the battery return pipe 4638 may be connected to the return pipe 4626 via pipe 4640. Pipes 4642 and 4640 may contain fluid control valves 4644 and 4646 respectively.

In a state of operation in which the compressed-gas energy storage system 4610 is discharged to provide power to the grid (e.g., demand exceeds supply by more than 500 kW), valve 4628 is closed and valve 4644 is opened to allow heat-transfer fluid from battery inlet pipe 4632 to be sent to inlet pipe 4622 via pipe 4642. Heat-transfer fluid is circulated via pump 4616 through heat exchanger 4614, return pipe 4626, and radiator 4620. During circulation in the heat-exchange subsystem, waste heat from the battery 4650 cooling system is used to heat the compressed gas prior to and/or during expansion in the compressed-gas storage system 4610 (e.g., by formation of foam between the gas and the heated heat-transfer fluid). The storage system 4610 power density is thereby increased and/or overall efficiency is improved.

In a different state of operation in which the battery 4650 is discharged to provide power to the grid (e.g., demand exceeds supply by less than 500 kW), valve 4644 and 4646 are closed and heat exchanger 4648, battery inlet pipe 4622, pump 4630, radiator 4634, and battery return pipe 4638, form a closed-loop battery-cooling system independent of the heat-exchange subsystem of the compressed-gas energy storage system 4610. In other modes of operation, waste heat from the battery 4650 may be directed to the thermal well 4620 where the thermal energy may be stored to be used at a later time during operation of the compressed-gas storage system 4610.

Figure 47:
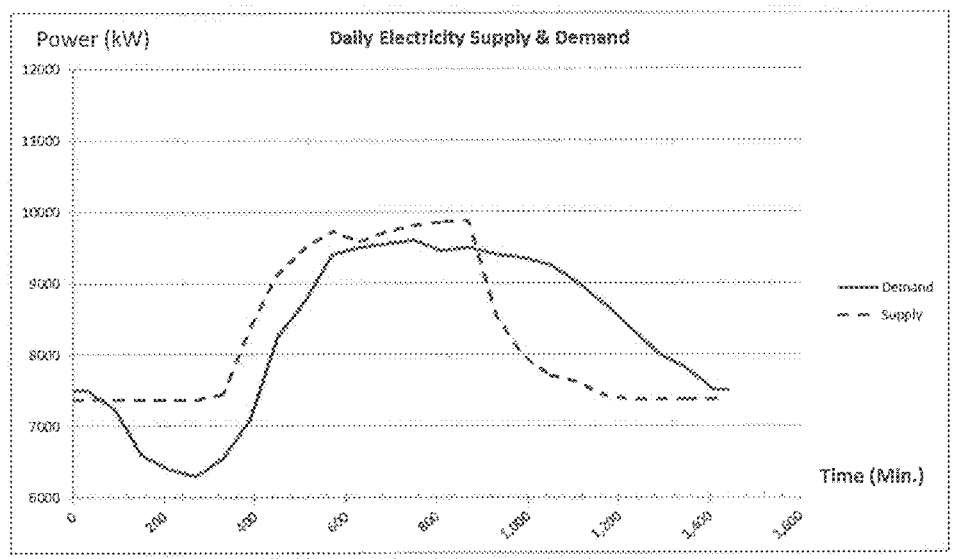
FIG. 47 is an illustrative plot of electricity supply and demand for an exemplary 24-hour period.

FIG. 47 is an illustrative plot of electricity supply and demand for an exemplary 24-hour period. The supply curve is based on a simulation of a source of constant-baseload power and an exemplary solar installation, whereas electricity demand is based on simulated data from an exemplary day. Electricity demand is typically lower during the evening and higher during the day. In the illustrative plot shown in FIG. 47, demand exceeds supply from approximately hour 15 (900 minutes) to hour 24 (1440 minutes).

Figure 48:
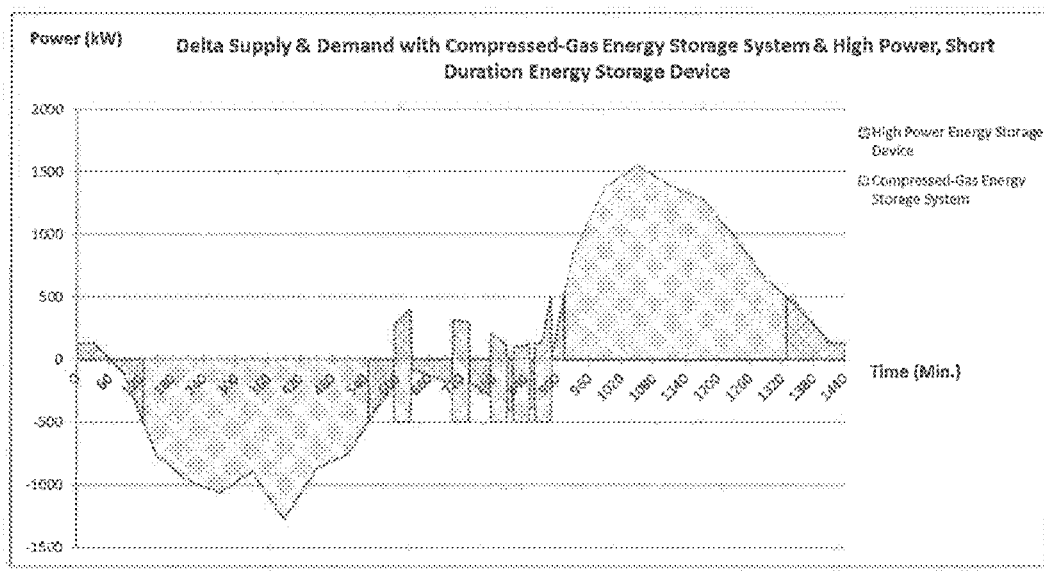
FIG. 48 is an illustrative plot of the response of a combined high-power, short-duration energy storage device and compressed-gas energy storage system, in accordance with various embodiments of the invention, on electricity supply and demand for the 24-hour period of FIG. 47.

FIG. 48 is an illustrative plot of the effect of a combined high-power, short-duration energy storage device and compressed-gas energy storage system on electricity supply and demand for a given 24-hour period. In the illustrative plot shown in FIG. 48, at minute zero demand exceeded supply by around 200 kW. The high-power, short-duration energy storage device is configured to discharge power to meet excess demand values less than 500 kW. Therefore, the high-power, short-duration energy storage device is shown in a discharging state from minute zero to minute 60 where the range of excess demand is 200 kW to 0 kW respectively. From minute 60 to minute 120, supply exceeds demand by less than 500 kW. Therefore, the high-power energy-storage device is shown in a charging state (depicted as negative values in FIG. 48) until the maximum power is reached at −500 kW.

The compressed-gas energy storage system is configured to discharge power to meet excess demand values above 500 kW. (In one embodiment, multiple 1 MW systems act as a larger system to address any power above 500 kW by employing multiple power units, e.g., two 1 MW systems may address power levels between 500 and 2000 kW). In the illustrative plot shown in FIG. 47, when supply exceeds demand in the range of 500 kW or more, the excess power is used to charge the compressed-gas energy storage system (i.e., store energy in the form of compressed gas). Therefore, the compressed-gas storage system is shown in a charging state from minute 120 to minute 540 when the excess power falls below 500 kW (depicted as negative values in FIG. 48). When the excess power falls below 500 kW, the high-power energy-storage device takes over and is therefore shown in a charging state (depicted as negative values in FIG. 48) from minute 540 to minute 600.

During the period ranging from minute 600 to minute 900, supply exceeds demand by varying values less than 500 kW; therefore, the high-power, short-duration energy storage device is shown in a charging state when values are less than 500 kW. Additionally, to maintain the state-of-charge of the high-power, short-duration energy storage device within a certain range, the compressed-gas energy storage device is shown in a charging state at −500 kW whenever the state-of-charge of the high power, short duration energy storage device exceeds a set maximum value (e.g., 900 kWh, as shown in FIG. 48 or in a discharging state at 500 kW whenever the state-of-charge of the high-power, short-duration energy storage device drops below a set minimum value (e.g., 100 kWh, as shown in FIG. 48). When demand exceeds supply from minute 900 to minute 1440, the high-power, short-duration energy storage device is discharged for the first 500 kW demand period. Afterwards, the compressed-gas energy storage system takes over and discharges power for the period where demand exceeds supply by 500 kW or more.

Figure 49:
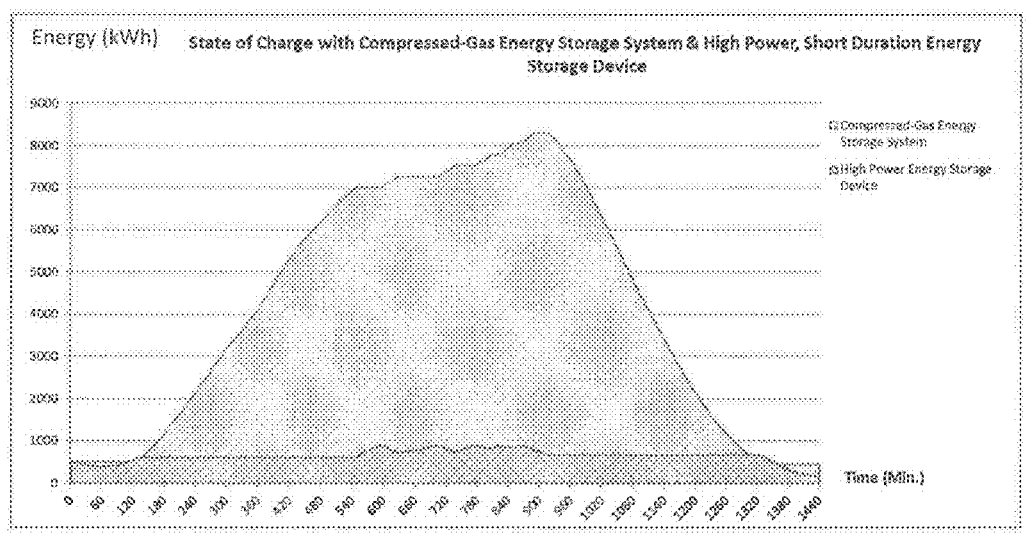
FIG. 49 is an illustrative plot of the state-of-charge of a combined high-power, short-duration energy storage device and compressed gas energy storage system, in accordance with various embodiments of the invention, for the 24-hour period of FIG. 47.

FIG. 49 is an illustrative plot of the state-of-charge for the combined high-power, short-duration energy storage device and compressed-gas energy storage system for the given 24-hour period illustrated in FIGS. 47 and 48. In this simulated scenario, a 2 MW compressed-gas energy storage system with 10 MWh of storage capacity operates in parallel with a 500 kW short-duration energy-storage device with storage capacity up to 1 MWh. Whenever the state-of-charge of the high-power, short-duration energy storage device exceeds 900 kWh (90% of maximum capacity), a portion of the stored energy is discharged to either the grid or to the compressed-gas energy storage system. Whenever the state-of-charge of the high-power, short-duration energy storage device drops below 100 kWh (10% of maximum capacity), the high-power, short-duration energy storage device is recharged via either the grid or the compressed-gas energy storage system. In this manner, the state-of-charge of the high-power, short-duration energy storage device may be maintained within an optimal range while the compressed gas energy storage system provides bulk energy storage and recovery.

Embodiments of the invention may be applied in a wide variety of settings where generation assets are connected to a grid whose loads may vary over time (e.g., with time of day), and where the power output of some generation assets may vary (e.g., with wind conditions, cloud conditions, mechanical breakdowns, transmission line failures, closures for scheduled refueling of a reactor core). Some of these applications are discussed further below.

Embodiments of the invention may also be applied in a variety of "behind the meter" settings, i.e., where a power user's access to power, or cost of power, varies over time (e.g., with time of day) and it is advantageous for the user to buy and store energy using a compressed-air energy storage system at some times and to generate power using the storage system at other times.

Figure 50:
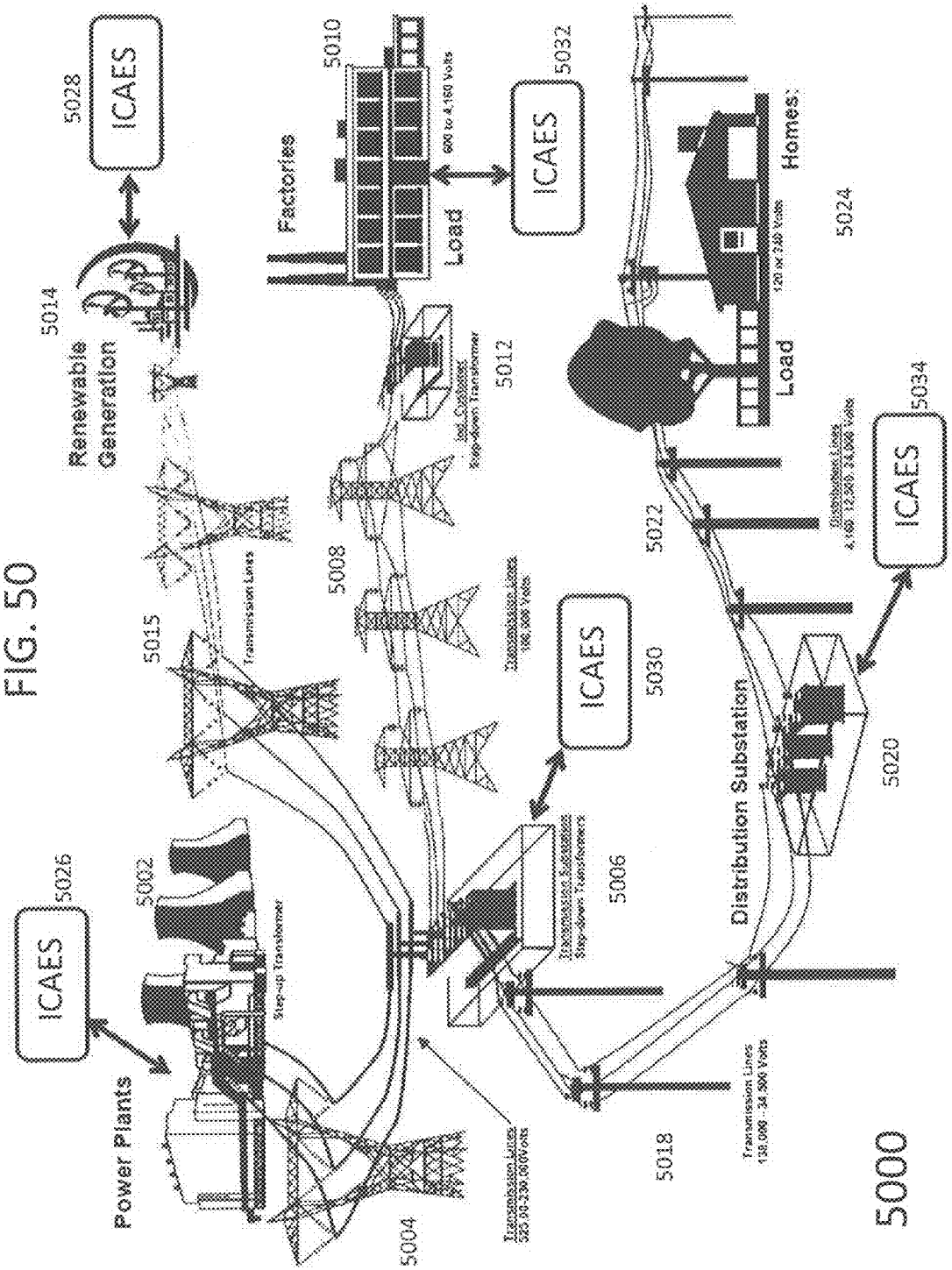
FIG. 50 is a conceptual drawing of an illustrative power generation and consumption network or grid in accordance with various embodiments of the invention.

FIG. 50 is a conceptual drawing of an illustrative power generation and consumption network or grid 5000 of conventional baseload power plants 5002, very-high-voltage transmission lines 5004, transmission substations 5006, regional high-voltage transmission lines 5008, large power loads 5010 with their own step-down transformers 5012, centralized renewable power generators 5014 (e.g., solar panels, wind turbines) connected by transmission lines 5015 to the network at, e.g., substations 5006, area transmission lines 5018, distribution substations 5020, local distribution lines 5022, small-scale power loads 5024 (e.g., homes), and isothermal compressed-air storage (ICAES™) systems 5026, 5028, 5030, 5032, 5034 that may exchange energy with other components of the network 5000 at a variety of points (as indicated by double-headed arrows). Such ICAES systems may include or consist essentially of any one or more of the illustrative energy storage systems described elsewhere herein, including those which employ foam-based heat transfer to increase thermal efficiency and speed (hence power density) of operation of cylinder assemblies.

Single representations of power lines, substations, loads, and ICAES systems stand, in the conceptual drawing of FIG. 50, for a possible multiplicity of complexly interconnected units of the same types: that is, network 5000 is a simplified representation of components of a class of real-world networks (power grids) that may be far more complex than network 5000 as represented in FIG. 50 and that may contain components (e.g., peak generators fired by natural gas) not represented in FIG. 50. Nevertheless, relationships indicated by FIG. 50 may accurately represent relationships between components in more complex real-world networks.

Applications of ICAES in network 5000 may be classed into at least four major categories, (1) conventional power generation, (2) renewable power generation and cogeneration, (3) transmission and network services, and (4) end user support.

Conventional Power Generation

Where ICAES 5026 is connected to the low-voltage side of the step-up transformer system at a conventional power plant 5002, several functions may be performed by the ICAES 5026. The operation of the ICAES 5026 and of its electrical connection with the low-voltage (local) electrical system of the power plant 5002 is governed by a control system (not depicted) including or consisting essentially of automatic controls (e.g., digital computers), human controllers, or both. Signals derived from a variety of sources may be directed to the control system of ICAES 5026. Such signals include measured, electronically coded, and remotely transmitted (reported) information describing the availability and output of other generation sources (both conventional 5002 and renewable 5014) attached to the network 500, the magnitude and location of loads (e.g., 5010, 5024), recent changes in the availability and output of generators of all types throughout network 5000 (including generators not represented in FIG. 50, e.g., rooftop solar panels co-located with loads 5010, 5024 in a geographically distributed manner), recent changes in magnitudes of loads 5010, 5024, quantitative estimates of energy stored in ICAES systems and other storage systems (e.g., hydroelectric storage reservoirs), quantitative forecasts (from, e.g., the National Weather Service) of temperatures and other aspects of weather in areas where loads are located, forecasts of renewable (e.g., hydroelectric) generation capacity based on recent weather events (e.g., precipitation) over geographically relevant areas, instantaneous market prices for exchange of power between network 5000 and other networks, impending physical challenges to the network 5000 (e.g., storms), operational status and loading of transmission facilities 5004, etc.

The controller bases decisions about the operation of ICAES 5026 upon the signals it receives. For example, energy from the conventional generator 5002 (or from elsewhere in the network 5000 via transmission lines 5004) may be stored in ICAES 5026 at a time when there is a surplus of generating capacity relative to load (e.g., at night). At such times as there is a shortage of generating capacity relative to demand (e.g., during peak demand near mid-day), or when more-expensive generators (e.g., gas-fired peak generators) would necessarily be called into action to meet demand, energy may be retrieved from ICAES 5026 and transmitted to loads through network 5000. Such electric energy time-shifting may decrease energy costs in network 5000 by obviating or mitigating the operation of more-expensive peak generators.

Alternatively or additionally, the ICAES 5026 associated with a particular generator may act as reserve capacity from which energy may be extracted when one or more other generators (not depicted) in network 5000 become unavailable (e.g., due to mechanical failure or scheduled refueling) or must operate at reduced capacity (e.g., due to low water levels at a hydroelectric facility).

Alternatively or additionally, energy may be extracted from ICAES 5026 in response to increases in loads 5024, 5010 throughout network 5000. Such increases in load may be routine (e.g., the daily peak in demand) or unusual (e.g., due to statistical fluctuations in large numbers of smaller loads, or due to a large user 5010 coming on line). Such applications may generally be termed a form of "load following."

Renewable Power Generation

ICAES 5028, co-located with renewable generators 5014 of significant size (i.e., wind farms or other non-distributed generators), can increase the value of the power provided by such generators by reducing the intermittency of their power output as seen by a purchaser of that output through the transmission lines 5015. That is, during periods when demand for power is low or generation by the renewable generator 5014 is relatively high, some or all energy produced by the renewable generator 5014 may be stored in ICAES 5028. At periods when demand (and/or price) for power is higher or when generation by the renewable generator 5014 is relatively low, energy may retrieved from ICAES 5028 and transmitted to the network 5000 via power lines 5015. Retrieval of energy from ICAES 5028 on a regular schedule is generally termed energy time-shifting; use of ICAES 5028 to mitigate the output intermittency of the generator 5014 is generally termed firming of the generator. In many real-world networks, the per-unit value of energy from a given generator is partly conditioned on the on-demand availability of that energy: since the availability of a unity of energy from a renewable generator 5014 is increased by the partial buffering of the output of generator 5014 through ICAES 5028, the use of ICAES 5028 to firm the output of renewable generator 5014 may be advantageous.

Transmission and Network Services

By means of appropriate electronic control signals, the controller of ICAES 5026 may simultaneously or independently control ICAES units 5026, 5028, 5030, 5032, 5034 and other energy-storage systems that may be located throughout the network 5000. ICAES units may be attached to network 5000 at some or all of the points indicated in FIG. 50, and/or at additional points not depicted in FIG. 50. Simultaneous remote-control operation of ICAES units and other storage units throughout network 5000 may provide a variety of transmission and network services, for example, enable the lowest-cost matching of generators (including storage units) to loads throughout the network at all times, or, if total load should exceed the generating capacity of network 5000, the minimization of economic and other losses due to supply-demand mismatch. Short-term fluctuations in load 5024, 5010, which may cause voltages on transmission lines to drop throughout portions of network 5000, may be mitigated by the rapid activation of ICAES units (e.g., units 5034, 5030) to add energy to network 5000. Such activation of rapid-response generators may generally be termed voltage support.

At times when some transmission lines (e.g., 5018) are heavily loaded, i.e., are carrying as much, or nearly as much, power as they are safely capable of carrying, yet demand increases (e.g., at load 5024), the controller may cause energy to be extracted from storage (e.g., ICAES 5034) in order to obviate the need for the transmission of additional power through the heavily loaded transmission line. Such transmission support may allow scheduled upgrades of the capacity of certain transmission lines in network 5000 to be deferred. Relief of temporary transmission congestion may also be afforded by such means.

Power to individual substations (e.g., 5006, 5020) may be supplied by ICAES units attached thereto (e.g., 5030, 5034) during widespread power outages, supporting on-site operations and thus speedier network recovery.

End User

Energy stored at ICAES units distributed in the grid (e.g., 5032, 5034) may be used to temporarily supply power to local loads when long-distance transmission lines (e.g., 5004, 5008) are disabled or overloaded, or when primary generators (e.g., 5002) are disabled, or in other outage conditions. Such powering of a local network of loads is generally termed islanding. Islanding of residential neighborhoods, industrial parks, large buildings, military bases, large single users (e.g., 5010), and other local loads may be enabled or supported by ICAES units.

Time-of-use management for single large users 5010 may be enabled by ICAES 5032. That is, energy may be purchased by the user 5010 from the grid when prices are lower (e.g., at night), stored in ICAES 5032, then extracted from storage when prices are higher (e.g., during the day). Additionally or alternatively, ICAES 5032 may assure power quality is high to the user 5010, protecting against economic losses (e.g., data losses) entailed by fluctuations in quality or availability of power from the network 5000. Additionally or alternatively, storage of energy in and retrieval of energy from ICAES 5032 may enable user 5010 to shape its demand profile in a way that manages demand charges and time-of-use.

All these applications of the invention, as well as others not explicitly described herein, are contemplated.

Generally, the systems described herein may be operated in both an expansion mode and in the reverse compression mode as part of a full-cycle energy storage system with high efficiency. For example, the systems may be operated as both compressor and expander, storing electricity in the form of the potential energy of compressed gas and producing electricity from the potential energy of compressed gas. Alternatively, the systems may be operated independently as compressors or expanders.

Embodiments of the invention may, during operation, convert energy stored in the form of compressed gas and/or recovered from the expansion of compressed gas into gravitational potential energy, e.g., of a raised mass, as described in U.S. patent application Ser. No. 13/221,563, filed Aug. 30, 2011, the entire disclosure of which is incorporated herein by reference.

Systems in accordance with embodiments of the invention may utilize a substantially incompressible fluid and/or one or more pressurized reservoirs to minimize or eliminate dead space within one or more cylinder assemblies and/or other components, as described in the '914 application and in U.S. patent application Ser. No. 13/080,910, filed Apr. 6, 2011, the entire disclosure of which is incorporated herein by reference. As also described in these applications, embodiments of the invention may incorporate mechanisms for substantially preventing the flow of compressible fluid (e.g., gas or foam) from the cylinder assembly into the heat-exchange components (e.g., heat exchangers, pumps, and/or pipes connected thereto and/or between the cylinder assembly and such components), and may thereby substantially prevent formation of dead space in the heat-exchange components. For example, various embodiments incorporate one or more check valves on the upstream side of one or more of the nozzles in the spray-generating or foam-generating mechanism introducing heat-exchange fluid into a cylinder assembly.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of storing energy, the method comprising:
dispersing a heat-transfer liquid within gas to form a first foam having a first foam expansion ratio;
compressing the first foam within a first cylinder assembly;
thereafter, transferring a second foam to a second cylinder assembly different from the first cylinder assembly, the second foam having a second foam expansion ratio smaller than the first foam expansion ratio;
compressing the second foam within the second cylinder assembly;

exhausting the compressed second foam from the second cylinder assembly; and storing at least a gaseous component of the compressed second foam.

2. The method of claim 1, wherein the gas comprises air at approximately atmospheric pressure.

3. The method of claim 1, further comprising transferring the first foam to the first cylinder assembly prior to compressing the first foam within the first cylinder assembly.

4. The method of claim 1, further comprising separating at least a portion of a liquid component from the compressed second foam prior to storing the gaseous component.

5. The method of claim 4, wherein the at least a portion of the liquid component is separated via at least one of mechanical separation or application of ultrasound energy.

6. The method of claim 5, wherein the at least a portion of the liquid component is separated via mechanical separation by at least one of a blade, a shear, a baffle, or a centrifuge.

7. The method of claim 1, wherein storing at least the gaseous component of the compressed second foam comprises storing both the gaseous component and a liquid component of the compressed second foam.

8. The method of claim 7, wherein the gaseous and liquid components are stored in the same storage reservoir.

9. The method of claim 1, wherein (i) after compressing the first foam within the first cylinder assembly, the compressed first foam is exhausted from the first cylinder assembly and (ii) the second foam comprises at least a portion of the compressed first foam.

10. The method of claim 9, wherein the compressed first foam is exhausted into a foam vessel, and further comprising introducing a heat-transfer liquid into the foam vessel to form the second foam.

11. The method of claim 1, further comprising:

after compressing the first foam, separating at least a portion of the compressed first foam into gaseous and liquid components; and forming the second foam by introducing heat-transfer liquid into the gaseous component of the compressed first foam.

12. The method of claim 11, wherein the heat-transfer liquid introduced into the gaseous component of the compressed first foam comprises at least a portion of the liquid component of the separated compressed first foam.

13. The method of claim 11, wherein the at least a portion of the compressed first foam is separated via at least one of mechanical separation or application of ultrasound energy.

14. The method of claim 13, wherein the at least a portion of the compressed first foam is separated via mechanical separation by at least one of a blade, a shear, a baffle, or a centrifuge.

15. The method of claim 11, further comprising storing the liquid component of the compressed first foam.

16. The method of claim 1, wherein a mass ratio of the first foam is approximately equal to a mass ratio of the second foam.

17. The method of claim 1, further comprising altering at least one of an average cell size or a uniformity of cell size of the first foam before compressing the first foam.

18. The method of claim 1, further comprising altering at least one of an average cell size or a uniformity of cell size of the second foam before compressing the second foam.

19. The method of claim 1, wherein a foam mass ratio of the first foam is selected from the range of 1 to 4.

20. The method of claim 1, wherein a foam mass ratio of the second foam is selected from the range of 1 to 4.

21. The method of claim 1, wherein the first foam is compressed substantially isothermally and the second foam is compressed substantially isothermally.

22. The method of claim 1, further comprising controlling a void fraction of the first foam by controlling a rate of dispersal of the heat-transfer liquid into the gas.

23. The method of claim 22, further comprising sensing at least one of a pressure or a temperature within the first cylinder assembly, wherein the rate of dispersal is controlled in response thereto.

24. The method of claim 1, further comprising, to compress the first foam and compress the second foam, driving a crankshaft mechanically coupled to the first and second cylinder assemblies.

25. The method of claim 1, wherein forming the first foam comprises spraying heat-transfer liquid on a screen.

26. The method of claim 10, wherein the heat-transfer liquid introduced into the foam vessel comprises water containing at least one foaming additive.

27. The method of claim 26, wherein the at least one foaming additive comprises at least one of the mineral oil, a glycol, a sulfonate, a fluorosurfactant, or an ethanolamine.

28. The method of claim 10, wherein forming the second foam comprises spraying heat-transfer fluid on a screen.

29. The method of claim 1, wherein the first foam comprises water containing at least one foaming additive.

30. The method of claim 29, wherein the at least one foaming additive comprises at least one of a mineral oil, a glycol, a sulfonate, a fluorosurfactant, or an ethanolamine.

* * * * *